US012487095B2

(12) United States Patent
Simpson

(10) Patent No.: US 12,487,095 B2
(45) Date of Patent: *Dec. 2, 2025

(54) CURB COMMUNITY OBJECTS WITH PRICE-TIME PRIORITY QUEUES FOR TRANSFORMED CURB CAPACITY UNITS

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,249

(22) Filed: Oct. 28, 2020

(65) Prior Publication Data

US 2021/0041258 A1 Feb. 11, 2021

Related U.S. Application Data

(63) Continuation-in-part of application No. 16/589,229, filed on Oct. 1, 2019, now abandoned, which is a (Continued)

(51) Int. Cl.

*G06Q 50/40* (2024.01)
*G01C 21/34* (2006.01)
(Continued)

(52) U.S. Cl.

CPC ..... *G01C 21/3484* (2013.01); *G01C 21/3423* (2013.01); *G06Q 10/02* (2013.01); (Continued)

(58) Field of Classification Search

None
See application file for complete search history.

(56) References Cited

U.S. PATENT DOCUMENTS 1,008,279 A 11/1911 Leuthesser
D209,710 S 12/1967 Bruce
(Continued)

FOREIGN PATENT DOCUMENTS

CN 107341968 A 11/2017
GB 2539556 A 12/2016
(Continued)

OTHER PUBLICATIONS

PCT International Search Report and Written Opinion; PCT/US2020/027543; Jul. 1, 2020.
(Continued)

*Primary Examiner* — Peter D Nolan
*Assistant Examiner* — Matthew Cobb
(74) *Attorney, Agent, or Firm* — Pramudji Law Group PLLC; Ari Pramudji

(57) ABSTRACT

Various implementations directed to price time priority queue routing for curb, sidewalk and parking capacity units are provided. Implementations of various methods and systems to transform navigation routes with two waypoints or a destination waypoint or a series sequence of waypoints into objects which have associated price-time priority queues or other prioritizations for transformed curb capacity units and curb capacity unit specifications. The present disclosed invention relates to combining the concepts of objected oriented programming, market price queues, navigation systems and social networking and curb capacity as a fungible asset class or curb capacity as an open market with trading and securitization transformations.

20 Claims, 85 Drawing Sheets

Related U.S. Application Data continuation-in-part of application No. 16/556,838, filed on Aug. 30, 2019, now Pat. No. 11,555,709, which is a continuation-in-part of application No. 16/274,490, filed on Feb. 13, 2019, now Pat. No. 11,215,466, which is a continuation-in-part of application No. 16/258,658, filed on Jan. 27, 2019, now Pat. No. 11,035,682, which is a continuation-in-part of application No. 16/257,032, filed on Jan. 24, 2019, now abandoned, which is a continuation-in-part of application No. 16/242,981, filed on Jan. 8, 2019, now abandoned, which is a continuation-in-part of application No. 16/242,967, filed on Jan. 8, 2019, now Pat. No. 12,001,999, which is a continuation-in-part of application No. 16/239,485, filed on Jan. 3, 2019, which is a continuation-in-part of application No. 16/183,647, filed on Nov. 7, 2018, now Pat. No. 11,861,527, which is a continuation-in-part of application No. 16/167,525, filed on Oct. 22, 2018, now Pat. No. 11,810,023, which is a continuation-in-part of application No. 15/877,393, filed on Jan. 23, 2018, now Pat. No. 12,124,976, which is a continuation-in-part of application No. 15/266,326, filed on Sep. 15, 2016, now Pat. No. 11,138,827, application No. 17/082,249, filed on Oct. 28, 2020 is a continuation-in-part of application No. 16/397,685, filed on Apr. 29, 2019, now Pat. No. 12,154,183, which is a continuation-in-part of application No. 16/359,841, filed on Mar. 20, 2019, now Pat. No. 12,141,885, which is a continuation-in-part of application No. 16/357,241, filed on Mar. 18, 2019, now Pat. No. 12,165,223, which is a continuation-in-part of application No. 16/183,647, filed on Nov. 7, 2018, now Pat. No. 11,861,527.

(60) Provisional application No. 63/052,159, filed on Jul. 15, 2020, provisional application No. 63/051,373, filed on Jul. 13, 2020, provisional application No. 63/044,997, filed on Jun. 26, 2020, provisional application No. 63/039,918, filed on Jun. 16, 2020, provisional application No. 63/027,344, filed on May 19, 2020, provisional application No. 62/927,025, filed on Oct. 28, 2019, provisional application No. 62/927,081, filed on Oct. 28, 2019.

(51) Int. Cl.

| | |
|---|---|
| ***G06Q 10/02*** | (2012.01) |
| ***G06Q 10/047*** | (2023.01) |
| ***G06Q 30/0283*** | (2023.01) |
| ***G06Q 30/08*** | (2012.01) |
| ***G06Q 40/04*** | (2012.01) |

(52) U.S. Cl.
CPC ....... *G06Q 10/047* (2013.01); *G06Q 30/0283* (2013.01); *G06Q 30/08* (2013.01); *G06Q 40/04* (2013.01); *G06Q 50/40* (2024.01)

(56) References Cited

U.S. PATENT DOCUMENTS

| | | | |
|---|---|---|---|
| 4,476,954 | A | 10/1984 | Johnson et al. |
| D318,073 | S | 7/1991 | Jang |
| 5,249,259 | A | 9/1993 | Harvey |
| 5,412,560 | A | 5/1995 | Dennison |
| 5,604,676 | A | 2/1997 | Penzias |
| 5,726,885 | A | 3/1998 | Klein et al. |
| 5,751,245 | A | 5/1998 | Janky et al. |
| 5,948,040 | A | 9/1999 | DeLorme et al. |
| 5,973,619 | A | 10/1999 | Paredes |
| 6,175,831 | B1 | 1/2001 | Weinreich et al. |
| 6,240,396 | B1 | 5/2001 | Walker et al. |
| 6,285,999 | B1 | 9/2001 | Page |
| D453,945 | S | 2/2002 | Shan |
| 6,356,838 | B1 | 3/2002 | Paul |
| 6,400,996 | B1 | 6/2002 | Hoffberg |
| D460,952 | S | 7/2002 | Kataoka |
| 6,421,606 | B1 | 7/2002 | Asai et al. |
| 6,434,530 | B1 | 8/2002 | Sloane et al. |
| D468,738 | S | 1/2003 | Lin |
| D469,089 | S | 1/2003 | Lin |
| 6,609,103 | B1 | 8/2003 | Kolls |
| 6,618,062 | B1 | 9/2003 | Brown et al. |
| 6,646,659 | B1 | 11/2003 | Brown et al. |
| 6,663,564 | B2 | 12/2003 | Miller-Kovach et al. |
| 6,708,879 | B2 | 3/2004 | Hunt |
| 6,850,907 | B2 | 2/2005 | Lutnick et al. |
| 7,010,472 | B1 | 3/2006 | Vasey-Glandon et al. |
| 7,090,638 | B2 | 8/2006 | Vidgen |
| 7,373,320 | B1 | 5/2008 | Mcdonough |
| D590,396 | S | 4/2009 | Lo |
| 7,584,123 | B1 | 9/2009 | Karonis et al. |
| 7,634,442 | B2 * | 12/2009 | Alvarado .............. G06Q 50/06 705/37 |
| 7,680,690 | B1 | 3/2010 | Catalano |
| 7,680,770 | B1 | 3/2010 | Buyukkokten et al. |
| 7,711,629 | B2 | 5/2010 | Laurent et al. |
| 7,747,739 | B2 | 6/2010 | Bridges et al. |
| 7,756,633 | B2 | 7/2010 | Huang et al. |
| 7,788,207 | B2 | 8/2010 | Alcorn et al. |
| D628,171 | S | 11/2010 | Hakopian |
| 7,886,166 | B2 | 2/2011 | Shnekendorf et al. |
| D638,879 | S | 5/2011 | Suto |
| 7,987,110 | B2 | 7/2011 | Cases et al. |
| 8,024,234 | B1 | 9/2011 | Thomas et al. |
| 8,065,191 | B2 | 11/2011 | Senior |
| D650,385 | S | 12/2011 | Chiu |
| 8,121,780 | B2 | 2/2012 | Gerdes et al. |
| 8,249,946 | B2 | 8/2012 | Froseth et al. |
| 8,296,335 | B2 | 10/2012 | Bouve et al. |
| 8,388,451 | B2 | 3/2013 | Auterio et al. |
| 8,570,244 | B2 | 10/2013 | Mukawa |
| 8,762,035 | B2 | 6/2014 | Levine et al. |
| 8,798,593 | B2 | 8/2014 | Brown et al. |
| 8,918,411 | B1 | 12/2014 | Latif et al. |
| 8,920,175 | B2 | 12/2014 | Black et al. |
| 8,930,490 | B2 | 1/2015 | Brown et al. |
| 8,968,099 | B1 | 3/2015 | Hanke et al. |
| 9,011,153 | B2 | 4/2015 | Bennett et al. |
| 9,020,763 | B2 | 4/2015 | Faaborg et al. |
| 9,077,204 | B2 | 7/2015 | More et al. |
| 9,092,826 | B2 | 7/2015 | Deng et al. |
| 9,159,088 | B2 | 10/2015 | Dillahunt et al. |
| 9,213,957 | B2 * | 12/2015 | Stefik .................. G06Q 10/025 |
| 9,274,540 | B2 | 3/2016 | Anglin et al. |
| 9,292,764 | B2 | 3/2016 | Yun et al. |
| 9,387,928 | B1 | 7/2016 | Gentry et al. |
| 9,389,090 | B1 | 7/2016 | Levine et al. |
| 9,389,094 | B2 | 7/2016 | Brenner et al. |
| 9,410,963 | B2 | 8/2016 | Martin et al. |
| 9,436,923 | B1 | 9/2016 | Sriram et al. |
| 9,450,817 | B1 | 9/2016 | Bahadur et al. |
| D772,828 | S | 11/2016 | Kusumoto |
| 9,528,972 | B2 | 12/2016 | Minvielle |
| 9,558,515 | B2 | 1/2017 | Babu et al. |
| 9,665,983 | B2 | 5/2017 | Spivack |
| 9,880,577 | B2 | 1/2018 | Dyess et al. |
| 9,952,042 | B2 | 4/2018 | Abovitz et al. |
| 9,960,637 | B2 | 5/2018 | Sanders et al. |
| 9,978,282 | B2 | 5/2018 | Lambert et al. |
| 10,082,793 | B1 | 9/2018 | Glaser |
| D832,355 | S | 10/2018 | Castro |
| 10,216,367 | B1 | 2/2019 | Patel |
| 10,262,289 | B2 | 4/2019 | Vaananen |
| 10,395,332 | B1 | 8/2019 | Konrardy et al. |
| 10,403,050 | B1 | 9/2019 | Beall et al. |
| 10,408,489 | B1 | 9/2019 | Trishaun et al. |

(56) References Cited

U.S. PATENT DOCUMENTS 10,452,978 B2 10/2019 Shazeer et al.
10,460,520 B2 10/2019 Simpson et al.
10,533,850 B2 1/2020 Abovitz et al.
10,586,084 B2 3/2020 Burch et al.
10,685,503 B2 6/2020 Ricci
10,737,585 B2 8/2020 Chaudhary et al.
D896,315 S 9/2020 Castro
10,832,337 B1 11/2020 Floyd et al.
D903,657 S 12/2020 Catania
D903,658 S 12/2020 Catania
D903,659 S 12/2020 Catania
10,872,381 B1 12/2020 Leise et al.
D910,758 S 2/2021 Leong
11,138,827 B2 10/2021 Simpson
11,183,080 B2 11/2021 Wolf et al.
D938,375 S 12/2021 Zhang
11,288,563 B2 3/2022 Lee et al.
11,296,897 B2 4/2022 Endress et al.
11,298,017 B2 4/2022 Tran
11,298,591 B2 4/2022 Evancha
11,537,953 B2 12/2022 Beaurepaire
11,555,709 B2 1/2023 Simpson
11,586,993 B2 2/2023 Handler et al.
D980,210 S 3/2023 Wu
11,651,464 B2 5/2023 Park
D993,316 S 7/2023 Lin
11,704,219 B1 7/2023 Lerner et al.
11,722,500 B2 8/2023 Singh
11,734,618 B2 8/2023 Ogden
D1,000,137 S 10/2023 Shuster
D1,007,451 S 12/2023 Im
D1,024,065 S 4/2024 Kim
2002/0004788 A1 1/2002 Gros et al.
2002/0013718 A1 1/2002 Cornwell
2002/0013761 A1 1/2002 Bundy
2002/0017997 A1 2/2002 Wall
2002/0065738 A1 5/2002 Riggs et al.
2002/0065766 A1 5/2002 Brown et al.
2002/0128952 A1 9/2002 Melkomaian
2002/0133456 A1 9/2002 Lancaster et al.
2002/0161689 A1 10/2002 Segal
2003/0055776 A1 3/2003 Samuelson
2003/0191725 A1 10/2003 Ratliff et al.
2003/0233311 A1 12/2003 Bramnick et al.
2004/0019552 A1 1/2004 Tobin
2004/0115596 A1 6/2004 Snyder et al.
2004/0249742 A1 12/2004 Laurent et al.
2004/0254819 A1 12/2004 Halim
2004/0260581 A1 12/2004 Baranowski et al.
2005/0021346 A1 1/2005 Nadan et al.
2005/0027637 A1 2/2005 Kohler
2005/0132070 A1 6/2005 Redlich et al.
2005/0288974 A1 12/2005 Baranowski et al.
2005/0288986 A1 12/2005 Barts et al.
2006/0104224 A1 5/2006 Singh
2006/0184321 A1 8/2006 Kawakami
2007/0005224 A1 1/2007 Sutardja
2007/0260723 A1 11/2007 Cohen
2008/0033833 A1 2/2008 Senior
2008/0040232 A1 2/2008 Perchthaler
2008/0077309 A1 3/2008 Cobbold
2008/0129490 A1 6/2008 Linville et al.
2008/0140557 A1 6/2008 Bowlby et al.
2008/0157990 A1 7/2008 Belzer et al.
2008/0195428 A1 8/2008 O'Sullivan
2008/0195432 A1 8/2008 Fell et al.
2008/0262892 A1 10/2008 Prager et al.
2009/0221338 A1 9/2009 Stewart
2009/0231687 A1 9/2009 Yamamoto
2009/0271236 A1 10/2009 Ye et al.
2009/0275002 A1 11/2009 Hoggle
2009/0276154 A1 11/2009 Subramanian et al.
2009/0287401 A1 11/2009 Levine et al.
2009/0309729 A1 12/2009 Nichols
2010/0042421 A1 2/2010 Bai et al.
2010/0081548 A1 4/2010 Labedz
2010/0114790 A1* 5/2010 Strimling ............. G06Q 10/083
705/330
2010/0191834 A1 7/2010 Zampiello
2010/0208029 A1 8/2010 Marti
2010/0211441 A1 8/2010 Sprigg et al.
2010/0217680 A1 8/2010 Fusz et al.
2010/0228574 A1 9/2010 Mundinger et al.
2010/0280748 A1 11/2010 Mundinger et al.
2010/0280884 A1 11/2010 Levine et al.
2010/0306078 A1 12/2010 Hwang
2010/0318373 A1 12/2010 Harris
2011/0025267 A1 2/2011 Kamen et al.
2011/0059693 A1 3/2011 O'Sullivan
2011/0098056 A1 4/2011 Rhoads et al.
2011/0106660 A1 5/2011 Ajjarapu et al.
2011/0184784 A1 7/2011 Rudow
2011/0191248 A1 8/2011 Bishop
2011/0202418 A1 8/2011 Kempton et al.
2012/0023032 A1 1/2012 Visdomini
2012/0072925 A1 3/2012 Jenkins et al.
2012/0075067 A1 3/2012 Attaluri
2012/0078743 A1* 3/2012 Betancourt ............ G06Q 30/08
705/338
2012/0101629 A1 4/2012 Olsen et al.
2012/0130556 A1 5/2012 Marhoefer
2012/0136527 A1 5/2012 McQuade
2012/0158762 A1 6/2012 IwuchukWu
2012/0303259 A1 11/2012 Prosser
2012/0323645 A1 12/2012 Spiegel et al.
2013/0024041 A1 1/2013 Golden et al.
2013/0035973 A1 2/2013 Desai et al.
2013/0132261 A1 5/2013 Ebersole
2013/0147820 A1 6/2013 Kalai et al.
2013/0173326 A1 7/2013 Anglin et al.
2013/0179205 A1 7/2013 Slinin
2013/0191237 A1 7/2013 Tenorio
2013/0211863 A1 8/2013 White
2013/0265174 A1 10/2013 Scofield et al.
2013/0268325 A1 10/2013 Dembo
2013/0275156 A1 10/2013 Kinkaid et al.
2013/0304522 A1 11/2013 Cundle
2013/0311264 A1 11/2013 Solomon et al.
2014/0032034 A1 1/2014 Raptopoulos
2014/0038781 A1 2/2014 Foley
2014/0052500 A1 2/2014 Vallapuzha et al.
2014/0075528 A1 3/2014 Matsuoka
2014/0098009 A1 4/2014 Prest et al.
2014/0122190 A1 5/2014 Wolfson et al.
2014/0129302 A1 5/2014 Amin et al.
2014/0149157 A1 5/2014 Shaam et al.
2014/0162598 A1 6/2014 Villa-Real
2014/0180732 A1 6/2014 Rotchin
2014/0220516 A1 8/2014 Marshall et al.
2014/0229258 A1 8/2014 Seriani
2014/0236641 A1 8/2014 Dawkins
2014/0244413 A1 8/2014 Senior
2014/0282586 A1 9/2014 Shear et al.
2014/0310019 A1 10/2014 Blander et al.
2014/0310149 A1 10/2014 Singh
2014/0324633 A1* 10/2014 Pollak .................. G06Q 10/083
705/26.63
2014/0349672 A1 11/2014 Kern et al.
2015/0006428 A1 1/2015 Miller et al.
2015/0016777 A1 1/2015 Abovitz et al.
2015/0058051 A1 2/2015 Movshovich
2015/0097864 A1 4/2015 Alaniz
2015/0154516 A1 6/2015 Joachim
2015/0161564 A1 6/2015 Sweeney et al.
2015/0178642 A1 6/2015 Abboud
2015/0198459 A1 7/2015 MacNeille et al.
2015/0206443 A1 7/2015 Aylesworth et al.
2015/0220916 A1 8/2015 Prakash et al.
2015/0241236 A1 8/2015 Slusar et al.
2015/0248689 A1 9/2015 Paul et al.
2015/0260474 A1 9/2015 Rublowsky et al.
2015/0269865 A1 9/2015 Volach et al.
2015/0324831 A1 11/2015 Barua et al.
2015/0348282 A1 12/2015 Gibbon et al.

(56) References Cited

U.S. PATENT DOCUMENTS

2015/0371186 A1 12/2015 Podgurny et al.
2016/0018969 A1 1/2016 Sundarraman
2016/0026253 A1 1/2016 Bradski et al.
2016/0034305 A1 2/2016 Shear et al.
2016/0041628 A1 2/2016 Verma
2016/0063436 A1 3/2016 Coles
2016/0117657 A1 4/2016 Forbes, Jr. et al.
2016/0117756 A1 4/2016 Carr et al.
2016/0148289 A1 5/2016 Altschuler
2016/0162989 A1 6/2016 Cole et al.
2016/0171891 A1 6/2016 Banatwala et al.
2016/0203422 A1 7/2016 Demarchi et al.
2016/0221935 A1 8/2016 Jaworska-Maslanka
2016/0224935 A1* 8/2016 Burnett .............. G06Q 10/0834
2016/0225115 A1 8/2016 Levy et al.
2016/0253662 A1 9/2016 Sriram
2016/0297316 A1 10/2016 Penilla et al.
2016/0298977 A1 10/2016 Newlin
2016/0300296 A1 10/2016 Alonso Cembrano
2016/0307276 A1 10/2016 Young
2016/0307288 A1 10/2016 Yehuda et al.
2016/0307373 A1 10/2016 Dean et al.
2016/0321609 A1* 11/2016 Dube ............... G06Q 10/08355
2016/0349835 A1 12/2016 Shapira
2016/0364679 A1 12/2016 Cao
2017/0019496 A1 1/2017 Orbach
2017/0039770 A1 2/2017 Lanier et al.
2017/0046658 A1 2/2017 Jones et al.
2017/0046664 A1 2/2017 Haldenby et al.
2017/0046799 A1 2/2017 Chan et al.
2017/0046806 A1 2/2017 Haldenby et al.
2017/0048216 A1 2/2017 Chow et al.
2017/0053461 A1 2/2017 Pal et al.
2017/0061509 A1 3/2017 Rosenberg et al.
2017/0089710 A1 3/2017 Slusar
2017/0122746 A1 5/2017 Howard et al.
2017/0146360 A1 5/2017 Averbuch
2017/0232300 A1 8/2017 Tran et al.
2017/0243286 A1 8/2017 Castinado et al.
2017/0243310 A1 8/2017 Dawkins
2017/0249626 A1 8/2017 Marlatt
2017/0276500 A1 9/2017 Margalit et al.
2017/0293881 A1* 10/2017 Narkulla .............. G06Q 10/083
2017/0293950 A1 10/2017 Rathod
2017/0318325 A1 11/2017 Ortiz
2017/0330274 A1 11/2017 Conant, II et al.
2017/0356749 A1 12/2017 Shelby
2017/0357914 A1 12/2017 Tulabandhula
2017/0373509 A1 12/2017 Betzin
2018/0012149 A1 1/2018 Yust
2018/0013211 A1 1/2018 Ricci
2018/0025417 A1 1/2018 Brathwaite et al.
2018/0046431 A1 2/2018 Thagadur Shivappa et al.
2018/0053226 A1 2/2018 Hutton et al.
2018/0053237 A1 2/2018 Hayes et al.
2018/0068355 A1 3/2018 Garry
2018/0075695 A1 3/2018 Simpson
2018/0088455 A1 3/2018 Cippant
2018/0095471 A1 4/2018 Allan et al.
2018/0102053 A1 4/2018 Hillman et al.
2018/0111494 A1 4/2018 Penilla et al.
2018/0117447 A1 5/2018 Bao et al.
2018/0121958 A1 5/2018 Aist et al.
2018/0129276 A1 5/2018 Nguyen et al.
2018/0140903 A1 5/2018 Poure
2018/0143029 A1 5/2018 Nikulin et al.
2018/0157999 A1 6/2018 Arora
2018/0165354 A1 6/2018 Mehta et al.
2018/0173742 A1 6/2018 Liu et al.
2018/0173800 A1 6/2018 Chang et al.
2018/0188715 A1 7/2018 Cella et al.
2018/0190026 A1 7/2018 Barnett et al.
2018/0209801 A1 7/2018 Stentz
2018/0209803 A1 7/2018 Rakah
2018/0238705 A1 8/2018 O'Herlihy
2018/0240542 A1 8/2018 Grimmer
2018/0278984 A1 9/2018 Aimone et al.
2018/0293638 A1 10/2018 Simpson
2018/0313798 A1 11/2018 Chokshi et al.
2018/0342106 A1 11/2018 Rosado
2018/0348863 A1 12/2018 Aimone et al.
2018/0357899 A1 12/2018 Krivacic et al.
2018/0365598 A1 12/2018 Jamail
2018/0365904 A1 12/2018 Holmes
2018/0374268 A1 12/2018 Niles
2019/0019144 A1 1/2019 Gillen
2019/0020973 A1 1/2019 Harish
2019/0047427 A1 2/2019 Pogorelik
2019/0050634 A1 2/2019 Nerayoff et al.
2019/0066528 A1 2/2019 Hwang et al.
2019/0102946 A1 4/2019 Spivack et al.
2019/0108686 A1 4/2019 Spivack et al.
2019/0139448 A1 5/2019 Marshall et al.
2019/0143828 A1 5/2019 Sawada et al.
2019/0146974 A1 5/2019 Chung et al.
2019/0158603 A1 5/2019 Nelson et al.
2019/0160958 A1 5/2019 Chaudhary et al.
2019/0178654 A1 6/2019 Hare
2019/0180862 A1 6/2019 Wisser et al.
2019/0186942 A1 6/2019 Rubin
2019/0188450 A1 6/2019 Spivack et al.
2019/0202448 A1 7/2019 Pal et al.
2019/0204110 A1 7/2019 Dubielzyk
2019/0205798 A1 7/2019 Rosas-Maxemin et al.
2019/0228269 A1 7/2019 Brent et al.
2019/0236741 A1 8/2019 Bowman et al.
2019/0236742 A1 8/2019 Tomskii et al.
2019/0251503 A1 8/2019 Simpson
2019/0251509 A1 8/2019 Simpson
2019/0259008 A1 8/2019 Lindsey
2019/0271553 A1 9/2019 Simpson
2019/0272589 A1 9/2019 Simpson
2019/0293438 A1 9/2019 Simpson
2019/0304000 A1 10/2019 Simpson
2019/0311431 A1 10/2019 Simpson
2019/0318286 A1 10/2019 Simpson
2019/0324989 A1 10/2019 Borochoff et al.
2019/0325541 A1 10/2019 Simpson
2019/0333166 A1 10/2019 Simpson
2019/0333181 A1 10/2019 Simpson
2019/0353499 A1 11/2019 Stenneth
2020/0013498 A1 1/2020 Gelber
2020/0027096 A1 1/2020 Cooner
2020/0047055 A1 2/2020 Ward
2020/0098071 A1 3/2020 Jackson
2020/0125999 A1 4/2020 Simpson
2020/0151816 A1 5/2020 Simpson
2020/0156495 A1 5/2020 Lindup
2020/0160461 A1 5/2020 Kaniki
2020/0173808 A1 6/2020 Beaurepaire et al.
2020/0219017 A1 7/2020 Simpson
2020/0226853 A1 7/2020 Ahmed et al.
2020/0317074 A1 10/2020 Miller et al.
2020/0317075 A1 10/2020 Yokoyama et al.
2020/0389301 A1 12/2020 Detres et al.
2021/0004909 A1 1/2021 Farmer et al.
2021/0012278 A1 1/2021 Alon et al.
2021/0041258 A1 2/2021 Simpson
2021/0042835 A1 2/2021 Simpson
2021/0065100 A1 3/2021 Hwang
2021/0158447 A1 5/2021 Simpson
2021/0166317 A1 6/2021 Simpson
2021/0248633 A1 8/2021 Simpson
2021/0318132 A1 10/2021 Simpson
2021/0326872 A1 10/2021 Robotham
2021/0379447 A1 12/2021 Lee
2021/0382924 A1 12/2021 Aaltonen et al.
2022/0020073 A1 1/2022 Farmer
2022/0068081 A1 3/2022 Pariseau
2022/0100731 A1 3/2022 Tirapu Azpiroz et al.
2022/0122026 A1 4/2022 Okabe et al.

(56) References Cited

U.S. PATENT DOCUMENTS

| | | | |
|---|---|---|---|
| 2023/0157579 A1 | 5/2023 | Sato | |
| 2023/0377409 A1 | 11/2023 | Rye | |

FOREIGN PATENT DOCUMENTS

| | | | |
|---|---|---|---|
| JP | 2003177034 A | 12/2001 | |
| KR | 20170078094 A1 | 12/2015 | |
| WO | 9508240 A2 | 3/1995 | |
| WO | 2001041084 A2 | 6/2001 | |
| WO | 2015059691 A1 | 4/2015 | |
| WO | 2015161307 A1 | 4/2015 | |
| WO | 2018024844 A1 | 2/2018 | |
| WO | 2019/134005 A1 | 7/2019 | |
| WO | 2019183468 A1 | 9/2019 | |
| WO | 2021/163675 A1 | 8/2021 | |

OTHER PUBLICATIONS

PCT International Search Report and Written Opinion; PCT/US2020/023223; Jun. 1, 20209.
PCT International Search Report and Written Opinion; PCT/US2020/023729; Jun. 1, 20208.
PCT International Search Report and Written Opinion; PCT/US2020/021546; Jun. 8, 2020.
PCT International Search Report and Written Opinion; PCT/US2020/018012; Apr. 2, 20201.
PCT International Search Report and Written Opinion; PCT/US2020/012208; Mar. 2, 20204.
Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020). https://www.nature.com/articles/s41598-018-33008-7.
Ahmed, et al.; Energy Trading with Electric Vehicles in Smart Campus Parking Lots; Applied Sciences; Sep. 7, 2018.
Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?.
Peters, et al.; Student Support Services for Online Learning Re-Imagined and Re-Invigorated: Then, Now and What's To Come; Contact North | Contact Nord; Sep. 2017.
Soccer ball-shaped drone might be the safest flying robot yet https://mashable.com/2015/12/21/soccer-ball-drone/ ; Dec. 21, 2015.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
U.S. Appl. No. 60/035,205, filed Jan. 10, 1997.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool For YOur Business, https://www.reedsmith.com/-/media/files/perspectives/2007/02/freight-derivatives--a-vital-tool-for-your-business/files/freight-derivatives--a vital-tool-for-your-business/fileattachment/etcfreightderivativesavitaltoolforyourbusiness.pdf(Year: 2007), Energy, Trade & Commodities, pp. 1-3.
Barry, Kieth, App lets drivers auction public parking spaces, Wired, Aug. 11, 2011, pp. 1-4.
Jiang, Landu, et al., Sun Chase: Energy-Efficient Route Planning for solar-powered Evs, IEEE 37th international conference on distrubuted computing systems, 2017, pp. 1-11.
Netlingo, https://web.archive.org/web/20170122184857/https://www.netlingo.com/word/electronic-exchange.php,dated Oct. 22, 2017.
Laseter, Tim, et al., "B2B benchmark: The State of Electronic Exchanges", Tech & Innovation, dated Oct. 1, 2001.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDKOM2, pp. 1-14, Aug. 2020.
Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.
Change the World, https://fortune.com/change-the-world/2019/IBM/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Ramasubramanian, Vasant, "Quadrasense: Immersive UAV-based cross-reality environmental sensor networks," phD diss., Massachusetts Institute of Technology, pp. 1-75, 2015.
Wyzant, https://web.archive.org/web/20190327185429/https://www.wyzant.com/hotitworks/students, Wyzant tutoring, pp. 1-13 , Mar. 27, 2019.
PCT International Search Report and Written Opinion; PCT/US2021/065855; Mar. 29, 2022.
PCT International Search Report and Written Opinion; PCT/US2022/012717; Mar. 30, 2022.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
PCT International Search Report and Written Opinion; PCT/US2022/027077; Nov. 1, 2022.
EP23168879.7 European Search Report, Jul. 5, 2023, pp. 1-13.
Wei, et al. "impact of aircraft size and seat availability on airlines demand and market share in duopoly markets" Published by Elsevier, 2005, pp. 315-327.
PCT International Search Report and Written Opinion; PCT/US2022/052969; Mar. 21, 2023.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; Mar. 8, 2023.
EP23153137.7 European Search Report, May 24, 2023, pp. 1-10.
EP20787830.7 European Search Report, May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
Papa, U., & Del Core, G., "Design of Sonar Sensor Model for Safe Landing of an UAV," IEEE Metrology for Aerospace, 2015, pp. 346-350.
Li, Jundong, et al., "Multi-network Embedding", pp. 1-9, 2018.
Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.

(56) References Cited

OTHER PUBLICATIONS

Freebeat, Smart Exercise Bike; retrieved from internet: https://www.amazon.com/Resistance-Cushioned-Detection-Altorithm-Instructors/dp/BOBZKKZ6B3/?th=1, Mar. 3, 2023; p. 1.
Aratani, Lori, "This app wants to reward you for smart commuting choices," The Washington Post, Aug. 18, 2018, pp. 1-3.
Yu, Haicong et al.; "A Multi-Modal Route Planning Approach with an Improved Genetic Algorithm", The International Archives of the Photogrammetry, Remote Sensing and Spaital Information Sciences, vol. 38, Part I, 2010.
"Node Influence Metric", Wikipedia, Nov. 6, 2020, pp. 1-5.
EP21916571 European Search Report, May 29, 2024, pp. 1-9.
Bortolini, et al.; "Fresh food sustainable distribution: cost, delivery time and carbon footprint three-objective optimization," 2016, pp. 1-12.
Fulldomepro, VR Aquatic Simulator with a Dome, Pub. Sep. 3, 2018 https://www.youtube.com/watch?v=k_53G5DksjQ, pp. 1-2.
Randomoneh, Dome Screens & Displays, Pub. Oct. 12, 2012, https:// hardforum.com/threads/dome-screens-displays, p. 1.
Borgobello, Bridget, TOOB Personal Dome Screen Revamped, Pub. Jan. 12, 2012, https:// newatlas.com/toob-earth-personal-dome-screen/21082, p. 1.
Asghari, et al; "Price-aware Real-time Ride-sharing at Scale—An Auction-based Approach", Oct. 31, 2016, SIGSPACIAL'16: Proceedings of the 24th Acm SIGSPATIAL International Conference on Advances in Geographic Information Systems, Article No. 3, pp. 1-10.
EP22740218.7 European Search Report, Nov. 12, 2024, pp. 1-29.
EP23153137.7 Exam Report (Communication pursuant to Article 94(3) EPC), Mar. 5, 2025, pp. 1-11.
Chang, et al., "Estimating Real-Time Traffic Carbon Dioxide Emissions Based on Intelligent Transportation System Technologies," IEEE Mar. 1, 2013, vol. 14, pp. 1-11.
Karbassi, et al.; "Vehicle Route Prediction and Time of Arrival Estimation Techniques for Improved Transportation System Management" Published by IEEE; 2003, pp. 511-516.
Valdes, J. J., et al.; (Sep. 2007). Virtual reality high dimensional objective spaces for multi-objective optimization: An improved representation. In 2007 IEEE Congress on Evolutionary Computation (pp. 4191-4198). IEEE., pp. 1-11.
Valdes, J. J., et al.; (2007). Multi-objective evolutionary optimization for constructing neural networks for virtual reality visual data mining: Application to geophysical prospecting. Neural networks, 20(4), pp. 498-508.
Zhao, et al., Deshpande, P. M., Naughton, J. F., & Shukla, A (Jun. 1998). Simultaneous optimization and evaluation of multiple dimensional queries. In Proceedings of the 1998 ACM SIGMOD international conference on Management of data (pp. 271-282).
Saulle, Rosella, et al., "Cost and Cost-Effectiveness of the Mediterranena Diet: Results of a Systemtic Review," www.mdpi.com/journal/nutrients, Nutrients 2013, 5, pp. 4566-4586.
Nikonowicz, et al., "Virtual Power Plants", Published by Open Acess Journal, 2012, pp. 135-149.
Garamvolgyi et al.; Towards_Model-Drive_Engineering_of_Smart_Contracts; IEEE/IFIP, pp. 134-139; 2018.
Khan et al; "A distributed-Ledger Consortium Model for Collaborative_Innovation"; IEEE pp. 29-37; 2017.
Meiklejohn S.; Top Ten Obstacles along Distributed Ledgers Path to Adoption; UCL; pp. 13-19; 2017.
Muttavarapu et al.; Distributed_Ledger_for_Spammers_Resume; IEEE; 9 pages, 2018.
S. Pramanik, P. Agrawal, and H. Hussain, "OmniNet: A unified architecture for multi-modal multi-task learning," Jul. 3, 2020 v2, arXiv: 1907.07804.
R. Akula, S. Gella, Y. Al-Onaizan, S.-C. Zhu, and S. Reddy, "Words aren't enough, their order matters: On the robustness of grounding visual referring expressions," 2020, arXiv:2005.01655.
R. Child, S. Gray, A. Radford, and I. Sutskever, "Generating long sequences qith sparse transformer," 2019, arXiv:1904.10509.
Y. Xian, C. H. Lampert, B. Schiele, and Z. Akata, "Zero-shot learning—A comprehensive evaluation of the good, the bad and the ugly," IEEE Trans. Pattern Anal. Mach. Intell., vol. 41, No. 9, pp. 2251-2265, Sep. 2019.
Owens and A. A. Efros, "Audio-visual scene analysis with selfsupervised multisensory features," inProc. Eur. Conf. Comput. Vis., 2018, pp. 639-658.
T. Chen and R. R. Rao; "Audio-visual integration in multimodal communication," Proc. IEEE, vol. 86, No. 5, pp. 837-852, May 1998.
N. Li, S. Liu, Y. Liu, S. Zhao, and M. Liu, "Neural speech synthesis with transformer network," in Proc. AAAI Conf. Artif. Intell., 2019, pp. 6706-6713.
M. Chen, Y. Li, Z. Zhang, and S. Huang, "TVT: Two-view transformer network for video captioning," in Proc. 10th Asian Conf. Mach. Learn., 2018, pp. 847-862.
X. Lin, C. Ding, J. Zeng, and D. Tao, "GPS-Net: Graph property sensing network for scene graph generation," in Proc. IEEE Conf. Comput. Vis. Pattern Recongnit., 2020, pp. 3743-3752.
W. Hao, C. Li, X. Li, L. Carin, and J. Gao, "Towards learning a generic agent for vision-and-language navigation via pre-training," in Proc. IEEE Conf. Comput. Vis. Pattern Recognit., 2020, pp. 13134-13143.
S. Ren, K. He, R. Girshick, and J. Sun, "Faster R-CNN: Towards realtime object detection with region proposal networks," in Proc. Int. Conf. Neural Inf. Porcess. Syst., 2015, pp. 91-99.
Y.-H. Tsai, S. Bai, P. P. Liang, J. Z. Kolter, L.-P. Morency, and R. Salakhutdinov, "Multimodal transformer for unaligned multimodal language sequences," in Proc. Conf. Assoc. Comput. Linguistics, 2019, pp. 6558-6569
J. Lin, A. Yang, Y. Zhang, J. Liu, J. Zhou, and H. Yang, "InterBERT: Vision-and-language interaction for multi-modal pretraining," 2020, arXvi:2003.13198.
D. Tran, H.Wang, L. Torresani, J. Ray, R. LeCun, and M. Paluri, "A closer look at spatiotemporal convolutions for action recognition," inProc. IEEE. Conf. Comput. Vis. Pattern Recongit., 2018, pp. 6450-6459.
S. Xie, C. Sun, J. Huang, Z. Tu, and K. Murphy, "Rethinking spatiotemporal feature learning for video understanding," 2017, arXiv:1712.04851.
L. Zhou, Y. Zhou, J. J. Corso, R. Socher, and C. Xiong, "End-to-end dense video captioning with masked transformer," in Proc. IEEE Conf. Comput. Vis. Pattern Recongit., 2018, pp. 8739-8748.
X. Wang, R. Girshick, A. Gupta, and K. He, "Non-local neural networks," in Proc. IEEE Conf. Comput. Vis Pattern Recongit., 2018, pp. 7794-7803.
J. L. Ba, J. R. Kiros, and G. E. Hinton, "Layer normalization," 2016, arXiv:1607.06450.
S. Ioffe and C. Szegedy, "Batch normalization: Accelerating deep network training by reducing internal covariate shift,"in Proc. Int. COnf. Mach. Learn., 2015, pp. 448-456.
K. He, X. Zhang, S. Ren, and J. Sun, "Deep residual learning for image recognition," in Proc. IEEE Conf. Comput. Vis. Pattern. Recongit., 2016, pp. 770-778.
J. Malmaud, J. Huang, V. Rathod, N. Johnston, A. Rabinovich, and K. Murpgy, "What's Cookin'? Interpreting cooking videos using text, speech and vision," 2015, arXiv:1503.01558.
L. Zhou, C. Xu, and J. J. Corso, "Towards automatic learning of procedures from web instructional videos," in Proc. AAAI Conf. Artif. Intelli., 2018, pp. 7590-7598.
D. Kiela et al., The hateful memes challenge: Detecting hate speech in multimodal memes, arXiv:2005.04790.
Miech, D. Zhukov, J.-B. Alayrac, M. Tapaswi, I. Laptev, and J. Sivic, "HowTo100M: Learning a text-video-embedding by watching hundred million narrated video clips," in Proc. IEEE Int. Conf. Comput. Vis., 2019, pp. 2630-2640.
Das et al., "Visual dialong," in Proc. IEEE Conf. Comput. VIs. Pattern Recongit., 2017, pp. 1080-1089.
R. Krishna, K. Hata, F. Ren, L. Fei-Fei, and J. C. Niebles, "Densecaptioning events in videos, " in Proc. IEEE Int. Conf. Comput. Vis., 2017, pp. 706-715.

(56) References Cited

OTHER PUBLICATIONS

V. Ordonez, G. Kulkarni, and T. Berg, "Im2Text: Describing images using 1 million captioned photographs, " in Proc. Int. Conf. Neural Inf. Process. Syst., 2011, pp. 1143-1151.
R. Krishna et al., "Visual genome: Connecting language and vision uisng crowdsourced dense image annotations," Int. J. Comput. Vis., vol. 123, pp. 32-73, 2017.
S. Antol et al., "VQA: Visual question answering," in Proc. IEEE Int. Conf. Comput. Vis., 2015, pp. 2425-2433.
T.-Y. Lin et al., "Microsoft COCO: Common objects in context," in Proc. Eur. Conf. Comput. Vis., 2014, ppp. 740-755.
P. Sharma, N. Ding, S. Goodman, and R. Soricut, "Conceptual captions: A cleaned, hypernymed, image alt-text dataset for automatic image captioning," in Proc. Conf. Assoc. Comput. Linguistics, 2018, pp. 2556-25655.
H. Luo et al., "UniVL: A unified video and language pre-trainign model for multimodal understanding and generation," 2020, arXiv:2002.06353.
D. Qi, L. Su, J. Song, E. Cui, T. Bharti, and A. Sacheti, "ImageBERT: Cross-modal pre-training with large-scale weak-supervised image-text data," 2020, arXiv:2001.07966.
Z. Huang, Z. Zheng, B. Liu, D. Fu and J. Fu, "Pixel-BERT: Aligning image pixels with text by deep multi-modal transformers," 2020, arXiv:2004.00849.
X. Li et al., "Oscar: Object-semantics aligned pre-training for vision-language tasks," in Proc. Eur. Conf. Comput. Vis., 2020, pp. 121-137.
J. Lu, V. Goswami, M. Rohrbach, D. Parikh, and S. Lee, "12-in-1: Multitask vision and language representation learning," in Proc. IEEE Conf. Comput. Vis. Pattern Recongit., 2020, pp. 10434-10443.
L. Zhou, H. Palangi, L. Zhang, H. Hu, J. Corso, and J. Gao, "Unified vision-languange pre-training for image captioning and VQA," in Proc. AAAI Conf. Artif. Intell., 2020, pp.13041-3049.
C. Alberti, J. Ling, M. Collins, and D. Reitter, "Fusion of detected objects in text for visual question answering," 2019, arXiv:1908.05054.
G. Li, N. Duan, Y. Fang, M. Gong, and D. Jiang, "Unicoderr-VL: A universal encoder for vision an dlanguage by cross-modal pre-training," in Proc. AAAI Conf. Artif. Intell., 2020, pp.11336-11344.
C. Sun, F. Baradel, K. Murphy, and C. Schmid, "Learning video representations using constrastive bidirectional transformer," 2019, arXiv:1906.05743.
Y.-C. Chen et al., "UNITER: Universal image-text representation learning," in Proc. Eur. Conf. Comput. Vis., 2020, pp. 104-120.
W. Su et al., "VL-BERT: Pre-training of genric visual-linguistic representations," 2019, arXiv:1908.08530.
L. H. Li, M. Yatskar, D. Yin, C.-J. Hsieh, and K.-W. Chang, "VisualBERT: A simple and performant baseline for vision and language," arXiv:1908.03557.
H. Tan and M. Bansal, "LXMERT: Learning cross-modality encoder representations from transformer," 2019, arXiv:1908.07490.
J. Lu, D. Batra, D. Parikh, and S. Lee, "ViLBERT: Pretraining taskagnostic visiolinguistic representations for vision-and-language tasks," 2019, arXiv:1908.02265.
Z. Yang, Z. Dai, Y. Yang, J. Carbonell, R. R. Salakhutdinov, and Q. V. Le, "XLNet: Generalized autoregressive pretraining for language understanding," in Proc. Int. Conf. Neural Inf. Process. Syst., 2019, Art No. 517.
Z. Dai, Z. Yang, Y. Yang, J. Carbonell, Q. V. Le and R. Salakhutdinov, "Transformer-XL: Attentive language models beyond a fixed-lenght context," 2019, arXiv:1901.02860.
Radford, K. Narasimhan, T. Salimans, and I. Sutskever, "Improving language understanding by generative pre-training," 2018. [Online]. Available: https://s3-us-west-2.amazonaws.com/openai-assets/ research-covers/language-unsupervised/language_understanding_paper.pdf.
M. Lewis et al., "BART: Denoising sequence-to-sequence pre-training for natural language generation, translation, and comprehension," 2019, arXiv:1910.13461.
Y. Li et al., "BEHRT: Transformer for electronic health records," Sci. Rep., vol. 10, 2020, Art No. 7155.
A. Lazarus et al., Multimodal Behavior Therapy. Berlin, Germany: Springer, 1976.
B. P. Yuhas, M. H. Goldstein, and T. J. Sejnowski, "Integration of acoustic and visual speech signals using neural networks," IEEE Commun. Mag., vol. 27, No. 11, pp. 65-71, Nov. 1989.
W. Guo, J. Wang, and S. Wang, "Deep multimodal representation learning: A survey," IEEE Access, vol. 7, pp. 63373-63394, 2019.
L. Wu, S. L. Oviatt, and P. R. Cohen, "Multimodal integration-a statistical view," IEEE Trans. Multimedia, vol. 1, No. 4, pp. 334-341, Dec. 1999.
J. Shang, T. Ma, C. Xiao, and J. Sun, "Pre-training of graph augmented transformer for medication recommendation," 2019, arXiv:1906.00346.
K. Gavrilyuk, R. Sanford, M. Javan, and C. G. Snoek, "Actor transformers for group activity recognition," inProc. IEEE Conf. Comput. Vis. Pattern Recognit., 2020, pp. 836-845.
Beltagy, M. E. Peters, and A. Cohan, "Longformer: The long-document transformer," 2020, arXiv:2004.05150.
D. Shin, Z. Ren, E. B. Sudderth, and C. C. Fowlkes, "3D scence reconstruction with multi-layer depth and epipolar transformers," in Proc. IEEE Int. Conf. Comput. Vis., 2019, pp. 2172-2182.
P. Xu et al., "SketchMate: Deep hashing for million-scale human sketch retrieval," in Proc. IEEE Conf. Comput. Vis. Pattern Recognit., 2018, pp. 8090-8098.
K. Gupta, J. Lazarow, A. Achille, L. Davis, V. Mahadevan, and A. Shrivastava, "LayoutTransformer: Layout generation and completion with self-attention," 2020, arXiv:2006.14615.
T. Hastie, R. Tibshirani, J. H. Friedman, and J. H. Friedman, The Eelements of Statistical Learning: Data Mining, Intference, and Prediction, vol. 2, Berlin, Germany: Springer, 2009.
C. Zhang, Z. Yang, X. He, and L. Deng, "Multimodal intelligence: Representation learning, information fusion, and applications," IEEE J. Sel. Topics Signal Process., vol. 14, No. 3, pp. 478-493, Mar. 2020.
C. Sun, A. Myers, C. Vondrick, K. Murphy, and C. Schmid, "VideoBERT: A joint for video and language representation learning," in Proc. IEEE Int. Coonf. Comput. Vis., 2019, pp. 7463-7472.
N. Carion, F. Massa, G. Synnaeve, N. Usuiner, A. Kirillov, and S. Zagoruyok, "End-to-end object detection with transformer," in Proc. Eur. Conf. Comput. Vis., 2020, pp. 213-229.
J. Devlin, M.-W. Chang, K. Lee, and K. Toutanova, "BERT: Pretraining of deep bidirectional transformer for language understanding," 2018, arXiv:1810.04805.
Vasawani et al., "Attention is all you need," in Proc. Int. Conf. Neural Inf. Process. Syst., 2017, pp. 5998-6008.
T. Baltrušaitis, C. Ahuja, and L.-P. Morency, "Multimodal machine learning: A survey and taxonomy," IEEE Trans. Pattern Anal. Mach. Intell., vol. 41, No. 2, pp. 423-443, Feb. 2019.
Cai, et al.; Incorporating Visual Information in Audio Based Self-Supervised Speaker Recognition; IEEE/ACM Transactions on Audio, Speech and Language Processing; vol. 30; pp. 1422-1435; Mar. 24, 2022.

* cited by examiner

1800

4800

General Terms & Conditions Relating to Transportation Capacity Unit Transfers

SEATSX, LLC

GTCs Dated as of September 2019

PREAMBLE

These General Terms & Conditions including this preamble (the “General Terms” or “GTCs”) shall be applicable to all without Transactions related to the sale and purchase and/or resale and purchase, transfer and assignment of those certain contracts for Transportation Capacity Unit(s) as arranged and accommodated by SeatsX, LLC (“SeatsX”), including (i) for an original Transaction, from Seller to Buyer, as arranged and accommodated by SeatsX and (ii) for a resale Transaction, from Seller (who acquired such rights through a prior original Transaction, as accommodated by SeatsX), to Buyer, as arranged and accommodated by SeatsX. In any Transaction hereto, Seller shall be Party A and Buyer shall be Party B. SeatsX is not a Party to the Transaction but provides a platform and marketplace to bring together and match willing Buyers and Sellers. For Resale Transactions, prior to use or consumption of the underlying Transportation Capacity Units by Party A, Party A desires to resell its Transportation Capacity Units and, through the use of SeatsX’s electronic trading platform and proprietary software and system for matching Buyers and Sellers in a forward marketplace (“SeatsX Trade Hub”,) a Buyer (“Party B”) desires to and agrees to purchase and take possession of said Transportation Capacity Units from Party A pursuant to the terms of these GTCs and the Transaction Confirmation, and Party A is willing to sell and dispose of such Transportation Capacity Units pursuant to the terms of these GTCs and the Transaction Confirmation.

FIG. 48

4900

To the extent that differing terms are specifically otherwise agreed between Party A and Party B, and approved by SeatsX, in its discretion, and included in the Confirmation, the Confirmation shall control; provided, however, that in a resale Transaction, such Confirmation must be consistent with the Confirmation of the original Transaction being resold. The Confirmation, together with these General Terms and the SeatsX Terms of Service, shall constitute the binding agreement of the Parties with respect to any Transaction. These General Terms may be amended from time to time by SeatsX.

By establishing an account with SeatsX and by executing trades on the SeatsX Trade Hub, you acknowledge and agree to these GTCs. SeatsX's GTCs and/or amended General Terms shall be available electronically on the SeatsX Trade Hub. It is the Parties' responsibility to know and understand each's respective duties and obligations hereunder. SeatsX shall have no further obligation to Parties with respect to such amendments other than to provide access to such amendments on the SeatsX Trade Hub.

Certain larger users that either offer for purchase or that purchase large volumes of TCUs on the SeatsX Trade Hub (each "Margin Party") may, in SeatsX discretion, be asked to post additional credit support in the format of margin or in such other form as such Party and SeatsX may mutually agree.

Party A and Party B have entered and/or anticipate entering into one or more Transactions that are or will be governed by these GTCs, as well as the SeatsX Terms of Service.

FIG. 49

5000

ARTICLE I

DEFINITIONS

As used in these GTCs, the following terms have the respective meanings set forth below:

"Affiliate" means, with respect to any Person, any other Person that directly or indirectly, through one or more intermediaries, controls or is controlled by, or is under common control with, such Person. For these purposes, "control" of any Person shall mean the ownership of, or the power to direct the voting of, more than ten percent (10%) of the common stock or issued share capital or other equity interests having ordinary voting power for the election of directors (or Persons performing comparable functions) of such Person.

"Agreement" has the meaning set forth in Section 2.2.

"Applicable Interest Rate" means, with respect to any cash held as collateral or margin by SeatsX posted by the applicable Margin Party the Federal Funds (effective) rate as set forth in the most recent H.15 (5/9) released and publicly available by the Federal Reserve Board of Governors.

"Assigning Party" has the meaning set forth in Section 10.4.

"Bankrupt" means any entity, if such entity a. files a petition or otherwise commences, authorizes or acquiesces in the commencement of a proceeding or cause of action under any bankruptcy, insolvency, reorganization, debt restructuring, liquidation or similar law, or has any such petition filed or commenced against it,
b. makes an assignment or any general arrangement for the benefit of creditors,
c. otherwise becomes bankrupt or insolvent (however evidenced),

FIG. 50

5100 c. otherwise becomes bankrupt or insolvent (however evidenced), d. has a liquidator, administrator, receiver, trustee, conservator or similar official appointed with respect to it or any substantial portion of its property or assets, or e. is generally unable to pay its debts as they fall due.

"Business Day" means (i) with respect to payments, a day, other than a Saturday or Sunday, on which the banks in Texas are open for business.

"Buyer" means the Party to an original Transaction or resale Transaction that is obligated to purchase a Product.

"Claiming Party" has the meaning set forth in Article 3.

"Claims" means all third-party claims, demands or actions in connection with this Agreement, threatened or filed, that directly or indirectly relate to the subject matter of an indemnity or remedy hereunder, and the resulting losses, liabilities, obligations, damages, expenses, attorneys' fees and court costs, whether incurred by or in connection with a settlement or otherwise, and whether such claims, demands or actions are threatened or filed prior to or after the termination of this Agreement.

"Confirmation" has the meaning set forth in Section 2.3.

"Contract Price" means the price per Period agreed to be paid by Buyer to Seller executed through the SeatsX Trade Hub in connection with a Transaction.

"Contract Value" means, with respect to a Terminated Transaction, as applicable, the net present value (discounted at the Present Value Discount Rate to the first day of the term applicable to such Terminated Transaction) of the Contract Price applicable to such Terminated Transaction.

"Contractual Currency" means United States Dollars.

FIG. 51

5200

"Costs" means, with respect to the Non-Defaulting Party, agency fees, brokerage fees, attorneys' fees and expenses, commissions and other similar third party transaction costs and expenses reasonably incurred by such Party (i) in terminating any arrangement or entering into new arrangements which replace a Terminated Transaction, or (ii) in connection with the enforcement and protection of such Party's rights and remedies under this Agreement.

"Defaulting Party" means a Party that is responsible for an Event of Default.

"Default Rate" means, for any day, the annual prime commercial lending rate (or comparable rate), from time to time published in the Wall Street Journal, as such rate may change, plus two (2) percent per annum; provided that the Default Rate shall never exceed the maximum interest rate permitted by applicable law.

"Delivery" means the delivery and transfer of the Product from Seller to Buyer in accordance with the Agreement.

"Early Termination Date" means the day designated by the Non-Defaulting Party pursuant to Section 5.2 as the early termination date, upon which date, all Transactions between Party A and Party will terminate.

"Effective Date" with respect to a given Party, unless as otherwise provided, means the earliest date on which both Parties A and B have signed up to transact on the SeatsX Trade Hub.

"Event of Default" means the occurrence of any of the events listed in Section 5.1.

"Force Majeure" means an event or circumstance which prevents a Party from performing its obligations under one or more Transactions, which is not within the reasonable control of, or the result of the negligence or willful misconduct of, the Claiming Party, and which, by the exercise of due diligence, the Claiming Party is unable to overcome or avoid or cause to be avoided. Force Majeure shall not include or be based on (i) the loss of Buyer's markets; (ii) Buyer's inability to economically use or resell the Product purchased hereunder; (iii) the loss or failure of Seller's supply (except as set forth above); or (iv) Seller's ability to sell the Product at a price greater than the Contract Price.

FIG. 52

5300

"GTCs" has the meaning set forth in the Preamble.

"Independent Amount" means with respect to a Margin Party, the amount determined by SeatsX as appropriate in its commercially reasonable discretion is warranted under the circumstances, or if no amount is specified, zero.

"Letter(s) of Credit" means one or more irrevocable, transferable standby letters of credit issued by a U.S. commercial bank or a foreign bank with a U.S. branch having a credit rating of at least A- by S&P and A3 by Moody's, in a form acceptable to the Party in whose favor the letter of credit is issued. Costs of a Letter of Credit shall be borne by the applicant for such Letter of Credit.

"Margin Party" shall have the meaning ascribed to it in the introductory paragraphs hereof.

"Non-Defaulting Party" means the Party that is not a Defaulting Party.

"Option" means the right but not the obligation to enter into a Transaction.

"Option Buyer" means the Party specified as the purchaser of an Option.

"Option Seller" means the Party specified as the seller of an Option.

"Party" or "Parties" means Party A and Party B, individually or collectively, as applicable and their respective permitted successors or assigns. For the avoidance of doubt, in providing access to the SeatsX Trade Hub, Seats X shall not be considered a Party for purposes of these GTCs with respect to a Transaction.

"Party B" has the meaning set forth in the Transaction Confirmation.

"Payment Date" means, with respect to a Transaction, the Trade Date of such Transaction with payment made through the SeatsX Trade Hub and settlement made by SeatsX pursuant to the Terms of Service.

"Performance Assurance" means collateral (other than the Independent Amount, if any) in the form of either cash, Letter(s) of Credit, or other security acceptable to SeatsX with respect to Margin Parties.

FIG. 53

5400

"Person" means an individual, partnership, corporation, limited liability company, association, organization, business trust, joint stock company, trust, unincorporated association, joint venture, firm or other entity, or a government or any political subdivision or agency, department or instrumentality thereof.

"Premium" means the premium to be paid or collected, if any, related to the purchase or sale of an Option that is specified by the Parties.

"Present Value Discount Rate" means at a particular date, (i) if the term of the Terminated Transaction, as applicable, is one year or less, the "Ask Yield" interest rate for the appropriate U.S. Government Treasury bill or note with a term closest to the time remaining in such term, plus 100 basis points, or (ii) if the time remaining in the term of the Terminated Transaction is greater than one year, the "Ask Yield" interest rate for the appropriate U.S. Government Treasury note with a term closest to the time remaining in such term, plus 100 basis points, in each case, as quoted in the "Treasury, Bonds, Notes & Bills" section of the Default Rate Source most recently published as of such date.

"Product" means the specified Transportation Capacity Unit during a specified time window during the Period to be made available by Seller to Buyer in connection with a Transaction in accordance with these GTCs.

"Recording" has the meaning set forth in Section 2.4.

"Replacement Value" means, with respect to a Terminated Transaction, as applicable, the net present value (discounted at the Present Value Discount Rate to the first day of the term applicable to such Terminated Transaction) of the Termination Replacement Price.

"Seller" means the Party to an original Transaction or resale Transaction that is obligated to sell and make available, or cause to be made available, a Product.

"Settlement Amount" has the meaning set forth in Section 5.3(i).

FIG. 54

5500

"Taxes" means any and all present or future ad valorem, consumption, excise, gross receipts, privilege, property, sales, transaction, transport, use and other taxes, levies, duties, imposts, governmental charges, licenses, fees, permits and assessments or increases therein, other than (i) income taxes required to be withheld at the source, (ii) taxes based on net income or net worth, and (iii) gross receipts taxes imposed in lieu of income taxes in jurisdictions that do not assess a corporate income tax.

"Term" means the aggregate duration of all Periods in respect of a Product.

"Terminated Transaction" means each Transaction terminated pursuant to Section 5.2, such Transaction having a term deemed to (i) commence on the Early Termination Date, and (ii) end on the last day of the Term applicable to such Transaction.

"Termination Payment" means the payment made by either Party pursuant to Section 5.3(ii).

"Termination Replacement Price" means with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction). The Termination Replacement Price shall be based on an actual Termination Replacement Transaction or the applicable forward price for the Product posted by SeatsX on the SeatsX Trade Hub.

"Termination Replacement Transaction" means a transaction for the purchase or sale, as applicable, of a Product(s) for any remaining period or part thereof to be purchased or sold in connection with the Terminated Transaction, provided that, the transaction replacing any Terminated Transaction or portion thereof shall be deemed to have a term:

a. commencing on the Early Termination Date; and b. ending on the last day of the term of the Terminated Transaction had it not been terminated.

FIG. 55

5600

"Trade Date" means the date on which the Parties execute a trade and agree to enter into a Transaction on the SeatsX Trade Hub.

"Transaction" means a particular transaction (including an Option) agreed to by the Parties relating to the sale and purchase of one or more Products.

"Transportation Capacity Unit" or "TCU" means the base unit of a given Product related to a ride for a given travel route offered on the SeatsX Trade Hub.

ARTICLE II

TRANSACTION TERMS AND CONDITIONS

2.1 Transactions. Each of Party A and Party B shall be in full compliance with SeatsX's registration and other requirements to participate. A Transaction shall be entered into upon agreement of the Parties through SeatsX Trade Hub and the proprietary matching execution procedures, including by means of electronic communication. Each Party agrees not to contest, or assert any defense to, the validity or enforceability of the Transaction entered into in accordance with these GTCs (i) based on any law requiring agreements to be in writing or to be signed by the Parties, or (ii) based on any lack of authority of the Party or any lack of authority of any employee of the Party to enter into a Transaction.

2.2 Governing Terms. Each Transaction matched and executed through SeatsX Trade Hub between the Parties shall be governed by these GTCs, the applicable Confirmation and Terms of Service. These GTCs, all Transactions and all Confirmations, as the same may be amended, supplemented or otherwise modified from time to time, shall form a single integrated agreement (the "Agreement") between the Parties. The Parties shall comply with all rules for use and Terms of Service of SeatsX's Trade Hub.

FIG. 56

5700

2.3 Confirmation. SeatsX, through its proprietary electronic matching platform has in place a procedure for documenting the terms of a given Transaction, to which the Parties previously had agreed. SeatsX shall confirm any Transaction arranged on the SeatsX Trade Hub by electronically sending the Parties a Confirmation ("Confirmation"). If either other Party objects to any term(s) of such Confirmation, it shall notify SeatsX and the other Party in writing via facsimile or electronic communication of such objections within two (2) Business Days of the Parties' receipt thereof, failing which a Party shall be deemed to have accepted the terms as sent; provided, however, that upon receipt of such objection, SeatsX shall determine the prior agreed-upon commercial terms of the Transaction and shall confirm the Confirmation to the agreed-upon terms if different than the prior Confirmation. Any such amended Confirmation shall be binding.

2.4 Recording. Unless a Party expressly objects at the beginning of a telephone conversation, each Party consents to the creation of a tape or electronic recording ("Recording") of all telephone conversations between the Parties to these GTCs, and agrees that any such Recordings will be retained in confidence, secured from improper access, and may be submitted in evidence in any proceeding or action relating to this Agreement. Each Party waives any further notice of such monitoring or recording, and agrees to notify its officers and employees of such monitoring or recording and to obtain any necessary consent of such officers and employees. The Recording, and the terms and conditions described therein, if admissible, shall be the controlling evidence for the Parties' agreement with respect to a particular Transaction in the event a Confirmation is not fully executed (or deemed accepted) by both Parties.

FIG. 57

5800

2.5 Inconsistency. In the event of any inconsistency among the terms of a Confirmation, a Recording, or the GTCs, the terms of the following shall prevail in order listed: (i) these GTCs; (ii) a Confirmation; and (iii) such Recording.

2.6 Parties' Responsibilities. With respect to each Transaction, unless the Parties otherwise agree, (i) Seller agrees to provide Buyer a ride in the specified class or type of vehicle along the specified travel route within the agreed-upon time period during the designated Time Window in the contracted Market, pursuant to the Agreement and Terms of Service. Seller shall provide the services associated with the Transportation Capacity Unit via routes and during the Time Period specified for the Product sold. Seller and Buyer shall take such steps as necessary to comply with all the Terms of Service and rules of the SeatsX Trade Hub. Payments related to any Transaction, any Margin and/or collateral shall be made to and held by SeatsX through the SeatsX Trade Hub with settlement to occur through the SeatsX Trade Hub and conducted by SeatsX pursuant to the rules of the Terms of Service. Seller shall sell and make available, or cause to be made available, the Product(s) to Buyer for the Contract Price for the agreed upon Term. Buyer shall purchase the Product from Seller for the Contract Price for the agreed upon Term.

FIG. 58

5900

ARTICLE III

FORCE MAJEURE

3.1 To the extent either Party is prevented by Force Majeure from carrying out, in whole or part, its obligations in respect of a Transaction, such Party (the "Claiming Party") shall orally notify the other Party and SeatsX of the Force Majeure as soon as practicable after the occurrence thereof and shall provide to the other Party a written description of the details of such Force Majeure within one (1) Business Day after the date of such oral notice. The Claiming Party shall make reasonable efforts to mitigate the effects of such Force Majeure with reasonable dispatch. If the Claiming Party complies with the foregoing procedures, such Claiming Party shall be excused from the performance of its obligations with respect to such Transaction (other than the obligation to make payments then due or becoming due with respect to performance prior to the Force Majeure). The non-Claiming Party shall not be required to perform or resume performance of its obligations to the Claiming Party which correspond to the obligations of the Claiming Party excused by Force Majeure; provided, however, that upon the occurrence of a Force Majeure, Buyer shall have the ability to reschedule the TCU for a time after the Force Majeure has ended, and the Delivery Period shall be extended by the number of days that such Force Majeure lasted.

ARTICLE IV

REMEDIES FOR PRODUCT DELIVERY FAILURES

4.1 Unless excused by Force Majeure or caused by failure of Buyer to deliver the Product hereunder pursuant to the terms hereof and in the Confirmation, upon a Product Delivery Failure during any Period, the non-failing Party shall be entitled to the price of such TCU as liquidated damages.

FIG. 59

6000

ARTICLE V

EVENTS OF DEFAULT; REMEDIES

5.1 Events of Default. An Event of Default shall be deemed to have occurred with respect to a Party upon the occurrence of any of the following:

a. the failure to make or apply, when due, any payment required pursuant to this Agreement, if such failure is not remedied within five (5) days after written notice thereof;

b. any representation or warranty made by such Party under this Agreement is false or misleading in any material respect when made or when deemed made or repeated;

c. the failure to perform any material covenant or obligation set forth in this Agreement (other than an Event of Default under this Section 5.1, any default for which the exclusive remedy is provided in Article 3, Article 4 or any default that arises as a result of Buyer's failure to deliver Content to Seller pursuant to Section 2.7), if such failure is not remedied within ten (10) days after written notice thereof;

d. such Party becomes Bankrupt;

e. such Party merges with or into, or reorganizes, amalgamates, consolidates or enters into any other transaction in which substantially all of its assets are transferable to, another Person who either (a) fails to assume all of such Party's obligations under this Agreement, or (b) assumes such Party's obligation under this Agreement, but whose creditworthiness is materially weaker than that of such Party immediately prior to such merger, reorganization, amalgamation, consolidation or other transaction; or f. any event of default under the Credit terms with respect to a Margin Party.

FIG. 60

6100

5.2 Effect of Event of Default. If an Event of Default with respect to a Defaulting Party shall have occurred and be continuing or if the Non-Claiming Party shall have the right to terminate its obligations pursuant to Article 3, the Non-Defaulting Party or Non-Claiming Party, as applicable, shall have the right to designate an Early Termination Date and to liquidate and terminate all, but not less than all, Transactions. For purposes of Sections 5.3, 5.4 and 5.5, the Non-Claiming Party, shall be deemed to be the "Non-Defaulting Party" and the other Party shall be deemed to be the "Defaulting Party"; Section 5.6 shall not be applicable to any Transaction terminated pursuant to Article 3 and Section 5.2.

5.3 Calculation of Termination Payment.

a. If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:

i. If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

ii. If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

FIG. 61

6200 iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non- Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section 5.4.

FIG. 62

6300

5.4 Notice of Payment of Termination Payment. As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and SeatsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3, no such interest shall be payable. If the Termination Payment is due from the Non-Defaulting Party, the Non-Defaulting Party shall pay such Termination Payment, without interest, within twenty (20) Business Days after delivery of such notice.

5.5 Disputes With Respect to Termination Payment. If the Defaulting Party disputes the Non-Defaulting Party's calculation of the Termination Payment, in whole or in part, the Defaulting Party shall, within two (2) Business Days of receipt of Non-Defaulting Party's explanation of the calculation of the Termination Payment, provide to the Non-Defaulting Party and SeatsX a detailed written explanation of the basis for such dispute; provided, however, that if the Termination Payment is due from the Defaulting Party, the Defaulting Party shall pay any undisputed amount and transfer Performance Assurance, if any, to the Non-Defaulting Party in an amount equal to the disputed amount of the Termination Payment. Any disputes that the Parties are unable to resolve by mutual agreement shall be resolved in accordance with the arbitration mechanism elected on the Schedule.

FIG. 63

6400

5.4 Notice of Payment of Termination Payment. As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and SeatsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3, no such interest shall be payable. If the Termination Payment is due from the Non-Defaulting Party, the Non-Defaulting Party shall pay such Termination Payment, without interest, within twenty (20) Business Days after delivery of such notice.

5.5 Disputes With Respect to Termination Payment. If the Defaulting Party disputes the Non-Defaulting Party's calculation of the Termination Payment, in whole or in part, the Defaulting Party shall, within two (2) Business Days of receipt of Non-Defaulting Party's explanation of the calculation of the Termination Payment, provide to the Non-Defaulting Party and SeatsX a detailed written explanation of the basis for such dispute; provided, however, that if the Termination Payment is due from the Defaulting Party, the Defaulting Party shall pay any undisputed amount and transfer Performance Assurance, if any, to the Non-Defaulting Party in an amount equal to the disputed amount of the Termination Payment. Any disputes that the Parties are unable to resolve by mutual agreement shall be resolved in accordance with the arbitration mechanism elected on the Schedule.

FIG. 64

6500

5.6 Closeout Setoff. After calculation of a Termination Payment in accordance with Section 5.3 (unless such Termination Payment was calculated as a result of a termination pursuant to Article 3), if the Defaulting Party would be owed the Termination Payment, the Non-Defaulting Party shall be entitled, at its option and in its discretion, to set off against such Termination Payment any amounts due and owing by the Defaulting Party to the Non-Defaulting Party under any other agreements, instruments or undertakings between the Defaulting Party and the Non-Defaulting Party which are not related to the SeatsX Trade Hub. The remedy provided for in this Section shall be without prejudice and in addition to any right of setoff, combination of accounts, lien or other right to which any Party is at any time otherwise entitled (whether by operation of law, contract or otherwise). Notwithstanding the foregoing, the Non-Defaulting Party shall not be required to pay to the Defaulting Party any amount owing by the Non-Defaulting Party under this Agreement until the Non-Defaulting Party receives confirmation satisfactory to it in its reasonable discretion that all obligations of the Defaulting Party to make any payments of any kind whatsoever to the Non-Defaulting Party or any of its Affiliates or otherwise which are due and payable as of the Early Termination Date have been fully and finally paid in cash.

ARTICLE VI
PAYMENT

6.1 Payments and Billings. All monthly payments and invoices shall be governed and will occur according to the SeatsX Terms of Service, unless otherwise specified herein. For the avoidance of doubt, payments for TCU Transactions shall occur online and provided to SeatsX for ultimate payment to the appropriate Party; provided, however, that payments associated with the early termination of a Transaction shall be invoiced and paid directly between the Parties. All payments shall be made in United States Dollars.

FIG. 65

6600

6.2 Disputes of Invoices. Payment terms and invoicing shall be done pursuant to the methods and procedures on the Terms of Service and credit card arrangements between the Parties and SeatsX. A Party may, in good faith, dispute the correctness of any credit and/or debit memos related to this Agreement within ten (10) days of the date that the invoice was rendered. In the event that any charge is disputed, payment of the undisputed portion shall be required to be made when due, with notice of the dispute given to the other Party and SeatsX in writing and stating the basis for the dispute. Payment of the disputed amount shall not be required until the dispute is resolved. Upon resolution of the dispute, any required payment shall be made within two (2) Business Days of such resolution along with interest accrued at the Default Rate from and including the due date to but excluding the date paid. Any dispute with respect to an invoice is waived unless the other Party is notified in accordance with this Section within sixty (60) days after the applicable invoice is rendered.

ARTICLE VII

LIMITATION OF REMEDIES, LIABILITY AND DAMAGES

7.1 NEITHER SEATSX NOR SELLER MAKE ANY WARRANTY WITH RESPECT TO ANY PRODUCT, AND ANY AND ALL IMPLIED WARRANTIES ARE DISCLAIMED. IN PARTICULAR, SELLER MAKES NO WARRANTY WITH RESPECT TO THE EFFECT THAT ANY PRODUCT WILL HAVE ON BUYER'S SALES OR BUSINESS.

FIG. 66

6700

7.2 THE PARTIES CONFIRM THAT THE EXPRESS REMEDIES AND MEASURES OF DAMAGES PROVIDED IN THIS AGREEMENT SATISFY THE ESSENTIAL PURPOSES HEREOF. FOR BREACH OF ANY PROVISION FOR WHICH AN EXPRESS REMEDY OR MEASURE OF DAMAGES IS PROVIDED, SUCH EXPRESS REMEDY OR MEASURE OF DAMAGES SHALL BE THE SOLE AND EXCLUSIVE REMEDY OF THE NON-BREACHING PARTY. THE BREACHING PARTY'S LIABILITY SHALL BE LIMITED AS SET FORTH IN SUCH PROVISION AND ALL OTHER REMEDIES OR DAMAGES AT LAW OR IN EQUITY ARE WAIVED. IF NO REMEDY OR MEASURE OF DAMAGES IS EXPRESSLY PROVIDED HEREIN OR IN A TRANSACTION, THE BREACHING PARTY'S LIABILITY SHALL BE LIMITED TO DIRECT ACTUAL DAMAGES, WHICH SHALL BE THE SOLE AND EXCLUSIVE REMEDY AVAILABLE TO THE NON-BREACHING PARTY AND THE NON- BREACHING PARTY HEREBY WAIVES ALL OTHER REMEDIES OR DAMAGES AT LAW OR IN EQUITY.

7.3 NOTWITHSTANDING ANYTHING IN THIS AGREEMENT TO THE CONTRARY, NEITHER PARTY NOR SEATSX SHALL BE LIABLE FOR CONSEQUENTIAL, INCIDENTAL, PUNITIVE, EXEMPLARY OR INDIRECT DAMAGES, LOST PROFITS OR OTHER BUSINESS INTERRUPTION DAMAGES, BY STATUTE, IN TORT OR CONTRACT, UNDER THE INDEMNITY PROVISIONS SET FORTH IN THIS AGREEMENT OR OTHERWISE.

7.4 TO THE EXTENT ANY DAMAGES REQUIRED TO BE PAID HEREUNDER ARE LIQUIDATED, THE PARTIES ACKNOWLEDGE THAT THE DAMAGES ARE DIFFICULT OR IMPOSSIBLE TO DETERMINE, OR OBTAINING AN ADEQUATE REMEDY IS OTHERWISE INCONVENIENT AND THE DAMAGES CALCULATED HEREUNDER CONSTITUTE A REASONABLE APPROXIMATION OF THE HARM OR LOSS.

FIG. 67

6800

7.5 BOTH PARTIES AGREE THAT SEATSX SHALL HAVE NO LIABILITY TO EITHER PARTY A OR PARTY B BASED UPON AN EVENT OF DEFAULT THAT MAY OCCUR WITH RESPECT TO ANY TRANSACTION HEREUNDER NOR FOR ANY PART IN ACCOMODATING AND ARRANGING ANY TRANSACTIION, UNLESS SUCH ACCOMODATING AND ARRANGING WAS SHOWN TO HAVE BEEN GROSSLY NEGLIGENT OR THAT SEATSX ACTED IN BAD FAITH. BOTH PARTIES EXPRESSLY WAIVE ANY AND ALL CLAIMS AGAINST SEATSX RELATED TO ANY ACTION OR INACTION TO THE SELLER OR THE BUYER, TO THE MAXIMUM EXTENT OF THE LAW.

7.6 ANY AND ALL ADDITIONAL LIMITATIONS OF LIABILITY IN FAVOR OF SEATSX CONTAINED IN THE TERMS OF SERVICE ARE EXPRESSLY INCORPORATED HEREIN IN THEIR ENTIRETY AND SHALL APPLY AS IF THE TEXT OF SUCH PROVISIONS ARE WRITTEN IN FULL HEREIN (BUT WITHOUT REGARD TO THE TERMS OF SERVICE CHOICE OF LAW.)

ARTICLE VIII

FINANCIAL INFORMATION

8.1 SeatsX may request periodically request either or both Parties to provide financial information, which may include, as applicable income statements, financial statements and/or credit reports, which the Party from which such financial information is requested shall provide SeatsX the information promptly.

ARTICLE IX

TAXES

9.1 Buyer is liable for and shall pay or cause to be paid (or reimburse Seller if Seller has paid) all Taxes applicable to the Transaction, including any Taxes imposed or collected by a taxing authority with jurisdiction over Buyer, unless Buyer has presented Seller with a valid tax exemption certificate. Buyer agrees to pay any such applicable Taxes and to defend, indemnify and hold Seller harmless from any Claims for such Taxes. Buyer shall provide all information reasonably required by Seller to ascertain the proper treatment and handling of tax liability hereunder.

FIG. 68

6900

ARTICLE X

CREDIT SUPPORT

10.1 Credit Protection. If at any time and from time to time during the term of this Agreement (and whether or not an Event of Default has occurred), SeatsX determines in its discretion that the financial condition of a Margin Client has materially changed so as to increase the likelihood of an Event of Default or of its ability to meet its payment obligations hereunder to the other Party or SeatsX, then SeatsX, on any Business Day, may request that such Party provide Performance Assurance in an amount of up to the amount SeatsX estimates would be due from such Party upon the occurrence of an Event of Default and early termination of all such Party's Transactions hereunder less any Performance Assurance already held by SeatsX from such Party. Such Performance Assurance shall be delivered to SeatsX within two (2) Business Days after the date of such request.

10.2 Grant of Security Interest/Remedies. To secure its obligations under these GTCs and, to the extent either or both Parties deliver Performance Assurance hereunder, each Party (a "Pledger") hereby grants to SeatsX (as Secured Party and/or as collateral agent for such other Party) and the other Party (collectively, the "Secured Party") a present and continuing security interest in, and lien on (and right of setoff against), and assignment of, all such Performance Assurance and any and all proceeds resulting therefrom or the liquidation thereof, whether now or hereafter held by, on behalf of, or for the benefit of, such Secured Party, and each Party agrees to take such action as the other Party reasonably requires in order to perfect the Secured Party's first- priority security interest in, and lien on (and right of setoff against), such Performance Assurance and any and all proceeds resulting therefrom or from the liquidation thereof. Any Secured Party (other than SeatsX) appoints to the extent necessary SeatsX as its collateral agent.

FIG. 69

7000

ARTICLE XI

MISCELLANEOUS

11.1 Representations and Warranties. On the Effective Date and on each Trade Date, each Party represents and warrants to the other Party that:

a. it is duly organized or registered, as applicable, validly existing and in good standing under the laws of the jurisdiction of its formation;

b. it has all authorizations, licenses and consents necessary for it to legally perform its obligations under this Agreement;

c. the execution, delivery and performance of this Agreement are within its powers, have been duly authorized by all necessary action and do not violate any of its governing documents, any contracts to which it is a party or any law, rule, regulation, order or the like applicable to it;

d. this Agreement and every other document and/or Terms of Service executed and delivered in accordance with this Agreement constitutes its legally valid and binding obligation enforceable against it in accordance with its terms, subject to any equitable defenses;

e. it is not Bankrupt and there are no proceedings pending or being contemplated by it or, to its knowledge, threatened against it which would result in it being or becoming Bankrupt;

f. there is not pending nor, to its knowledge, threatened against it or any of its Affiliates any legal proceedings that could materially adversely affect its ability to perform its obligations under this Agreement;

g. no Event of Default, or any event that with the passage of time would constitute an Event of Default, with respect to it has occurred and is continuing and no such event or circumstance would occur as a result of its entering into or performing its obligations under this Agreement;

FIG. 70

7100 h. it is acting for its own account, has made its own independent decision to enter into this Agreement and as to whether this Agreement is appropriate or proper for it based upon its own judgment, is not relying upon the advice or recommendations of the other Party in so doing, and is capable of assessing the merits of and understanding, and understands and accepts, the terms, conditions and risks of this Agreement;

i. the material economic terms of each Transaction are subject to individual negotiation by the Parties; and j. it has a valid, existing and current account on the SeatsX Trade Hub.

11.2 Indemnity. Each Party shall defend, indemnify and hold harmless the other Party and SeatsX, and each's Affiliates, directors, officers, employees, agents and representatives from and against any and all Claims for physical property damage, personal injury or wrongful death, to the extent that such Claims arise out of or result from the negligence or willful misconduct of the indemnifying Party or such Party's employees, agents or contractors in connection with the provision of a Product or any other performance hereunder. Buyer shall defend, indemnify and hold harmless Seller and its Affiliates, directors, officers, employees, agents and representatives from and against any Claims arising or resulting from any defect in or failure to provide a Product.

FIG. 71

7200

11.3 Successors and Assigns; Assignment.

a. Transactions arising under this Agreement shall be binding upon and inure to the benefit of, and may be performed by, the respective successors and assigns of the Parties, except that no assignment, pledge, or other transfer by either Party (the "Assigning Party") shall operate to release the Assigning Party from any of its obligations under this Agreement unless: (i) consent to such release is given in writing by the non-Assigning Party, which consent shall not be unreasonably withheld or delayed by SeatsX; (ii) such assignment, pledge or transfer is made to an Affiliate of the Assigning Party and such Affiliate is at least as creditworthy as the Assigning Party (as long as such Affiliate also has a valid account on the SeatsX Trade Hub and shall be deemed to make representations and warranties thereunder on the dated of such assignment), or (iii) such assignment, pledge or transfer is incident to a merger, reorganization, consolidation or other transaction in which substantially all of the assets of the Assigning Party are transferred to another Person who assumes all of the obligations of the Assigning Party under this Agreement and such Person is at least as creditworthy as the Assigning Party.

b. Seller hereby acknowledges and agrees that Buyer shall, without further consent of Seller have the ability to assign and transfer all its rights or obligations under a Transaction to any other Person qualified by SeatsX. Pursuant to a resale Transaction executed on the SeatsX Trade Hub.

11.4 Governing Law. THIS AGREEMENT AND THE RIGHTS AND DUTIES OF THE PARTIES HEREUNDER SHALL BE GOVERNED BY AND CONSTRUED, ENFORCED AND PERFORMED IN ACCORDANCE WITH THE LAWS OF NEW YORK, WITHOUT REGARD TO PRINCIPLES OF CONFLICTS OF LAW, IF APPLICABLE.

FIG. 72

7300

11.5 Dispute Resolution.

a. For any Dispute (as defined below) with an amount in controversy of less than $25,000, each Party shall provide a written summary of its position on the Dispute to SeatsX Designee who will evaluate and determine the validity of the Dispute and the appropriate amounts due with respect to the Dispute within fifteen (15) days. Such determination shall bind both Parties.

b. Agreement to Arbitrate. Any and all claims, counterclaims, demands, causes of action, disputes, controversies, and other matters in question arising out of or relating to these GTCs and any Transaction thereunder, or the alleged breach hereof or thereof, or in any way relating to the subject matter of any Transaction or the relationship between the Parties created by these GTCs and any Transaction thereunder (hereafter a "Dispute") with an amount in controversy of $25,000 or greater shall be finally resolved by binding arbitration administered by the American Arbitration Association ("AAA") under the Commercial Arbitration Rules (the "Rules") then in force, to the extent such Rules are not inconsistent with the provisions of these GTCs.

i. Number and Appointment of Arbitrators. Except as provided by this clause, the appointment and confirmation of the arbitrators shall be made in accordance with the relevant provisions of the Rules. The arbitral tribunal shall be composed of one arbitrator (the "Tribunal"). In the request for arbitration, the Party requesting arbitration (the "Claimant") shall ask SeatsX to appoint one arbitrator. The other Party other than the Claimant shall be the Respondent.

FIG. 73

7400 ii. Venue; Procedural Issues. The seat of the arbitration shall be in Houston, Texas in the United States of America. The hearings in this arbitration shall be held at the seat or at such other place as the Parties may agree. The arbitration shall be conducted and the award rendered in the English language. Subject to any relevant legal privilege against disclosure, the Tribunal shall have the power to make all orders necessary for the disclosure contemplated above, which orders the Parties consent in advance to obey. If a Party fails or refuses to comply with an order for discovery, the Tribunal may take that failure into account when deciding the issues and may infer that the documents not produced would have supported the opposing Party's claims.

iii. Powers of the Arbitrators; Limitations on Remedies. The validity, construction, and interpretation of this agreement to arbitrate, and all procedural aspects of the arbitration conducted pursuant to this agreement to arbitrate, including but not limited to, the determination of the issues that are subject to arbitration (i.e., arbitrability), the scope of the arbitrable issues, allegations of "fraud in the inducement" to enter into these GTCs or this agreement to arbitrate, allegations of corruption, allegations of waiver, laches, delay or other defenses to arbitrability, and the rules governing the conduct of the arbitration shall be decided by the Tribunal. The Tribunal shall have the power to award all remedies available under the applicable law, except as limited by these GTCs. The Tribunal shall not decide the Dispute ex aqueo et bono or as amiable compositeur or by reliance on any other doctrine or principle that would permit the Tribunal to avoid the application of these GTCs and/or the governing law. The Tribunal shall not have the authority to modify or amend any term or provision of these GTCs or any Transaction thereto.

FIG. 74

7500 iv. Arbitration Awards. The award shall be final and binding on the Parties and may be confirmed in, and judgment upon the award entered by, any court having jurisdiction over the Parties. The Tribunal's award shall be entitled to all of the protections and benefits of a final judgment as to any Dispute, including compulsory counterclaims, that were or could have been presented to the Tribunal, and shall be final and binding on the Parties and non-appealable to the maximum extent permitted by law.

v. Confidentiality. Except to the extent necessary for proceedings relating to enforcement of the arbitration agreement, the award or other, related rights of the Parties, the fact of the arbitration, the arbitration proceeding itself, all evidence, memorials or other documents exchanged or used in the arbitration and the arbitrators' award shall be maintained in confidence by the Parties to the fullest extent permitted by applicable law. However, a violation of this covenant shall not affect the enforceability of this agreement to arbitrate or of the Tribunal's award.

vi. EACH PARTY HEREBY EXPRESSLY WAIVES ANY RIGHT TO TRIAL BY JURY OF ANY CLAIM, DEMAND, ACTION OR CAUSE OF ACTION ARISING UNDER THIS AGREEMENT OR IN ANY WAY CONNECTED WITH OR RELATED OR INCIDENTAL TO THE DEALINGS OF THE PARTIES HERETO OR ANY OF THEM WITH RESPECT TO THESE GTCS OIR ANY TRANSACTION, IN EACH CASE WHETHER NOW EXISTING OR HEREAFTER ARISING, AND WHETHER FOUNDED IN CONTRACT OR TORT OR OTHERWISE.

FIG. 75

7600 iv. Arbitration Awards. The award shall be final and binding on the Parties and may be confirmed in, and judgment upon the award entered by, any court having jurisdiction over the Parties. The Tribunal's award shall be entitled to all of the protections and benefits of a final judgment as to any Dispute, including compulsory counterclaims, that were or could have been presented to the Tribunal, and shall be final and binding on the Parties and non-appealable to the maximum extent permitted by law.

v. Confidentiality. Except to the extent necessary for proceedings relating to enforcement of the arbitration agreement, the award or other, related rights of the Parties, the fact of the arbitration, the arbitration proceeding itself, all evidence, memorials or other documents exchanged or used in the arbitration and the arbitrators' award shall be maintained in confidence by the Parties to the fullest extent permitted by applicable law. However, a violation of this covenant shall not affect the enforceability of this agreement to arbitrate or of the Tribunal's award.

vi. EACH PARTY HEREBY EXPRESSLY WAIVES ANY RIGHT TO TRIAL BY JURY OF ANY CLAIM, DEMAND, ACTION OR CAUSE OF ACTION ARISING UNDER THIS AGREEMENT OR IN ANY WAY CONNECTED WITH OR RELATED OR INCIDENTAL TO THE DEALINGS OF THE PARTIES HERETO OR ANY OF THEM WITH RESPECT TO THESE GTCS OIR ANY TRANSACTION, IN EACH CASE WHETHER NOW EXISTING OR HEREAFTER ARISING, AND WHETHER FOUNDED IN CONTRACT OR TORT OR OTHERWISE.

FIG. 76

7700

11.6 Notices. All notices required or permitted to be given hereunder in writing shall, unless expressly provided otherwise, be in writing, properly addressed, postage pre-paid and delivered by hand, facsimile, certified or registered mail, courier or electronic messaging system to the appropriate address listed on the notice schedule hereto or such other address as either Party may designate from time to time by providing notice thereof to the other Party and SeatsX. A notice will be deemed effective as indicated: (i) if in writing and delivered in person or by courier, on the date it is delivered; (ii) if sent by facsimile transmission, on the date that transmission is received in legible form by a responsible employee of the recipient; (iii) if sent by certified or registered mail (airmail, if overseas) or the equivalent (return receipt requested), on the date that mail is delivered or its delivery is attempted; or (iv) if sent by electronic messaging system, on the date that the electronic message is received, unless, in each case, the date of that delivery (or attempted delivery) or that receipt, as applicable, is not a Business Day or that communication is delivered (or attempted) or received, as applicable, after the close of business in the location of the recipient on a Business Day, in which case that communication shall be deemed given and effective on the first following day that is a Business Day.

11.7 Entire Agreement. This Agreement constitutes the entire agreement between the Parties relating to the subject matter hereof and supersedes all prior agreements, understandings, negotiations, whether oral or written, of the Parties.

11.8 Non-Waiver; No Partnership or Third Party Beneficiaries. No waiver by any Party of any of its rights with respect to the other Party or with respect to these GTCs or any matter or default arising in connection with these GTCs, shall be construed as a waiver of any other right, matter or default. Any waiver shall be in writing signed by the waiving Party. Neither Party shall be deemed to be the employee, agent, partner, joint venturer or contractor of any other Party under or in connection with these GTCs. This Agreement is made and entered into for the sole benefit of the Parties, and their permitted successors and assigns, and no other Person shall be a direct or indirect legal beneficiary of, have any rights under, or have any direct or indirect cause of action or claim in connection with these GTCs.

FIG. 77

7800

11.9 Severability. If, at any time, any provision of these GTCs is or becomes illegal, invalid or unenforceable in any respect under the law of any jurisdiction, neither the legality, validity or enforceability of the remaining provisions hereof nor the legality, validity or enforceability of such provision under the law of any other jurisdiction shall in any way be affected or impaired thereby and the Parties shall promptly negotiate to restore these GTCs as near as possible to its original intent and economic effect.

11.10 Confidentiality. Neither Party shall disclose the terms of any Transaction to a third party (other than the employees, lenders, counsel or accountants of the Party and its Affiliates or prospective purchasers, directly or indirectly, of a Party of all or substantially all of a Party's assets or of any rights under these GTCs, provided such Persons shall have agreed to keep such terms confidential) except:

a. in order to comply with any applicable law, order, regulation or exchange rule, and (ii) to the extent necessary to implement any Transaction, or (iii) to the extent such information is delivered to such third party for the sole purpose of calculating a published index.

Each Party shall notify the other Party of any proceeding of which it is aware which may result in disclosure of the terms of any Transaction (other than as permitted hereunder) and use reasonable efforts to prevent or limit the disclosure. The existence of these GTCs is not subject to this confidentiality obligation. The Parties shall be entitled to all remedies available at law or in equity to enforce, or seek relief in connection with this confidentiality obligation.

11.11 Limitation on Rights. All rights related to the Product purchased and sold under these GTCs and all obligations incurred under these GTCs are purely contractual in nature. In the event of a dispute involving both Parties with a customer of one Party, both Parties shall assert the applicability of any limitations on liability to customers that may be contained in either Party's applicable contracts.

FIG. 78

7900

11.12 Headings and References. The headings contained in these GTCs are for convenience of reference only and do not constitute a part of these GTCs. Any reference to an "Article", "Section" or "Exhibit" refers to an article, section or exhibit, as the case may be, of these GTCs.

11.13 Bankruptcy Acknowledgments. The Parties intend that each Transaction and the Agreement shall constitute a "forward contract", that these General Terms shall constitute a "master netting agreement, and that each Party shall be a "forward contract merchant", and "master netting agreement participant", as such terms are defined in Title 11 of the United States Code, as amended from time to time (the "Bankruptcy Code"), and as such, that the Non-Defaulting Party shall have the rights granted in the Bankruptcy Code, including Sections 362, 546, 556, 560, 561, and 562, to terminate, liquidate, accelerate, net out, and offset in connection with the Agreement. This Agreement is entered into in reliance on the fact that these GTCs and all Transactions between the Parties form a single agreement between the Parties.

11.14 Counterparts. These GTCs may be executed in several counterparts, each of which is an original and all of which constitute one and the same instrument.

FIG. 79

8000

NOTICE

| | |
|---|---|
| Notices and Correspondence:<br>__________<br>__________<br>__________<br>Attn: __________<br>Phone No.: __________<br>Fax No.: __________ | Notices and Correspondence:<br>__________<br>__________<br>__________<br>Attn: __________<br>Phone No.: __________<br>Fax No.: __________ |
| Payments:<br>Attn: __________<br>Phone: __________<br>Fax: __________<br>Bank: __________<br>Account No.: __________<br>ABA Routing No.: __________ | Payments:<br>Attn: __________<br>Phone: __________<br>Fax: __________<br>Bank: __________<br>Account No.: __________<br>ABA Routing No.: __________ |
| Scheduling Matters:<br>__________<br>Attn: __________<br>Phone No.: __________<br>Fax No.: __________<br>Cell No.: __________<br>Email: __________ | Scheduling Matters:<br>__________<br>Attn: __________<br>Phone No.: __________<br>Fax No.: __________<br>Cell No.: __________<br>Email: __________ |

FIG. 80

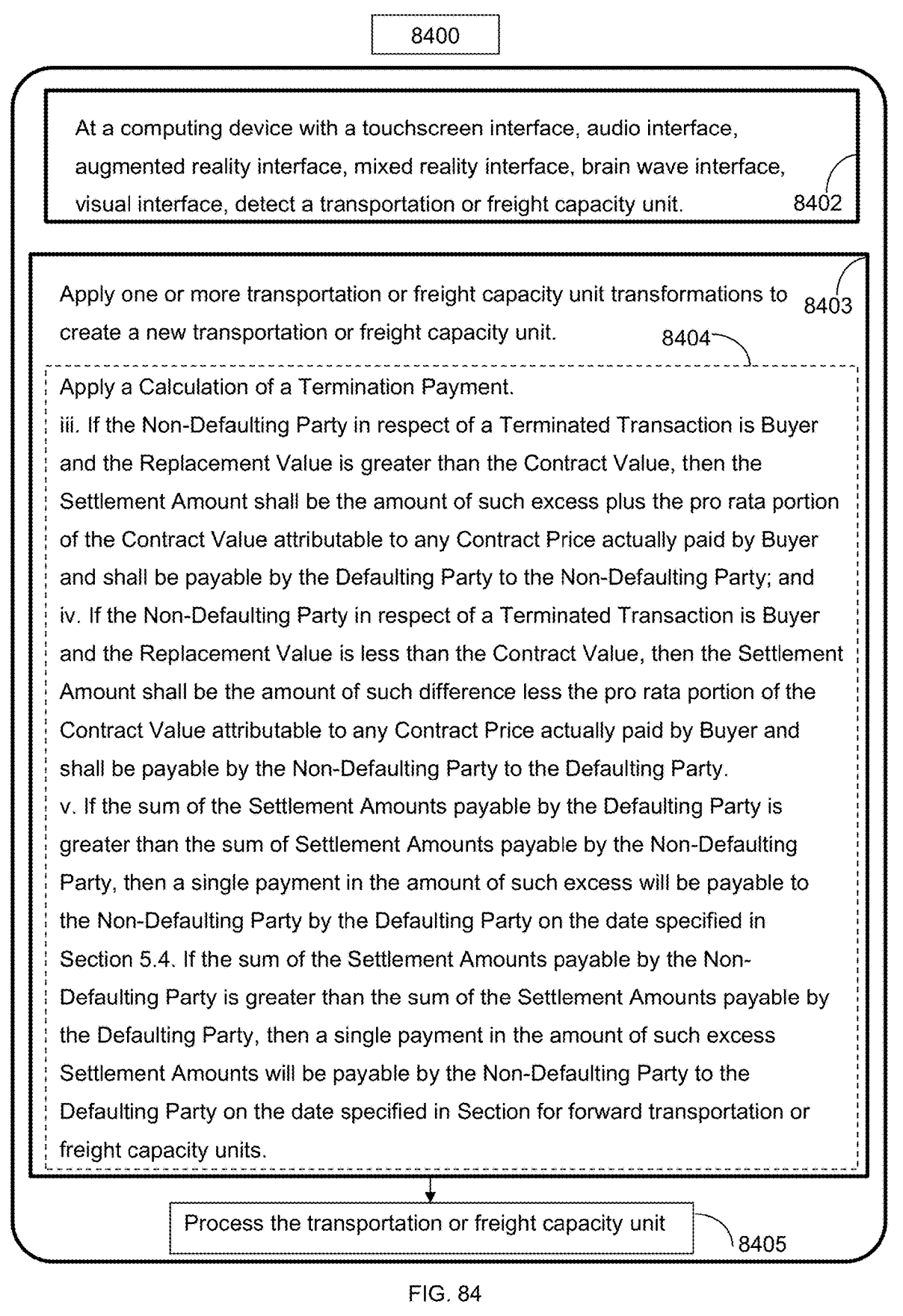

8400

At a computing device with a touchscreen interface, audio interface, augmented reality interface, mixed reality interface, brain wave interface, visual interface, detect a transportation or freight capacity unit. 8402

Apply one or more transportation or freight capacity unit transformations to create a new transportation or freight capacity unit. 8403

8404

Apply a Calculation of a Termination Payment.

iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section for forward transportation or freight capacity units.

Process the transportation or freight capacity unit 8405

FIG. 84

CURB COMMUNITY OBJECTS WITH PRICE-TIME PRIORITY QUEUES FOR TRANSFORMED CURB CAPACITY UNITS

CROSS-REFERENCE TO RELATED APPLICATIONS

This application claims the benefit of: U.S. provisional patent application Ser. No. 62/927,025, filed Oct. 28, 2019 and titled "CURB COMMUNITY OBJECTS WITH PRICE-TIME PRIORITY QUEUES FOR TRANSFORMED CURB CAPACITY UNITS;" U.S. provisional patent application Ser. No. 62/927,081, filed Oct. 28, 2019 and titled "TOLL AND CONGESTION COMMUNITY OBJECTS WITH PRICE—TIME PRIORITY QUEUES FOR TRANSFORMED TOLL AND CONGESTION CAPACITY UNITS;" U.S. provisional patent application Ser. No. 63/027,344, filed May 19, 2020 and titled "TIME INTERVAL GEOLOCATION COMMUNITY OBJECTS WITH PRICE TIME PRIORITY QUEUES FOR TRANSFORMED TIME INTERVAL GEOLOCATION UNITS;" U.S. provisional patent application Ser. No. 63/039,918, filed Jun. 16, 2020 and titled "VIRTUAL REALITY, AUGMENTED REALITY, MIXED REALITY DATA EXCHANGE SOCIAL NETWORK WITH MULTI-DIMENSIONAL MAP TILE PORTING;" U.S. provisional patent application Ser. No. 63/044,997, filed Jun. 26, 2020 and titled "MULTI-DIMENSIONAL CLASSIFICATION OBJECT MATRICES TO ESTIMATE MULTI-DIMENSIONAL REPRESENTATIONS WITH MULTI-FUNCTION DEVICE;" U.S. provisional patent application Ser. No. 63/052,159, filed Jul. 15, 2020 and titled "MULTI-DIMENSION INFORMATION SERVICE HELMET METHOD AND SYSTEM;" and U.S. provisional patent application Ser. No. 63/051,373, filed Jul. 13, 2020 and titled "VIRTUAL POWER PLANT OPTIMIZATION METHOD AND SYSTEM;" each of which is herein incorporated by reference.

This application is a continuation-in-part of U.S. patent application Ser. No. 16/589,229, entitled "TRANSPORTATION AND FREIGHT CAPACITY UNITS," filed Oct. 1, 2019; which is a continuation-in-part of U.S. patent application Ser. No. 16/556,838, entitled "FINANCIAL SWAP INDEX METHOD AND SYSTEM ON TRANSPORTATION CAPACITY UNITS AND TRADING DERIVATIVE PRODUCTS BASED THEREON," filed Aug. 30, 2019; which is a continuation-in-part of U.S. patent application Ser. No. 16/274,490, entitled "ROUTE COMMUNITY OBJECTS WITH PRICE-TIME PRIORITY QUEUES FOR TRANSFORMED TRANSPORTATION UNITS," filed Feb. 13, 2019; which is a continuation-in-part of U.S. patent application Ser. No. 16/258,658, entitled "NAVIGATION ROUTES AS COMMUNITY OBJECT VIRTUAL HUB SEQUENCES TO WHICH USERS MAY SUBSCRIBE," filed Jan. 27, 2019; which is a continuation-in-part of U.S. patent application Ser. No. 16/257,032, entitled "SECURITIZATION OF TRANSPORTATION UNITS," filed Jan. 24, 2019; which is a continuation-in-part of U.S. patent application Ser. No. 16/242,981, entitled "STRATEGY GAME LAYER OVER PRICE BASED NAVIGATION," filed Jan. 8, 2019; which is a continuation-in-part of U.S. patent application Ser. No. 16/242,967, entitled "PRICE BASED NAVIGATION," filed Jan. 8, 2019; which is a continuation-in-part of U.S. patent application Ser. No. 16/239,485, entitled "MARKET LAYER PRICE QUEUE ROUTING FOR MULTI-LAYERED NODAL NETWORK TOPOLOGY FOR A MULTI-MODAL SECURE FORWARD MARKET AUCTION IN TRANSPORTATION CAPACITY AND SPACE," filed Jan. 3, 2019; which is a continuation-in-part of U.S. patent application Ser. No. 16/183,647, entitled "FINANCIAL SWAP PAYMENT STRUCTURE METHOD AND SYSTEM ON TRANSPORTATION CAPACITY UNIT ASSETS," filed Nov. 7, 2018; which is a continuation-in-part of U.S. patent application Ser. No. 16/167,525, entitled "MULTI-LAYERED NODAL NETWORK TOPOLOGY FOR A MULTI-MODAL SECURE FORWARD MARKET AUCTION IN TRANSPORTATION CAPACITY AND SPACE," filed Oct. 22, 2018; which is a continuation-in-part of U.S. patent application Ser. No. 15/877,393, entitled "ELECTRONIC FORWARD MARKET EXCHANGE FOR TRANSPORTATION SEATS AND CAPACITY IN TRANSPORTATION SPACES AND VEHICLES," filed Jan. 23, 2018; which is a continuation-in-part of U.S. patent application Ser. No. 15/266,326, entitled "IMPLEMENTATIONS OF A COMPUTERIZED BUSINESS TRANSACTION EXCHANGE FOR VARIOUS USERS," filed Sep. 15, 2016; each of which is herein incorporated by reference.

This application is also a continuation-in-part of U.S. patent application Ser. No. 16/397,685, entitled "TUTORING COMMUNITY OBJECTS WITH PRICE TIME PRIORITY QUEUES FOR TRANSFORMED TUTORING UNITS," filed Apr. 29, 2019; which is a continuation-in-part of U.S. patent application Ser. No. 16/359,841, entitled "PARKING COMMUNITY OBJECTS WITH PRICE-TIME PRIORITY QUEUES FOR TRANSFORMED PARKING UNITS," filed Mar. 20, 2019; which is a continuation-in-part of U.S. patent application Ser. No. 16/357,241, entitled "RENEWABLE ENERGY COMMUNITY OBJECTS WITH PRICE TIME PRIORITY QUEUES FOR TRANSFORMED RENEWABLE ENERGY UNITS," filed Mar. 18, 2019; which is a continuation-in-part of U.S. patent application Ser. No. 16/183,647, entitled "FINANCIAL SWAP PAYMENT STRUCTURE METHOD AND SYSTEM ON TRANSPORTATION CAPACITY UNIT ASSETS," filed Nov. 7, 2018; which is a continuation-in-part of U.S. patent application Ser. No. 16/167,525, entitled "MULTI-LAYERED NODAL NETWORK TOPOLOGY FOR A MULTI-MODAL SECURE FORWARD MARKET AUCTION IN TRANSPORTATION CAPACITY AND SPACE," filed Oct. 22, 2018; which is a continuation-in-part of U.S. patent application Ser. No. 15/877,393, entitled "ELECTRONIC FORWARD MARKET EXCHANGE FOR TRANSPORTATION SEATS AND CAPACITY IN TRANSPORTATION SPACES AND VEHICLES," filed Jan. 23, 2018; which is a continuation-in-part of U.S. patent application Ser. No. 15/266,326, entitled "IMPLEMENTATIONS OF A COMPUTERIZED BUSINESS TRANSACTION EXCHANGE FOR VARIOUS USERS," filed Sep. 15, 2016; each of which is herein incorporated by reference.

BACKGROUND OF THE INVENTION

The following descriptions and examples are not admitted as prior art by virtue of their inclusion within this section.

In some scenarios, curb space units, sidewalk space units, parking spot space units, air space units, outer space capacity units for transit, delivery, parking, or capacity may not utilize dynamic virtual topology market queues or price time priority queues. Such queues may not be used because transportation, delivery, parking or capacity systems may typically be considered to be closed, non-transparent, non-substitutable, and/or non-transferrable, no cost of cover calculations exist, and the construct for dynamic routing based on curb or parking capacity unit marketplaces across delivery, transit, parking, air congestion capacity or generalized space capacity may not be understood. Further, in such scenarios, legal or physical transformations may not exist for transportation or freight capacity units to trade as commodities, which may prevent the formation of transportation, delivery, parking or capacity systems routing sequences that are based upon market dynamic, transparent market price-based inputs in edge weights or edge values. In these scenarios, methods and systems may lack the legal and physical calculation mechanics for curb side parking for delivery, curb space units, sidewalk space units, parking spot space units, air space units, outer space capacity units, which may limit vehicle capacity routing or transportation, delivery, parking or capacity systems utilization, analysis and equation usefulness.

Deficiencies in market structure and legal and physical curb side parking for delivery, curb space units, sidewalk space units, parking spot space units, air space units, outer space capacity units may not allow for the transferability of an underlying space, parking spot, transit curb space, delivery curb space capacity units, which may inhibit flexibility to exchange such an asset and may lead to the development of monopolistic systems. Further, in some scenarios, curb capacity, parking capacity or air space capacity options may allow for transferability, but they may lack structures which account for force majeure contingencies, remedies for curb capacity, parking capacity or air space capacity unit delivery failures, events of default, remedies, calculation formulas for termination payments, or independent valuation transformations. In such scenarios, the ability to trade the value of physical curb side parking for delivery, curb space units, sidewalk space units, parking spot space units, air space units, outer space capacity units may be limited.

SUMMARY

Described herein are implementations of various technologies relating to a price time priority queue routing for curb, parking, sidewalk space capacity units. The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

Described herein are implementations of various technologies relating to a price time priority queue routing for curb space capacity units. In one implementation, a method may include receiving origin location data and destination location data from a first user, where the origin location data corresponds to a geographic origin and the destination location data corresponds to a geographic destination, where the origin location data and destination location data may be the same location or different locations. The method may also include generating a plurality of routes based on the origin location data and the destination location data for curb, parking or generalized space capacity units. The method may further include determining a plurality of virtual hubs along the plurality of routes, where the plurality of virtual hubs includes a first virtual hub based on the origin location data and a second virtual hub based on the destination location data. The method may additionally include receiving curb capacity or parking capacity or air space capacity cost data for the plurality of routes for one or more geolocation exchange units, where the one or more geolocation exchange units corresponds to a predetermined space curb space, parking space or air space between two or more virtual hubs with geolocation data of latitude, longitude and altitude, and where the curb capacity or parking capacity or air space capacity cost data includes data relating to arrival and departure times, curb capacity or parking capacity or air space capacity expenses, or combinations thereof. In addition, the method may include receiving market depth data for a geolocation exchange for the one or more geolocation exchange units based on the plurality of curb capacity or parking capacity or air space capacity routes, where the market depth data includes one or more bid prices and one or more offer prices for the one or more geolocation exchange units. The method may also include selecting an optimized route of the plurality of routes for the one or more geolocation exchange units based on an objective function, where the objective function uses the curb capacity or parking capacity or air space capacity cost data, the market depth data, or combinations thereof.

In another implementation, a computing system may include one or more processors, and the computing system may also include one or more memory having program instructions executable by the one or more processors to receive origin location data and destination location data from a first user, where the origin location data corresponds to a geographic origin and the destination location data corresponds to a geographic destination. The one or more memory may also have program instructions executable by the one or more processors to generate a plurality of routes based on the origin location data and the destination location data. The one or more memory may further have program instructions executable by the one or more processors to determine a plurality of virtual hubs along the plurality of routes, where the plurality of virtual hubs includes a first virtual hub based on the origin location data and a second virtual hub based on the destination location data. The one or more memory may additionally have program instructions executable by the one or more processors to receive travel cost data for the plurality of curb capacity or parking capacity or air space capacity routes for one or more geolocation exchange units, where the one or more geolocation exchange units corresponds to a predetermined curb capacity or parking capacity or air space capacity space traveling from the first virtual hub to the second virtual hub, the first virtual hub and second virtual hub may be the same location or two locations which span a plurality of longitude, latitude and altitude coordinates, and where the travel cost data includes data relating to travel time, travel expenses, parking costs, curb parking costs, space capacity costs or combinations thereof. In addition, the one or more memory may have program instructions executable by the one or more processors to receive market depth data for a geolocation exchange for the one or more geolocation exchange units based on the plurality of curb capacity or parking capacity or air space capacity routes, where the market depth data includes one or more bid prices and one or more offer prices for the one or more geolocation exchange units. The one or more memory may also have program instructions executable by the one or more processors to select an optimized curb capacity or parking capacity or air space capacity route of the plurality of curb capacity or parking capacity or air space capacity routes for the one or more geolocation exchange units based on an objective function, where the objective function uses the travel cost data, the market depth data, parking or curb capacity costs, or combinations thereof.

In yet another implementation, a non-transitory computer-readable medium may have stored thereon a plurality of computer-executable instructions which, when executed by a computer, cause the computer to receive origin location data and destination location data from a first user, where the origin location data corresponds to a geographic origin and the destination location data corresponds to a geographic destination. The plurality of computer-executable instructions which, when executed by a computer, may also cause the computer to generate a plurality of curb capacity or parking capacity or air space capacity routes based on the origin location data and the destination location data. The plurality of computer-executable instructions which, when executed by a computer, may further cause the computer to determine a plurality of virtual hubs along the plurality of routes, where the plurality of virtual hubs includes a first virtual hub based on the origin location data and a second virtual hub based on the destination location data. The plurality of computer-executable instructions which, when executed by a computer, may additionally cause the computer to receive travel cost data for the plurality of curb capacity or parking capacity or air space capacity routes for one or more geolocation exchange units, where the one or more geolocation exchange units corresponds to a predetermined space traveling from the first virtual hub to the second virtual hub, wherein the first virtual hub and the second virtual hub may be the same location or different latitude, longitude and altitude coordinates, and where the travel cost data includes data relating to travel time, travel expenses, curb capacity or parking capacity or air space capacity or combinations thereof. In addition, the plurality of computer-executable instructions which, when executed by a computer, may cause the computer to receive market depth data for a geolocation exchange for the one or more geolocation exchange units based on the plurality of curb capacity or parking capacity or air space capacity routes, where the market depth data includes one or more bid prices and one or more offer prices for the one or more geolocation exchange units. The plurality of computer-executable instructions which, when executed by a computer, may also cause the computer to select an optimized curb capacity or parking capacity or air space capacity route of the plurality of curb capacity or parking capacity or air space capacity routes for the one or more geolocation exchange units based on an objective function, wherein the objective function uses the travel cost data, the market depth data, curb capacity or parking capacity or air space capacity or combinations thereof.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 48 illustrates and exemplary transformation preamble formula to create a "Transportation Capacity Unit" for transportation curb or freight curb capacity units in accordance with some embodiments.

FIG. 49 illustrates and exemplary transformation preamble formula to create a "Transportation Capacity Unit" for transportation curb or freight curb capacity units in accordance with some embodiments.

FIG. 50 illustrates and exemplary transformation definition formulas to create a "Transportation Capacity Unit" for transportation curb or freight curb capacity units in accordance with some embodiments.

FIG. 51 illustrates and exemplary transformation definition formulas to create a "Transportation Capacity Unit" for transportation curb or freight curb capacity units in accordance with some embodiments.

FIG. 52 illustrates and exemplary transformation definition formulas to create a "Transportation Capacity Unit" for transportation curb or freight curb capacity units in accordance with some embodiments.

FIG. 53 illustrates and exemplary transformation definition formulas to create a "Transportation Capacity Unit" for transportation curb or freight curb capacity units in accordance with some embodiments.

FIG. 54 illustrates and exemplary transformation definition formulas to create a "Transportation Capacity Unit" for transportation curb or freight curb capacity units in accordance with some embodiments.

FIG. 55 illustrates and exemplary transformation definition formulas to create a "Transportation Capacity Unit" for transportation curb or freight curb capacity units in accordance with some embodiments.

FIG. 56 illustrates and exemplary transformation definition and transaction terms and condition formulas to create a "Transportation Capacity Unit" for transportation curb or freight curb capacity units in accordance with some embodiments.

FIG. 57 illustrates and exemplary transformation definition and transaction terms and condition formulas to create a "Transportation Capacity Unit" for transportation curb or freight curb capacity units in accordance with some embodiments.

FIG. 58 illustrates and exemplary transformation definition and transaction terms and condition formulas to create a "Transportation Capacity Unit" for transportation curb or freight curb capacity units in accordance with some embodiments.

FIG. 59 illustrates and exemplary transformation force majeure and remedies for product delivery failure formulas to create a "Transportation Capacity Unit" for transportation curb or freight curb capacity units in accordance with some embodiments.

FIG. 60 illustrates and exemplary transformation event of default remedy formulas to create a "Transportation Capacity Unit" for transportation curb or freight curb capacity units in accordance with some embodiments.

FIG. 61 illustrates and exemplary transformation event of default remedy formulas to create a "Transportation Capacity Unit" for transportation curb or freight curb capacity units in accordance with some embodiments.

FIG. 62 illustrates and exemplary transformation event of default remedy formulas to create a "Transportation Capacity Unit" for transportation curb or freight curb capacity units in accordance with some embodiments.

FIG. 63 illustrates and exemplary transformation event of default remedy formulas to create a "Transportation Capacity Unit" for transportation curb or freight curb capacity units in accordance with some embodiments.

FIG. 64 illustrates and exemplary transformation event of default remedy formulas to create a "Transportation Capacity Unit" for transportation curb or freight curb capacity units in accordance with some embodiments.

FIG. 65 illustrates and exemplary transformation event of default remedy and payment formulas to create a "Transportation Capacity Unit" for transportation curb or freight curb capacity units in accordance with some embodiments.

FIG. 66 illustrates and exemplary transformation payment and limitation of remedy and liability and damages formulas to create a "Transportation Capacity Unit" for transportation curb or freight curb capacity units in accordance with some embodiments.

FIG. 67 illustrates and exemplary transformation limitation of remedy and liability and damages formulas to create a "Transportation Capacity Unit" for transportation curb or freight curb capacity units in accordance with some embodiments.

FIG. 68 illustrates and exemplary transformation limitation of remedy and liability and damages and financial information and tax formulas to create a "Transportation Capacity Unit" for transportation curb or freight curb capacity units in accordance with some embodiments.

FIG. 69 illustrates and exemplary transformation credit supporting formulas to create a "Transportation Capacity Unit" for transportation curb or freight curb capacity units in accordance with some embodiments.

FIG. 70 illustrates and exemplary transformation Transportation Capacity Unit formulas to create a "Transportation Capacity Unit" transportation curb or freight curb capacity units in accordance with some embodiments.

FIG. 71 illustrates and exemplary transformation Transportation Capacity Unit formulas to create a "Transportation Capacity Unit" for transportation curb or freight curb capacity units in accordance with some embodiments.

FIG. 72 illustrates and exemplary transformation Transportation Capacity Unit formulas to create a "Transportation Capacity Unit" for transportation curb or freight curb capacity units in accordance with some embodiments.

FIG. 73 illustrates and exemplary transformation Transportation Capacity Unit formulas to create a "Transportation Capacity Unit" for transportation curb or freight curb capacity units in accordance with some embodiments.

FIG. 74 illustrates and exemplary transformation Transportation Capacity Unit formulas to create a "Transportation Capacity Unit" for transportation curb or freight curb capacity units in accordance with some embodiments.

FIG. 75 illustrates and exemplary transformation Transportation Capacity Unit formulas to create a "Transportation Capacity Unit" for transportation curb or freight curb capacity units in accordance with some embodiments.

FIG. 76 illustrates and exemplary transformation Transportation Capacity Unit formulas to create a "Transportation Capacity Unit" for transportation curb or freight curb capacity units in accordance with some embodiments.

FIG. 77 illustrates and exemplary transformation Transportation Capacity Unit formulas to create a "Transportation Capacity Unit" for transportation curb or freight curb capacity units in accordance with some embodiments.

FIG. 78 illustrates and exemplary transformation Transportation Capacity Unit formulas to create a "Transportation Capacity Unit" for transportation curb or freight curb capacity units in accordance with some embodiments.

FIG. 79 illustrates and exemplary transformation Transportation Capacity Unit formulas to create a "Transportation Capacity Unit" for transportation curb or freight curb capacity units in accordance with some embodiments.

FIG. 80 illustrates and exemplary transformation Transportation Capacity Unit for transportation curb or freight curb capacity units notice correspondence in accordance with some embodiments.

FIG. 84 illustrates and exemplary transformation of a Transportation Capacity Unit flow chart of a plurality of formula transformations in accordance with some embodiments.

DETAILED DESCRIPTION

Figure 1:
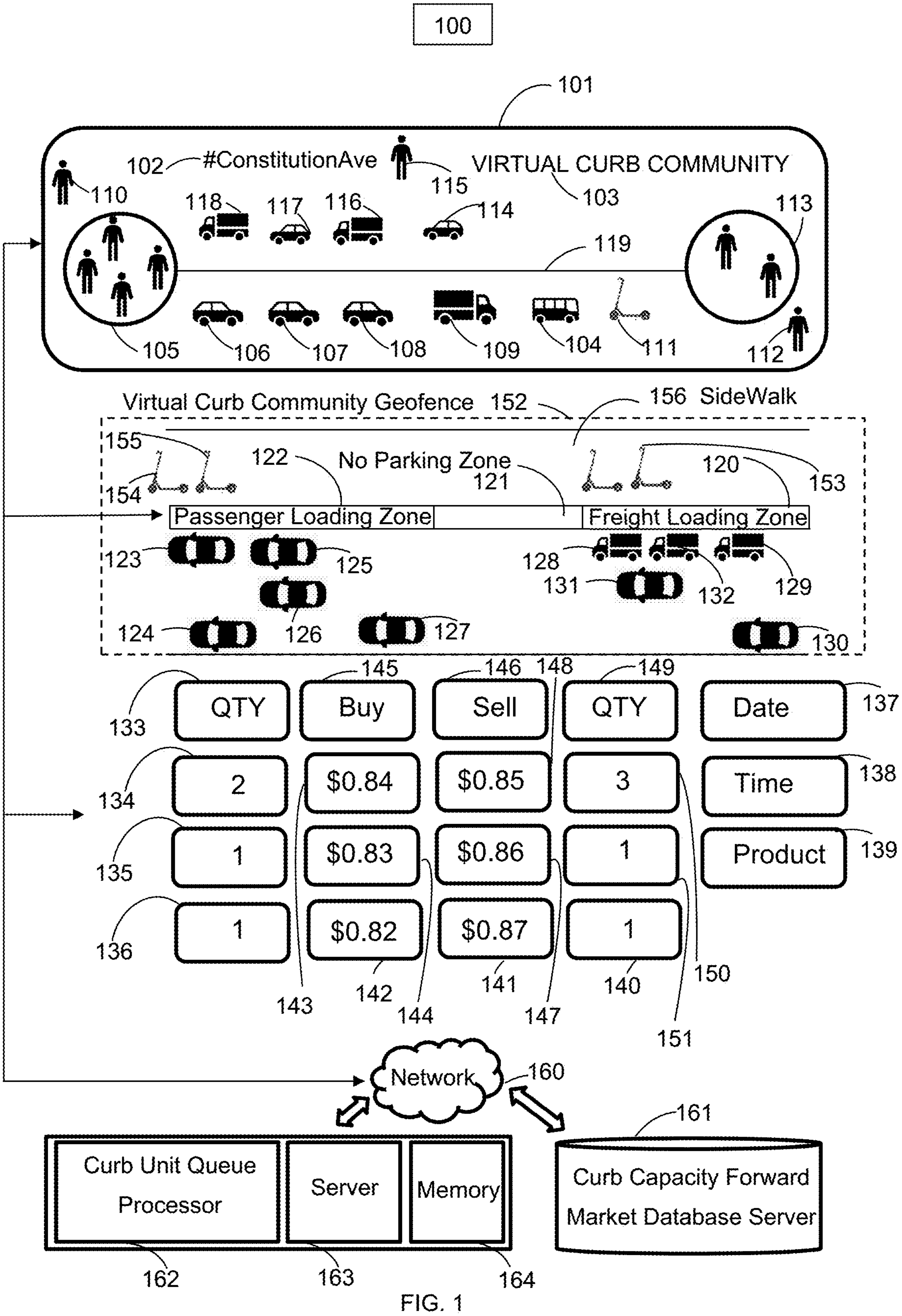
FIG. 1 illustrates a schematic diagram of a plurality of virtual curb hub sequences data transformations into waypoint combinations as community objects to which users may subscribe and associate price-time priority queues or other priority schema in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact curb capacity and freight curb units as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context. Similarly, the meaning of "curb capacity" may be used interchangeably with "sidewalk capacity" or "transportation capacity" to represent space on the road near a curb or the sidewalk adjacent to the curb or sidewalk space near a curb. Similarly, the meaning of "security" may be used interchangeably with "unitized object" or "unitization" or "forward curb capacity object" to represent space on the road near a curb or the sidewalk adjacent to the curb or sidewalk space near a curb that is tradable in markets from legal transformations.

A computing device, as described herein, may include any computing implementation known to those skilled in the art, including mobile computing devices. In some embodiments a mobile computing device may be substituted for a fixed stationary computing device or a virtual reality headset or a mixed reality headset or an augmented reality headset or an audio interfaced computer device. Embodiments may also occur on a projection computing device or in any other method or system which communicates and integrates the use of a network, community route processor, my route processor, sequence route processor, global positioning system network, mobile computing devices, servers, forward commodity forward market auction database, price-time priority queues, grouping software instructions for hubs, securitization transformations and specifications, game servers, indexing algorithms for curb capacity unit securities on various navigation routes, navigation servers, virtual hub topology methods and systems, transparent open access user interface pricing systems, blockchain audit and safety methods, facial recognition, fingerprint recognition or photo recognition of users for security and identity check, algorithms for no arbitrage conditions and constraints with a user interface or graphical user interface formatted on mobile or stationary computing devices over various mediums which are connected through a network for the purpose of grouping users into virtual curb hub sequences of community objects as a gateway to participating, transacting or trading curb capacity or freight curb capacity units between combinations of virtual curb hubs as a forward commodity in an auction or priority schema.

Various implementations directed to price time priority queue routing for curb, parking or general space capacity units for delivery, parking, standing, waiting, docking, hovering, across transit and freight and travel will now be described in the following paragraphs with reference to FIGS. 1-85.

The following paragraphs provide various techniques of various embodiments described herein such as illustrated as in FIG. 1. In one implementation as illustrated in FIG. 1, a user 110 may be assigned or may join a virtual route community 101, 103 which is a sequence of virtual hub(s). In some embodiments, the virtual curb hub sequence may be assigned a metadata tag such as #ConstitutionAve 102 which is short for a longer full name sequence such as Constitution Avenue, Washington, D.C. In some embodiments, the origin virtual hub 105, may be a specific curb address and geolocation data in the city of Washington, D.C. along Constitution Avenue. In some embodiments, the route 119 between the curb address of an address on Constitution Ave such as the street address of two Constitution Avenue virtual curb hub 105 and the fifty Constitution Avenue virtual curb hub 113 may be a sequence of two virtual curb hubs. In some embodiments, there may be many one or more trucks 118 along the curb route 119 or cars 117 or additional trucks 116 or additional cars 114 which are headed in a certain direction along the route curb 119. In some embodiments, additional vehicles 106, 107, 108, 109, 104 or bikes, eBikes or eScooters 111 may be headed the other direction along the virtual curb hub sequence 119 between two virtual curb hub points 105, 113. In some embodiments, additional user(s) 112 may join the virtual hub route curb sequence community 103. In yet another exemplary implementation, a user 110 may be assigned or may join a virtual route curb community 122, 120, 122, 156 which are a sequence of virtual curb hub(s) or virtual curb hub(s) zone(s). In some embodiments, the virtual hub curb sequence may be assigned a metadata tag such as #ConstitutionAve 102 which is may represent an exemplary street curb which has a plurality of passenger loading zones 122, no parking zones 121 and freight or food loading zones 120 or sidewalk zones 156. In some embodiments, the street may have a plurality of vehicles such as cars 123, 124, 126, 127, 131, 130 and trucks 128, 132, 129 and eScooters 154, eBikes 155, bikes 153 as well as airplanes for air landing strips, autonomous vehicles 130, bikes, boats for shipping lanes or ports, busses, drone landing areas or unmanned aerial craft landing areas on the curb, or a limo or livery service, or motorcycle, or moped, or shuttle for space landing areas, or spaceship for space landing areas, or subway for subway stations, or taxis or transportation network companies or trains, or package delivery services on a plurality of modes or robotic delivery services. In some embodiments, there may be many one or more trucks 128 along the virtual curb route 119 or cars 125 which are headed in a certain direction along the virtual curb route or virtual curb space 119. In some embodiments, the graphical user interface may communicate with the network 160 and receive instructions from the curb unit queue processor 162 and server 163 and memory 164 as well as the curb capacity forward market database base server 161. In yet another exemplary implementation, a user 112 or additional user 110 may be assigned or may join a virtual curb community 119 which is a sequence of virtual curb hub(s) from the geofence or crossing the geofence.

In some implementations and embodiments, virtual curb hub sequences such as the street address of two Constitution Avenue virtual curb hub 105 and the fifty Constitution Avenue virtual curb hub 113 may be a sequence of two virtual curb hubs are transformed into community objects which may then be assigned a plurality of attributes in the same sense as a class in the Java programming language has methods as a part of the class object in object oriented programming. In some embodiments, the data transformation of a virtual curb hub sequence into a community object allows the similar benefits of the data transformations involved in computing languages with methods which help the instructions of the computer program communicate in an organized manner using modular logic. In some embodiments, virtual curb hub sequences such as 105 to 113 #ConstitutionAve 102 may be combined with other virtual hub sequences to extend the series sequence. As we have discussed at length in the previous sections of the disclosed invention, while there may be hundreds or thousands or millions of people along various curb capacity virtual hub sequences, there currently exists no method or system of organizing a route curb or sidewalk or virtual curb hub sequence into a transformed data community object. The attributes of communities allow for superior communication, accountability and even transactions to occur within a community object 101. In some embodiments, the data transformation of a virtual hub sequence community object 101 allows a plurality of network members 110, 112 to be assigned virtual curb route communities 103 based on a plurality of attributes, prior GPS location histories, geofencing, navigation search queries or other attributes. In some embodiments, virtual curb hub sequences which have been transformed into community objects 101 provide greater communication and organizational ability for a market to transact curb capacity unit(s) and provide a gateway for those curb capacity unit transactions as described in U.S. patent application Ser. No. 15/877,393, "Electronic Forward market exchange for transportation capacity seats and capacity in curb capacity spaces and vehicles," filed Jan. 23, 2018, the entirety of which is incorporated by reference herein.

In some embodiments, virtual curb hub sequences which have been transformed into community objects 101 communicate through a network 160 to associate a price-time priority queue 133, 134, 135, 136, 137, 138, 139, 140, 141, 142, 143, 144, 145, 146, 147, 148, 149, 150, 151 for a transformed curb capacity community object using a curb capacity unit queue processor 162, a server 163, memory 164 and a curb capacity forward market database server 161. In some other embodiments, the price-time priority queue 133, 134, 135, 136, 137, 138, 139, 140, 141, 142, 143, 144, 145, 146, 147, 148, 149, 150, 151 may also be organized into other priority schema queue structures and sequences. In some embodiments, the virtual hub sequences or community objects 101 may be independent or sequenced to construct a waypoint sequence of multiple linked virtual curb hub route community objects 101. In some embodiments, the associated price-time priority queue 133, 134, 135, 136, 137, 138, 139, 140, 141, 142, 143, 144, 145, 146, 147, 148, 149, 150, 151 for curb capacity units may have generated processing and user interface display instructions from the curb capacity unit queue processor 162, the server 163, the memory 164 and a curb capacity forward market database server 161 through a network 160. In some embodiments, the price-time priority queue 133, 134, 135, 136, 137, 138, 139, 140, 141, 142, 143, 144, 145, 146, 147, 148, 149, 150, 151 for transformed curb capacity units may process and display a plurality of time and date sequences for a plurality of forward delivery periods for transformed curb capacity unit(s). In some embodiments, an exemplary priority schema may follow the buy quantity of curb capacity units 133 label which a price-time priority schema to label the buy quantity at a given price and time of curb capacity units as the first price time priority position buy quantity of two curb capacity units 134. In some embodiments, the second price-time priority queue position may be represented by a buy quantity of one 135 for curb capacity units at a given virtual curb hub sequence. In some embodiments, the third price-time priority queue position may be represented by a buy quantity of one 136 for curb capacity units at a given virtual curb hub sequence. In some embodiments, an exemplary priority schema buy prices may follow the price of curb capacity units 145 label which a price-time priority schema to label the price at a given price and time of curb capacity units as the first price time priority position price of $0.84 curb capacity units 143. In some embodiments, the second price-time priority queue position may be represented by a buy price of $0.83 144 for curb capacity units at a given virtual curb hub sequence. In some embodiments, the third price-time priority queue position may be represented by a price of $0.82 142 for curb capacity units at a given virtual curb hub sequence. In some embodiments, exemplary priority schema sell prices may follow the price of curb capacity units 146 label which a price-time priority schema to label the price at a given sell price and time of curb capacity units as the first price time priority position price of $0.85 curb capacity units 148. In some embodiments, the second price-time priority queue position may be represented by a sell price of $0.86 147 for curb capacity units at a given virtual curb hub sequence. In some embodiments, the third price-time priority queue position may be represented by a sell price of $0.87 141 for curb capacity units at a given virtual curb hub sequence. In some embodiments, an exemplary priority schema may follow the sell quantity of curb capacity units 149 label which a price-time priority schema to label the quantity at a given price and time of curb capacity units as the first price time priority position sell quantity of three curb capacity units 150. In some embodiments, the second price-time priority queue position may be represented by a sell quantity of one 151 for curb capacity units at a given virtual curb hub sequence. In some embodiments, the third price-time priority queue position may be represented by a sell quantity of one 140 for curb capacity units at a given virtual curb hub sequence. In some embodiments, the date 137 may be selected for a given curb capacity unit specification. In some embodiments, the time 138 may be selected for a given curb capacity unit specification. In some embodiments, the product 139 may be selected for a given curb capacity unit specification.

In some implementations and embodiments, eScooters 154 or eBikes 155 or bikes 153 may be on a sidewalk 156 or curb zones 122, 121, 120 wherein a price-time priority queue 133, 134, 135, 136, 137, 138, 139, 140, 141, 142, 143, 144, 145, 146, 147, 148, 149, 150, 151 may be assigned to the transportation or delivery vehicle for space at a given contract specification or utilize another prioritization schema to reserve space or purchase or sell space or trade space at a given specification. In some embodiments, the virtual curb or sidewalk community geofence 152 may be assigned or subscribed to for vehicle objects in the geofence. In some embodiments, certain no parking zones 121 may also be designated by the system.

Figure 2:
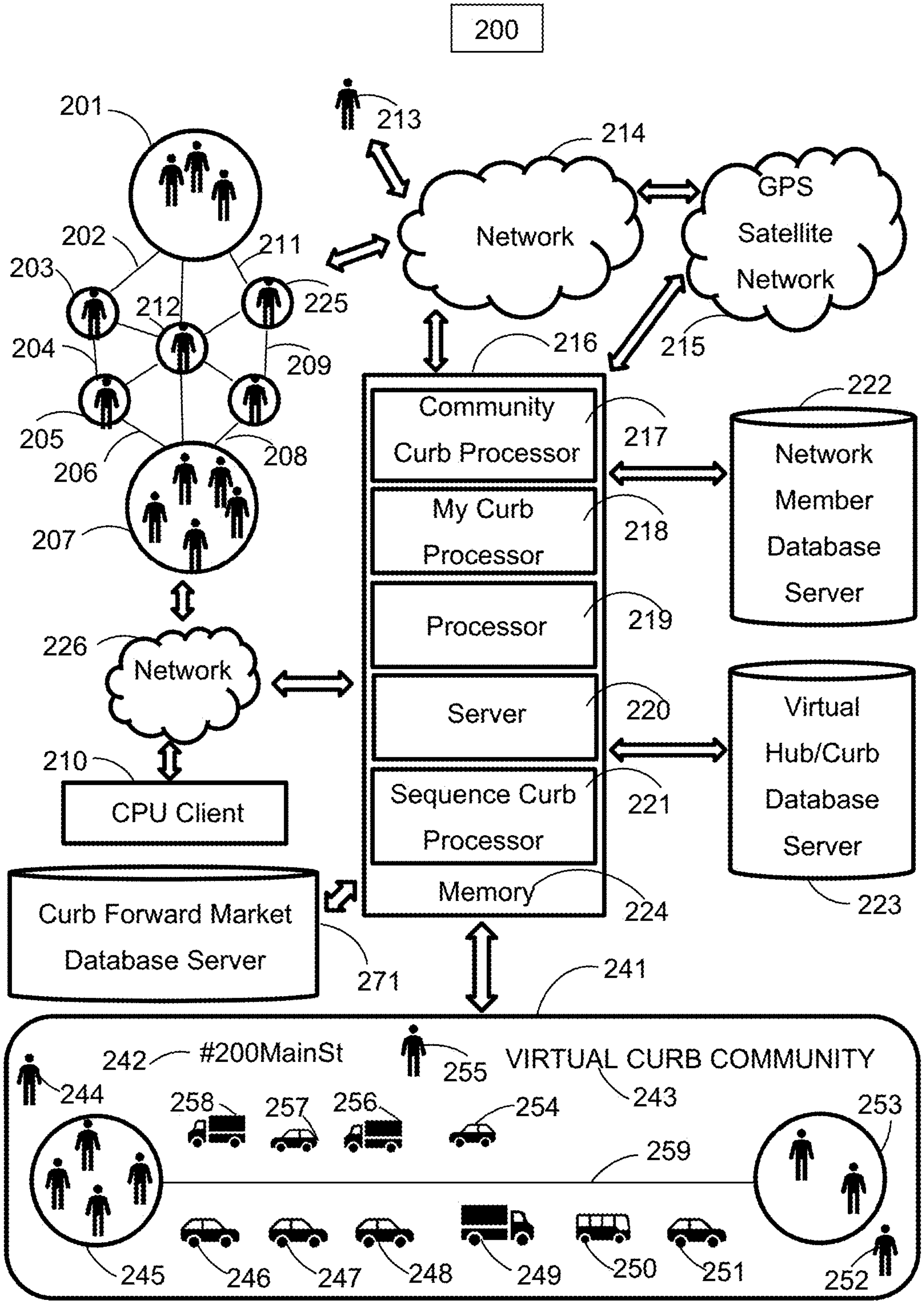
FIG. 2 illustrates a schematic diagram of an exemplary network configuration and of a virtual curb hub sequences data transformation into a waypoint combination as community object to which users may subscribe and associate price-time priority queues or other priority schema in accordance with implementations of various techniques described herein.

FIG. 2 illustrates in some implementations and embodiments, an exemplary network configuration 200. In some implementations and embodiments a network of virtual curb capacity hubs 201, 203, 205, 207, 212, 225 may represent a virtual curb capacity or virtual sidewalk capacity network of a neighborhood, village, city, county, state, country, continent or even inter-virtual hub networks across geographies. Prior art as well as current inventions carry no methods or data transformations to transform navigation curb routes or sidewalk routes 202 which are a virtual curb hub sequence 202 between a series of virtual curb capacity hubs 201 and 203 or 203 and 212 or even multi-leg combinations such as 201 to 203 and 203 to 212 as a sequence. In some embodiments, user(s) 213 or the network 214 have input hundreds or thousands or millions or more virtual hubs 201 to form a network topology for curb capacity virtual hub sequences 241. In some embodiments, the curb capacity data transformation to a series of virtual curb capacity hubs 245, 253 allows for network structure 201, 203, 212, 205, 207, 225, 212 and organization such as a hub and spoke model which is heavily utilized within the airline curb capacity industry or a plurality of other competing network topologies which are not dependent on road pathways. While hub and spoke curb capacity systems are common for airplane capacity or bus and train networks, they do not exist for private vehicle networks in an organized manner other than road ways. In some embodiments, virtual curb capacity hub topologies 241 over road structures 259 allows for the benefits of public curb capacity networks to be combined with private curb networks. In some embodiments, the virtual curb capacity hub network 201, 203, 212, 205, 207, 225, 212 has been input into the network 214. In some embodiments, the topology of the virtual hub network 201, 203, 212, 205, 207, 225, 212 then moves for further data transformation in the community route curb processor 217 which transforms subsections of the curb capacity network topology 201, 203, 212, 205, 207, 225, 212 into a virtual hub sequence 241 which represents two addresses 245, 253 along a virtual hug sequence 242 such as Palo Alto, California 245 to San Francisco, California 253 corresponding each virtual hub address 245, 252 with a physical address. Virtual Route Curb Communities 243 may be one to one, one to two or one to many and any superset or subset combination thereof. The My Curb Processor 218 further processes virtual hub combination and virtual curb capacity hub sequences into a specific network members account on the network member database server 222. In some embodiments, the sequence route processor 221 may connect a plurality of virtual hub sequences 201, 203 205, 207 in a logical order to complete a path combination 201 to 207 for navigation or community object construction. In some embodiments, community objects may be made from simple direct path routes 202 between two virtual hubs 201 and 203 or multi-virtual hub constructions between two virtual hub sequences 201 to 207 by waypoints of 201 to 203 to 212 to 207 or any combination or superset or subset thereof. In some embodiments, the virtual route curb community objects 243 allow attributes to be assigned to the community objects. In some embodiments, users may be assigned to a plurality or community virtual hub sequence objects 241. In some embodiments, network members 213 may be assigned to a virtual route curb community 241 because the user(s) route history on the GPS satellite network 215 suggests the route curb has overlap with virtual hub route sequences the user has used or queried on various search methods on the system. In some embodiments the user 213 may use a CPU client 210 that is a visual, audio or other type of computing interface with the network 226 of navigation route communities 243. In some embodiments, the curb capacity forward market database server 271 may interface with a processor 219 or sequence curb processor 221 or my curb processor 218 or community route curb object processor 217 to process a plurality of price-time priority queues 300 for transformed curb capacity unit(s) or other priority schema. In some embodiments, a plurality of vehicles 258, 257, 256, 254, 246, 247, 248, 249, 250, 251 may be in route between a said first virtual hub 245 and a second said virtual hub 253. In some embodiments, vehicles 257, 247 may be moving in opposite directions along a route 259. In some embodiments, a truck 258 may contain a transformed curb capacity unit(s) or a car 251 may contain a transformed curb capacity unit(s) or a bus 250 may contain a transformed curb capacity unit(s) or a plurality of other vehicle types may contain a transformed curb capacity unit(s) under a specification which is substitutable. In some embodiments, the virtual curb hub or community object sequence of waypoints may be reversed from waypoint 245 to waypoint 253 to waypoint 253 to waypoint 245. In some embodiments, waypoint 245 and waypoint 253 may represent the same longitude, latitude and altitude coordinate or they may be disparate longitude, latitude and altitude coordinates. In some embodiments, the community route curb object 241 or community route object sequence 101, 105, 113 may have an infinite series of associated price-time queues 300 whereby any subset or superset comprise a forward market for transformed curb capacity unit(s), transformed community route object(s) and the associated transformed curb capacity unit(s). In some embodiments virtual route communities 241, 101, 121, 141 are transformed data structures that form objects which community users 213 may subscribe, friend, join, follow to more efficiently have news and understanding for the curb capacity unit transactions as described in U.S. patent application Ser. No. 15/877,393, "Electronic Forward market exchange for transportation capacity seats and capacity in transportation capacity spaces and vehicles," filed Jan. 23, 2018, the entirety of which is incorporated by reference herein. In some embodiments, the Network 226 may use the community curb processor 217 to interact over the network 226 with other camera devices, visual detection devices, geofence devices, gps satellite networks 215, city and private networks 214 to process 219 images to confirm arrival and drop off of curb capacity units under a plurality of specifications. In some embodiments, cities or municipalities may use the network 214, 226 to issue tickets, fines or charges to users who did not pay for the curb capacity unit in the curb capacity unit topology 201, 202, 203, 204, 205, 206, 207, 208, 209, 225, 211, 212 against the network member server data 222 community curb processor 217, my curb processor 218, general processors 219, general servers 220, sequence curb processors and memory 224 for a given virtual curb community object 241.

Figure 3:
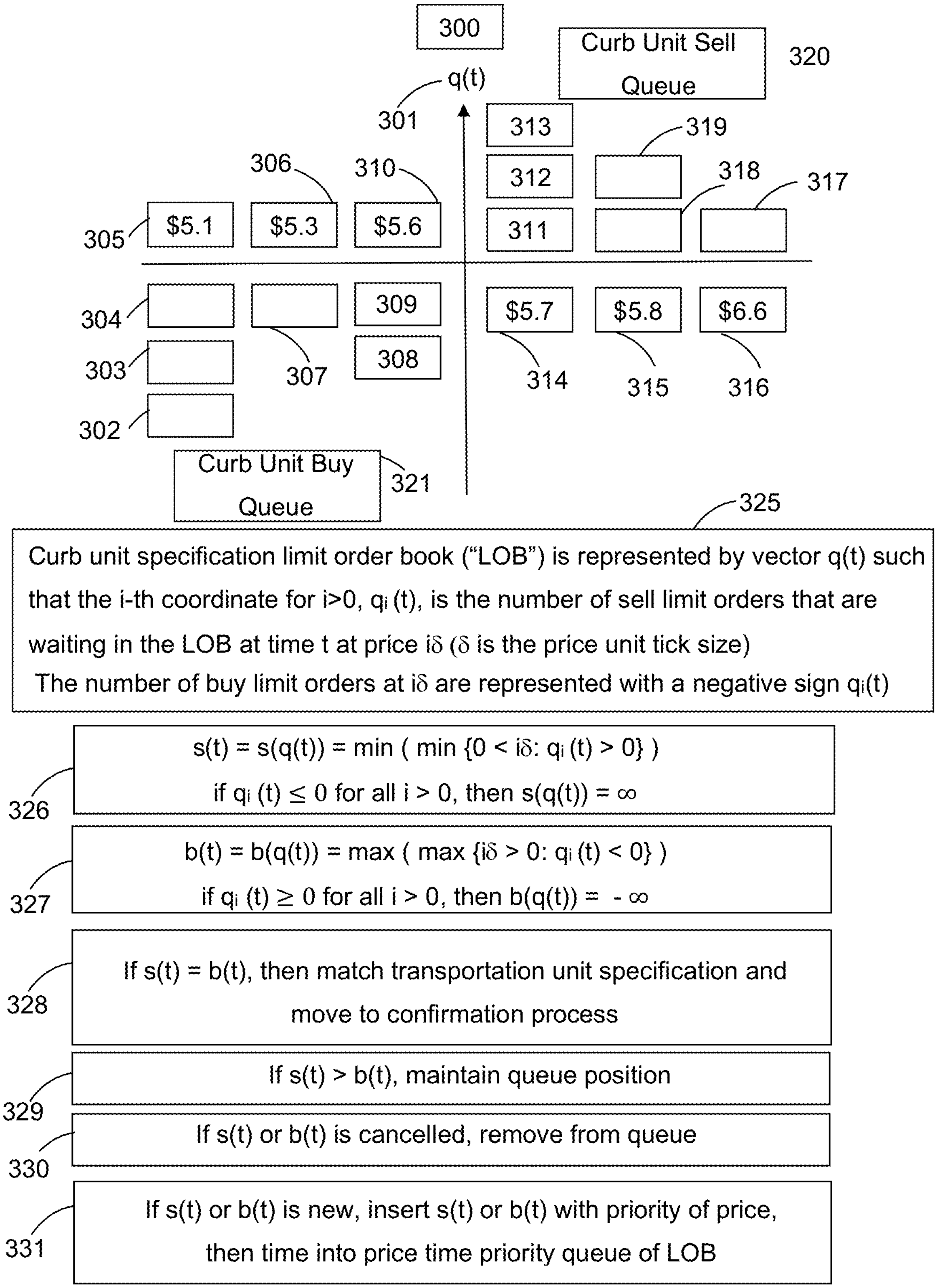
FIG. 3 illustrates an exemplary price-time priority queue for community route objects or waypoint combinations and community route object sequences for transformed curb capacity and freight curb units in accordance with implementations of various techniques described herein.

FIG. 3 illustrates exemplary user price-time priority queue 300 for transacting or matching transformed curb capacity unit data, participating, transacting and/or trading curb capacity, representing the transformed curb capacity unit value as a homogeneous asset specification or sidewalk capacity as a physical forward commodity security between combinations of virtual hubs over various curb capacity modes. In some embodiments, user transformed curb capacity unit(s) or transformed curb capacity unit(s) associated with route curb community objects interface 300 includes the following instructions, transformations and elements, or a subset or superset thereof:

- exemplary transformed curb capacity unit price-time priority sell queue 320;
- exemplary transformed curb capacity unit price-time priority buy queue 321;
- exemplary transformed curb capacity unit price priority bucket 305 in the curb capacity unit buy queue of $5.10;
- exemplary transformed curb capacity unit price priority bucket 306 in the curb capacity unit buy queue of $5.30;
- exemplary transformed curb capacity unit price priority bucket 310 in the curb capacity unit buy queue of $5.60;
- exemplary transformed curb capacity unit price priority bucket 314 in the curb capacity unit sell queue of $5.70;
- exemplary transformed curb capacity unit price priority bucket 315 in the curb capacity unit sell queue of $5.80;
- exemplary transformed curb capacity unit price priority bucket 316 in the curb capacity unit sell queue of $6.60;
- exemplary transformed curb capacity unit price-time priority buy price 304 in the first time position of the price priority bucket 305 of $5.10;
- exemplary transformed curb capacity unit price-time priority buy price 303 in the second time position of the price priority bucket 305 of $5.10;
- exemplary transformed curb capacity unit price-time priority buy price 302 in the third time position of the price priority bucket 305 of $5.10;
- exemplary transformed curb capacity unit price-time priority buy price 307 in the first time position of the price priority bucket 306 of $5.30;
- exemplary transformed curb capacity unit price-time priority buy price 309 in the first time position of the price priority bucket 310 of $5.60;
- exemplary transformed curb capacity unit price-time priority buy price 308 in the second time position of the price priority bucket 310 of $5.60;
- exemplary transformed curb capacity unit price-time priority sell price 311 in the first time position of the price priority bucket 314 of $5.70;
- exemplary transformed curb capacity unit price-time priority sell price 312 in the second time position of the price priority bucket 314 of $5.70;
- exemplary transformed curb capacity unit price-time priority sell price 313 in the third time position of the price priority bucket 314 of $5.70;
- exemplary transformed curb capacity unit price-time priority sell price 318 in the first time position of the price priority bucket 315 of $5.80;
- exemplary transformed curb capacity unit price-time priority sell price 319 in the second time position of the price priority bucket 315 of $5.80;
- exemplary transformed curb capacity unit price-time priority sell price 317 in the first time position of the price priority bucket 316 of $6.60;
- exemplary transformed curb capacity unit price time priority limit order book ("LOB") 325 is represented by the vector q(t) 301, such that the i-th coordinate for i>0, $q_i$ (t), is the number of sell limit orders of transformed curb capacity units that are waiting in the LOB at time t a price iδ (δ is the price unit tick size of the transformed curb capacity unit), the number of buy limit orders for transformed curb capacity units at iδ are represented with a negative sign $q_i$ (t);
- exemplary benchmark price 326 of all sell limit orders at time t are computed as s(t)=s(q(t))=min (min {0<iδ: $q_i$ (t)>0}), if $q_i$ (t) is less than or equal to 0 for all i>0, then s (q (t))=infinity;
- exemplary benchmark price 327 of all buy limit orders at time t are computed as b(t)=b (q (t))=max (max {iδ>0: $q_i$ (t)<0}), if $q_i$ (t) is greater than or equal to 0 for all i>0, then b(q (t))=negative infinity;
- exemplary order match 328 in the transformed curb capacity unit limit order book where s(t)=b(t), which then moves the method and system to the matched transformed curb capacity unit limit order confirmation and delivery process;
- exemplary limit order book status of no order match 329, where s (t)>b (t);
- exemplary limit order book i-th $q_i$ (t) element 330 of LOB is cancelled, remove from queue;
- exemplary i-th qi (t) element is a new transformed curb capacity unit order 331 in LOB, insert into respective limit order buy queue 321 or limit order sell queue 320 with priority of price, then time into the price time priority queues 300.

In some implementations and embodiments, the price-time priority queue 300 for transformed curb capacity units may be assigned to a commute community object 241 which is a waypoint sequence of transformed curb capacity units. In some embodiments, the price-time priority queue 300 may be assigned to two waypoints as a commute community object 241 or the price—time prior queue 300 may be assigned to a commute community waypoint object sequence of many waypoints 203 to 205 to 207 to 212 which have been added together to form one continuous curb community object 241 and respective price-time priority queue for transformed curb capacity units through processing instructions from the Community Curb Route Processor 217 and Sequence Curb Route Processor 221 via the network(s) 226 and 214 and 215. In some embodiments, the limit order book 301 vector may be assigned to a specific date and time for the commute community waypoint object which is a forward market price for transformed curb capacity unit(s) 271 and commute community waypoint object(s) 241. In some implementations and embodiments, a specific transformed curb capacity unit price-time priority queue limit buy order 304 with a specific price stamp bucket 305 of $5.10, may be cancelled, if the 304 order is cancelled, the 303 price-time priority limit order book buy queue price then moves to the higher price-time priority queue position of 304 and price—time priority price of 302 moves to position 303. In some embodiments, the price-time priority limit order sell price 319 of price-time priority bucket price 315 of $5.80 may be cancelled, if 319 price-time priority of the transformed curb capacity unit is cancelled, then order 317 moves to a higher position in the overall transformed curb capacity queue 320 even though the limit order book price 317 remains in the price bucket of 316 which is $6.60. In some embodiments, price-time priority insertion may occur where a new order is inserted into either the transformed curb capacity unit buy queue 320 or transformed curb capacity unit sell queue 321. In some embodiments, by example but not limiting by example, a new price-time limit order for a transformed curb capacity unit may be inserted as a sell order at a price of $5.70 at position 313 which would then assume order 312 was also at a price of $5.70 and that order 312 was placed with a time that was before order 313 was placed. In the aforementioned example of the price-time order insertion of 313, price-time orders of 319, 318 and 317 have moved lower in their relative position even though they remain in distinctly different price buckets of 315 and 316 respectively as the price-time priority queue 300, price is first priority, then time stamp in the price-time priority queue 300 for transformed curb capacity units.

In some implementations and embodiments, the lowest selling price s(t) 326 may equal the highest buying price b(t) 327, in which case the highest transformed curb capacity unit buy queue price bucket 310 is equal to the lowest transformed curb capacity unit sell queue 320 selling bucket price 314. In the example 300 of the limit order book 301, but not limiting by example, the highest transformed unit buy price 310 of $5.60 is lower than the lowest curb capacity unit sell queue 320 lowest selling bucket 314 of $3.70 so no match occurs because s (t)>b (t) 329. In some embodiments, many order insertions 331 or order cancellations 330 may occur for transformed curb capacity units from the curb capacity forward market database server 271 associated with community objects which are series of waypoints 241.

In some implementations and embodiments, the LOB 300 for transformed curb capacity units may contain many different types of instruction structures and specifications such as limit orders 720, market orders 720, market if touched orders 720, snap market orders 720, snap mid orders 720, snap to primary orders 720, peg to benchmark orders 720, or adaptive custom orders 720 which are custom customer designed instructions which are all standard order types for anyone skilled in the art of markets. In some embodiments, the LOB 300 for transformed curb capacity units may also contain instructions for order times such as good for the day 710, good till cancelled 710, immediate or cancel 710, good till date 710, day till cancelled 710 or a plurality of additional custom instructions for the timing of the order of the transformed curb capacity unit in the LOB 300 that is associate with a commute community object 241. In some embodiments, a plurality of additional instructions and specifications may also be unique to each transformed curb capacity unit LOB 300 such as automobile mode 811, air mode 812, autonomous vehicle mode 813, bike mode 814, boat mode 815, bus mode 816, drone mode 817, limo mode 818, motorcycle mode 819, moped mode 820, shuttle mode 821, spaceship mode 822, subway mode 823, taxi mode 824, scooter mode, eBike mode, eScooter mode, train mode 825, fastest optimized mode 826, which may combine many modes 810 or a single mode 810 for a waypoint commute community object 241 or waypoint community sequence 201 to 203 to 205 to 212 to 207 of many commute communities 241.

In some implementations and embodiments, the LOB 300 may be assigned to transformed curb capacity unit packages 828 that have associated commute community objects 241. In some embodiments, the LOB 300 for transformed curb capacity units may be assigned to cargo 829 such as a trailer of a rig or container of a boat or container on a truck or any type of cargo that takes up the space of a transformed curb capacity unit. In some embodiments, the LOB 300 may even be assigned to the virtual transformed curb capacity unit 830 which would be space along a packet moving medium such as a telecom pipeline, satellite telecom or wireless telecom that moves packets of data which are transformed curb capacity units parked in storage on the cloud.

In some embodiments, the curb capacity unit may be assigned to a plurality of other priority queues for trading purposes including but not limited to various blockchain sequences tied to the curb capacity unit over a distributed ledger on the community curb processor 217 or server 220 or sequence curb processor 221 or curb forward market database server 271.

Figure 4:
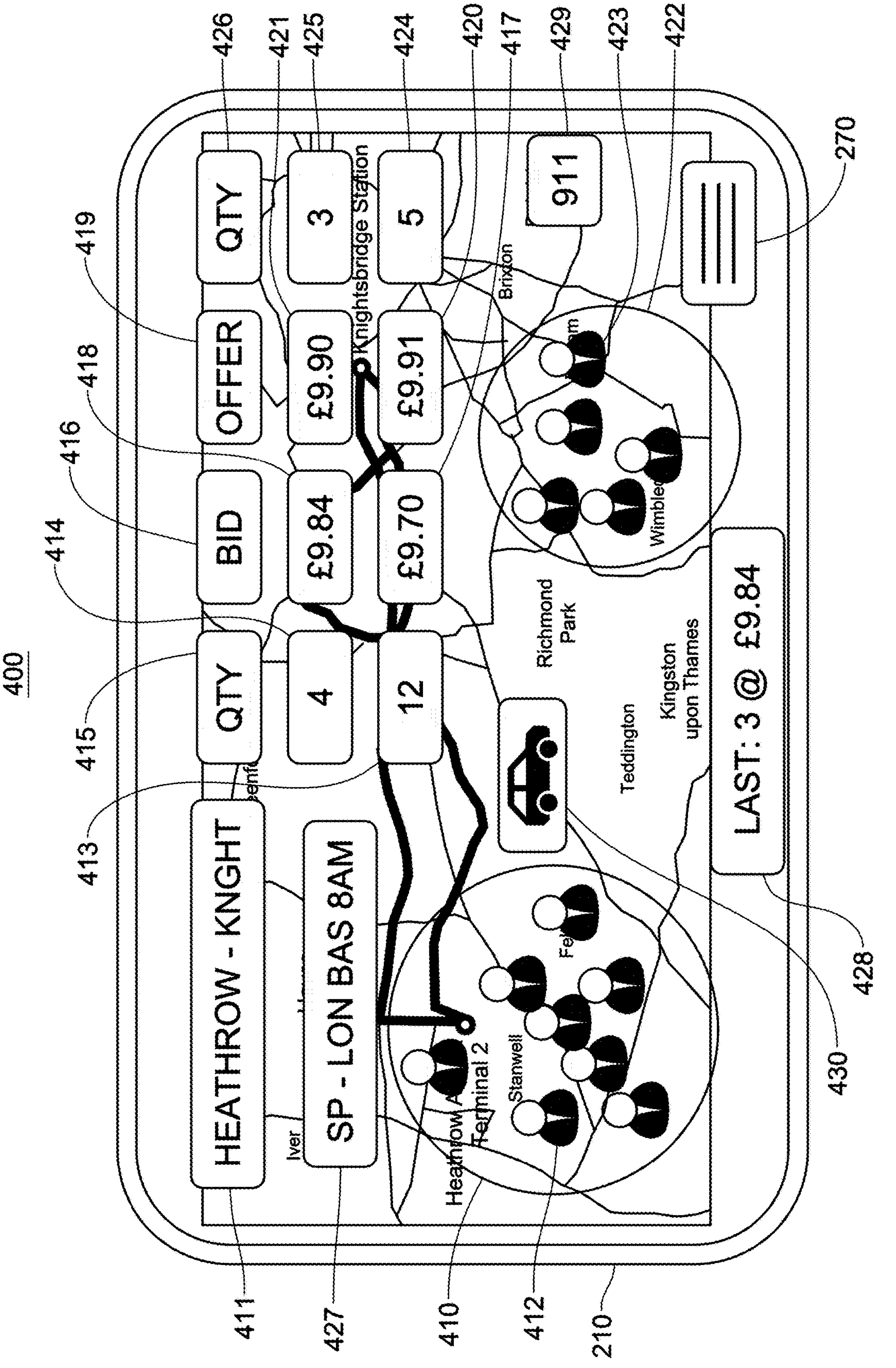
FIG. 4 illustrates an exemplary user interface with various international configurations of trading automobile or freight curb capacity in accordance with some embodiments in accordance with implementations of various techniques described herein.

FIG. 4 illustrates exemplary user interfaces 210 for participating, transacting and/or trading curb capacity as a physical forward data transformed curb capacity unit commodity or security between combinations of virtual hubs which may be community objects 241 over various curb capacity modes. In some implementations and embodiments, a user interface 210 includes the following elements, or a subset or superset thereof:

- exemplary virtual curb hub combination 311;
- exemplary virtual hub origin/from location 410 with users 412 within the virtual hub location 410;
- exemplary specification summary of the market, level of service and time of delivery commencement 427, in this particular embodiment the GUI 210 has moved to an international virtual market hub combination market such as within London;
- exemplary mode of curb capacity type 430;
- exemplary transaction summary of the last trade auction quantity and price 428 in the local currency or another currency set by the user 110;

exemplary virtual curb hub destination/to location 422 and user who is being delivered on the curb capacity or freight capacity unit 423;

exemplary bid/buy quantity title header 415 for an exemplary virtual curb capacity hub market;

exemplary bid/buy price title header 416 for an exemplary virtual curb capacity hub market;

exemplary offer/sell price title header 419 for an exemplary virtual curb capacity hub market;

exemplary offer/sell quantity title header 426 for an exemplary virtual curb capacity hub market;

exemplary bid/buy quantity 414 for the best bid quantity for the associated LOB 300 from a plurality of users 110 for an exemplary respective curb capacity virtual hub combination that has undergone a plurality of data transformations in the method 411;

exemplary bid/buy quantity 413 for the second-best bid quantity for the associated LOB 300 from a plurality of users 110 for an exemplary respective curb capacity or freight capacity virtual hub combination that has undergone a plurality of data transformations in the method 411;

exemplary bid/buy price 418 for the best bid price for the associated LOB 300 from a plurality of users 110 for an exemplary respective curb capacity virtual hub combination that has undergone a plurality of data transformations in the method 411;

exemplary bid/buy price 417 for the second-best bid price for the associated LOB 300 from a plurality of users 110 for an exemplary respective curb capacity or freight capacity virtual hub combination that has undergone a plurality of data transformations in the method 411;

exemplary offer/sell price 421 for the best offer price for the associated LOB 300 from a plurality of users 110 for an exemplary respective curb capacity or freight capacity virtual hub combination that has undergone a plurality of data transformations in the method 411;

exemplary offer/sell price 420 for the second-best offer price for the associated LOB 300 from a plurality of users 110 for an exemplary respective curb capacity or freight capacity virtual hub combination that has undergone a plurality of data transformations in the method 411;

exemplary offer/sell quantity 425 for the best offer quantity for the associated LOB 300 from a plurality of users 110 for an exemplary respective curb capacity or freight capacity virtual hub combination that has undergone a plurality of data transformations in the method 411;

exemplary offer/sell quantity 424 for the second-best offer quantity for the associated LOB 300 from a plurality of users 110 for an exemplary respective curb capacity or freight capacity virtual hub combination that has undergone a plurality of data transformations in the method 411;

exemplary safety dispatch “911” button 429 to enact video and audio recording of the user 110 environment and dispatch of that information to authorities;

exemplary hamburger menu button 270 to move back to menu options and settings away from the participation, transaction, trading GUI 210 embodiment.

In some implementations and embodiments the user 110 may enter a transaction quantity and price for transformed curb capacity or freight capacity unit securities to participate, transact and/or trade by the GUI 210 detecting user 110 contact with a bid/buy price 418 or offer/sell price 421. The GUI 210 detects user 110 contact with any of the GUI 210 buttons which have been aforementioned. The GUI 210 may detect user contact 110 with any of the GUI 210 buttons 418, 417, 420,421 or user 110 voice interface with the application 210 method. Upon user 110 contact with buttons on the GUI 210, instructions are instantiated which allows the user 110 to change the specifications of the respective virtual hub combination 411. A plurality of prices and markets may be presented based on a plurality of contract specifications. In some embodiments, the best bid/buy price 418 may be moving up in price or down in price depending on the market conditions at any given time. In some embodiments the last auction trade or last transacted price for a given specification is listed to help the user 110 understand how the market is moving so that the user 110 may submit a competitive offer/selling price 421 or bid/buying price 414. In some embodiments, users 110 may adjust settings of the GUI 210 to show more bid/buying prices 417 or more offer/selling prices 420. In some embodiments the matrix of market quantities and prices 413, 414, 415, 416, 417, 418, 419, 420, 421, 424, 425, 426 may be referred to as market depth in the GUI 210 embodiment. In some embodiments the number of users 110 may be displayed as user icons 412 or 423 for the amount of people logged in which desire to transact, trade or participate in a given virtual hub 410 to virtual hub 422 combination auction. In some implementations and embodiments, users 110 may select the curb capacity mode 430 such that the user allows a market for only one form of transformed curb capacity as a commodity or security or the user 110 may allow the system to show multiple forms of transformed curb capacity between two virtual curb capacity hubs 410, 411, 422. In some embodiments the GUI 210 may detect a user 110 selecting the 911 button 429 which may activate voice and video recording functions on the mobile or stationary device 210 and transmit the data with a confirmation from the user 110 to the authorities to provide enhanced security while participating, transacting or trading forward transformed curb capacity or freight as a commodity or security. In some embodiments the user may toggle between the GUI 210 market view screen in FIG. 4 and other menu 270 options and settings by the user 110 selecting the hamburger button 270 and the GUI 210 detecting the user 110 input or contact. In some embodiments the GUI 210 may instantiate instructions in the memory of the mobile computing device 210 which then transmits curb capacity or freight capacity data through the network 140 or wireless GPS network 150 to call upon instruction routines and instruction sub-routines on the curb capacity forward market database server 130, virtual hub database server 120, network member database server 160, no arbitrage condition database server 180 and/or instructions in the memory of the cloud and local CPUs 190 which all interface together to make one system which may deliver curb capacity or freight capacity units to users 110 from and to a plurality of virtual hubs 410, 422 with a plurality of specifications 427 at specific market prices.

Figure 5:
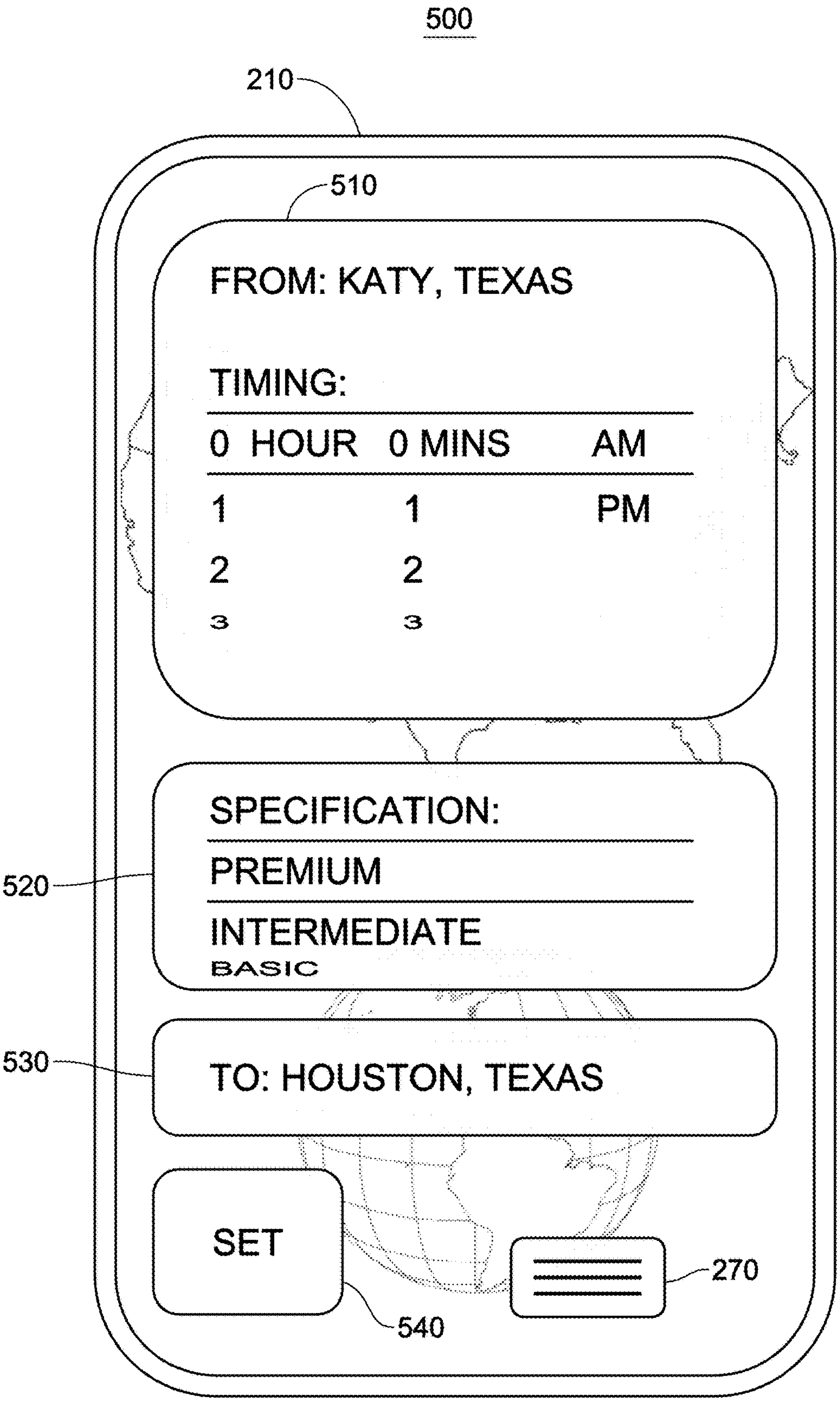
FIG. 5 illustrates an exemplary user interface to select a specification grade of curb capacity or curb freight capacity with various timing specifications in accordance with some embodiments in accordance with implementations of various techniques described herein.

FIG. 5 illustrates an exemplary user interface 210 for listing timing specifications 510 on a portable multifunction device in accordance with some embodiments. In some embodiments, user interface 210 includes the following elements, or a subset or superset thereof:

origin/from virtual curb hub timing specification (a data transformation) 510;

specification of quality of curb capacity (a data transformation) 520;

destination/To virtual hub (a data transformation) 530;

setting button 540 to transmit the timings 510 and quality specification grade 520 (a data transformation);

hamburger button 270 to instruct the GUI 210 to take the user 110 to the menu screen.

In some implementations and embodiments, the user 110 may select a plurality of timing options in the timing selection specification 510. The timing specification constraint may be the time at which the transformed curb capacity or freight curb capacity unit security departs from the origin/from virtual hub 410. As in any commodity market, if a user 110 is late and they have purchased the curb capacity unit, the user must still pay for the curb capacity or freight capacity unit regardless if the user 110 is present at the time of departure or not. The user has the option if they know they will be late to sell back the curb capacity or freight curb capacity unit to the market at the then current price. Accordingly, for the purpose of example, but not limiting by example, if a user 110 bought a transformed curb capacity unit security for £9.90 421 and the user 110 realized they would be late for the 8 am curb departure specification 427, then the user 110 may either pay for the curb capacity unit even though the user 110 was present and did not take delivery of the curb capacity unit security, or the user 110 may preemptively sell back the curb capacity unit security to the market at the then current bid price 418. The user 110 would then have offset their obligation in a timely manner and another user 110 on the network 160 may then purchase the available curb capacity or freight curb capacity unit security. By eliminating the initial obligation by an creating an offset obligation, the additional data transformation concepts such as cost of cover, liquidated damages or force majeure are not employed by the method. In some embodiments, virtual curb capacity or freight hub combination units may or may not have the available liquidity if the user 110 were to wait too long before delivery of the curb capacity unit to make an adjustment and therefore may need to take delivery even if they are not present. In some embodiments, the user 110 may select a grade specification 520. For the purpose of example, but not limiting by example, a plurality of specification grades may exist, such as "premium" which may be defined by certain classes of curb capacity units and/or certain quality levels. Similarly, for the purpose of example, but not limiting by example, a plurality of specification grades may exist such as "intermediate" or "basic" which may be defined by certain classes of curb capacity or freight capacity unit securities and/or certain quality levels. In some embodiments, many variations of specification grades may be utilized in a priority grid structure. In some embodiments, the user 110 may select the destination/to virtual hub 530 to change the virtual curb hub combination. In some embodiments, the user 110, may contact the "set" button 540 to transmit the transformed curb capacity unit security specification data by using the GUI 210 which may instantiate instructions in the memory of the mobile computing device which then transmits curb capacity data through the network 160 or wireless GPS network to call upon instruction routines and instruction sub-routines on the curb capacity forward market database server 161, virtual curb unit queue hub database server 163 and processor 162, network member database server 222, map routing servers 220 and/or instructions in the memory of the cloud and local CPUs 164 which all interface together to make one system which may deliver transformed curb capacity unit securities or unitized objects to users 110 from and to a plurality of virtual hubs 410, 422 with a plurality of specifications at specific market prices.

Figure 6:
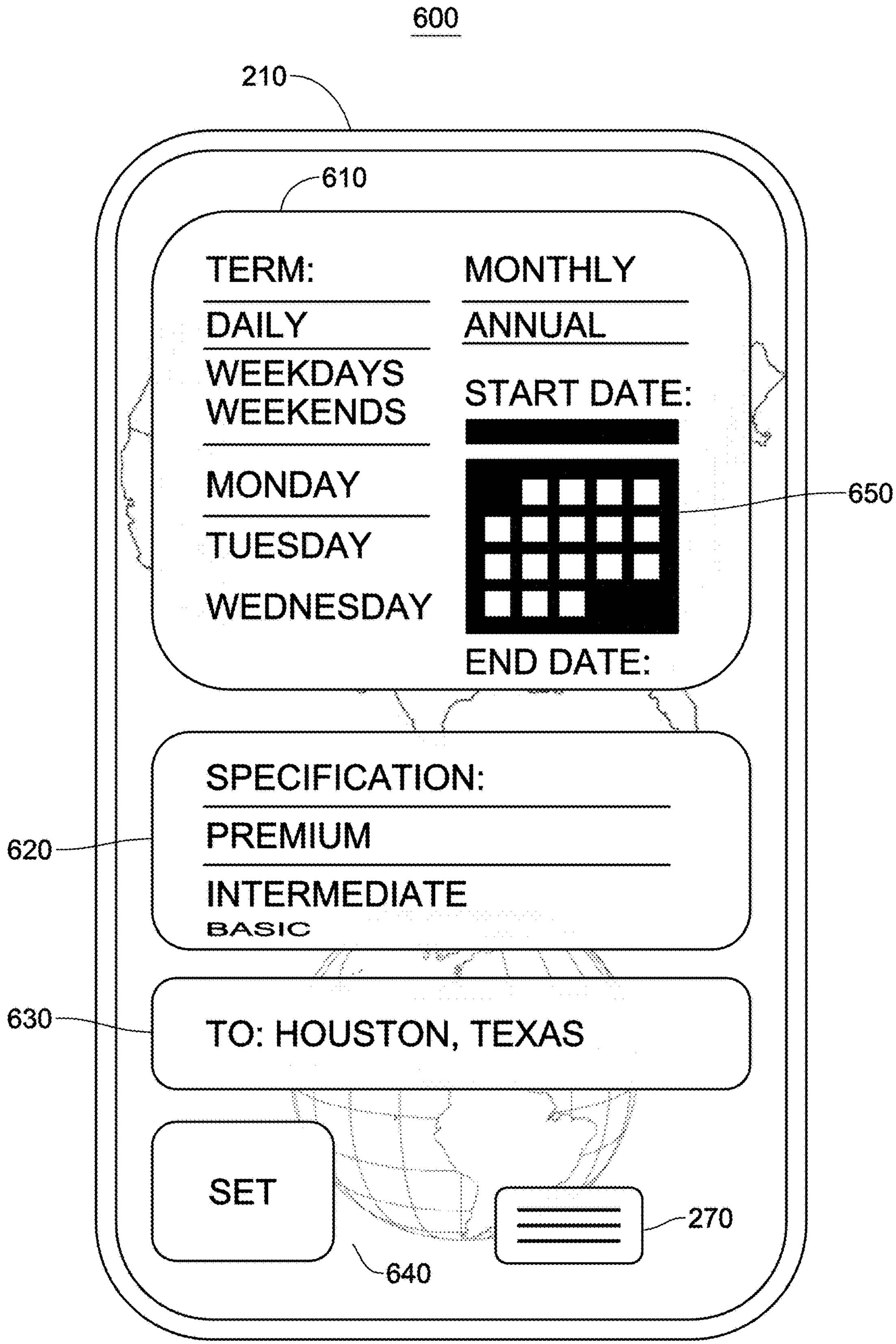
FIG. 6 illustrates an exemplary user interface with various term specifications for curb capacity or curb freight capacity in accordance with some embodiments.

FIG. 6 illustrates an exemplary user interface 210 for selecting the term transformation specification 610 on a portable multifunction device in accordance with some embodiments. In some embodiments, user interface 210 includes the following elements, or a subset or superset thereof:

term specification options (a data transformation) 610;

specification of quality of curb capacity or freight curb capacity (a data transformation) 620;

destination/to virtual curb hub (a data transformation) 630;

setting button 640 to transmit the term 610 and quality curb specification grade (a data transformation) 620;

calendar button 650 to select specification start dates and end dates for a plurality of virtual curb capacity or freight hub combinations (a data transformation);

hamburger button 270 to instruct the GUI 210 to take the user 110 to the menu screen.

In some embodiments, the term specification 610 may be used to participate, transact and/or trade in a specific virtual curb hub combination for a specific time period specification. Users 110 may set the term to daily, weekly, monthly, annual, weekdays, weekends, specific days such as Monday, Tuesday, Wednesday, Thursday, Friday, Saturday, Sunday or any combination of term selections the user 110 sets as relevant for participating, transacting or trading in the transformed curb capacity or freight curb capacity unit securities market. Not limiting by example, but for use of illustrating a possible subset of term selections, the user 110 may select "weekdays" 610 during a specific calendar time period 650 of a given year. In some embodiments, specific time start dates and end dates may be set by the user with the calendar button 650. In some embodiments a user 110 may select "Mondays" 610 within a specification date window 650 (a data transformation). In some embodiments, the user 110 may select "weekends" 610 during a specification calendar window of dates 650 (a data transformation). In some embodiments, the user 110, may contact the "set" button 640 to transmit the transformed curb capacity or freight curb capacity unit specification data by using the GUI 210 which may instantiate instructions in the memory of the mobile computing device which then transmits curb capacity data through the network 214 or wireless GPS network 215 to call upon instruction routines and instruction sub-routines on the curb capacity forward market database server 271, virtual curb hub database server 223, network member database server 222, map routing servers 220, no arbitrage condition database server 280 and/or instructions in the memory of the cloud and local CPUs 219 which all interface together to make one system which may deliver curb capacity units to users 110 from and to a plurality of virtual curb hubs 410, 422 with a plurality of specifications at specific market prices.

Figure 7:
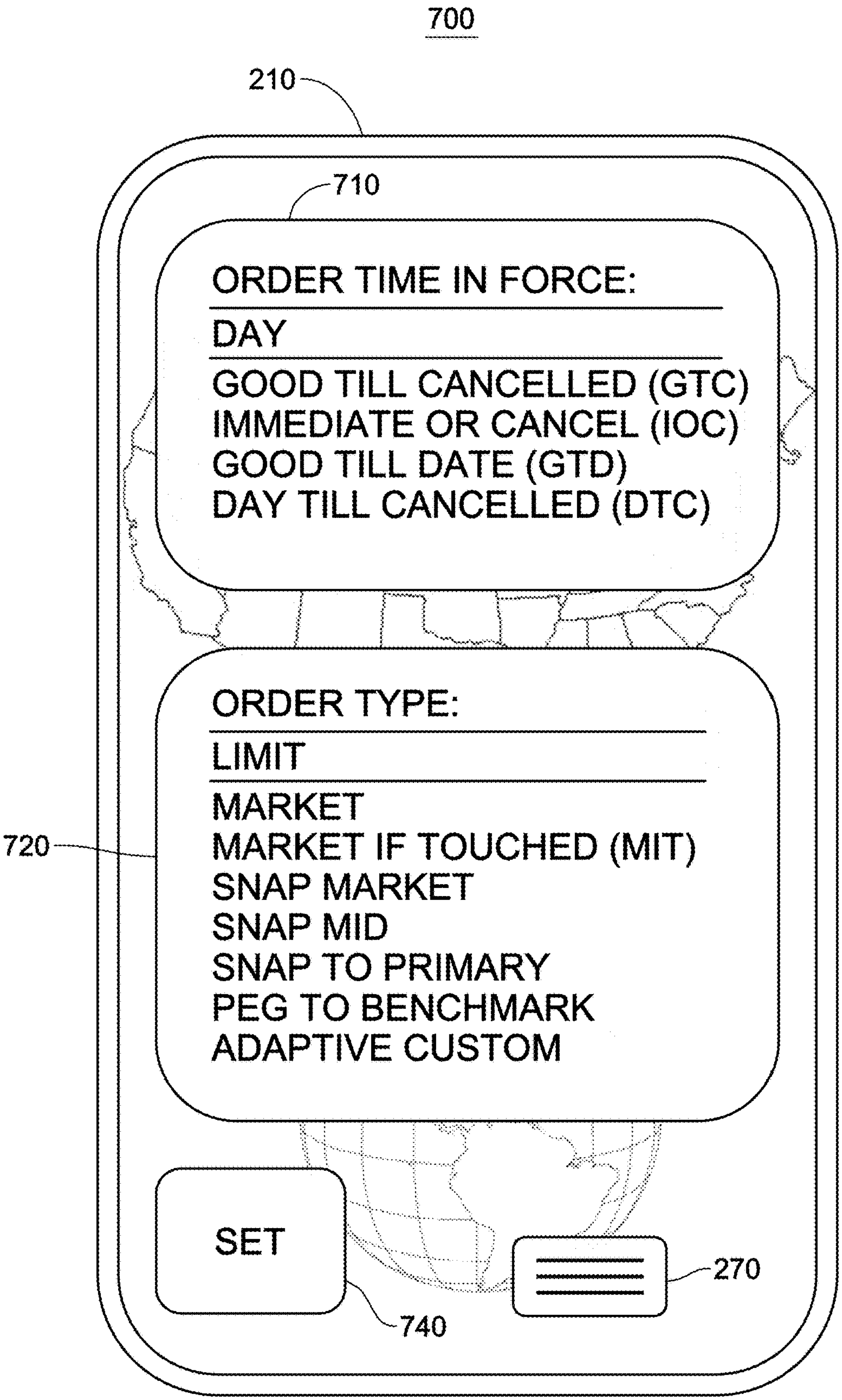
FIG. 7 illustrates an exemplary user interface with various order types and order time in force designations for curb capacity or curb freight capacity in accordance with some embodiments.

FIG. 7 illustrates an exemplary user interface 210 for selecting order time in force order types 710 (a data transformation) as well as order types 720 (a data transformation) on a portable multifunction device in accordance with some embodiments. In some embodiments, user interface 210 includes the following elements, or a subset or superset thereof:

order time in force specification options (a data transformation) 710;

order type specification options (a data transformation) 720;

setting button 740 to transmit the order time in force specification 710 and order type specification option 720 (a data transformation);

hamburger button 270 to instruct the GUI 210 to take the user 110 to the menu screen.

In some embodiments, user interface 210 may be used by the user 110 to select a plurality of order time in force 710 specifications. In some embodiments, order time in force selections 710 may include a subset or superset thereof: day (DAY) order 710; good till cancelled order (GTC) 710; immediate or cancel order (IOC) 710; good till date order (GTD) 710; day till cancelled order (DTC) 710. Order time in force 710 specifications may be used to designate how long a user 110 order may be valid. In some embodiments, the GUI 210 may display the definitions of a plurality of order time in force 710 characteristics so that the user 110 may select the appropriate order time in force 710 specification for the curb capacity or freight curb capacity unit that the user 110 may participate, transact and/or trade. In some embodiments, the user interface 210 may be used to select the order type 720 specifications. In some embodiments, order type selections 720 may include a subset or superset thereof: Limit 720, Market 720, Market if Touched (MIT) 720; Snap to Market 720; Snap to Mid 720; Snap to primary 720; Peg to benchmark 720; adaptive custom 720. In some embodiments, the GUI 210 may display the definitions of a plurality of order types 720 characteristics so that the user 110 may select the appropriate order type 720 specification for the curb capacity or freight capacity unit that the user 110 may participate, transact and/or trade. In some embodiments, the user 110, may contact the "set" button 740 to transmit the curb capacity or freight curb capacity unit specification mode data by using the GUI 210 which may instantiate instructions in the memory of the mobile computing device which then transmits curb capacity data through the network 214 or wireless GPS network 215 to call upon instruction routines and instruction sub-routines on the curb capacity forward market database server 271, virtual curb hub database server 223, network member database server 222, map routing servers 220, no arbitrage condition database server 280 and/or instructions in the memory of the cloud and local CPUs 219 which all interface together to make one system which may deliver curb capacity units to users 110 from and to a plurality of virtual curb hubs 410, 422 with a plurality of specifications at specific market prices.

Figure 8:
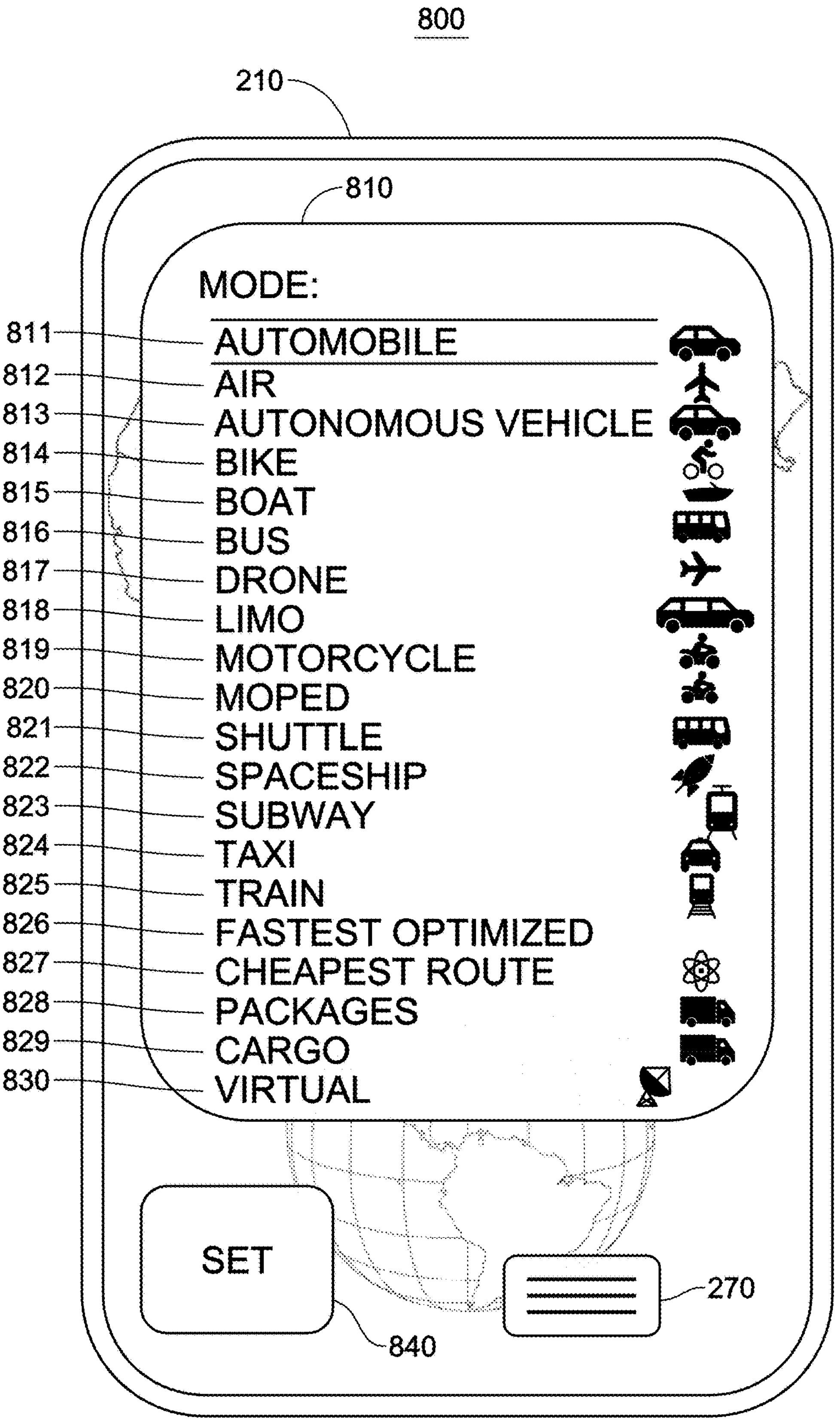
FIG. 8 illustrates an exemplary user interface with various modes of curb capacity or curb freight capacity in accordance with some embodiments.

FIG. 8 illustrates an exemplary user interface 210 for selecting virtual hub curb capacity unit modes 810 (a data transformation) on a portable multifunction device in accordance with some embodiments. In some embodiments, user interface 210 includes the following elements, or a subset or superset thereof:

virtual hub curb capacity unit modes 810 (a data transformation);

setting button 840 to transmit the virtual hub curb capacity unit modes 810;

hamburger button 270 to instruct the GUI 210 to take the user 110 to the menu screen.

In some embodiments, user interface 210 may be used by the user 110 to select a plurality of virtual hub transformed curb capacity unit security modes 810 specifications. In some embodiments, virtual hub curb capacity unit mode selections 810 may include a subset or superset thereof: Automobile 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; virtual 830; eScooter; eBike, or other modes. In some embodiments, virtual hub curb capacity unit modes are simply that a user 110 would have a virtual curb capacity or freight capacity unit in an automobile or an airplane as examples, but not limiting by example. In some embodiments, the user 110 may bid on cargo 829 or package capacity 828 in any mode or multi-modal of transformed curb capacity or freight capacity between a combination of virtual curb capacity hub locations. In some embodiments, the user 110 may use one or multiple modes of curb capacity between a combination of virtual curb capacity hub capacity points. In some embodiments, a user 110 may use the system and method for hovering or idling drone capacity in air space 817 with virtual hubs having not only latitude and longitude coordinates, but also altitude coordinates. In some implementations and embodiments, air capacity space may use the system and method to restrict blocks of air or out space capacity where limits are desired by users 110. In some embodiments, sidewalk space may be geofenced with virtual hub sequences for use by the system and method of price time priority queues for reserving and trading those respective securitized spaces for scooters 820, bikes 814, or any freight or transit objects. In some embodiments, the user 110, may contact the "set" button 840 to transmit the transformed curb capacity or freight curb capacity unit specification mode data by using the GUI 210 which may instantiate instructions in the memory of the mobile computing device which then transmits curb capacity data through the network 214 or wireless GPS network 215 to call upon instruction routines and instruction sub-routines on the curb capacity forward market database server 271, virtual curb hub database server 223, network member database server 222, map routing servers 220, no arbitrage condition database server 280 and/or instructions in the memory of the cloud and local CPUs 219 which all interface together to make one system which may deliver curb capacity units to users 110 from and to a plurality of virtual curb hubs 410, 422 with a plurality of specifications at specific market prices.

Figure 9:
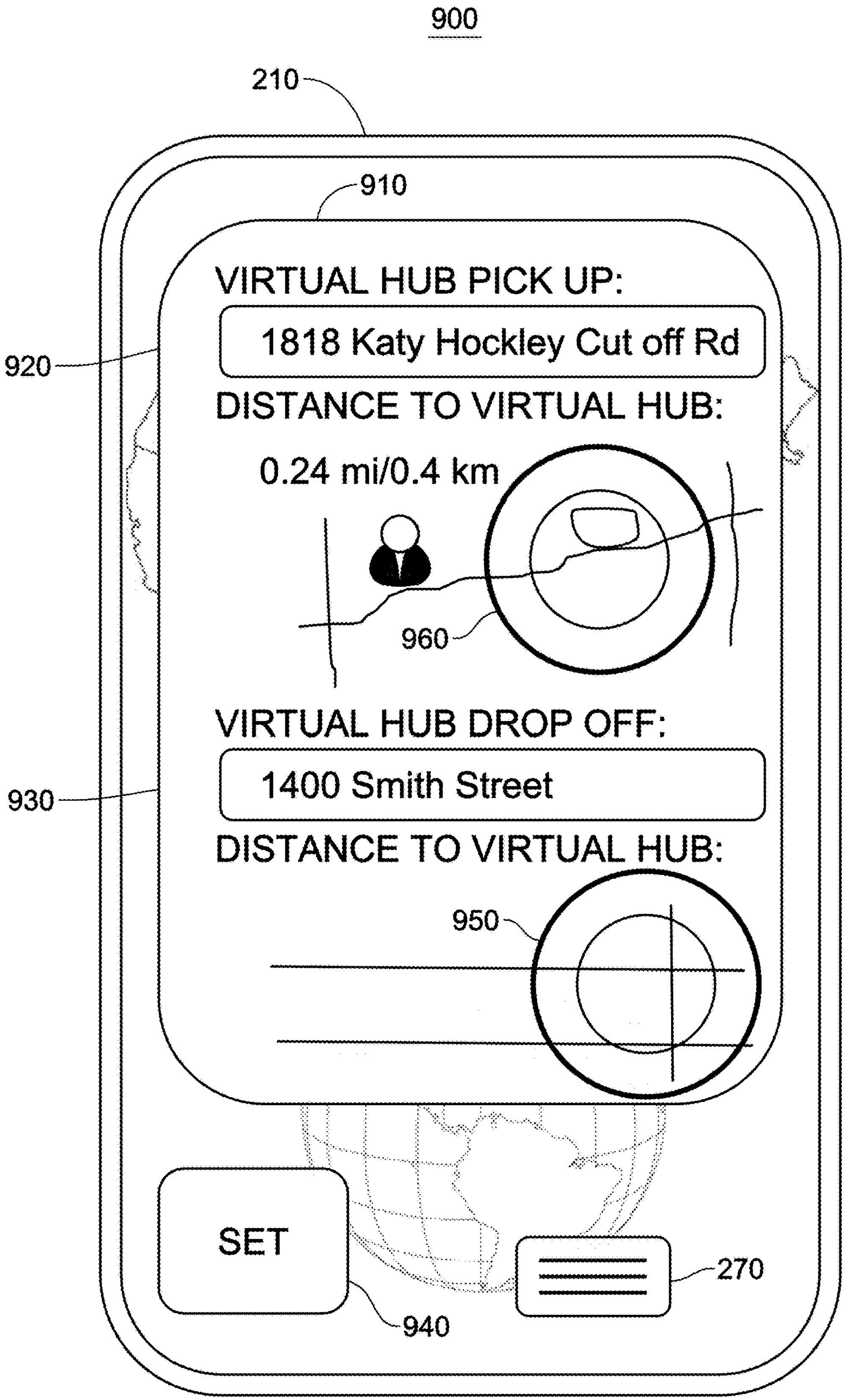
FIG. 9 illustrates an exemplary user interface with the distance between the user and a virtual hub pick up point for curb capacity or curb freight capacity as well as the distance between a user and a virtual drop off point for curb capacity or curb freight capacity in accordance with some embodiments.

FIG. 9 illustrates an exemplary user interface 210 for identifying the distance the user 110 is from the virtual hub from a map and distance perspective on a portable multifunction device in accordance with some embodiments. In some embodiments, user interface 210 includes the following elements, or a subset or superset thereof:

virtual hub curb capacity unit pick up display 910;

virtual hub curb capacity unit pick up address 920;

virtual hub curb capacity unit drop off address 930;

virtual hub curb capacity pick-up target zone 960;

virtual hub curb capacity drop-off target zone 950;

setting button 940 to transmit the virtual hub curb capacity unit addresses 920, 930;

hamburger button 270 to instruct the GUI 210 to take the user 110 to the menu screen.

In some implementations and embodiments, user interface 210 may be used by the user 110 to select a plurality of virtual hub curb capacity unit address 910 specifications. In some implementations and embodiments, virtual hub curb capacity or freight curb capacity unit address selections 910 may include a subset or superset thereof: virtual hub pick up address 920; virtual hub drop off address 930. In some embodiments, virtual hub curb capacity unit addresses 920 and 930 may be changed before delivery of a virtual curb capacity unit. The user interface map and address tool 910 may display the users 110 distance from the address of the virtual curb capacity or freight hub as well as a map to assist the user 110 in finding the location of the virtual curb capacity hub. In some embodiments, user interface 210 displays the virtual hub pick up zone 960 on a map in context to the user's 110 location. In some embodiments, user interface 210 displays the virtual hub drop off zone 950 on a map in context to the user's 110 location. In some embodiments, the user 110, may contact the "set" button 940 to transmit the curb capacity unit specification mode data by using the GUI 210 which may instantiate instructions in the memory of the mobile computing device which then transmits curb capacity data through the network 214 or wireless GPS network 215 to call upon instruction routines and instruction sub-routines on the curb capacity forward market database server 271, virtual curb hub database server 223, network member database server 222, map routing servers 220, no arbitrage condition database server 280 and/or instructions in the memory of the cloud and local CPUs 219 which all interface together to make one system which may deliver curb capacity units to users 110 from and to a plurality of virtual curb hubs 410, 422 with a plurality of specifications at specific market prices.

Figure 10:
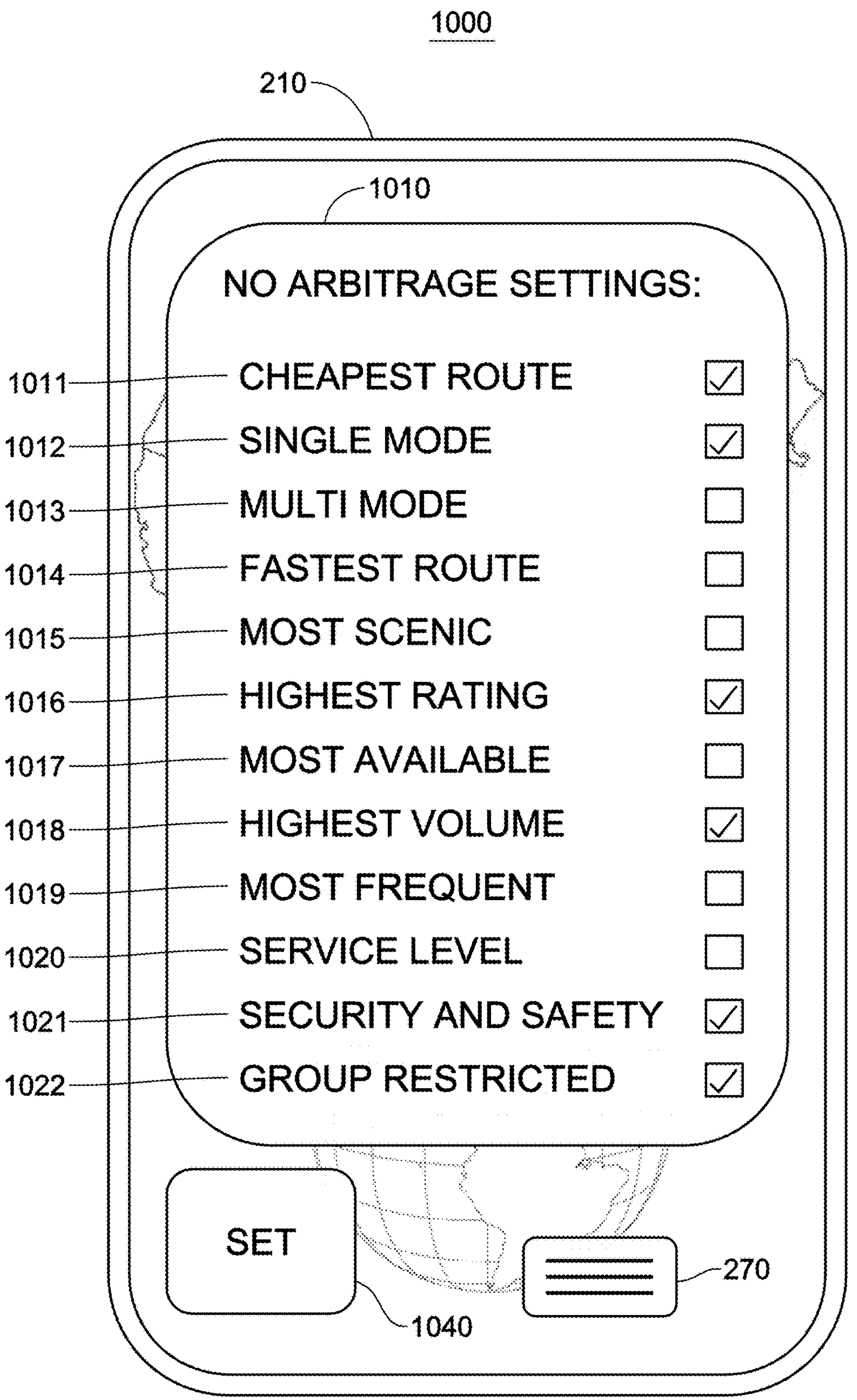
FIG. 10 illustrates an exemplary user interface for settings and constraints of the curb capacity or curb freight capacity trading method and system in accordance with some embodiments.

FIG. 10 illustrates an exemplary user interface 210 for identifying the constraints and no arbitrage settings 1010 the user 110 selects on a portable multifunction device in accordance with some embodiments (multiple data transformations). In some embodiments, user interface 210 includes the following elements, or a subset or superset thereof:

- constraint and no arbitrage settings 1010 (a data transformation);
- setting button 1040 to transmit the virtual hub curb capacity constraints and no arbitrage settings;
- hamburger button 270 to instruct the GUI 210 to take the user 110 to the menu screen.

In some embodiments, user interface 210 may be used by the user 110 to select a plurality of virtual hub curb capacity constraint and no arbitrage settings 1010. In some embodiments, virtual hub curb capacity unit constraint and no arbitrage selections 1010 may include a subset or superset thereof: cheapest route 1011 (a data transformation); single mode 1012 (a data transformation); multi-mode 1013 (a data transformation); fastest route 1014 (a data transformation); most scenic 1015 (a data transformation); highest rating 1016 (a data transformation); most available 1017 (a data transformation); highest volume 1018 (a data transformation); most frequent 1019 (a data transformation); service level 1020 (a data transformation); security and safety 1021 (a data transformation). In some embodiments, the "cheapest route setting" 1011 instantiates instructions in the memory of the CPU 190 to complete a standard cost minimization linear program to assist the user 110 to complete the curb capacity unit between two virtual hubs with the lowest cost. In some embodiments, the "single mode" 1012 instantiates instructions in the memory of the CPU 190 to set a constraint for the user 110 to complete the curb capacity unit between two virtual hubs with the only one mode of curb capacity. In some embodiments, the "multi mode" 1013 instantiates instructions in the memory of the CPU 164 to set a constraint for the user 110 to complete the curb capacity unit between two virtual hubs with more than one mode of curb capacity. In some embodiments, the "fastest route" 1014 instantiates instructions in the memory of the CPU 164 to complete standard linear programming equation to minimize travel time for the user 110 to complete the curb capacity unit between two virtual hubs with the shortest time. In some embodiments, the settings 1010 may set instructions for the price based navigation routing index and GUI presentation on the user(s) 110 interface 111. In some embodiments, the "most scenic" 1015 instantiates instructions in the memory of the CPU 164 to complete an algorithm with the highest ratings for scenery to assist the user 110 to complete the transformed curb capacity unit between two virtual hubs with highest scenery rating. In some embodiments, the "highest rating" 1016 instantiates instructions in the memory of the CPU 164 to complete a rating algorithm to assist the user 110 to complete the curb capacity unit between two virtual hubs with the highest rating. In some embodiments, the "most available" 1017 instantiates instructions in the memory of the CPU 164 to complete a algorithm to search for the route with the most open curb capacity units to assist the user 110 to complete the curb capacity unit between two virtual curb hubs with the most available open seats or open curb capacity units. In some embodiments, the "highest volume" 1018 instantiates instructions in the memory of the CPU 164 to complete an algorithm to select the curb route with the highest volume of participants to assist the user 110 to complete the transformed curb capacity unit between two virtual curb hubs with the largest number of users 110. In some embodiments, the "most frequent" 1019 instantiates instructions in the memory of the CPU 164 to complete most frequent route analysis from a timing constraint perspective to assist the user 110 to complete the curb capacity unit between two virtual curb hubs with the most frequent departures. In some embodiments, the "service level" 1020 instantiates instructions in the memory of the CPU 164 to align the constraint to select the service level to assist the user 110 to complete the curb capacity unit between two virtual hubs with the correct level of service. In some embodiments, the "security and safety" 1021 instantiates instructions in the memory of the CPU 164 to run safety and security algorithms on the user's 110 based on block chain performance of drivers and riders to assist the user 110 to complete the curb capacity unit between two virtual hubs with the highest level of safety and security. In some embodiments, the "group restricted" 1022 instantiates instructions in the memory of the CPU 190 to run grouping limitation algorithms on the user's 110 market auction based on limiting the pool of curb landing drivers and curb landing riders or curb landing freight providers and curb landing shippers to assist the user 110 to complete the curb capacity or freight curb capacity unit between two virtual hubs with a limit on the pool of available users. In some embodiments, a plurality of settings which transform the data may be sequenced for presenting as a transformed market 400 or as a transformed market as a layer on a navigation system with indexed curb routes based on price 4200. A user(s) 110 pool for group restricted 1022 (a data transformation) settings may limit the user pool displayed by email, security, sex, rating or a plurality of other restrictions. In some implementations and embodiments, the user 110, may contact the "set" button 1040 to transmit the curb capacity or freight capacity unit security specification settings mode data by using the GUI 210 which may instantiate instructions in the memory of the mobile computing device which then transmits curb capacity data through the network 214 or wireless GPS network 215 to call upon instruction routines and instruction sub-routines on the curb capacity forward market database server 271, virtual curb hub database server 223, network member database server 222, map routing servers 220, no arbitrage condition database server 280 and/or instructions in the memory of the cloud and local CPUs 219 which all interface together to make one system which may deliver curb capacity units to users 110 from and to a plurality of virtual curb hubs 410, 422 with a plurality of specifications at specific market prices.

Figure 11:
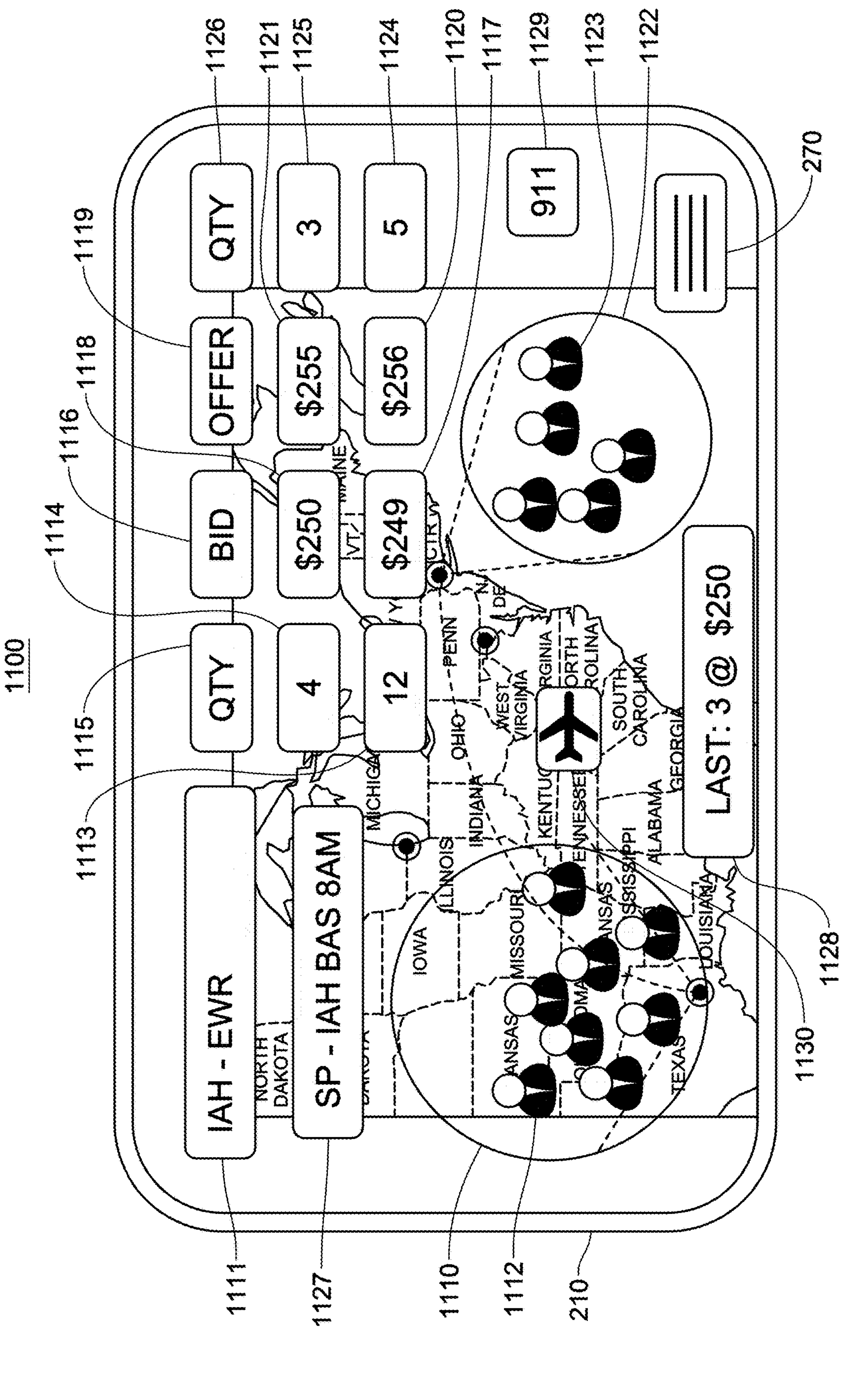
FIG. 11 illustrates an exemplary user interface for transacting and trading domestic air travel curb capacity or air freight curb capacity in accordance with some embodiments.

FIG. 11 illustrates exemplary user interfaces 210 for participating, transacting and/or trading transformed curb capacity or curb freight as a physical forward commodity or security between combinations of virtual hubs over various curb capacity modes. In some embodiments, user interface 210 includes the following elements, or a subset or superset thereof:

- exemplary virtual hub combination 1111;
- exemplary virtual hub origin/from location 1110 with users 1112 within the virtual curb hub location 1110;
- exemplary specification summary of the market, level of service and time of delivery commencement 1127;
- exemplary mode of air curb capacity or air curb freight capacity type 1130;
- exemplary transaction summary of the last trades quantity and price 1128;
- exemplary virtual hub destination/to location 1122 and user who is being delivered on the curb capacity unit 1123;
- exemplary bid/buy quantity title header 1115 for an exemplary virtual curb capacity hub market;
- exemplary bid/buy price title header 1116 for an exemplary virtual curb capacity or curb freight hub market;
- exemplary offer/sell price title header 1119 for an exemplary virtual curb capacity or freight hub market;
- exemplary offer/sell quantity title header 1126 for an exemplary virtual curb capacity or freight hub market;
- exemplary bid/buy quantity 1114 for the best bid quantity from a plurality of users 110 for an exemplary respective curb capacity or curb freight capacity virtual hub combination that has undergone a plurality of data transformations in the method 1111;
- exemplary bid/buy quantity 1113 for the second-best bid quantity from a plurality of users 110 for an exemplary respective curb capacity or curb freight capacity virtual hub combination that has undergone a plurality of data transformations in the method 1111;
- exemplary bid/buy price 1118 for the best bid price from a plurality of users 110 for an exemplary respective curb capacity or curb freight capacity virtual hub combination that has undergone a plurality of data transformations in the method 1111;
- exemplary bid/buy price 1117 for the second-best bid price from a plurality of users 110 for an exemplary respective curb capacity or curb freight capacity virtual hub combination that has undergone a plurality of data transformations in the method 1111;
- exemplary offer/sell price 1121 for the best offer price from a plurality of users 110 for an exemplary respective curb capacity or freight capacity virtual hub combination that has undergone a plurality of data transformations in the method 1111;
- exemplary offer/sell price 1120 for the second-best offer price from a plurality of users 110 for an exemplary respective curb capacity or freight capacity virtual hub combination that has undergone a plurality of data transformations in the method 1111;
- exemplary offer/sell quantity 1125 for the best offer quantity from a plurality of users 110 for an exemplary respective curb capacity or freight capacity virtual hub combination that has undergone a plurality of data transformations in the method 1111;
- exemplary offer/sell quantity 1124 for the second-best offer quantity from a plurality of users 110 for an exemplary respective curb capacity or freight capacity virtual hub combination that has undergone a plurality of data transformations in the method 1111;
- exemplary safety dispatch "911" button 1129 to enact video and audio recording of the user 110 environment and dispatch of that information to authorities;
- exemplary hamburger menu button 270 to move back to menu options and settings away from the participation, transaction, trading auction GUI 210 embodiment.

In some implementations and embodiments the user 110 may enter a transaction quantity and price for transformed curb capacity or curb freight capacity unit securities to participate, transact and/or trade by the GUI 210 detecting user 110 contact or audio interface with a bid/buy price 1118 or offer/sell price 1121. The GUI 210 detects user 110 contact with any of the GUI 210 buttons which have been aforementioned. In some implementations and embodiments, upon user 110 contact or audio interface with buttons on the GUI 210, instructions are instantiated which allow the user 110 to change the specifications of the respective virtual curb hub combination 1111. In some implementations and embodiments, a plurality of prices and markets may be presented based on a plurality of contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1121 or bid/buying price 1118. In some implementations and embodiments, users 110 may adjust settings of the GUI 210 to show more bid/buying prices 1117 or more offer/selling prices 1120. In some implementations and embodiments, the matrix of market quantities and prices 1113, 1114, 1115, 1116, 1117, 1118, 1119, 1120, 1121, 1124, 1125, 1126 may be referred to as market depth in the GUI 210 embodiment. In some embodiments the number of users 110 may be displayed as user icons 1112 or 1123 for the amount of people logged in which desire to transact, trade or participate in a given virtual curb hub 1110 to virtual curb hub 1122 combination. In some embodiments, users 110 may select the curb capacity mode 1130 such that the user allows a market for only one form of curb capacity as a commodity or the user 110 may allow the system to show multiple forms of curb capacity between two virtual curb capacity hubs 1110, 1111, 1122. In some implementations and embodiments, the GUI 210 may detect a user 110 selecting the 911 button 1129 which may activate voice and video recording functions on the mobile or stationary device 210 and transmit the data with a confirmation from the user 110 to the authorities to provide enhanced security while participating, transacting or trading transformed forward curb capacity as a commodity or security. In some implementations and embodiments, the user may toggle between the GUI 210 market view screen in FIG. 3 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 210 which then transmits curb capacity or freight capacity data through the network 214 or wireless GPS network 215 to call upon instruction routines and instruction sub-routines specification mode data by using the GUI 210 which may instantiate instructions in the memory of the mobile computing device which then transmits curb capacity data through the network 214 or wireless GPS network 215 to call upon instruction routines and instruction sub-routines on the curb capacity forward market database server 271, virtual curb hub database server 223, network member database server 222, map routing servers 220, no arbitrage condition database server 280 and/or instructions in the memory of the cloud and local CPUs 219 which all interface together to make one system which may deliver curb capacity units to users 110 from and to a plurality of virtual curb hubs 410, 422 with a plurality of specifications at specific market prices which all interface together to make one system which may deliver curb capacity units to users 110 from and to a plurality of virtual hubs 1110, 1122 with a plurality of specifications at specific market prices.

Figure 12:
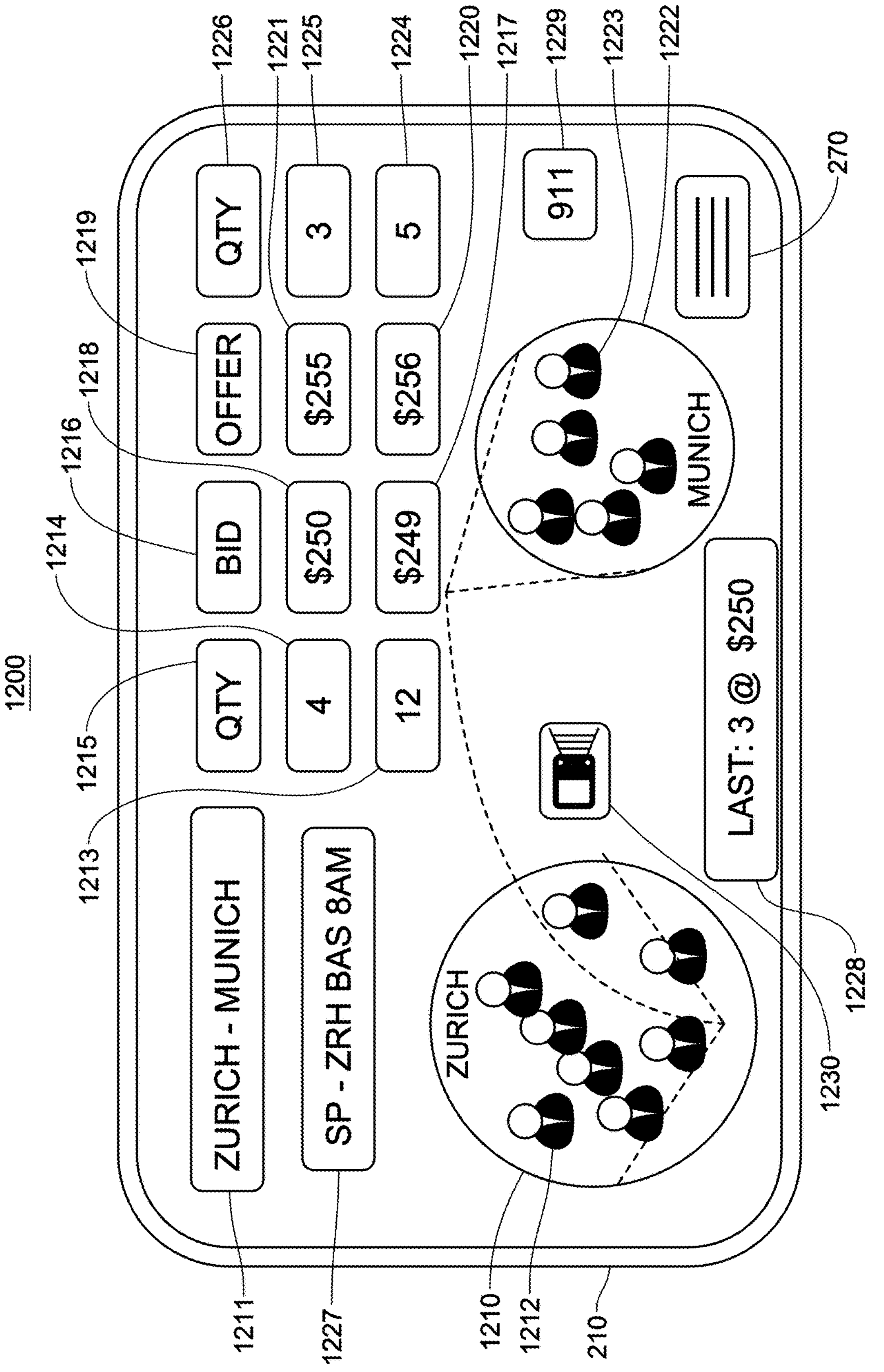
FIG. 12 illustrates an exemplary user interface for transacting and trading international train curb capacity or train curb freight capacity in accordance with some embodiments.

FIG. 12 illustrates exemplary user interfaces 210 for participating, transacting and/or trading transformed curb capacity as a physical forward commodity or security between combinations of virtual curb hubs over various curb capacity modes. In some implementations and embodiments, user interface 210 includes the following elements, or a subset or superset thereof:

- exemplary virtual hub combination 1211;
- exemplary virtual hub origin/from location 1210 with users 1212 within the virtual hub location 1210;
- exemplary specification summary of the market, level of service and time of delivery commencement 1227;
- exemplary mode of train curb capacity type 1230;
- exemplary transaction summary of the last trades quantity and price 1228;
- exemplary virtual hub destination/to location 1222 and user who is being delivered on the curb capacity or freight curb capacity unit 1223;
- exemplary bid/buy quantity title header 1215 for an exemplary virtual curb capacity or freight curb hub market;
- exemplary bid/buy price title header 1216 for an exemplary virtual curb capacity or freight curb hub market;
- exemplary offer/sell price title header 1219 for an exemplary virtual curb capacity or freight curb hub market;
- exemplary offer/sell quantity title header 1226 for an exemplary virtual curb capacity for freight curb hub market;
- exemplary bid/buy quantity 1214 for the best bid quantity from a plurality of users 110 for an exemplary respective curb capacity or freight curb capacity virtual hub combination that has undergone a plurality of data transformations in the method 1211;
- exemplary bid/buy quantity 1213 for the second-best bid quantity from a plurality of users 110 for an exemplary respective curb capacity or freight capacity virtual hub combination that has undergone a plurality of data transformations in the method 1211;
- exemplary bid/buy price 1218 for the best bid price from a plurality of users 110 for an exemplary respective curb capacity or freight curb capacity virtual hub combination that has undergone a plurality of data transformations in the method 1211;
- exemplary bid/buy price 1217 for the second-best bid price from a plurality of users 110 for an exemplary respective curb capacity or freight curb capacity virtual hub combination that has undergone a plurality of data transformations in the method 1211;
- exemplary offer/sell price 1221 for the best offer price from a plurality of users 110 for an exemplary respective curb capacity or freight curb capacity virtual hub combination that has undergone a plurality of data transformations in the method 1211;
- exemplary offer/sell price 1220 for the second-best offer price from a plurality of users 110 for an exemplary respective curb capacity or freight curb capacity virtual hub combination that has undergone a plurality of data transformations in the method 1211;
- exemplary offer/sell quantity 1225 for the best offer quantity from a plurality of users 110 for an exemplary respective curb capacity or freight curb capacity virtual hub combination that has undergone a plurality of data transformations in the method 1211;
- exemplary offer/sell quantity 1224 for the second-best offer quantity from a plurality of users 110 for an exemplary respective curb capacity or freight curb capacity virtual curb hub combination that has undergone a plurality of data transformations in the method 1211;
- exemplary safety dispatch "911" button 1229 to enact video and audio recording of the user 110 environment and dispatch of that information to authorities.
- exemplary hamburger menu button 270 to move back to menu options and settings away from the participation, transaction, trading GUI 210 embodiment.

In some implementations and embodiments, the user 110 may enter a transaction quantity and price for curb capacity or freight curb capacity units to participate, transact and/or trade by the GUI 210 detecting user 110 contact with a bid/buy price 1218 or offer/sell price 1221. In some implementations and embodiments, the GUI 210 detects user 110 contact with any of the GUI 210 buttons which have been aforementioned. In some implementations and embodiments, upon user 110 contact with buttons or audio interface on the GUI 210, instructions are instantiated which allows the user 110 to change the specifications of the respective virtual hub combination 1211. In some implementations and embodiments, a plurality of transformed prices and transformed markets may be presented based on a plurality of transformed contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1221 or bid/buying price 1214. In some embodiments, users 110 may adjust settings of the GUI 210 to show more bid/buying prices 1217 or more offer/selling prices 1120. In some embodiments the matrix of market quantities and prices 1213, 1214, 1215, 1216, 1217, 1218, 1219, 1220, 1221, 1224, 1225, 1226 may be referred to as market depth in the GUI 210 embodiment. In some embodiments the number of users 110 may be displayed as user icons 1212 or 1223 for the amount of people logged in which desire to transact, trade or participate in a given virtual curb hub 1210 to virtual curb hub 1222 combination. In some embodiments, users 110 may select the curb capacity mode 1230 such that the user allows a market for only one form or mode of curb capacity as a commodity or security or the user 110 may allow the system to show multiple forms (multi-modal) of curb capacity between two virtual curb capacity hubs 1210, 1211, 1222. In some implementations and embodiments, the GUI 210 may detect a user 110 selecting the 911 button 1229 which may activate voice and video recording functions on the mobile or stationary device 210 and transmit the data with a confirmation from the user 110 to the authorities to provide enhanced security while participating, transacting or trading transformed forward curb capacity or freight units as a commodity or security. In some implementations and embodiments, the user may toggle between the GUI or CPU device 210 market view screen in FIG. 4 and other menu 270 options and settings by the user 110 selecting the hamburger button 270 and the GUI 210 detecting the user 110 input or contact or audio instructions. In some embodiments the GUI 210 may instantiate instructions in the memory of the mobile computing device 210 which then transmits curb capacity or freight curb capacity data through the network 214 or wireless GPS network 215 to call upon instruction routines and instruction sub-routines on the curb capacity forward market database server 271, virtual curb hub database server 223, network member database server 222, map routing servers 220, no arbitrage condition database server 220 and/or instructions in the memory of the cloud and local CPUs 219 which all interface together to make one system which may deliver curb capacity or freight capacity units to users 110 from and to a plurality of virtual hubs 1210, 1222 with a plurality of specifications at specific market prices.

Figure 13:
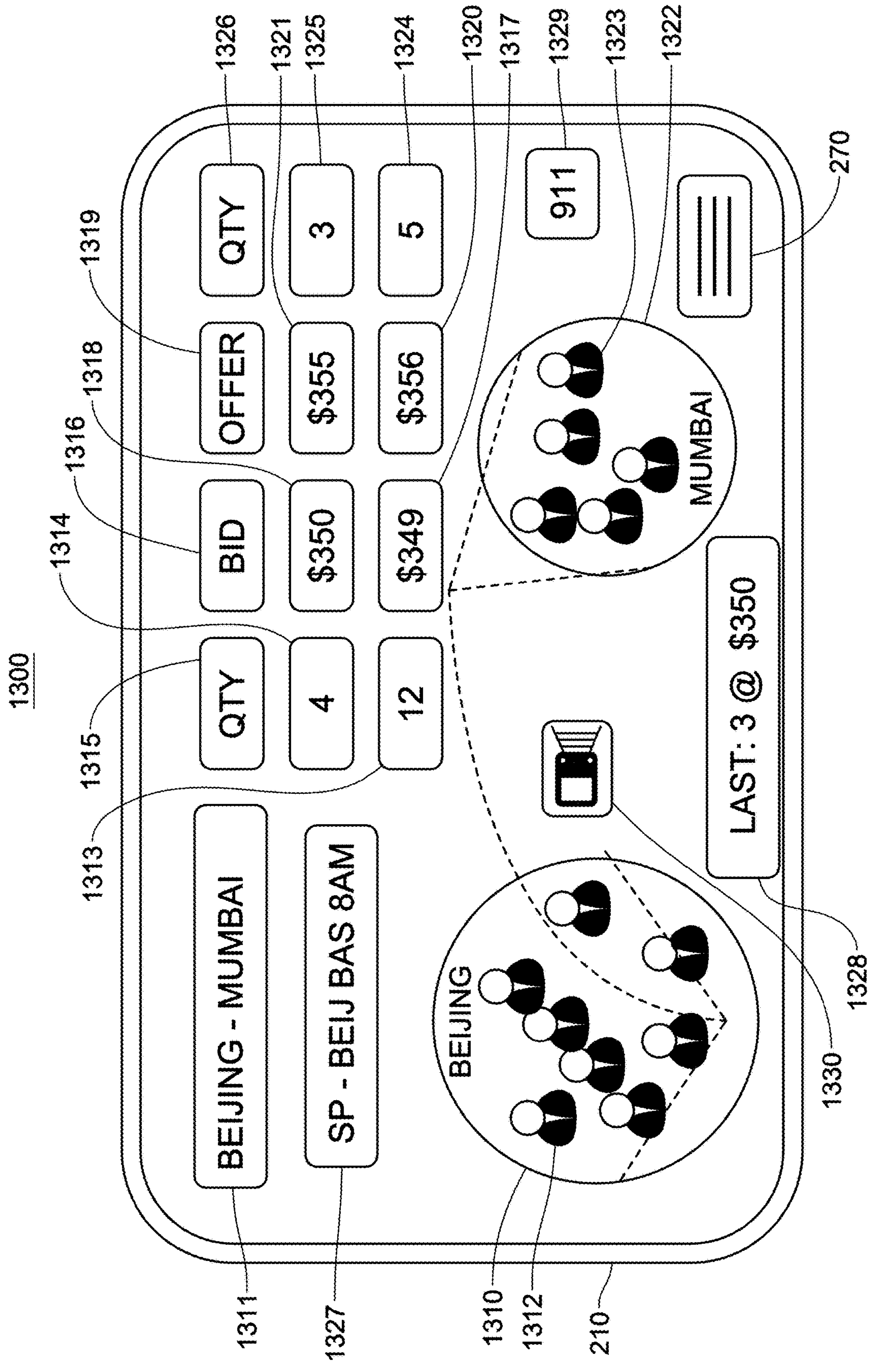
FIG. 13 illustrates an exemplary user interface for transacting and trading international train curb capacity or train freight capacity in accordance with some embodiments.

FIG. 13 illustrates exemplary user interfaces 210 for participating, transacting and/or trading transformed curb capacity as a physical forward commodities or securities between combinations of virtual hubs over various curb capacity modes. In some embodiments, user interface 210 includes the following elements, or a subset or superset thereof:

- exemplary virtual hub combination 1311;
- exemplary virtual hub origin/from location 1310 with users 1312 within the virtual hub location 1310;
- exemplary specification summary of the market, level of service and time of delivery commencement 1327;
- exemplary mode of train curb capacity type 1330;
- exemplary transaction summary of the last trades quantity and price 1328;
- exemplary virtual hub destination/to location 1322 and user who is being delivered on the curb capacity or freight curb capacity unit 1323;
- exemplary bid/buy quantity title header 1315 for an exemplary virtual curb capacity or freight hub market;
- exemplary bid/buy price title header 1316 for an exemplary virtual curb capacity or freight curb hub market;
- exemplary offer/sell price title header 1319 for an exemplary virtual curb capacity or freight curb hub market;
- exemplary offer/sell quantity title header 1326 for an exemplary virtual curb capacity or freight hub market;
- exemplary bid/buy quantity 1314 for the best bid quantity from a plurality of users 110 for an exemplary respective curb capacity or freight curb capacity virtual hub combination that has undergone a plurality of data transformations in the method 1311;
- exemplary bid/buy quantity 1313 for the second-best bid quantity from a plurality of users 110 for an exemplary respective curb capacity or freight curb capacity virtual hub combination that has undergone a plurality of data transformations in the method 1311;
- exemplary bid/buy price 1318 for the best bid price from a plurality of users 110 for an exemplary respective curb capacity or freight curb capacity virtual hub combination that has undergone a plurality of data transformations in the method 1311;
- exemplary bid/buy price 1317 for the second-best bid price from a plurality of users 110 for an exemplary respective curb capacity or freight capacity virtual hub combination that has undergone a plurality of data transformations in the method 1311;
- exemplary offer/sell price 1321 for the best offer price from a plurality of users 110 for an exemplary respective curb capacity or freight curb capacity virtual hub combination that has undergone a plurality of data transformations in the method 1311;
- exemplary offer/sell price 1320 for the second-best offer price from a plurality of users 110 for an exemplary respective curb capacity or freight curb capacity virtual hub combination that has undergone a plurality of data transformations in the method 1311;
- exemplary offer/sell quantity 1325 for the best offer quantity from a plurality of users 110 for an exemplary respective curb capacity or freight curb capacity virtual hub combination that has undergone a plurality of data transformations in the method 1311;
- exemplary offer/sell quantity 1324 for the second-best offer quantity from a plurality of users 110 for an exemplary respective curb capacity or freight curb capacity virtual hub combination that has undergone a plurality of data transformations in the method 1311;
- exemplary safety dispatch "911" button 1329 to enact video and audio recording of the user 110 environment and dispatch of that information to authorities.
- exemplary hamburger menu button 270 to move back to menu options and settings away from the participation, transaction, trading GUI 210 embodiment.

In some implementations and embodiments, the user 110 may enter a transaction quantity and price for curb capacity or freight capacity units to participate, transact and/or trade by the GUI 210 detecting user 110 contact or audio instructions with a bid/buy price 1318 or offer/sell price 1321. In some implementations and embodiments, the GUI 210 detects user 110 contact with any of the GUI 210 buttons which have been aforementioned. Upon user 110 contact or audio interface with buttons or audio instructions on the GUI 210, instructions are instantiated which allows the user 110 to change the specifications of the respective virtual hub combination 1311. In some implementations and embodiments, a plurality of prices and markets may be presented based on a plurality of transformed contract specifications. In some embodiments, the best bid/buy price 1318 may be moving up in price or down in price depending on the market conditions at any given time. In some embodiments the last trade or last transacted price for a given transformed specification is listed to help the user 110 understand how the market is moving so that the user 110 may submit a competitive offer/selling price 1321 or bid/buying price 1314. In some implementations and embodiments, users 110 may adjust settings of the GUI 210 to show more bid/buying prices 1317 or more offer/selling prices 1320. In some embodiments the matrix of market quantities and prices 1313, 1314, 1315, 1316, 1317, 1318, 1319, 1320, 1321, 1324, 1325, 1326 may be referred to as market depth in the GUI 210 embodiment. In some embodiments the number of users 110 may be displayed as user icons 1312 or 1323 for the amount of people logged in which desire to transact, trade or participate in a given virtual hub 1310 to virtual hub 1322 transformed combination. In some implementations and embodiments, users 110 may select the curb capacity mode 1330 such that the user allows a market for only one form of curb capacity as a commodity or the user 110 may allow the system to show multiple forms of transformed curb capacity or freight capacity or securities between two virtual curb capacity hubs 1310, 1311, 1322. In some implementations and embodiments, by way of example and not to limit by example to avoid doubt, transformed curb capacity units or transformed curb capacity unit securities may even be substitutable between modes if the other specifications meet the grade category of the transformed curb capacity unit specification or transformed curb capacity unit security. In some implementations and embodiments, a user(s) 110 may have bought a transformed curb capacity unit with a specification and the delivery mechanism was a bus, however the bus user 110 bought back their transformed curb capacity unit or transformed curb capacity unit security and now the original purchaser may be matched with a car of another user 110 who will deliver the transformed curb capacity unit or transformed curb capacity unit security. In some embodiments, bus 816, train 1330, airplane 1130, car 430, or a plurality of other modes may be substitutable if the transformed curb capacity unit or transformed curb capacity unit security meets the delivery transformed specification grade. In some embodiments the GUI 210 may detect a user 110 selecting the 911 button 1329 which may activate voice and video recording functions on the mobile or stationary device 111 and transmit the data with a confirmation from the user 110 to the authorities to provide enhanced security while participating, transacting or trading forward curb capacity or freight curb capacity as a commodity. In some embodiments the user may toggle between the GUI 210 market view screen in FIG. 4 and other menu 270 options and settings by the user 110 selecting the hamburger button 270 and the GUI 210 detecting the user 110 input or contact. In some embodiments the GUI 210 may instantiate instructions in the memory of the mobile computing device 210 which then transmits curb capacity or freight capacity data through the network 214 or wireless GPS network 215 to call upon instruction routines and instruction sub-routines on the curb capacity forward market database server 220, virtual hub database server 223, network member database server 222, map routing servers 220, no arbitrage condition database server 220 and/or instructions in the memory of the cloud and local CPUs 210 which all interface together to make one system which may deliver curb capacity or freight capacity units to users 110 from and to a plurality of virtual hubs 1310, 1322 with a plurality of specifications at specific market prices.

Figure 14:
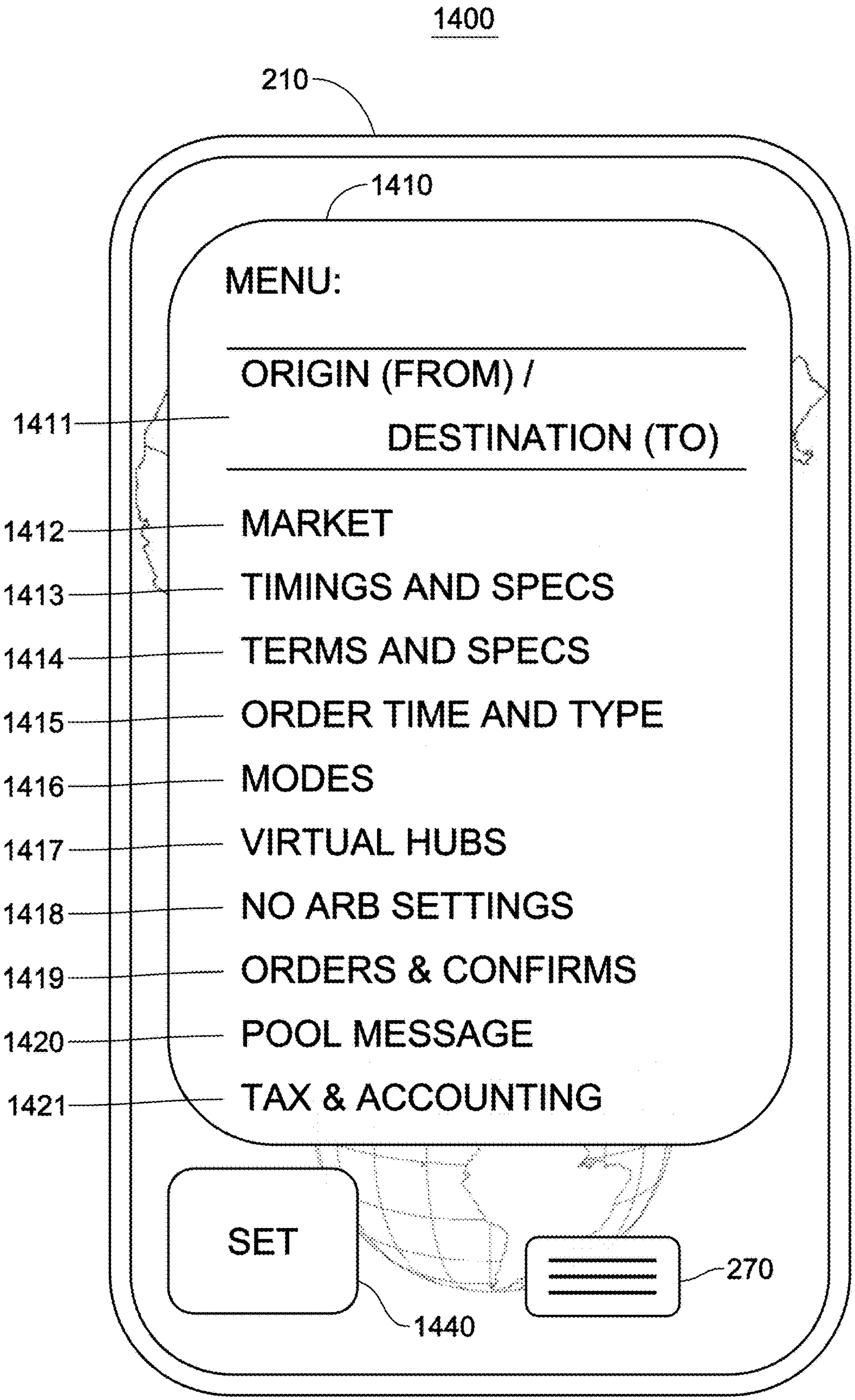
FIG. 14 illustrates an exemplary user interface for transacting and trading various menu options within the system and method in accordance with some embodiments.

FIG. 14 illustrates an exemplary user interface 210 for selecting menu options 1410 on a portable multifunction device in accordance with some embodiments. In some embodiments, user interface 210 includes the following elements, or a subset or superset thereof:

- menu options 1410;
- origin (From)/Destination (to) menu option 1411;
- market menu option 1412;
- timings and specs menu option 1413;
- term and specs menu option 1414;
- order time and type menu option 1415;
- modes menu option 1416;
- virtual hubs menu option 1417;
- no arb settings menu option 1418;
- orders and confirms menu option 1419;
- pool message menu option 1420;
- tax and accounting menu option 1421;
- setting button 1440 to transmit the menu option;
- hamburger button 270 to instruct the GUI 210 to take the user 110 to the menu screen.

In some implementations and embodiments, user interface 210 may be used by the user 110 to select a plurality of menu options 1410. In some embodiments, the user 110 may select the origin (from)/destination (to) menu option 1411 which may instruct the GUI 210 to go to an address input rendering 910 and/or FIG. 4. In some implementations and embodiments, the user 110, may contact the "market" menu option 1412 which may instruct the GUI 210 to render a market participation, transaction and/or trading screen such as 300, 400, 1100, 1200, or 1300. In some embodiments the user may toggle between the GUI 210 market view screen in FIG. 3 and other menu 270 options and settings by the user 110 selecting the hamburger button 270 and the GUI 210 detecting the user 110 input or contact. In some embodiments, the user 110, may contact the "timings and specs" menu option 1413 which may instruct the GUI 210 to render a timings and specs screen such as 500. In some embodiments, the user 110, may contact the "term and specs" menu option 1414 which may instruct the GUI 210 to render a term and specs screen such as 600. In some embodiments, the user 110, may contact the "order time and type" menu option 1415 which may instruct the GUI 210 to render an order time and type screen such as 700. In some embodiments, the user 110, may contact the "modes" menu option 1416 which may instruct the GUI 210 to render a mode screen such as 800. In some embodiments, the user 110, may contact the "Virtual Hubs" menu option 1417 which may instruct the GUI 210 to render a virtual curb hubs screen such as 900. In some embodiments, the user 110, may contact the "no arb settings" menu option 1418 which may instruct the GUI 210 to render a no arbitrage constraint screen such as 1000. In some embodiments, the user 110, may contact the "orders and confirms" menu option 1419 which may instruct the GUI 210 to render the market orders and transaction confirmations for the user 110. In some implementations and embodiments, the user 110, may contact the "pool message" menu option 1420 which may instruct the GUI 210 to message either the actual curb capacity unit processor 162 or the opposite seller user 110 or buyer user 110 depending on if the user 110 was an opposite buyer or seller of the curb capacity unit. In some embodiments, the user 110, may contact the "tax and accounting" menu option 1421 which may instruct the GUI 210 to render tax and accounting information for the respective user 110. In some embodiments the GUI 210 menu option selection 1410 may instantiate instructions in the memory of the mobile computing device 210 which then transmits curb capacity data through the network 214 or wireless GPS network 215 to call upon instruction routines and instruction sub-routines on the curb capacity forward market database server 271, virtual curb hub database server 223, network member database server 222, map routing server 220, no arbitrage condition database server 220 and/or instructions in the memory of the cloud and local CPUs 210 which all interface together to make one system which may deliver curb capacity or freight capacity units or securities to users 110 from and to a plurality of virtual hubs 410, 422 with a plurality of specifications at specific market prices.

Figure 15:
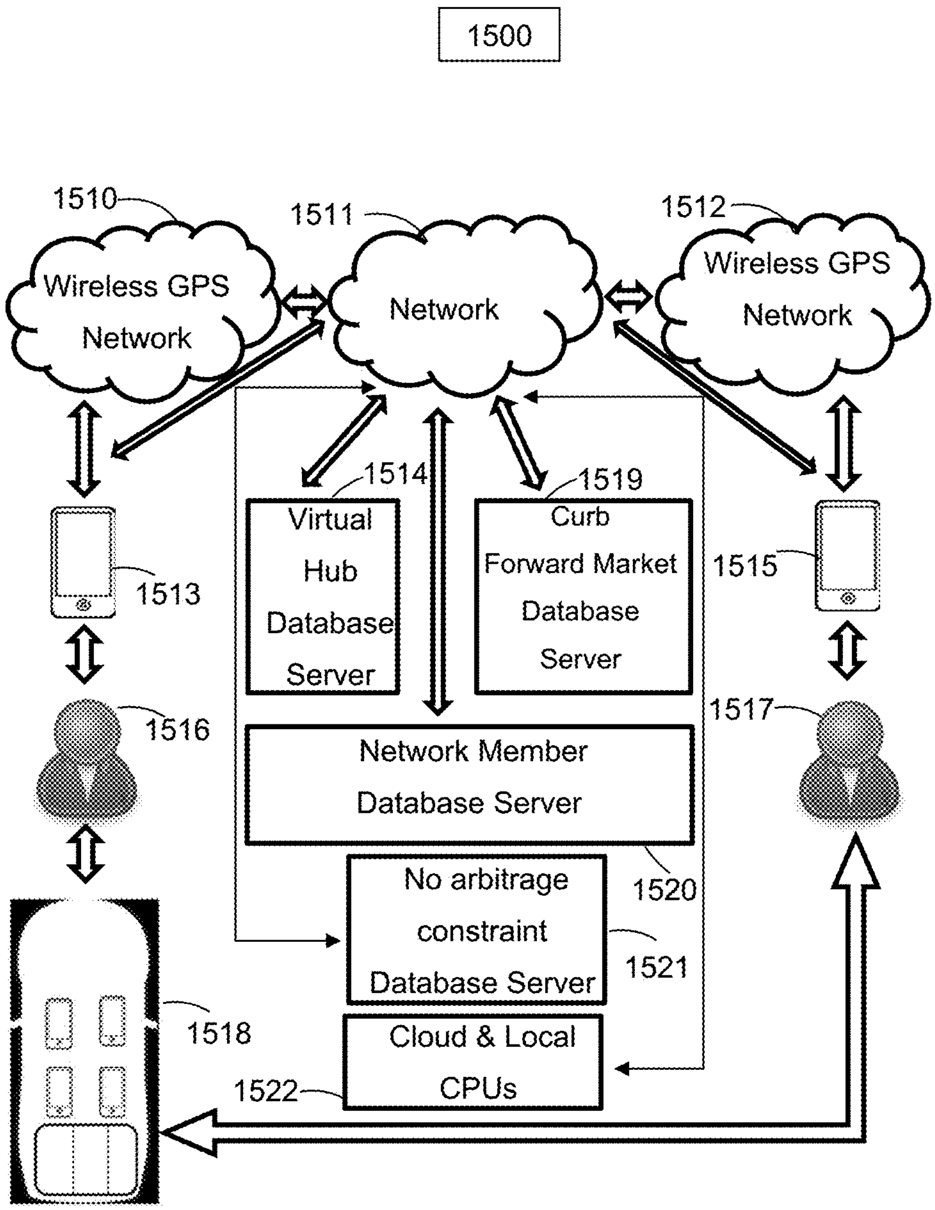
FIG. 15 illustrates a schematic diagram of a network configuration and implementations of methods which support the method and system of trading curb capacity in accordance with some embodiments.

FIG. 15 illustrates an exemplary network configuration 1500 in one exemplary implementation of participating, transacting and/or trading transformed curb capacity or freight curb capacity units or securities in accordance with some embodiments. In some embodiments, network configuration 1500 includes the following elements, or a subset or superset thereof:

- wireless global positioning system (GPS) network 1510;
- network/s 1511;
- additional global positioning system (GPS) network 1512;
- user member portable multifunction device 1513;
- virtual hub database server 1514;
- curb capacity forward market database server 1519;
- additional user member portable multifunction device 1515;
- network member database server 1520;
- network member user 1516;
- additional network member user 1517;
- no arbitrage constraint database server 1521;
- cloud and Local CPUs 1522;

curb capacity or freight curb capacity unit mode 1518.

In some implementations and embodiments, the software and/or instructions stored in memory of the cloud & local CPUs 1522 and portable multifunction devices 1513, 1515 may include additional instructions to instantiate specification requirements, participation, transactions, and/or trading on the curb capacity or freight curb capacity unit network 1511. In some embodiments, instructions may include standard database web services with the database as service provider (i.e. calling from the outside in, which lets the client GUI 210 or 1513 call each of the virtual hub database server 1514 and/or curb capacity forward market database server 1519 and/or network member database server 1520 and/or no arbitrage constraint database server 1521 and/or cloud & local CPUs 1522 through the wireless GPS network 1510 or network 1511. In some embodiments, each of the virtual hub database server 1514 and/or curb capacity forward market database server 1519 and/or network member database server 1520 and/or no arbitrage constraint database server 1521 and/or cloud & local CPUs 1522 may instruct the network to instantiate the database servers 1514, 1519, 1520, 1521, 1522 as service consumers (i.e. calling from the inside out, which lets a SQL query or application module in the database session consume an external web service. In some embodiments, users 1516 and/or 1517 may use portable multifunction devices 1513 and/or 1515 to access the curb capacity or freight capacity unit market GUI 210 so that the users 1516 and/or 1517 may participate, transact and/or trade curb capacity or freight curb capacity units. In some embodiments, the virtual hub database server 1514 stores map tile data in addition to user location data which is utilized by the GUI 210 to display or render location of virtual hubs and user 1516 proximity to those virtual hubs 200, 300, 400, 900, 1100, 1200, 1300. In some implementations and embodiments, the curb capacity forward market database server 1519 stores bid and offer data for respective quantities of users as well as transaction data and a plurality of market data for each virtual hub combination. In some implementations and embodiments, the network member database server 1520 stores user profile, user transaction, user trade, user settings, user specifications, user rating, user criminal history or background check data or facial recognition data or fingerprint recognition data or photo scan recognition data or ride history data, user track record, user bank data, user credit card data, user history data, user tax data and a plurality of other data. In some embodiments, the no arbitrage constraint database server 1521 stores data and algorithms to identify user 110 constraints 1000 and run algorithm calculations for users on specific constraints to check for compliance with constraints. In some embodiments, network servers and CPUs 1514, 1519, 1520, 1521, 1522, 1513, 1515 my interface through the network 1511 and/or wireless GPS networks 1510, 1512 such that curb capacity or freight capacity units may be participated in, transacted and/or traded efficiently in the context of a market for curb capacity units or securities. Included aforementioned data elements may be a subset or superset of data used for any specific calculation or transformation to participate, transact or trade curb capacity or freight capacity units or securities.

Figure 16:
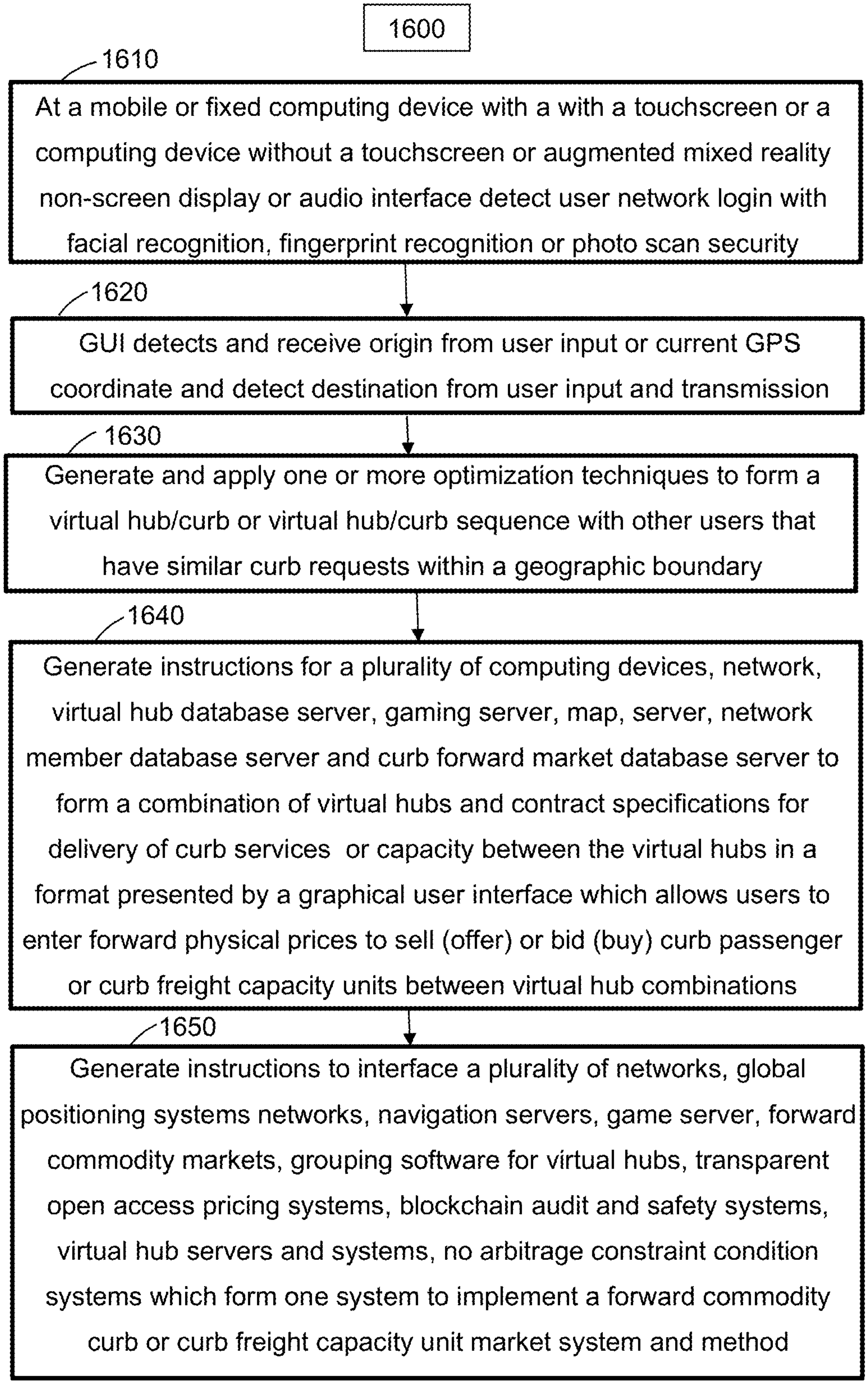
FIG. 16 is a flow diagram illustrating methods exemplary users move through while participating, transacting and trading curb capacity or curb freight capacity in accordance with some embodiments.

FIG. 16 illustrates a flowchart embodiment of steps a user may perform to participate, transact and/or trade transformed curb capacity units or securities between virtual hub combinations. In some embodiments a user at a mobile or portable multifunction device and/or fixed computing device with a touchscreen or a computing device without a touchscreen or augmented, audio interface computing device, mixed reality non-screen display may detect user login to the curb capacity unit network 1610. In some embodiments, the GUI of the curb capacity unit network may detect and receive origin location from user input or current GPS coordinate information and detect destination address from user input and transmission of data 1620. In some embodiments, the GUI and/or CPUs and/or databases may generate and apply one or more optimization techniques to form a virtual hub with other users that have similar curb capacity requests within a geographic boundary 1630. In some embodiments, the GUI and/or CPUs and or databases may generate instructions for a plurality of computing devices, network, virtual hub database server, network member database server and curb capacity forward market database server 271 to form a combination of virtual hubs and transformed contract specifications for delivery of curb capacity services or curb capacity or freight curb capacity between the virtual hubs in a format presented by a graphical user interface which allows users to enter forward physical prices to sell (offer) or bid (buy) curb capacity units or securities between virtual hub combinations 1640 in an open market auction format. In some embodiments, the GUI and/or CPUs and or databases may generate instructions to interface a plurality of networks, global positioning systems networks, servers, forward commodity market auctions, map routing servers, grouping instruction software for virtual hubs, navigation servers, transparent open access pricing systems, game servers, blockchain audit and safety systems, virtual hub servers and systems, no arbitrage constraint condition systems which form one system to implement a forward commodity curb capacity or freight capacity unit forward market system and method 1650.

Figure 17:
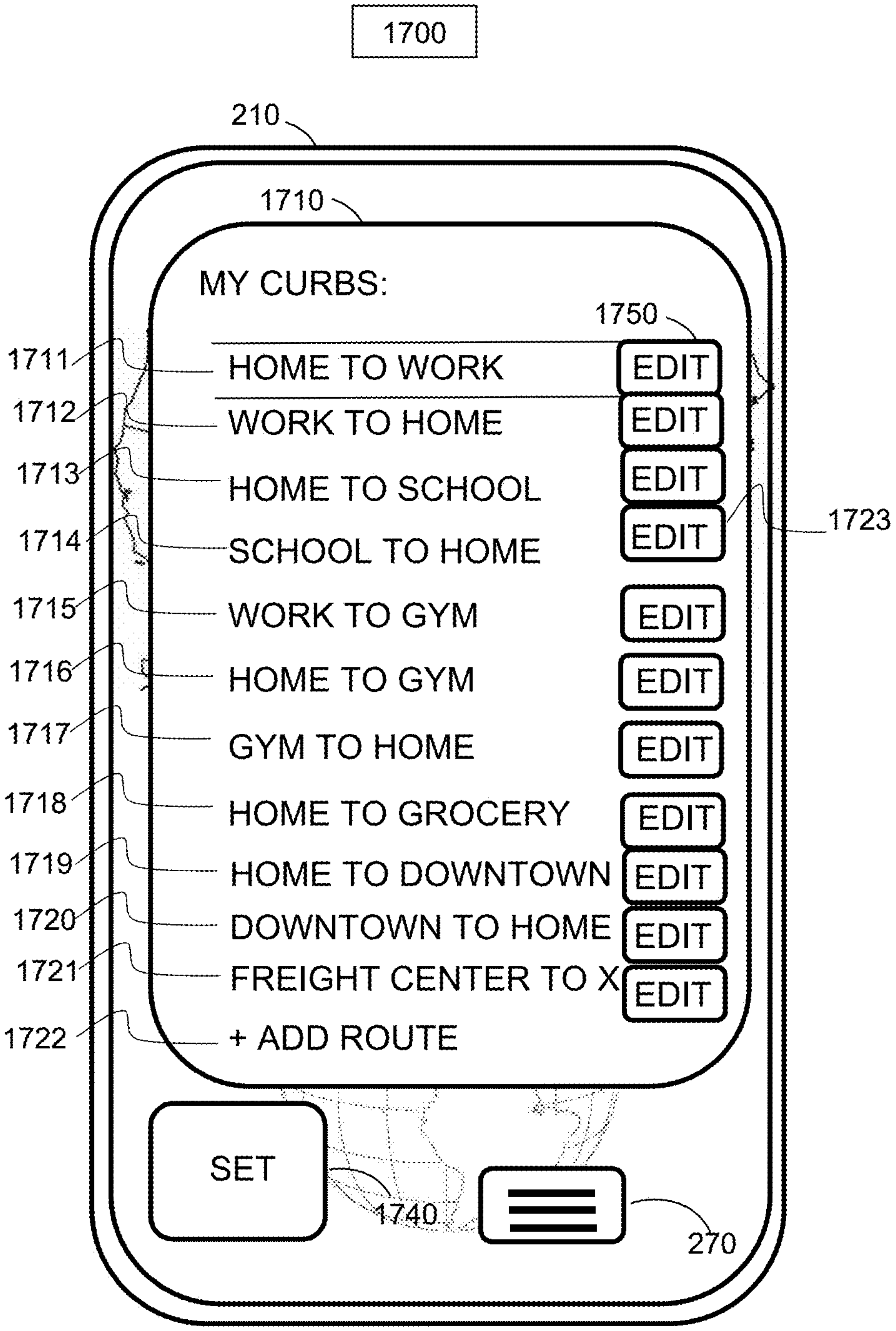
FIG. 17 illustrates an exemplary user interface for displaying most frequent routes in accordance with some embodiments.

FIG. 17 illustrates an exemplary embodiment of a user 110 most frequent curb capacity or freight unit routes 1710 in one exemplary implementation of participating, transacting and/or trading curb capacity or freight capacity units in accordance with some embodiments. In some embodiments, most frequent my routes include the following elements, or a subset or superset thereof:

- home to work 1711 (may have subsets of transformed data);
- work to home 1712 (may have subsets of transformed data);
- home to school 1713 (may have subsets of transformed data);
- school to home 1714 (may have subsets of transformed data);
- work to gym 1715 (may have subsets of transformed data);
- home to gym 1716 (may have subsets of transformed data);
- gym to home 1717 (may have subsets of transformed data);
- home to grocery 1718 (may have subsets of transformed data);
- home to downtown 1719 (may have subsets of transformed data);
- downtown to home 1720 (may have subsets of transformed data);
- freight center to X where X is a delivery route or multi virtual hub combination 1721 (may have subsets of transformed data);
- + add route 1722 (may have subsets of transformed data);
- edit 1723 (may have subsets of transformed data);
- setting button 1740 to transmit the My Routes data;
- hamburger button 270 to instruct the GUI 210 to take the user 110 to the menu screen.

In some implementations and embodiments, the GUI 210 may be used to select, store and/or edit user 110 frequent or preferred routes ("MY ROUTES") 1710 for more efficient access to curb capacity unit markets over various modes and specifications of curb capacity. In some embodiments, the user 110 may select, store and/or edit address and specification data for "Home to Work" 1711 and/or "Work to Home" 1712 and/or "Home to School" 1713 and/or "School to Home" 1714 and/or "Work to Gym" 1715 and/or "Home to Gym" 1716 and/or "Gym to Home" 1717 and/or "Home to Grocery" 1718 and/or "Home to Downtown" 1719 and/or "Downtown to Home" 1720 and/or "Freight Center to X" 1721 and/or "+ Add Route" 1722. In some embodiments, the My Routes 1710 module may include any route a user 110 may request on any curb capacity or freight capacity unit mode and/or specification. In some embodiments the user may toggle between the GUI 210 market view screen in FIG. 3 and other menu 270 options and settings by the user 110 selecting the hamburger button 270 and the GUI 210 detecting the user 110 input or contact. In some implementations and embodiments, the user 110 is notified via SMS text, in application, email or a plurality of other well-known communication methods when market activity occurs on a given route or virtual hub combination. In other words, the "my routes" 1710 feature not only allows for one touch access to a saved route, but also performs notification features between users. Lastly, in some embodiments, the EDIT 1750 button allows a user 110 to modify a plurality of notification settings such as email, SMS text, in application, voice, messaging or other notification methods.

Figure 18:
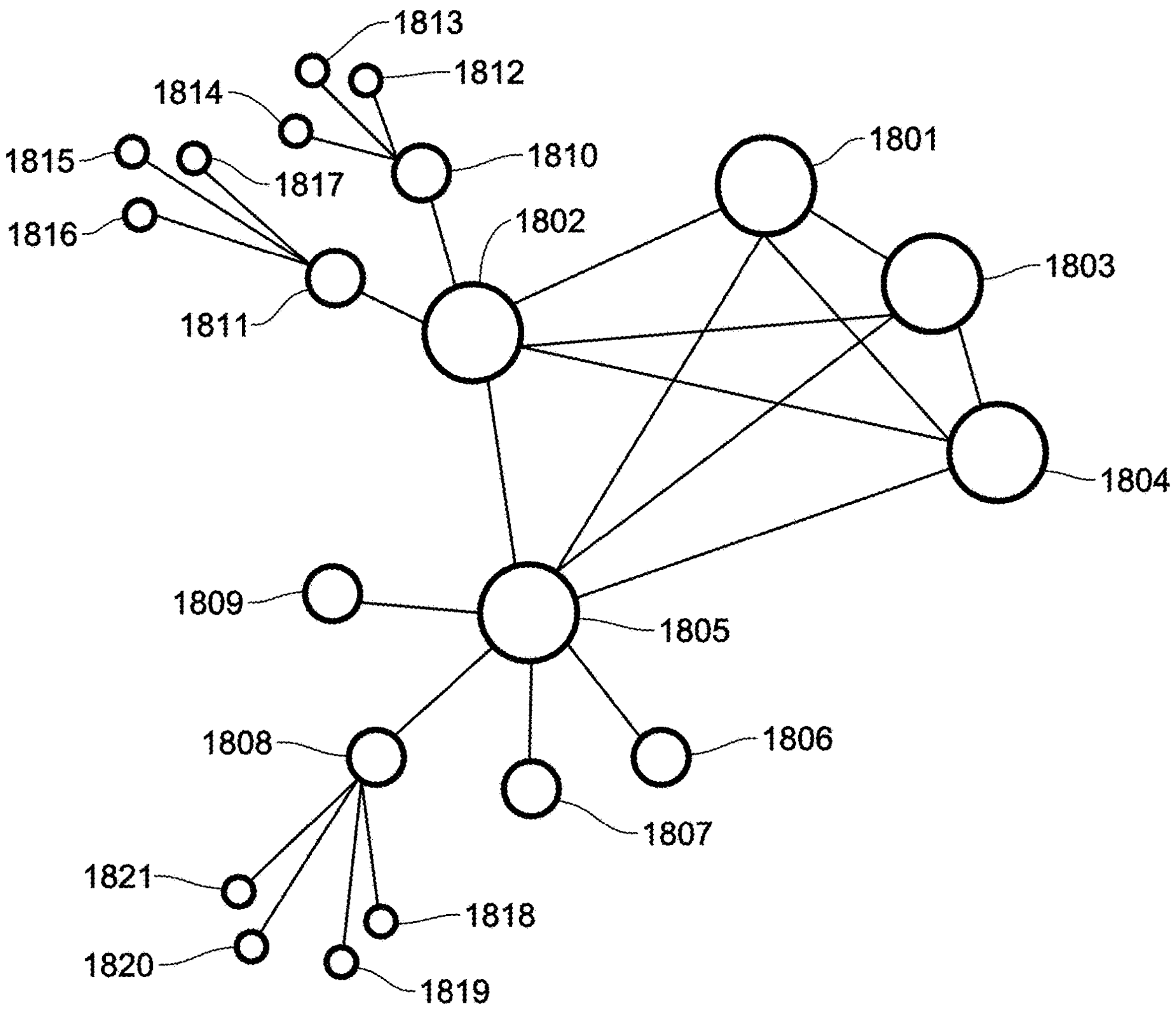
FIG. 18 illustrates an exemplary network topology of a virtual hub combination or series of multiple virtual hub combinations for use in the market auction platform for forward curb capacity or freight curb capacity method in accordance with some embodiments.

FIG. 18 illustrates an exemplary network topology configuration 1800 in one exemplary implementation of participating, transacting and/or trading transformed curb capacity or freight curb capacity units or securities in accordance with some embodiments. In some embodiments, network configuration 1800 includes the following elements, or a subset or superset thereof:

large virtual curb hub nodes such as 1801, 1802, 1803, 1804, 1805;

medium virtual curb hub nodes such as 1810, 1811, 1809, 1808, 1807, 1806;

small virtual curb hub nodes such as 1812, 1813, 1814, 1815, 1816, 1816, 1817, 1818, 1819, 1820, 1821;

In some embodiments, the overall network node topology 1800 is comprised of large virtual hub nodes 1801, 1802, 1803, 1804, 1805 and medium virtual hub nodes 1810, 1811, 1809, 1808, 1807, 1806 and small virtual hub nodes 1812, 1813, 1814, 1815, 1816, 1816, 1817, 1818, 1819, 1820, 1821, or a subset or superset thereof. In some embodiments a user may input a starting point of 1815 and an ending point of 1818 which represent specific geographic virtual hub locations in a city, multiple cities or even countries or multiple countries. In some embodiments, forward curb capacity market auctions may occur directly between two exemplary points such as 1815 and 1818 or the method and system may combine a series of smaller auctions to comprise a larger auction between two endpoints on the system. In some embodiments, a series of smaller auctions may be combined between 1815 and 1811 as well as 1811 and 1802 as well as 1802 and 1805 as well as 1805 and 1808 as well as 1808 and 1818 which would be added together to make a combined virtual hub auction. A combined series of smaller auctions may be constrained by instructions which form auctions based on cheapest curb capacity or freight route 1011, single mode transport or freight auctions 1012, multi-mode curb transport or curb freight 1013, fastest transport or freight constraints 1014, most scenic auctions 1015, highest rating auctions 1016, most available or liquid auctions 1017, highest volume auctions 1018, most frequent auctions 1019, service level auctions 1020, security and safety level auctions 1021, group restricted auctions by sex, email, organization, gender or other 1022. In some embodiments, the constraints allow for many types of auctions which are unique and novel for transformed curb capacity and freight capacity units or securities in a forward curb capacity and freight market. In some implementations and embodiments, the user 110 may specify instructions that set forward market auction constraints based on one or a plurality of constraints. In some implementations and embodiments, the constrained auctions may have fungible units which allow many participants to transact in the auctions. In some embodiments, the disclosed creation of a forward market of curb capacity units between virtual curb hubs 1801 and 1804 or other combinations along map routes has the attributes of a fungible forward contract which allows for one curb capacity unit to be substitutable for another curb capacity unit because the unit has been transformed and defined as a commodity contract. In other words, if user A bought a curb capacity unit from user B between 1801 virtual hub and 1804 virtual hub, but then user A was not able to perform the obligation to purchase the curb capacity unit between 1801 virtual hub and 1804 virtual hub from user B, user A could resell the curb capacity unit contract between virtual hub 1801 and virtual hub 1804 to a third party user C on the forward curb capacity unit auction market between virtual hub 1804 and virtual hub 1801 to retrieve the financial payment made for their original purchase from user B and then user C would replace user A and be matched with user B for the curb capacity unit transformation between virtual hub 1804 and virtual hub 1801. No other prior art system or method performs the aforementioned data transformation combination. In some implementations and embodiments, the curb capacity or freight unit auction substitutability dynamic creates a unique and novel invention that does not exist in the world today. In some embodiments, user 110 input 210 instructions use constrained optimization to form one curb auction between two points or a series of multiple auctions that form one larger auction.

In some implementations and embodiments, the forward curb capacity and freight unit auctions subject to various constraints may be presented as a linear programming cost minimization problem in the exemplary case where the user 110 selects the cheapest route 1011 constraint. In such an exemplary case, the series of auctions may be combined that utilize the lowest cost path between the start point 1815 and the ending point 1818. In such exemplary case, the linear programming cost minimization function may select the following path of 1815 to 1811 to 1802 to 1804 to 1805 to 1808 to 1818 if that combination is the lowest cost auction path. In another such exemplary case, the user 110 may select instructions for the auction to minimize both cost and shortest route. In such exemplary case the linear programming function may minimize cost subject to a constraint that time is the shortest along the path and the resulting auction may combine a different and unique series of auctions between the starting point of 1815 and ending point 1818. Accordingly, the path may be optimized to minimize cost subject to the shortest path that yields a path of 1815 to 1811 to 1802 to 1805 to 1808 to 1818. The plurality of combinations of linear programming sequences of auctions for curb capacity or freight units between two points may consider an infinite set of combinations and permutations.

In some implementations and embodiments, the forward transformed curb capacity and freight unit or transformed curb capacity security unit auctions may be held side by side between two competing routes 4200. By way of example but not limiting by example a user may input instructions for the method and system to route between 1801 virtual curb hub and 1805 virtual curb hub. One route may be directly between 1801 virtual curb hub and 1805 virtual curb hub. Another route may be between virtual curb hub 1801 and virtual curb hub 1805 by way of virtual curb hub 1802. The time between the curb routes may vary due to traffic, construction, road conditions, accidents or a plurality of other exogenous factors, however, the data transformation of the disclosed method allows for two auctions to form side by side. Side by side curb auctions may be displayed on a market based user interface 1300 or as a software layer of instructions over a navigation system 4200. The first curb capacity unit auction may be between virtual curb hub 1805 and virtual curb hub 1801 directly as one auction. In some implementations and embodiments, a second auction may be by combining two smaller auctions between virtual curb hub 1805 and virtual curb hub 1802 with the auction between 1802 virtual curb hub and 1801 virtual curb hub which could be expressed independently or as a combined auction. The plurality of route auctions for the curb capacity unit (auction one directly between 1801 virtual hub and 1805 virtual hub) (auction two between 1801 virtual curb hub and 1805 virtual curb hub by way of 1802 virtual curb hub) may allow for the user to have transparent price auction information for the value of various proposed routes which have different price values.

Figure 19:
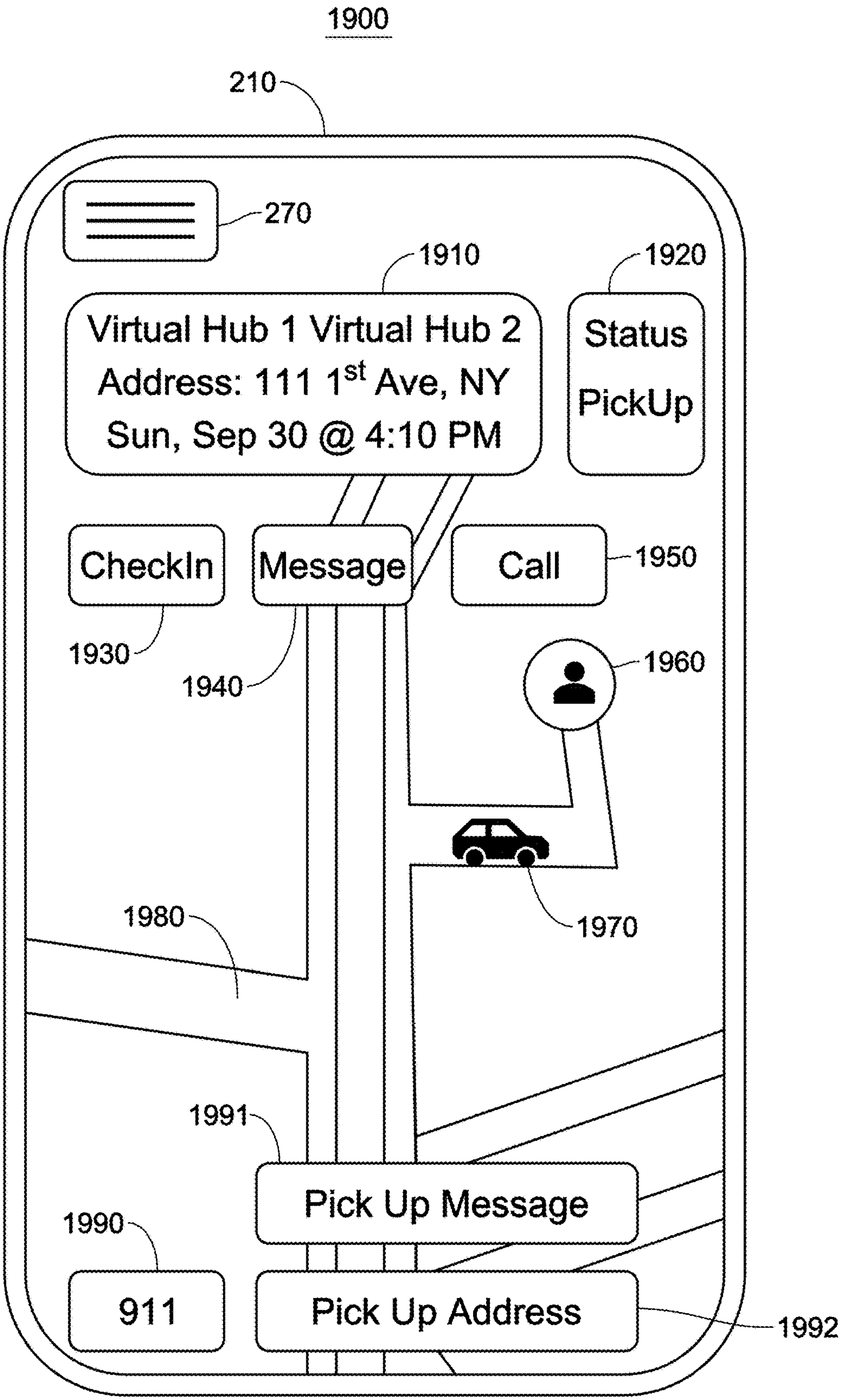
FIG. 19 illustrates an exemplary user interface to display the map of the virtual hub to virtual hub route of a given transaction for forward curb capacity or freight curb capacity units in accordance with some embodiments.

FIG. 19 illustrates an exemplary delivery and pick up geofence status configuration 1900 in one exemplary implementation of participating, transacting and/or trading transformed curb capacity or freight curb capacity units or securities in accordance with some embodiments. In some embodiments, the delivery and pick up status configuration 1900 includes the following elements, or a subset or superset thereof:

- computing device unit GUI 210 to display method of multi layered network node topology for forward market of curb capacity and freight units.
- hamburger menu toggle 270 to move between different application configurations;
- virtual curb hub 1 pickup address and virtual curb hub 2 destination address at a contract specification with regards to quality, day, date and time 1910;
- trip status for PickUp of curb capacity or freight curb unit 1920;
- CheckIn passenger or freight status for curb capacity unit 1930;
- messaging texts and instructions between users to make pick up and delivery of curb capacity or freight curb capacity units 1940;
- call between users with number masking for privacy security 1950;
- GPS map location of user 110 who is a rider or if freight curb cargo location 1960;
- GPS map location of user 110 who is a driver or if freight, cargo carrier curb unit location 1970;
- GPS map of curb capacity or freight unit delivery and pickup 1980;
- Texting message window for freight or curb capacity unit communication between users 1991;
- PickUp address data window during PickUp status 1992;
- Security button to report security issues to 911 and system database 1990;

In some embodiments, the GUI 210 transmits delivery instructions to the users 110 to help the user have a rendering or map of their GPS location 1960 relative to the selling user 1970 of freight or curb capacity units. In some embodiments, the GUI 210 displays the trips status such as PickUp 1920 status, the trip status may include subsets or supersets of various status conditions such as PickUp, start, leaving, on-going, in-progress, arriving, arrived or a plurality of other trip status conditions. In some embodiments, the trip view of the GUI 210 may include a CheckIn 1930 button to confirm a passenger or freight transformed curb capacity unit has been moved into the transformed curb capacity unit object which could be a car, airplane, autonomous vehicle, bike, boat, ship, bus, drone, limo, motorcycle, moped, shuttle, spaceship, subway, taxi, train, cargo, combination of transformed modes or other type of curb capacity mode. In some embodiments, the user 110 may transmit a message using the message 1940 button which may transmit audio, visual or text messages between users 110, 1970, 1960. In some embodiments, the users 110, 1960, 1970 may call each other using the call 1950 button to communicate pickup or delivery instructions. In some embodiments, a user 110, 1960, 1970 may message another user 110, 1960, 1970 to communicate using the PickUp Message window 1991 which may utilize visual, audio or text communication modes as well as log a message history between users. In some embodiments the users 110, 1960, 1970 may toggle to other modes of the application using the menu hamburger button 270. In some embodiments the GPS display of a map with the relative position of a curb capacity or freight unit seller 1970 and a curb capacity or freight unit buyer 1960 are displayed to help users 110 understand each others relative position and location on a map 1980. In some embodiments the GPS location of the curb capacity and freight curb unit seller 1970 and curb capacity or freight unit buyer 1960 are tracked in real time with location updates on the map 1980.

Figure 20:
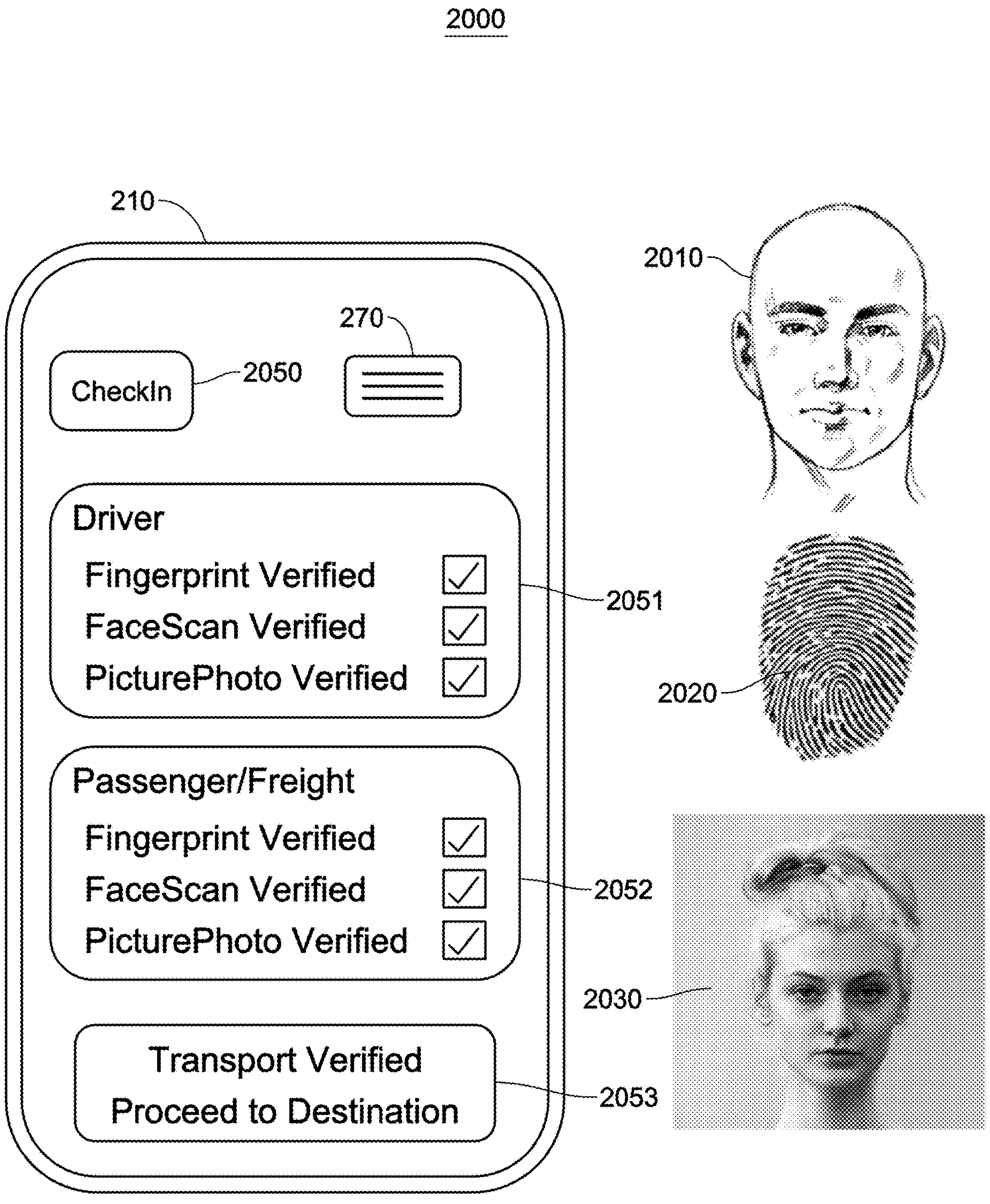
FIG. 20 illustrates an exemplary user interface to display the results of a security check and verification of users identity for forward curb capacity or freight curb capacity units in accordance with some embodiments.

FIG. 20 illustrates an exemplary CheckIn configuration 2000 in one exemplary implementation of participating, transacting and/or trading curb capacity or freight curb capacity units in accordance with some embodiments. In some embodiments, the CheckIn 2050 for a buyer or seller of a curb capacity or freight unit includes the following elements, or a subset or superset thereof:

- computing device unit GUI 210 to display method of multi layered network node topology for forward market of curb capacity and freight units with security CheckIn.
- hamburger menu toggle 270 to move between different application configurations;
- driver or seller of curb capacity or freight curb capacity unit scan check for finger print, face scan or picture photo scan to verify identity of user 2051;
- passenger or freight and curb capacity unit buyer unit scan check for finger print, face scan or picture photo scan to verify identity of user 2052;
- transport verification confirmation window to confirm identities of users in the system at the application system level 2053;
- buyer and seller of curb capacity or freight curb capacity unit facial recognition confirmation 2010;
- buyer and seller of curb capacity or freight curb capacity unit finger print recognition confirmation 2020;
- buyer and seller of curb capacity or freight unit photo recognition confirmation 2030;

In some embodiments, the GUI 210 of a computing device transmits and confirms the identity of users against identity records in the Network Member Database Server 222 which also confirms security checks for criminal records or other activity that would suspend a user from the platform environment. In some embodiments, the driver verification window 2051 may fail an identity verification due to a user not being the registered user 2010 on the Network Member Database Server 222. In some embodiments, the passenger or freight verification window 2052 may fail an identity verification due to a user 2010 not being the registered user on the network member database server 222. In some embodiments, the transport verification window 2053 may instruct the user 2010 to proceed to destination if verification is successful. In some embodiments, the transport verification window 2053 may instruct the user not to proceed to the destination if the verification is not successful. The identity verification system is unique and novel and dependent on a novel and unique auction forward market for transformed curb capacity unit or freight unit or securities over multiple nodes or virtual hubs topologies.

Figure 21:
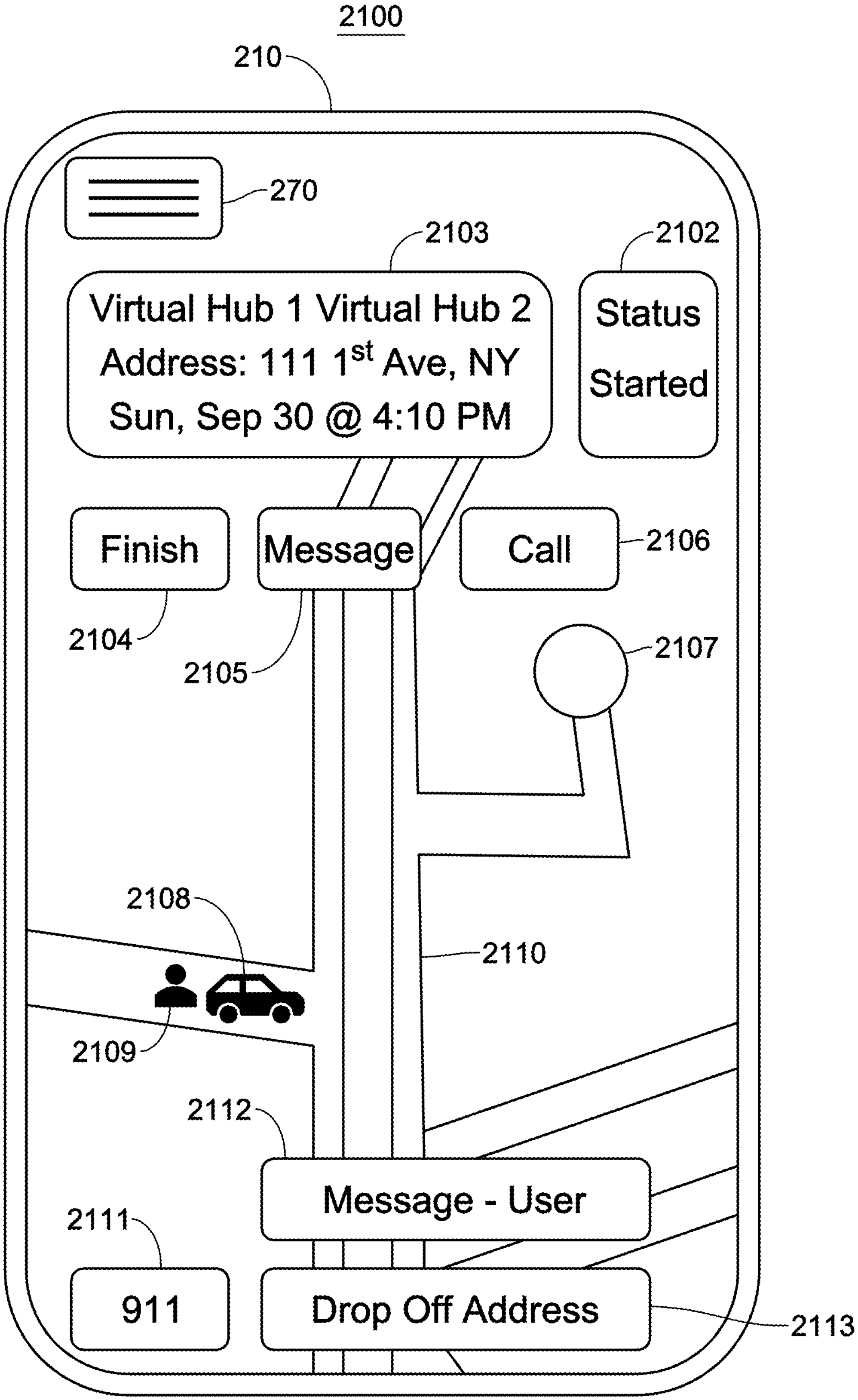
FIG. 21 illustrates an exemplary user interface to display the status of the virtual hub to virtual hub route of a given transaction for forward curb capacity or freight curb capacity units in accordance with some embodiments.

FIG. 21 illustrates an exemplary delivery and pick up status configuration 2100 once a curb capacity or freight curb unit delivery has started in one exemplary implementation of participating, transacting and/or trading curb capacity or freight capacity units in accordance with some embodiments. In some embodiments, the delivery and pick up status configuration 2100 includes the following elements, or a subset or superset thereof:

- computing device unit GUI 210 to display method of multi layered network node topology for forward market of curb capacity and freight units.
- hamburger menu toggle 270 to move between different application configurations;
- virtual curb hub 1 pickup address and virtual curb hub 2 destination address at a transformed contract specification with regards to quality, day, date and time 2103 of delivery of a curb capacity or freight unit;
- trip status of started of curb capacity or freight curb unit or security 2102;
- finish trip passenger or freight status for curb capacity unit 2104 once a curb capacity or freight curb capacity unit has been delivered;
- messaging texts and instructions between users to make pick-up, on-going route status and delivery complete of curb capacity or freight capacity units 2105;
- call between system users with number masking for privacy security 2106;
- GPS map location of user 2109 who is a rider or if freight, cargo location 2109;
- GPS map location of user 2108 who is a driver or if freight, cargo carrier unit location 2108;
- GPS map of curb capacity or freight unit delivery and pickup 2110;
- Texting message window for freight or curb capacity unit communication between users 2112;
- Starting point of virtual hub for forward curb capacity or freight units 2107;
- Security button to report security issues to 911 and system database 2111;
- Drop off address for delivery of passenger or freight for curb capacity or freight curb unit 2111.

In some embodiments, the GUI 210 transmits delivery instructions to the users 110 to help the user have a rendering or map of their GPS location 2109 relative to the selling user 2108 of transformed freight or curb capacity units or securities. In some embodiments, the GUI 210 displays the trips status such as Started 2102 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2104 button to confirm a passenger or freight curb capacity unit has been delivered or completed by the curb capacity unit object which could be a car, airplane, autonomous vehicle, bike, boat, ship, bus, drone, limo, motorcycle, moped, shuttle, spaceship, subway, taxi, train, eScooter, eBike, cargo or other types of curb capacity modes. In some embodiments, the user 110 may transmit a message using the message 2105 button which may transmit audio, visual or text messages between users 110, 2109, 2108. In some embodiments, the users 110, 2109, 2109 may call each other using the call 2106 button to communicate pickup or delivery instructions or other necessary communication. In some embodiments, a user 110, 2109, 2108 may message another user 110, 2109, 2108 to communicate using the Message-User window 2112 which may utilize visual, audio or text communication modes as well as log a message history between users. In some embodiments the users 110, 2109, 2108 may toggle to other modes of the application using the menu hamburger button 270. In some embodiments the GPS display of a map with the relative position of a transformed curb capacity or freight unit or security seller 2108 and a transformed curb capacity or freight unit or security buyer 2109 are displayed to help users 110 understand each others relative position and location on a map 2110. In some embodiments the GPS location of the curb capacity and freight curb capacity unit seller 2108 and curb capacity or freight curb capacity unit buyer 2109 are tracked in real time with location updates on the map 2110.

Figure 22:
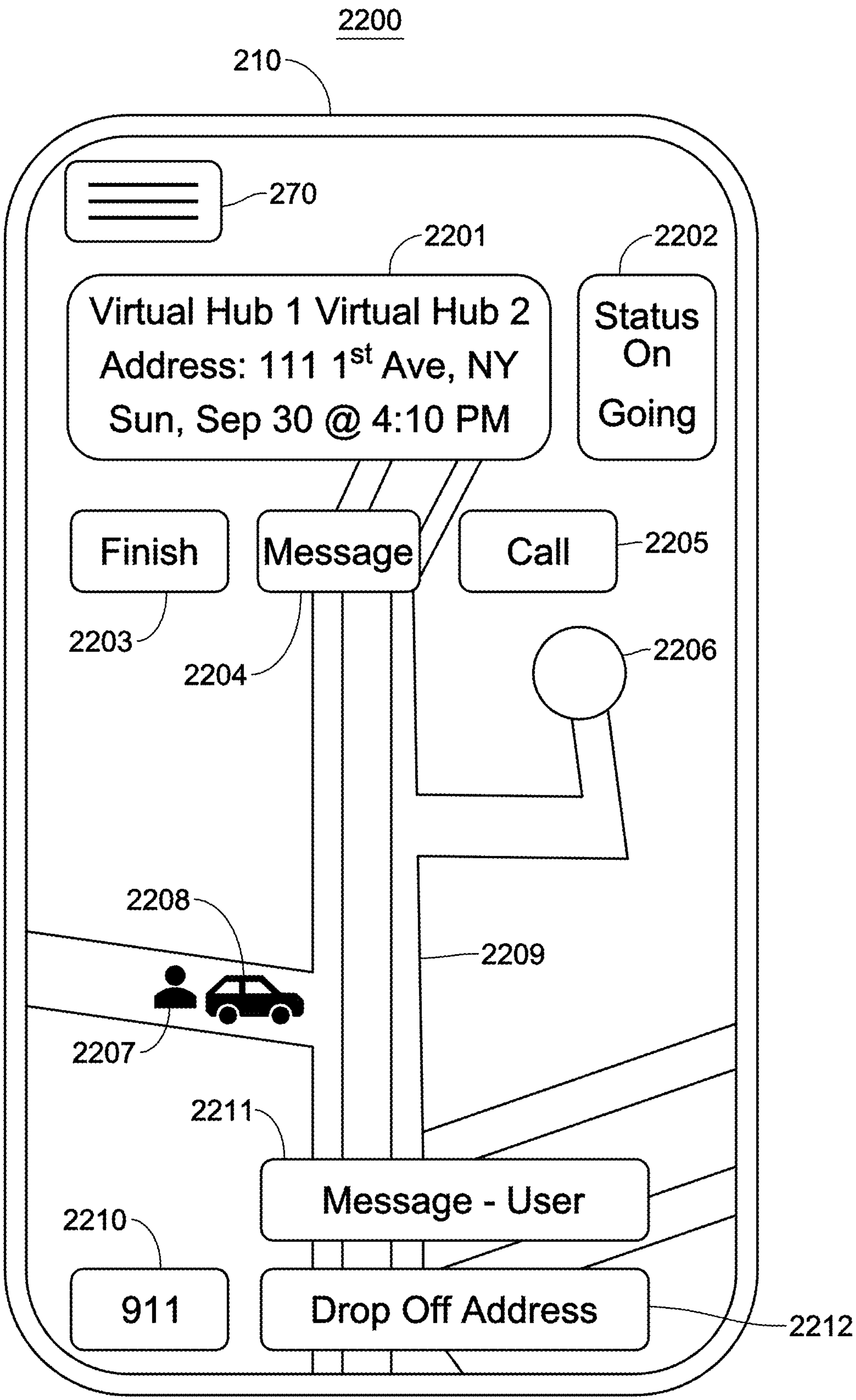
FIG. 22 illustrates an exemplary user interface to display the status of the virtual hub to virtual hub route of a given transaction for forward curb capacity or freight curb capacity units in accordance with some embodiments.

FIG. 22 illustrates an exemplary delivery and pick up status configuration 2200 once a curb capacity or freight unit delivery is ongoing in one exemplary implementation of participating, transacting and/or trading transformed curb capacity or freight capacity units or securities in accordance with some embodiments. In some embodiments, the delivery and pick up status configuration 2200 includes the following elements, or a subset or superset thereof:

- computing device unit GUI 210 to display method of multi layered network node topology for forward market of curb capacity and freight units.
- hamburger menu toggle 270 to move between different application configurations;
- virtual curb hub 1 pickup address and virtual curb hub 2 destination address at a contract specification with regards to quality, day, date and time 2201 of delivery of a curb capacity or freight curb capacity unit;
- trip status of ongoing for curb capacity or freight unit 2202;
- finish trip passenger or freight status button for curb capacity unit 2203 once a curb capacity or freight curb capacity unit has been delivered;
- messaging texts and instructions between users to make pick-up, on-going route status and delivery complete of curb capacity or freight curb capacity units 2204;
- call between system users with number masking for privacy security 2205;
- GPS map location of user 2209 who is a rider or if freight, cargo location 2209;
- GPS map location of user 2208 who is a driver or if freight, cargo carrier unit location 2207;
- GPS map of curb capacity or freight unit delivery and pickup 2206;
- texting message window for freight or curb capacity unit communication between users 2211;
- starting point of virtual hub for forward curb capacity or freight curb capacity units 2206;

security button to report and record security issues to 911 and system database 2210;

drop off address for delivery of passenger or freight for curb capacity or freight curb capacity unit 2212.

In some implementations and embodiments, the GUI 210 transmits delivery instructions to the users 110 to help the user 110 have a rendering or map of their GPS location 2207 relative to the selling user 2208 of freight or curb capacity units. In some embodiments, the GUI 210 displays the trips status such as On-Going 2202 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2203 button to confirm a passenger or freight curb capacity unit or security has been delivered or completed by the curb capacity unit object which could be a car, airplane, autonomous vehicle, bike, boat, ship, bus, drone, limo, motorcycle, moped, shuttle, spaceship, subway, taxi, train, cargo or other types of curb capacity modes. In some embodiments, the user 110 may transmit a message using the message 2204 button which may transmit audio, visual or text messages between users 110, 2207, 2208. In some implementations and embodiments, the users 110, 2207, 2208 may call each other using the call 2205 button to communicate pickup or delivery instructions or other necessary communication. In some implementations and embodiments n some embodiments, a user 110, 2207, 2208 may message another user 110, 2207, 2208 to communicate using the Message-User window 2211 which may utilize visual, audio or text communication modes as well as log a message history between users 110, 2207, 2208. In some embodiments the users 110, 2207, 2208 may toggle to other modes of the application using the menu hamburger button 270. In some implementations and embodiments the GPS display of a map with the relative position of a curb capacity or freight unit seller 2208 and a curb capacity or freight unit buyer 2207 are displayed to help users 110 understand each others relative position and location on a map 2209. In some embodiments the GPS location of the curb capacity and freight unit seller 2208 and curb capacity or freight unit buyer 2207 are tracked in real time with location updates on the map 2209. In some embodiments, the GUI 210 may display the Drop Off Address 2212 of the curb capacity or freight unit. In some implementations and embodiments, a user 110, 2207, 2208 may use a 911 button 2210 to submit a recording to the system servers and to authorities who are connected to the system if anything has occurred that may compromise the security of any user or curb capacity unit.

Figure 23:
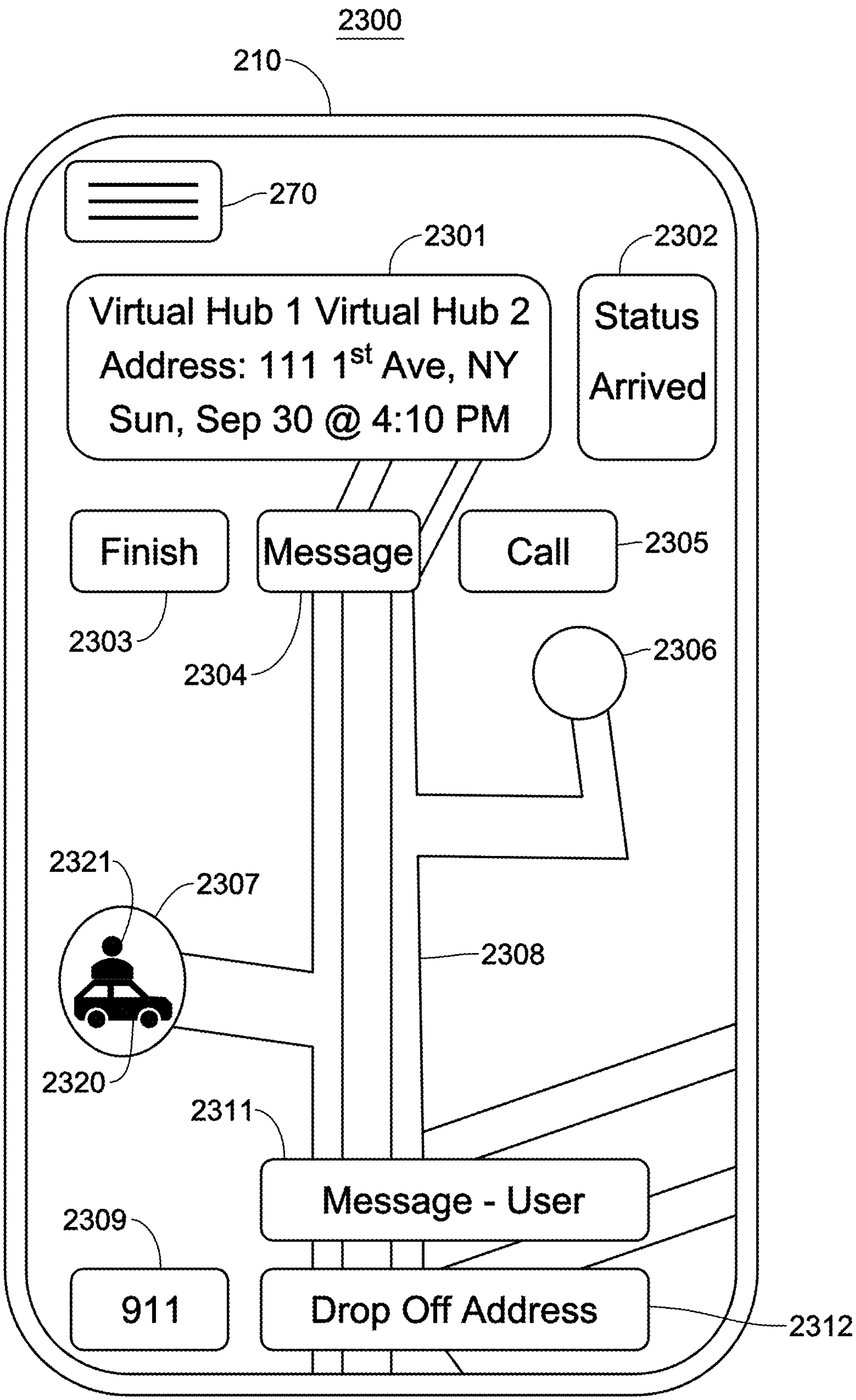
FIG. 23 illustrates an exemplary user interface to display the status of the virtual hub to virtual hub route of a given transaction for forward curb capacity or freight curb capacity units in accordance with some embodiments.

FIG. 23 illustrates an exemplary delivery and pick up status configuration 2300 once a curb capacity or freight unit delivery has arrived in one exemplary implementation of participating, transacting and/or trading curb capacity or freight capacity units in accordance with some embodiments. In some embodiments, the delivery and pick up status configuration 2300 includes the following elements, or a subset or superset thereof:

computing device unit GUI 210 to display method of multi layered network node topology for forward market of curb capacity and freight curb capacity units.

hamburger menu toggle 270 to move between different application configurations;

virtual hub 1 pickup address and virtual hub 2 destination address at a contract specification with regards to quality, day, date and time 2301 of delivery of a curb capacity or freight curb capacity unit;

trip status of arrived for curb capacity or freight curb capacity unit 2302;

finish trip passenger or freight status button for curb capacity unit 2303 once a curb capacity or freight curb capacity unit has been delivered;

messaging texts and instructions between users to make pick-up, on-going route status and delivery complete of curb capacity or freight capacity units 2304;

call between system users with number masking for privacy security 2305;

GPS map location of user 2307 who is a rider or if freight, cargo location 2307;

GPS map location of user 2307 who is a driver or if freight, cargo carrier unit location 2307;

GPS map of curb capacity or freight curb capacity unit delivery and pickup 2308;

texting message window for freight or curb capacity unit communication between users 2311;

starting point of virtual hub for forward transformed curb capacity or freight units or securities 2306;

ending point of virtual hub for forward transformed curb capacity units or freight units or securities 2307;

security button to report and record security issues to 911 and system database 2309;

drop off address for delivery of passenger or freight for curb capacity or freight unit 2312;

In some embodiments, the GUI 210 transmits delivery instructions to the users 110 to help the user 110 have a rendering or map of their GPS location 2307 relative to the selling user 2307 of freight or curb capacity units. In some embodiments, the GUI 210 displays the trips status such as Arrived 2302 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2303 button to confirm a passenger or freight curb capacity unit has been delivered or completed by the curb capacity unit object which could be a car, airplane, autonomous vehicle, bike, boat, ship, bus, drone, limo, motorcycle, moped, shuttle, spaceship, subway, taxi, train, cargo or other types of curb capacity modes. In some implementations and embodiments, the user 110 may transmit a message using the message 2304 button which may transmit audio, visual or text messages between users 110, 2307. In some implementations and embodiments, the users 110, 2307 may call each other using the call 2305 button to communicate pickup or delivery instructions or other necessary communication. In some embodiments, a user 110, 2307 may message another user 110, 2307 to communicate using the Message-User window 2311 which may utilize visual, audio or text communication modes as well as log a message history between users 110, 2307. In some implementations and embodiments, the users 110, 2307 may toggle to other modes of the application using the menu hamburger button 270. In some embodiments the GPS display of a map with the relative position of a curb capacity or freight unit seller 2307 and a curb capacity or freight curb capacity unit buyer 2307 are displayed to help users 110 understand each others relative position and location on a map 2308. In some implementations and embodiments, the GPS location of the curb capacity and freight unit seller 2307 and transformed curb capacity or freight unit or security buyer 2307 are tracked in real time with location updates on the map 2308. In some embodiments, the GUI 210 may display the Drop Off Address 2312 of the transformed curb capacity or freight unit or security. In some implementations and embodiments, a user 110, 2307 may use a 911 button 2309 to submit a recording to the system servers and to authorities who are connected to the system if anything has occurred that may compromise the security of any user or curb capacity unit.

Figure 24:
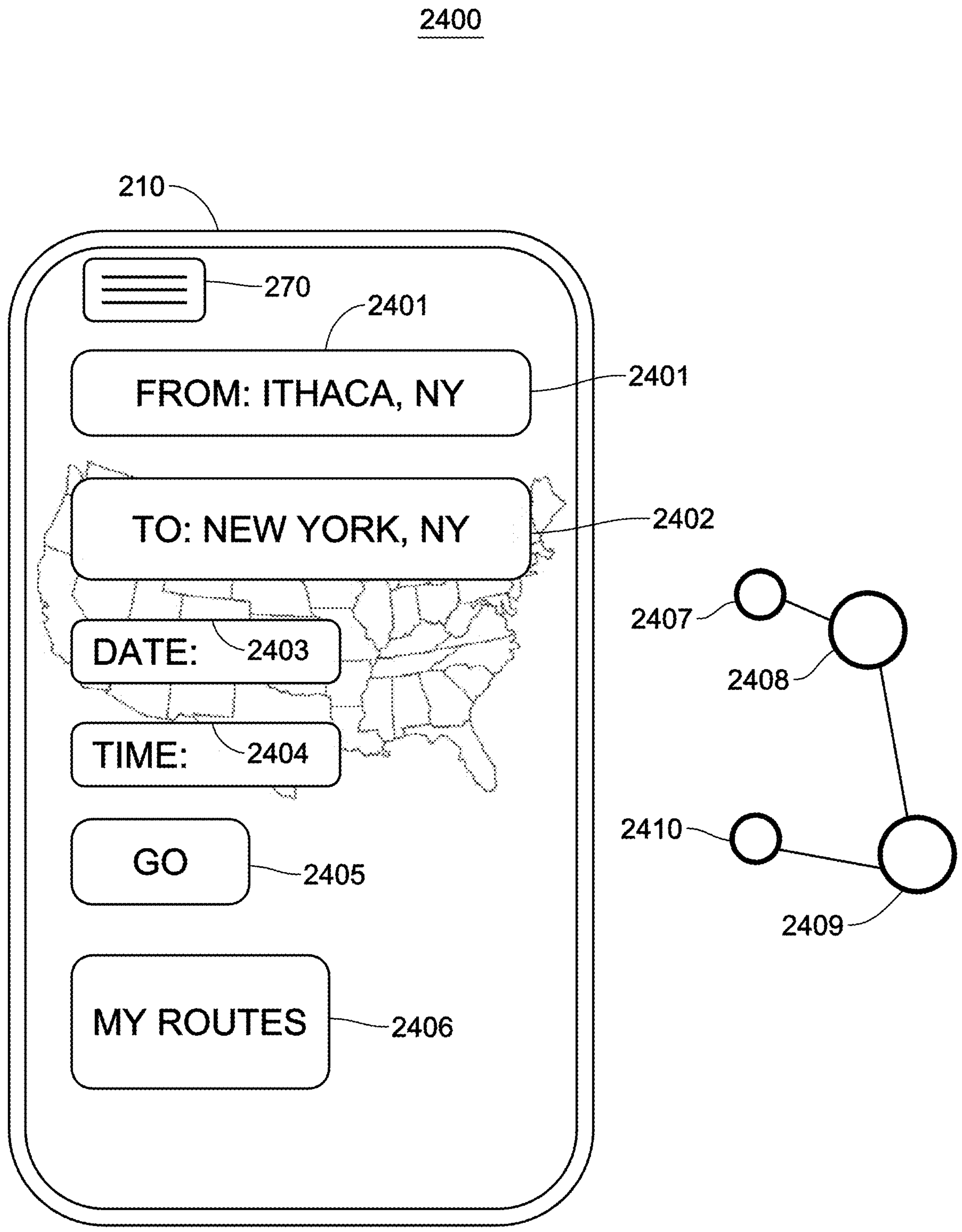
FIG. 24 illustrates an exemplary user interface to display a multi-hub, virtual-hub sequence given a start and end point for a transaction auction for forward curb capacity or freight capacity units in accordance with some embodiments.

FIG. 24 illustrates an exemplary delivery and pick up configuration 2400 for a curb capacity or freight curb capacity unit multi layered network node topology in one exemplary implementation of participating, transacting and/or trading curb capacity or freight curb capacity units in accordance with some embodiments. In some embodiments, the multi layered network node topology of participating, transacting and/or trading curb capacity or freight capacity configuration 2400 includes the following elements, or a subset or superset thereof:

- computing device unit GUI 210 to display method of multi layered network node topology for forward market of curb capacity and freight curb capacity units;
- hamburger menu toggle 270 to move between different application configurations;
- from node starting point 2401 of a multi layered network node topology for forward market of curb capacity and freight curb capacity units;
- to or destination node ending point 2402 of a multi layered network node topology for forward market of curb capacity and freight curb capacity units;
- date module 2403 in GUI 210 of an auction for a multi layered network node topology for forward market of transformed curb capacity and freight curb capacity units or securities;
- time module 2404 in GUI 210 of pickup and delivery of an auction for a multi layered network node topology for forward market of curb capacity and freight curb capacity units;
- go button 2405 to form an auction for a multi layered network node topology for forward market of transformed curb capacity and freight curb capacity units or securities;
- my routes button 2406 to quickly obtain common from 2401 or to 2402 points in an auction for a multi layered network node topology for forward market of transformed curb capacity and freight curb capacity units for a user on the system;
- multi-hub network 2407, 2408, 2409, 2410 which may form a single dual node auction 2407 to 2408 or 2407 to 2410 or any possible node combination or a multi-node auction series for a multi layered network node topology for forward market of curb capacity and freight curb capacity units for a user on the system.

In some implementations and embodiments, the GUI 210 transmits a from node 2401 and to node 2402 with instructions to the users 110 with a specific date 2403 and time 2404 of a multi layered network node topology for forward market of transformed curb capacity and freight units for a user on the system to perform an auction by pressing the Go button 2405. The system may use a plurality of constraints such as but not limited by cheapest route 1011, single mode of curb capacity 1012, multi method mode of curb capacity 1013, fastest route 1014, most scenic route 1015, highest rated route or highest rated driver 1016, most available route 1017, highest volume route 1018, most frequent route 1019, service level route 1020, security and safety of route 1021, group restricted email or group criteria 1022 to use any two node points 2407, 2408, 2409, 2410 or any combination of points 2407, 2408, 2409, 2410. In some embodiments the system may use no constraint, one constraint or a plurality of constraints to allow the user 110 to participate, transact or trade in a multi layered network node topology for forward market of curb capacity and freight units in an auction. In some implementations and embodiments, the auction for forward market transformed curb capacity or freight units or securities may be comprised of an auction between only two points or a plurality of points subject to a plurality of constraints. In some implementations and embodiments, the from or starting point or starting virtual hub may be 2407, but the system selects an auction between 2408 and 2409 rather than starting at 2407 because one or more constraints were selected to frame the auction for forward market curb capacity or freight units. In some implementations and embodiments, an auction may be comprised of multiple modes of curb capacity comprising a car ride curb capacity or freight unit auction between 2407 and 2408 points, followed by an airplane curb capacity or freight unit auction between 2408 and 2409, followed by a ship auction between 2410 and 2409 for curb capacity or freight units. In some implementations and embodiments, the various plurality of auctions may be displayed as one auction or a series of auctions. In some implementations and embodiments, auctions for a multi layered network node topology for a forward market of curb capacity and freight units may consist of any subset or superset of the aforementioned possibilities including any constraints 1000 or any plurality of modes 800.

Figure 25:
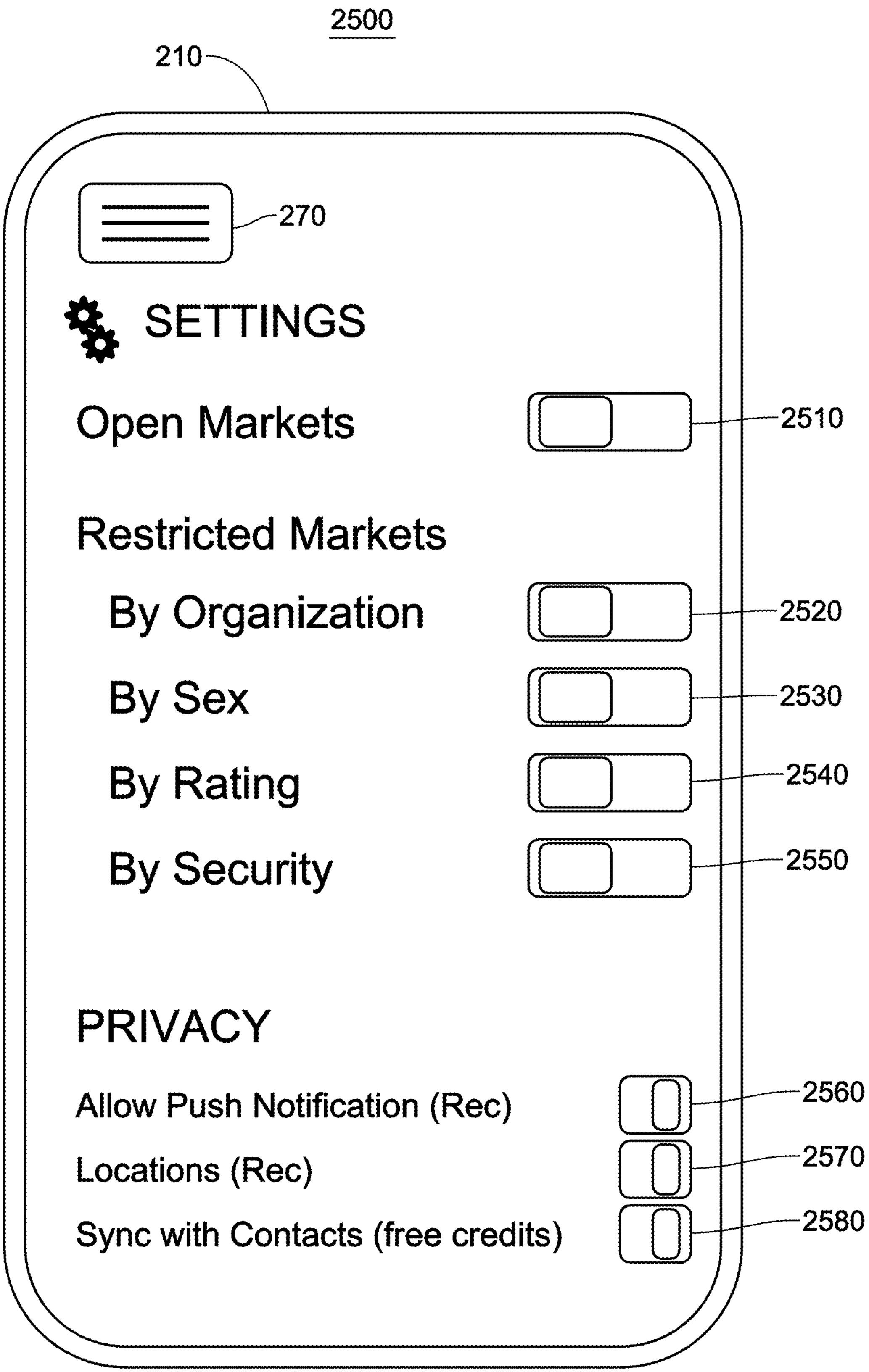
FIG. 25 illustrates an exemplary user interface to display open or restriction settings for auctions of the curb capacity or freight curb forward market system and method in accordance with some embodiments.

FIG. 25 illustrates an exemplary setting configuration 2500 for a curb capacity or freight curb capacity unit multi layered network node topology in one exemplary implementation of participating, transacting and/or trading curb capacity or freight capacity units in accordance with some embodiments. In some embodiments, the multi layered network node topology of participating, transacting and/or trading curb capacity or freight capacity configuration 2500 includes the following setting elements, or a subset or superset thereof:

- computing device unit GUI 210 to display method of multi layered network node topology for forward market of transformed curb capacity and freight curb capacity units or securities.
- hamburger menu toggle 270 to move between different application configurations;
- open markets setting toggle 2510 which allows a user to see all market participants of a given auction on a multi layered network node topology for a forward market of transformed curb capacity and freight curb capacity units or securities;
- restricted markets setting By Organization 2520, By Sex 2530, By Rating 2540, By Security 2550 or by any other restriction the user 110 defines which limit the auction participants for the user;
- privacy settings which restrict push notifications 2560, location information 2570; Sync with contacts 2580, or other privacy settings;

In some implementations and embodiments, a user 110 may select open markets 2510 which show every participant in a given auction for a multi layered network node topology for a forward market of curb capacity and freight units. In some embodiments, participants or users 110 may select to restrict the market view of the GUI such as 400 by organization email 2520 or by sex 2530 or by rating of driver 2540 or rating of user 2540 or by security 2550 or by a plurality of other restrictions but not limited to those restrictions. In some embodiments, users 110 may change privacy settings which restrict push notifications 2560, location settings 2570, Sync with Contacts settings 2580 or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market auction for a multi layered network node topology for a forward market of curb capacity and freight curb capacity units.

Figure 26:
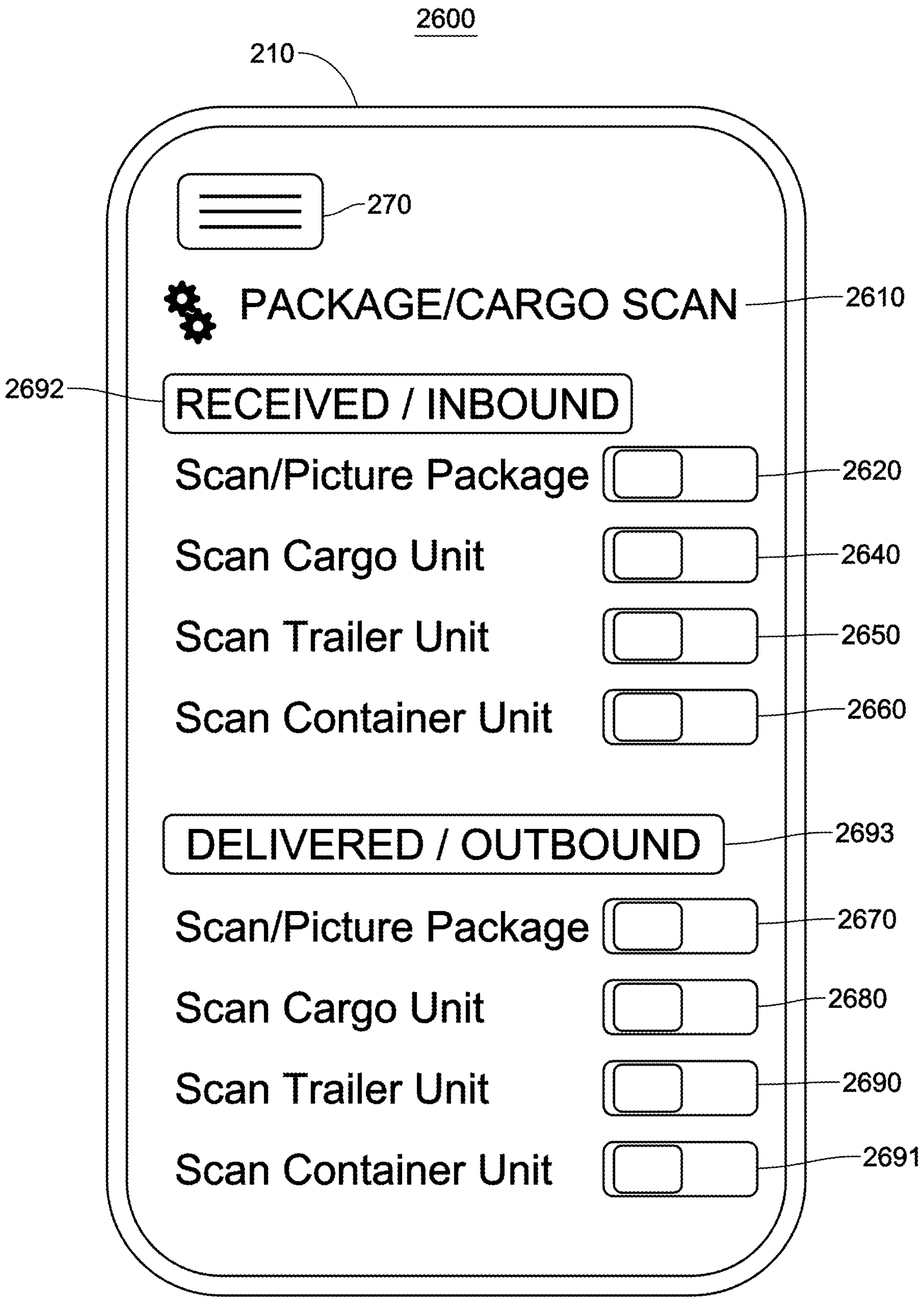
FIG. 26 illustrates an exemplary user interface to display inbound and outbound package, cargo or freight QR scans or UPC scans or pictures to document freight curb units in which are delivered against the forward curb market auction for two or more virtual curb hubs in accordance with some embodiments.

FIG. 26 illustrates an exemplary setting for a package or cargo scan configuration 2600 for a transformed curb capacity or freight curb capacity unit multi layered network node topology in one exemplary implementation of participating, transacting and/or trading curb capacity or freight capacity units in accordance with some embodiments. In some embodiments, the multi layered network node topology of participating, transacting and/or trading curb capacity or freight capacity configuration 2600 includes the following setting for a package or cargo scan elements, or a subset or superset thereof:

- computing device unit GUI 210 to display method of multi layered network node topology for forward market of transformed curb capacity and freight units.
- hamburger menu toggle 270 to move between different application configurations;
- package or Cargo Scan module 2610 to document the status and position of transformed forward market freight or curb capacity units or security;
- package or cargo Inbound or received module 2692 to scan a picture, universal product code barcode, QR code, or other transformed curb capacity or freight curb capacity unit identifier or security;
- package or cargo Inbound scan toggle switch 2620 to scan a picture, universal product code barcode, QR code, or other transformed curb capacity or freight curb capacity unit identifier or security;
- cargo unit Inbound scan toggle switch 2640 to scan a picture, universal product code barcode, QR code, or other transformed curb capacity or freight curb capacity unit identifier or security;
- trailer unit Inbound scan toggle switch 2650 to scan a picture, universal product code barcode, QR code, or other transformed curb capacity or freight curb capacity unit identifier or security;
- container unit Inbound scan toggle switch 2660 to scan a picture, universal product code barcode, QR code, or other transformed curb capacity or freight curb capacity unit identifier or security;
- package or cargo outbound or delivered module 2693 to scan a picture, universal product code barcode, QR code, or other transformed curb capacity or freight curb capacity unit or security identifier or security;
- package or cargo outbound or delivered scan toggle 2670 to scan a picture, universal product code barcode, QR code, or other transformed curb capacity or freight curb capacity unit identifier or security;
- cargo outbound or delivered scan toggle 2680 to scan a picture, universal product code barcode, QR code, or other transformed curb capacity or freight curb capacity unit identifier;
- trailer outbound or delivered scan toggle 2690 to scan a picture, universal product code barcode, QR code, or other transformed curb capacity or freight unit identifier;
- container unit outbound or delivered scan toggle 2691 to scan a picture, universal product code barcode, QR code, or other transformed curb capacity or freight unit identifier;

In some implementations and embodiments, a user 110 may select the package or cargo unit scan module 2610 to scan or take a picture of a package or cargo identification code such as a QR code, Uniform Product code or other identifying package or cargo characteristic. In some implementations and embodiments, the user 110 may select the inbound Scan/Picture Package toggle 2620 which captures the identification characteristic which may include QR Codes, Uniform Product Codes, Serial Numbers or other cargo identification characteristics of a package or cargo curb capacity or freight unit. In some implementations and embodiments, inbound cargo may include a larger unit structure than a package such as a crate or large movable unit with identification characteristics which may include QR codes, uniform product codes, serial numbers or other cargo identification characteristics, for such larger units a user 110 may use the scan cargo Unit toggle 2640 to capture the cargo identification characteristic for inbound receipt of the curb capacity or freight unit. In some embodiments, an inbound scan trailer unit toggle 2650 option may be used by a user 110 to instruct the system configuration that receipt of a large trailer unit such as an eighteen wheel trailer unit or smaller trailer, may be scanned to identify the curb capacity or freight unit. In some implementations and embodiments, an inbound Scan Container Unit 2660 toggle may be utilized to track the receipt or location of a shipping container. In some implementations and embodiments, a user 110 may select the outbound package or cargo unit scan module 2693 to scan or take a picture of a package or cargo identification code such as a QR code, Uniform Product code or other identifying package or cargo characteristic to confirm delivery to a delivery address of the curb capacity or freight curb capacity unit. In some embodiments, the user 110 may select the outbound Scan/Picture Package toggle 2670 which captures the identification characteristic of a package or cargo curb capacity or freight unit once the unit is delivered to the delivery address. In some implementations and embodiments, cargo may include a larger unit structure than a package such as a crate or large movable unit with identification characteristics which may include QR Codes, Uniform Product Codes, Serial Numbers or other cargo identification characteristics, for such larger units a user 110 may use the outbound Scan Cargo Unit toggle 2680 to capture the cargo identification characteristic for outbound receipt of the transformed curb capacity or freight unit or security. In some implementations and embodiments, an outbound scan trailer unit toggle 2690 option may be used by a user 110 to instruct the system configuration that delivery of a large trailer unit such as an eighteen wheel trailer unit or smaller trailer, may be scanned to identify the curb capacity or freight unit and confirm delivery. In some embodiments, an outbound Scan Container Unit 2691 toggle may be utilized to track the delivery or location of a shipping container which has been delivered. In some implementations and embodiments, transformed curb capacity or freight units or securities may be a subset or superset of the aforementioned in the formation of an open forward market auction for a multi layered network node topology for a forward market of transformed curb capacity and freight units or securities.

Figure 27:
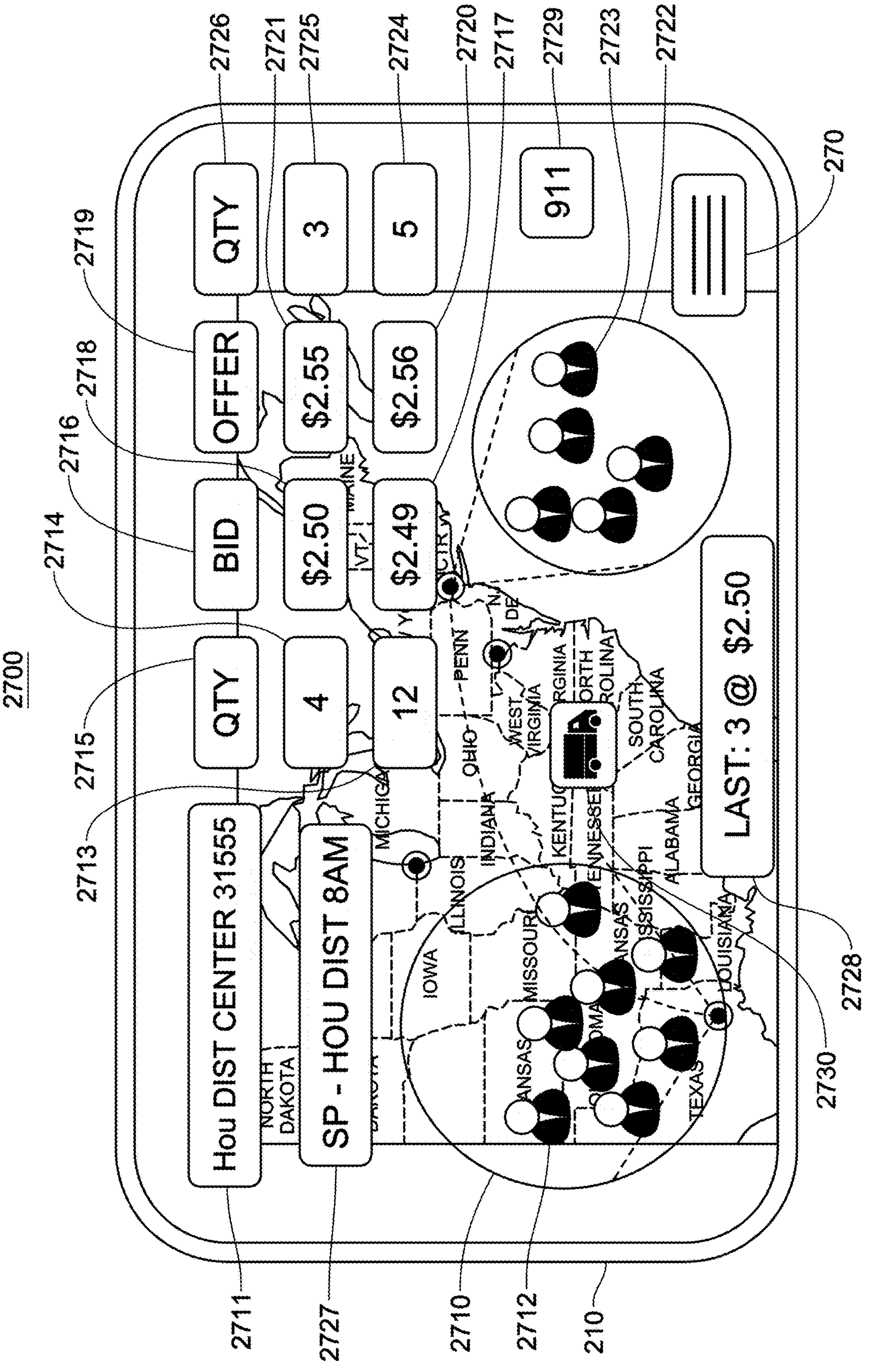
FIG. 27 illustrates an exemplary user interface to display a forward freight auction for a curb capacity unit a given hub or multi-hub combination in accordance with some embodiments.

FIG. 27 illustrates an exemplary setting for a package or cargo market configuration 2700 for a transformed curb capacity or freight curb capacity unit or security multi layered network node topology in one exemplary implementation of participating, transacting and/or trading transformed curb capacity or freight capacity units or securities in accordance with some embodiments. In some embodiments, user interface 210 includes the following elements, or a subset or superset thereof:

exemplary virtual hub combination from a shipping center location (a data transformation) 2711;

exemplary virtual hub origin/from location 2710 with users or freight originators 2712 within the virtual hub location 2710 (a data transformation);

exemplary specification summary of the market, level of service and time of delivery commencement 2727 (a data transformation);

exemplary mode of ground curb capacity or freight capacity type 2730 (a data transformation);

exemplary transaction summary of the last trades quantity and price 2728;

exemplary virtual hub destination/to location 2722 and user who is being delivered on the curb capacity or freight capacity unit 2723 (a data transformation);

exemplary bid/buy quantity title header 2715 for an exemplary virtual curb capacity or freight curb capacity unit hub market (a data transformation);

exemplary bid/buy price title header 2716 for an exemplary virtual curb capacity or freight curb capacity hub market (a data transformation);

exemplary offer/sell price title header 2719 for an exemplary virtual curb capacity or freight curb capacity hub market (a data transformation);

exemplary offer/sell quantity title header 2726 for an exemplary virtual curb capacity or freight hub market (a data transformation);

exemplary bid/buy quantity 2414 for the best bid quantity from a plurality of users 110 for an exemplary respective curb capacity or freight curb capacity virtual hub combination 2711 (a data transformation);

exemplary bid/buy quantity 2713 for the second-best bid quantity from a plurality of users 110 for an exemplary respective curb capacity or freight capacity virtual hub combination 2711 (a data transformation);

exemplary bid/buy price 2718 for the best bid price from a plurality of users 110 for an exemplary respective curb capacity or freight capacity virtual hub combination 2711 (a data transformation);

exemplary bid/buy price 2717 for the second-best bid price from a plurality of users 110 for an exemplary respective curb capacity or freight capacity virtual hub combination 2711 (a data transformation);

exemplary offer/sell price 2721 for the best offer price from a plurality of users 110 for an exemplary respective curb capacity or freight capacity virtual hub combination 2711 (a data transformation);

exemplary offer/sell price 2720 for the second-best offer price from a plurality of users 110 for an exemplary respective curb capacity or freight capacity virtual hub combination (a data transformation) 2711;

exemplary offer/sell quantity 2725 for the best offer quantity from a plurality of users 110 for an exemplary respective curb capacity or freight capacity virtual hub combination (a data transformation) 2711;

exemplary offer/sell quantity 2724 for the second-best offer quantity from a plurality of users 110 for an exemplary respective curb capacity or freight capacity virtual hub combination (a data transformation) 2711;

exemplary safety dispatch “911” button 2729 to enact video and audio recording of the user 110 environment and dispatch of that information to authorities and system servers.

exemplary hamburger menu button 270 to move back to menu options and settings away from the participation, transaction, trading auction GUI 210 embodiment.

In some embodiments, the user 110 may enter a transaction quantity and price for curb capacity or freight capacity units to participate, transact and/or trade by the GUI 210 detecting user 110 contact or audio interface with a bid/buy price 2718 or offer/sell price 2721. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub combination 2711. A plurality of prices and markets may be presented based on a plurality of transformed contract specifications. In some embodiments, the best bid/buy price 2718 may be moving up in price or down in price depending on the market conditions at any given time. In some embodiments the last trade or last transacted price for a given specification is listed to help the user 110 understand how the market is moving so that the user 110 may submit a competitive offer/selling price 2721 or bid/buying price 2718. In some embodiments, users 110 may adjust settings of the GUI 210 to show more bid/buying prices 2717 or more offer/selling prices 2720. In some embodiments the matrix of market quantities and prices 2713, 2714, 2715, 2716, 2717, 2718, 2719, 2720, 2721, 2724, 2725, 2726 may be referred to as market depth in the GUI 210 embodiment. In some embodiments the number of users 110 may be displayed as user icons 2712 or 2723 for the amount of people logged in which desire to transact, trade or participate in a given virtual hub 2710 to virtual hub 2722 combination for curb capacity or freight units. In some embodiments, users 110 may select the curb capacity mode 2730 such that the user allows a market for only one form of transformed curb capacity or freight capacity as a commodity or the user 110 may allow the system to show multiple forms of curb capacity or freight capacity between two virtual curb capacity hubs 2710, 2711, 2722. In some embodiments the GUI 210 may detect a user 110 selecting the 911 button 2729 which may activate voice and video recording functions on the mobile or stationary device 111 and transmit the data with a confirmation from the user 110 to the authorities and system servers to provide enhanced security while participating, transacting or trading forward transformed curb capacity or freight as a commodity or security. In some embodiments the user may toggle between the GUI 210 market view screen in FIG. 4 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 111 which then transmits transformed curb capacity or freight capacity data through the network 214 or wireless GPS network 215 to call upon instruction routines and instruction sub-routines on the curb capacity forward market database server 271, virtual hub database server 223, network member database server 222, map routing servers 220, no arbitrage condition database server 220 and/or instructions in the memory of the cloud and local CPUs 210 which all interface together to make one system which may deliver curb capacity units to users 110 from and to a plurality of virtual hubs 2710, 2722 with a plurality of specifications at specific market prices.

Figure 28:
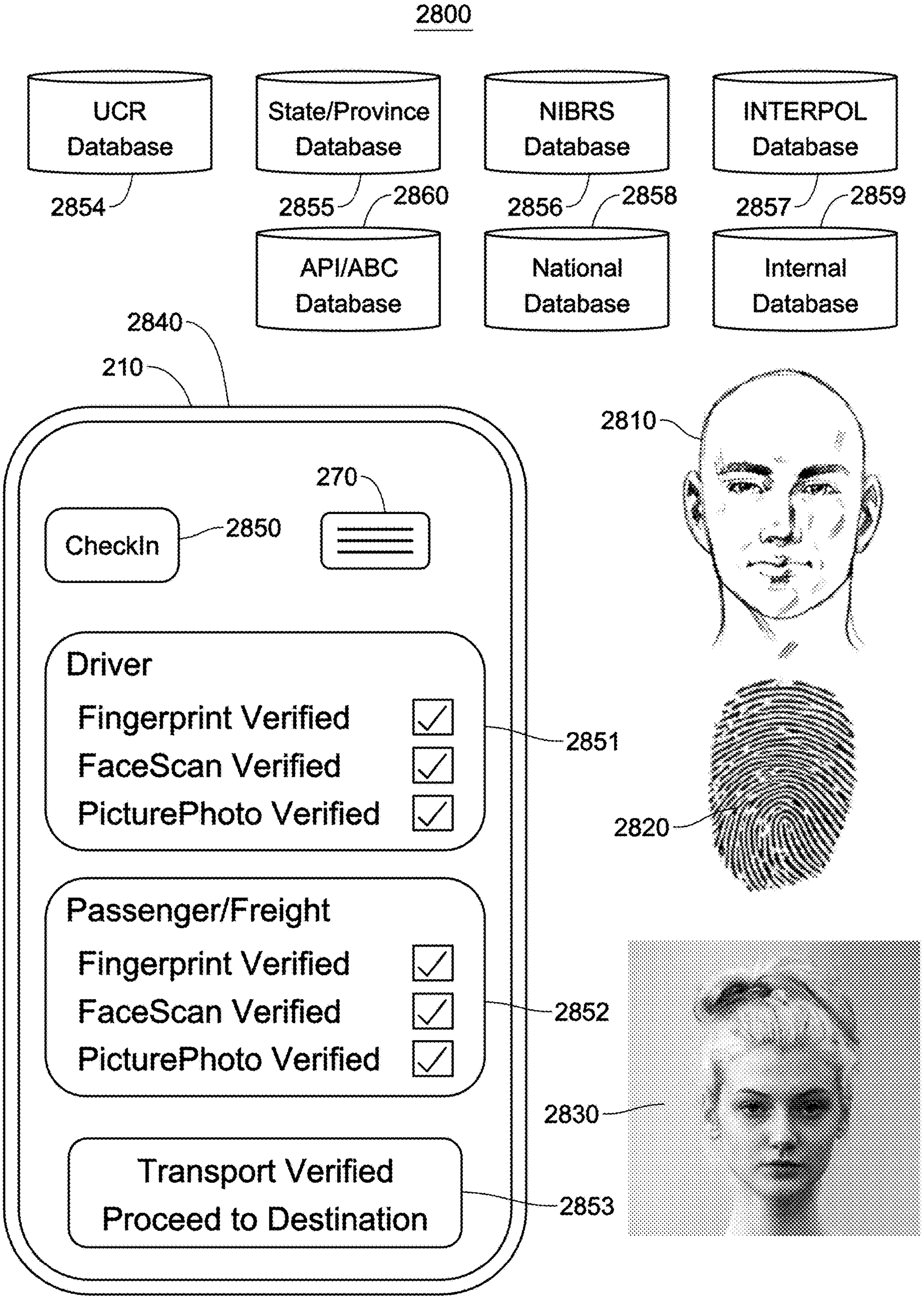
FIG. 28 illustrates an exemplary user interface and database configuration which allow user identity or criminal record or transaction history to be verified in accordance with some embodiments.

FIG. 28 illustrates an exemplary check in and security database configuration 2800 for a curb capacity curb capacity or freight curb capacity unit multi layered network node topology in one exemplary implementation of participating, transacting and/or trading transformed curb capacity or freight capacity units or securities in accordance with some embodiments. In some embodiments, the multi layered network node topology of participating, transacting and/or trading curb capacity or freight capacity configuration 2800 includes the following security configuration elements, or a subset or superset thereof:

- exemplary uniform crime reporting ("UCR") database 2854 from international agencies who report crime;
- exemplary International State or Provincial crime reporting database 2855 from international governments who report crime;
- exemplary International National Incident Based Reporting System ("NIBRS") crime reporting database 2856 from international governments who report crime;
- exemplary Interpol crime reporting database 2857 from international governments who report crime which connects National Central Bureaus ("NCBs");
- exemplary International application program interface and ABC ("API/ABC") crime reporting database 2860 from international governments who report crime;
- exemplary national crime reporting database 2858 from international governments who report crime;
- exemplary internal system crime reporting database 2859 from crimes which occurred on system;
- exemplary facial scan to identify user 2810 against a plurality of crime databases;
- exemplary fingerprint scan to identify user 2820 against a plurality of crime databases;
- exemplary photo or photo scan to identify user 2830 against a plurality of crime databases;
- exemplary voice scan to identify user 2810 against a plurality of crime databases;
- exemplary computing device unit GUI 210 to display method of multi layered network node topology for forward market of curb capacity and freight units.
- hamburger menu toggle 270 to move between different application configurations;
- exemplary driver or freight transport or freight or transport seller unit user interface 2851 to confirm identity verification against a plurality of crime databases;
- exemplary passenger unit or freight curb capacity unit user interface 2852 to confirm identity verification against a plurality of crime databases;
- exemplary handshake verification user interface 2853 to confirm both buyer and seller of curb capacity or freight units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, curb capacity or freight curb capacity unit security may be a subset or superset of the aforementioned in the formation of an open forward market auction for a multi layered network node topology for a forward market of curb capacity and freight units. Such security checks are standard in airports, but they are not automated and they are not utilized in other modes of curb capacity which degrades the overall safety of other curb capacity methods if they are not utilized. In some embodiments, the check in instructions may reject a user from confirmed verified transport if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to transport verified status 2853 in the system.

Figure 29:
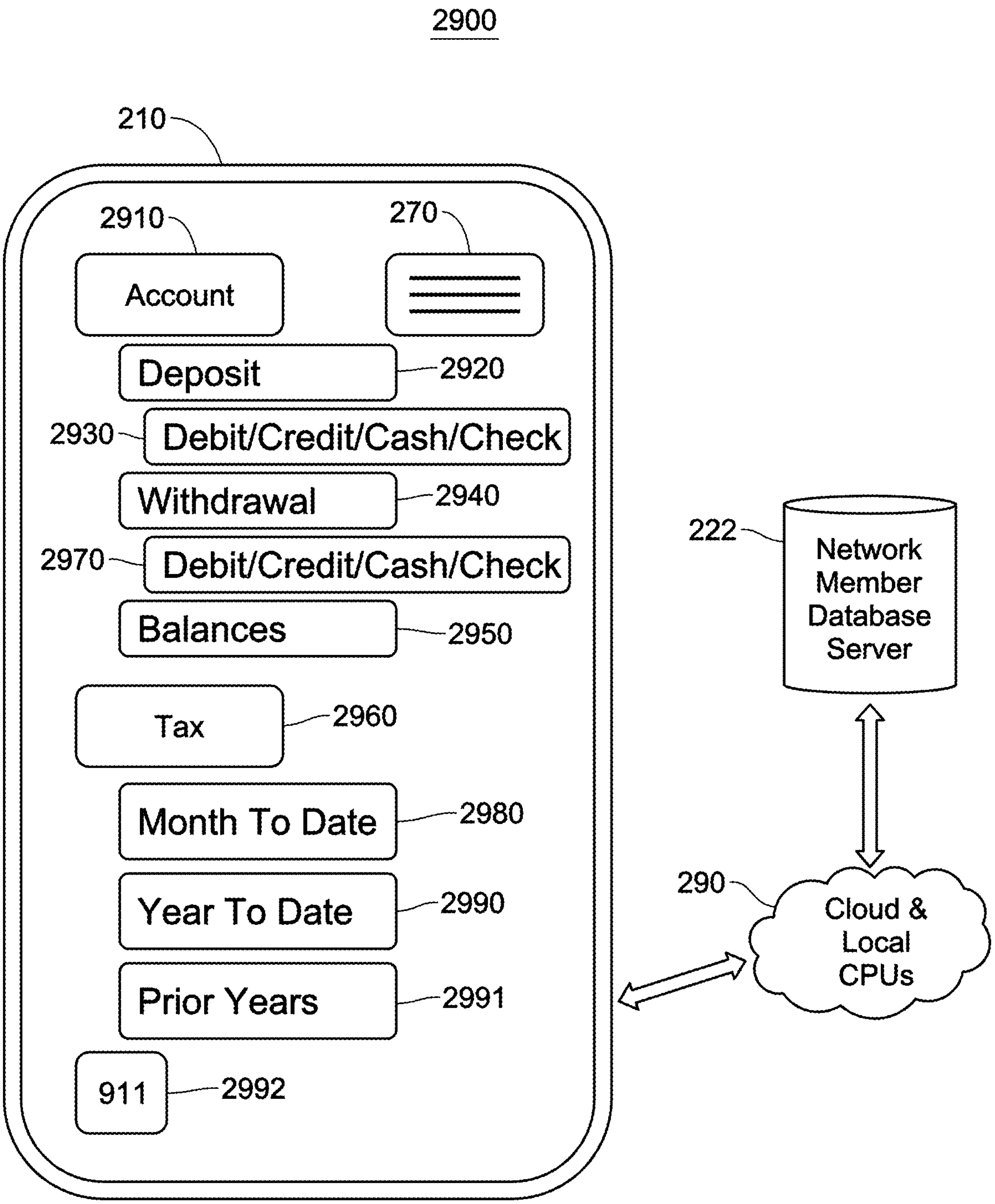
FIG. 29 illustrates an exemplary user interface and database configuration for account balances and payment for the forward market auctions of curb capacity and freight capacity between virtual hubs in accordance with some embodiments.

FIG. 29 illustrates an exemplary user accounting configuration 2900 for a transformed curb capacity or freight unit or security multi layered network node topology in one exemplary implementation of participating, transacting and/or trading transformed curb capacity or freight capacity unit auctions in accordance with some embodiments. In some embodiments, the multi layered network node topology of participating, transacting and/or trading transformed curb capacity or freight capacity configuration 2900 includes the following accounting elements, or a subset or superset thereof:

- computing device unit GUI 210 to display method of multi layered network node topology for forward market of curb capacity and freight curb capacity units;
- exemplary hamburger menu toggle 270 to move between different application configurations;
- exemplary account button 2910 to edit or confirm user account data;
- exemplary deposit button 2920 to add transaction funds or transaction currency or transaction balances to the user account;
- exemplary deposit method button 2930 to add transaction funds or transaction currency or transaction balances to the user account through Debit, Credit, Cash, Check, virtual currency, digital currency or a plurality of other payment methods;
- exemplary withdrawal button 2940 to send transaction funds or transaction currency or transaction balances to the user account in a different institution;
- exemplary withdrawal method button 2970 to send transaction funds or transaction currency or transaction balances to the user account at a different institution through Debit, Credit, Cash, Check, virtual currency, digital currency or a plurality of other payment methods;
- exemplary balances button 2950 to confirm user account balances;
- exemplary tax button 2960 to track user account activity for taxation reporting;
- exemplary month to date tax reporting button 2980;
- exemplary year to date tax reporting button 2990;
- exemplary prior year tax reporting button 2991;
- exemplary "911" security button 2991;
- exemplary Network Member Database Server 160;
- exemplary cloud and CPU and Network configuration 190 to send and receive network member account data;

In some embodiments, user account 2910 data may be displayed with voice or screen or non-screen computing devices with instructions from the GUI 210 in accordance with instructions on the method and system. In some embodiments, user deposit 2920 data may be displayed with voice or screen or non-screen computing devices with instructions from the GUI 210 in accordance with instructions on the method and system. In some embodiments, user deposit method 2930 data such as Debit, Credit, Cash, Check, virtual currency, digital currency or a plurality of other payment methods may be displayed with voice or screen or non-screen computing devices with instructions from the GUI 210 in accordance with instructions on the method and system. In some embodiments, user withdrawal 2940 data may be displayed with voice or screen or non-screen computing devices with instructions from the GUI 210 in accordance with instructions on the method and system. In some embodiments, user withdrawal method 2970 data such as Debit, Credit, Cash, Check, virtual currency, digital currency or a plurality of other payment methods may be displayed with voice or screen or non-screen computing devices with instructions from the GUI 210 in accordance with instructions on the method and system to place money in the system account into a different institution specified by the user 110. In some embodiments, user balances 2950 data may be displayed with voice or screen or non-screen computing devices with instructions from the GUI 210 in accordance with instructions on the method and system. In some implementations and embodiments, user tax button 2960 data may be displayed with voice or screen or non-screen computing devices with instructions from the GUI 210 in accordance with instructions on the method and system. In some embodiments, user month to date tax data button 2980, year to date tax data button 2990, prior year tax data button 2991 may be displayed with voice or screen or non-screen computing devices with instructions from the GUI 210 in accordance with instructions on the method and system. In some implementations and embodiments, the accounting and tax information may be stored in the network member database server 160 and transmitted through the cloud, network and CPUs 190 to the GUI computing device 210. In some embodiments, curb capacity or freight unit accounting and fund interfaces may be a subset or superset of the aforementioned in the formation of an open forward market auction for a multi layered network node topology for a forward market of curb capacity and freight units.

Figure 30:
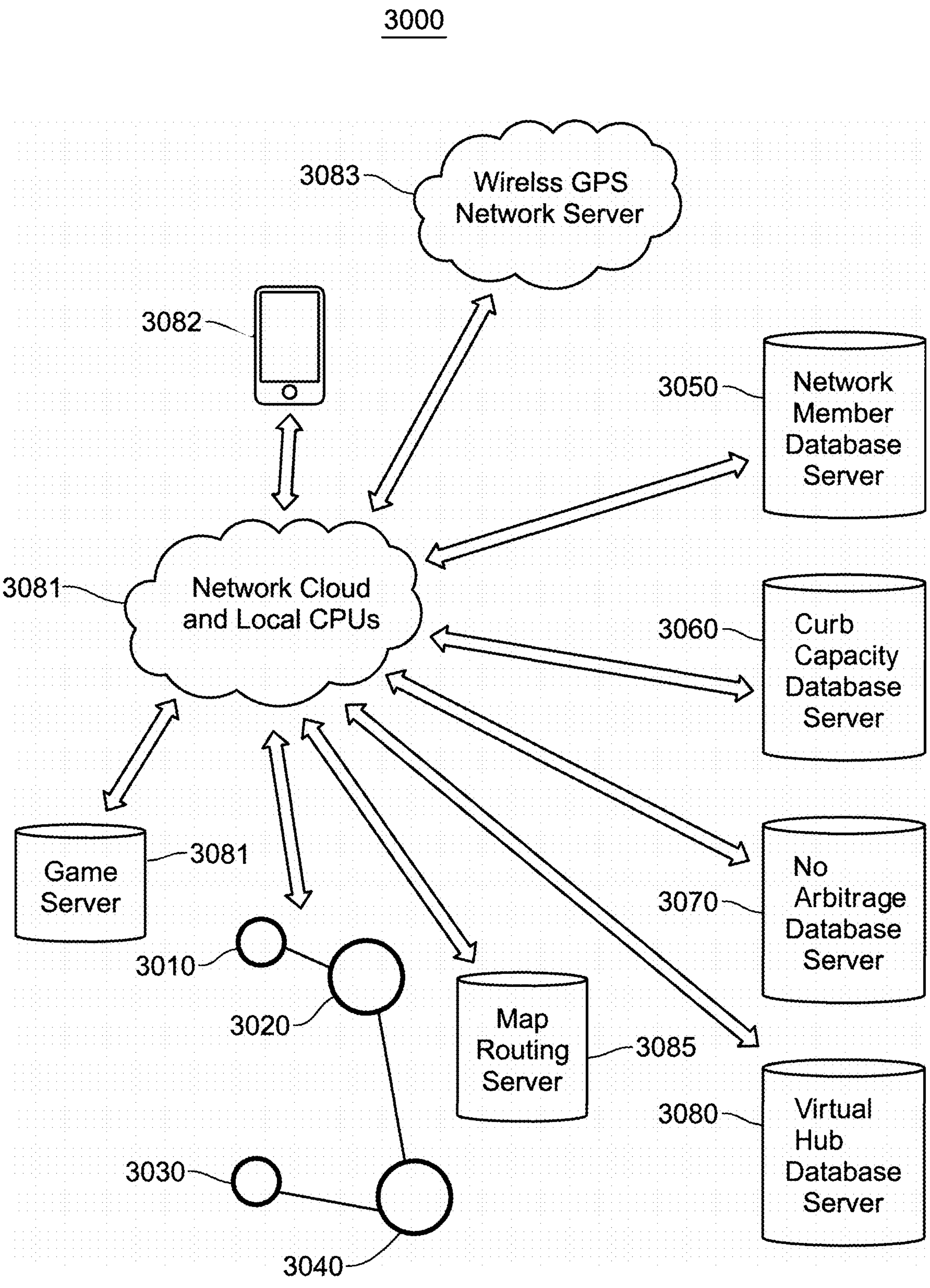
FIG. 30 illustrates an exemplary method and system configuration of multiple virtual curb hub topology auctions in accordance with some embodiments.

FIG. 30 illustrates an exemplary network configuration 3000 for a curb capacity or freight curb capacity unit multi layered network node topology in one exemplary implementation of participating, transacting and/or trading curb capacity or freight capacity unit auctions in accordance with some embodiments. In some embodiments, the multi layered network node topology of participating, transacting and/or trading curb capacity or freight capacity configuration 3000 includes the following accounting elements, or a subset or superset thereof:

- exemplary wireless GPS network and server 3083;
- exemplary Wireless computing device that is audio, video, screen or non-screen interfaced 3082;
- exemplary network member database server 3050;
- exemplary curb capacity forward market database server 3060;
- exemplary no arbitrage condition database server 3070;
- exemplary virtual hub database server 3080;
- exemplary network, network cloud, and local CPUs 3081;
- exemplary network multi layered network virtual hub node topology for forward market curb capacity of freight unit auctions 3010, 3020, 3030, 3040.

In some implementations and embodiments, the network topology 3010 may utilize a voice or screen or non-screen computing device 3082 to interface with system and method instructions over a network and network cloud and networked CPUs 3081 to use instructions on CPUs to order a constrained or unconstrained virtual hub network topology auction over two or more virtual hub nodes 3010, 3020, 3030, 3040 over one or multiple modes of curb capacity or freight with instructions and data from the virtual hub database server 3080, the no arbitrage condition database server 3070, the curb capacity forward market database server 3060, the network member database server 3050 and the wireless GPS network server 3083. Network data may be displayed with voice or screen or non-screen computing devices with instructions from the GUI 210 in accordance with instructions on the method and system.

Figure 31:
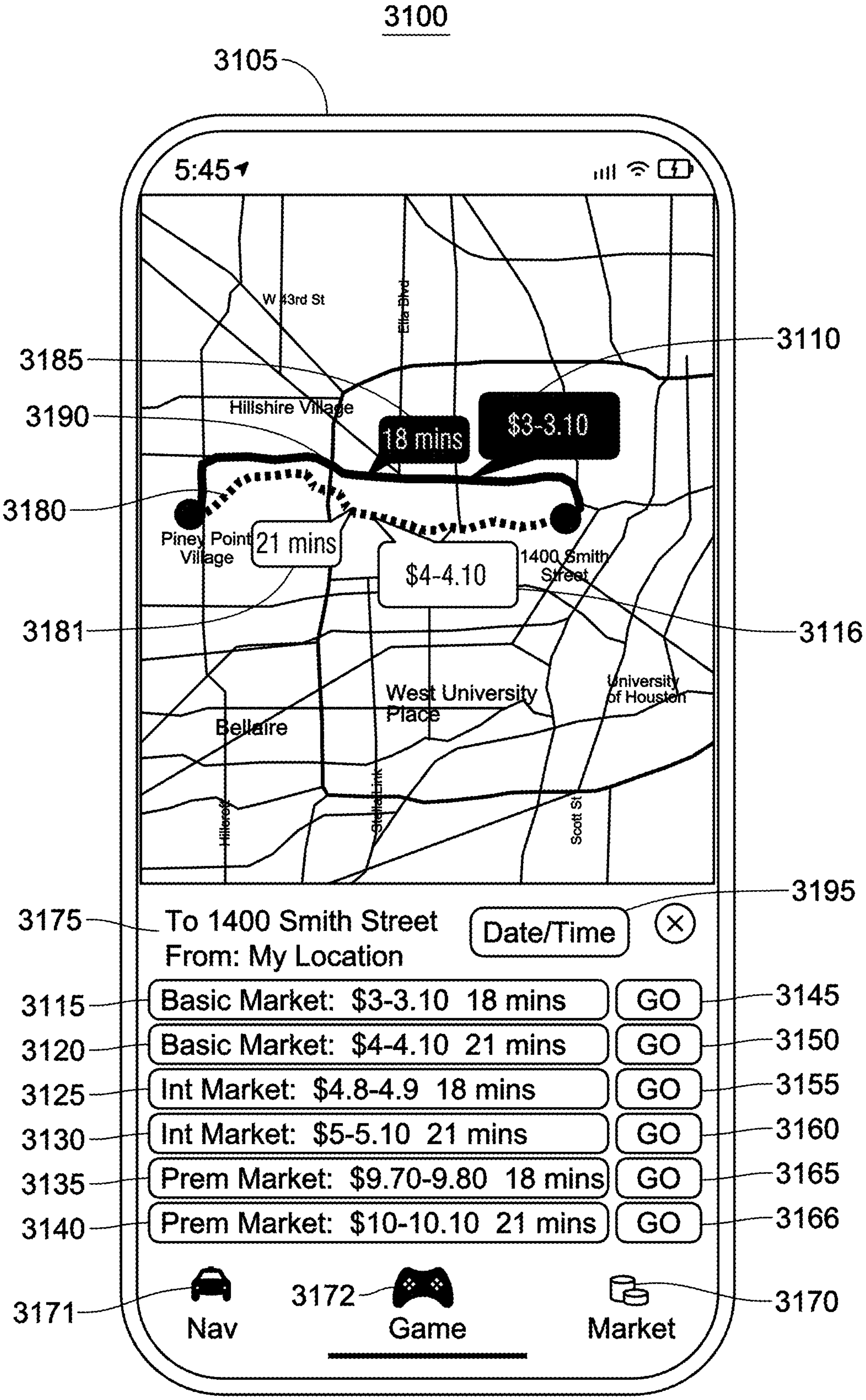
FIG. 31 illustrates an exemplary method and system configuration of the integration interface with GPS map routing such as TomTom or Apple Maps or other third party map routing software applications in accordance with some embodiments.

FIG. 31 illustrates an exemplary network configuration 3100 integrating the disclosed method and system as a layer on a traditional third party map software. In some embodiments, the multi layered network node topology of participating, transacting and/or trading transformed curb capacity or freight capacity configuration 3100 includes the following accounting elements, or a subset or superset thereof:

- exemplary computing device 3105;
- exemplary route input by user 3175;
- exemplary route node structure 3190 to satisfy user route request 3175;
- exemplary alternative route node structure 3180 to satisfy user route request 3175 with associated time 3180;
- exemplary time estimate 3185 for route 3190;
- exemplary live auction price value 3110 for route 3190;
- exemplary alternative live auction price value 3115 for route 3180;
- exemplary navigation mode button 3171;
- exemplary game mode button 3172;
- exemplary date and time modification button 3195 for disclosed route 3175;
- exemplary transformed forward curb capacity unit auction value and modification feed 3115 and selection GO 3145 button to transact the given route with a basic curb capacity unit or security feature and characteristic for one route 3190 that satisfies the user route request 3175;
- exemplary alternative transformed forward curb capacity unit auction value and modification feed 3120 and selection GO 3150 button to transact the given route with a basic curb capacity unit or security feature and characteristic for one alternative route 3180 that satisfies the user route request 3175;
- exemplary transformed forward curb capacity unit auction value and modification feed 3125 and selection GO 3155 button to transact the given route with an intermediate curb capacity unit or security feature and characteristic for one route 3190 that satisfies the user route request 3175;
- exemplary alternative transformed forward curb capacity unit auction value and modification feed 3130 and selection GO 3160 button to transact the given route with an intermediate curb capacity unit or security feature and characteristic for one alternative route 3180 that satisfies the user route request 3175;
- exemplary transformed forward curb capacity unit auction value and modification feed 3135 and selection GO 3165 button to transact the given route with a premium curb capacity unit or security feature and characteristic for one route 3190 that satisfies the user route request 3175;
- exemplary alternative transformed forward curb capacity unit auction value and modification feed 3140 and selection GO 3165 button to transact the given route with a premium curb capacity unit or security feature and characteristic for one alternative route 3180 that satisfies the user route request 3175;
- exemplary market display feature 3170 as an overlay onto map routing for user requests 3175;

In some embodiments, map routing interfaces 3105 such as Apple Maps or TomTom or another third party, may integrate the disclosed method and system to display the transformed forward curb capacity unit or security market auction price along a various route given various virtual hub topologies 1800 over the user 110 defined route request 3175. The computing device 3105 may disclose over visual, audio or other communication methods the forward transformed curb capacity unit auction price 3110 on a given route 3190. In yet other embodiments, the disclosed curb capacity unit transformation may communicate the forward transformed curb capacity unit or security auction price 3115 of an alternative route 3180 such that a user may select either route 3190 or 3180 based on the disclosed method and system price 3110 or 3115 which was generated by instructions from a plurality of users between two virtual hubs on the user defined route 3175. The disclosed forward market curb capacity unit auction may be communicated on an on demand basis representing the current time and day or on a forward basis by changing the Date/Time 3195 user interface button feature to represent the then current market pricing for future time intervals on a plurality of given routes 3190 and 3180 along the user requested virtual hub combination 3175. Virtual hubs may represent the end points of a route defined by the user 3175 or virtual hubs may represent points along a given route but not including the endpoints or virtual hubs may represent points not along the route the user defined 3175. Virtual hub combinations transform curb capacity units into a forward market which allow users of the method and system to transact in the physical market by either delivering transformed curb capacity units as a driver of a vehicle or capacity holder or by receiving them as a passenger or package if the unit is a package rather than a person. A curb capacity unit or security represents space which may be filled by a person or a package. Further the forward transformed curb capacity unit market auction 3170 overlay may be a layer on traditional GPS map routing software or as an alternative to time based routing or mileage based routing. The forward curb capacity unit market specification such as "Basic" 3115, 3120 or "Intermediate" 3125, 3130 or "Premium" 3135, 3140 may also have a plurality of other characteristics or levels which form the basis of a fungible transformed contract or substitutable contract between users which is exchangeable with the same terms and conditions if one user is unable to fulfil their contract obligations for the transformed curb capacity unit. In some embodiments, the navigation mode 3171 may move the user to turn by turn directions along the price based navigation route 3190. In some embodiments, the game mode 3172 may move the user to a game based overlay on the price based navigation route 3190. In some embodiments, the market mode 3170 may move the user to a market based overlay on the priced based navigation route 3190.

The disclosed method and system of a transformed curb capacity unit may be fully functional as a layer in map routing software 3100 or as a stand alone application 200, 300, etc.

In some implementations and embodiments, the disclosed method and system curb capacity unit auction price 3110 and 3115 has two prices or more in other embodiments. Two route prices 3110 are disclosed at $3 and $3.10. The former price of $3 is the price where a user is willing to buy or pay for a curb capacity unit along the given route 3190. The later price of $3.10 is the price at which a user is willing to sell a curb capacity unit along the given route 3190. The instructions of the auction may match the highest bidding price of $3 with the lowest selling price in the price queue when the prices match. In other words, in the exemplary embodiment, if a user wanted to sell a curb capacity unit at the current forward market auction queue 3110 on route 3190, the user would enter a price of $3 which is the current highest bidding price in the method and system queue 3110. By way of further example, another user may desire to buy a curb capacity unit on the forward transformed curb capacity unit auction method and system on route 3190, to match, the user would enter a price of $3.10 which is the lowest selling price of a seller on the forward market curb capacity unit auction method and system.

Figure 32:
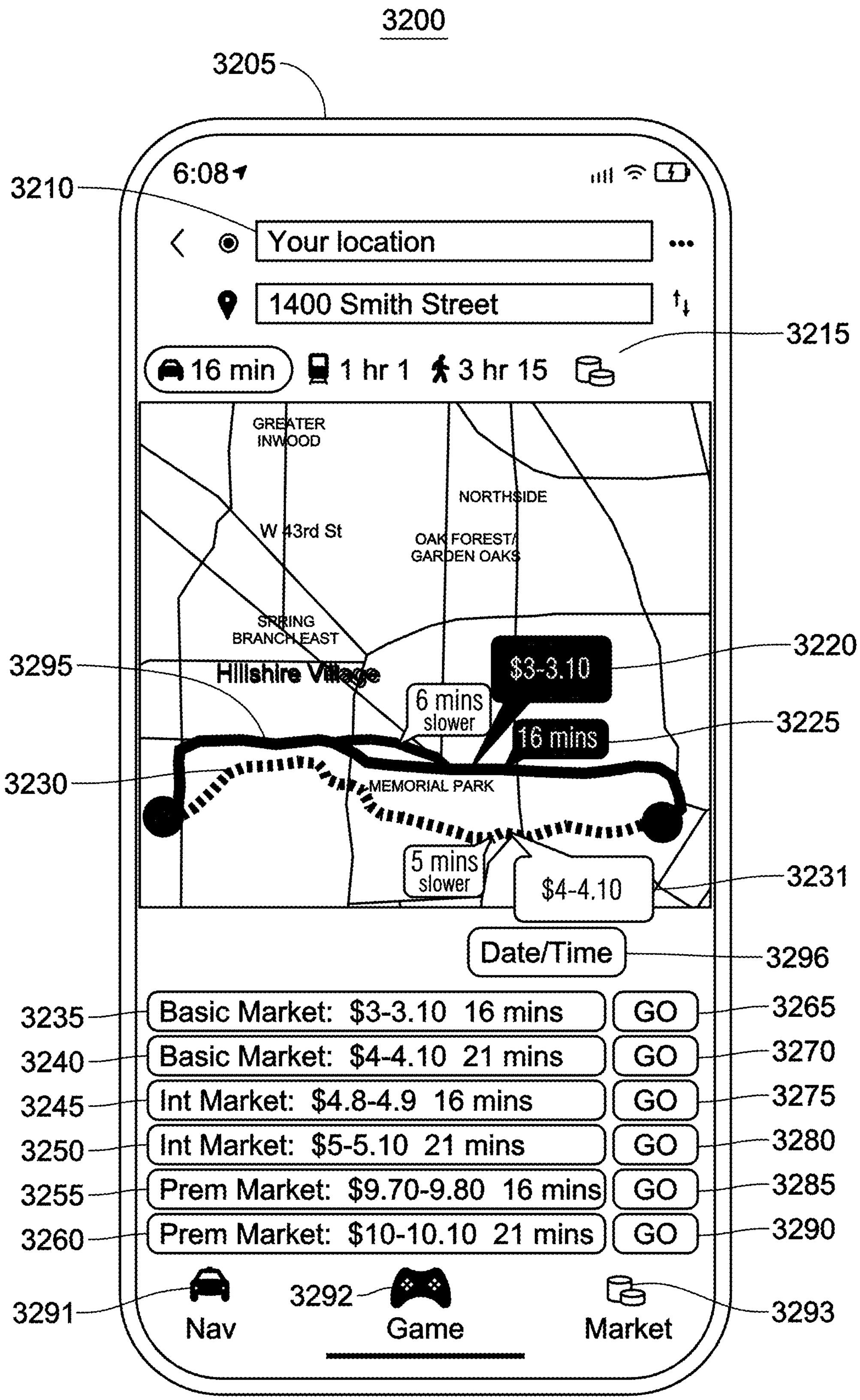
FIG. 32 illustrates an exemplary method and system configuration of the integration interface with GPS map routing such as Google Maps or other third party map routing software applications in accordance with some embodiments.

FIG. 32 illustrates another exemplary network configuration 3200 integrating the disclosed method and system as a layer on another traditional third party map software. In some embodiments, the multi layered network node topology of participating, transacting and/or trading curb capacity or freight capacity configuration 3200 includes the following accounting elements, or a subset or superset thereof:

- exemplary computing device 3205;
- exemplary route input by user 3210;
- exemplary route node structure 3295 to satisfy user route request 3210;
- exemplary alternative route node structure 3230 to satisfy user route request 3210 with associated time;
- exemplary time estimate 3225 for route 3295;
- exemplary navigation mode button 3291;
- exemplary game mode button 3292;
- exemplary market mode button 3293;
- exemplary live auction price value 3220 for route 3295;
- exemplary alternative live auction price value 3230 for route 3230;
- exemplary date and time modification button 3296 for disclosed route 3210;
- exemplary transformed forward curb capacity unit or security auction value and modification feed 3235 and selection GO 3265 button to transact the given route with a basic curb capacity unit feature and characteristic for one route 3295 that satisfies the user route request 3210;
- exemplary alternative transformed forward curb capacity unit or security auction value and modification feed 3240 and selection GO 3270 button to transact the given route with a basic curb capacity unit feature and characteristic for one alternative route 3230 that satisfies the user route request 3210;
- exemplary transformed forward curb capacity unit or security auction value and modification feed 3245 and selection GO 3275 button to transact the given route with an intermediate curb capacity unit feature and characteristic for one route 3295 that satisfies the user route request 3210;
- exemplary alternative transformed forward curb capacity unit or security auction value and modification feed 3250 and selection GO 3280 button to transact the given route with an intermediate curb capacity unit feature and characteristic for one alternative route 3230 that satisfies the user route request 3210;
- exemplary transformed forward curb capacity unit or security auction value and modification feed 3255 and selection GO 3285 button to transact the given route with a premium curb capacity unit feature and characteristic for one route 3295 that satisfies the user route request 3210;
- exemplary alternative transformed forward curb capacity unit or security auction value and modification feed 3260 and selection GO 3290 button to transact the given route with a premium transformed curb capacity unit feature and characteristic for one alternative route 3230 that satisfies the user route request 3210;
- exemplary market display feature 3215 as an overlay onto map routing for user requests 3210;

In some implementations and embodiments, map routing interfaces 3205 such as Google Maps or Garmin or another third party navigation method, may integrate the disclosed method and system to display the transformed forward curb capacity unit or security market auction price along a various route given various virtual hub topologies 1800 over the user 110 defined route request 3210. In some implementations and embodiments, the computing device 3205 may disclose over visual, audio or other communication methods the forward transformed curb capacity unit or security auction price 3220 on a given route 3295. In yet other embodiments, the disclosed curb capacity unit transformation may communicate the forward transformed curb capacity unit auction price 3230 of an alternative route 3230 such that a user may select either route 3295 or 3230 based on the disclosed method and system price 3230 or 3220 which was generated by instructions from a plurality of users between two virtual hubs on the user defined route 3210 and instructions to generate a price queue for buyers and sellers of curb capacity units long given routes. In some implementations and embodiments, the user(s) 110 may alter the date 3296 such that the transformed curb capacity unit or security may be updated with user 110 submitted prices 3235 for forward looking time periods. In some implementations and embodiments, the disclosed forward market transformed curb capacity unit or security auction may be communicated on an on demand basis representing the current time and day or on a forward basis by changing the date/time 3296 user interface button feature to represent the then current market pricing for future time intervals on a plurality of given routes 3295 and 3230 along the user requested virtual hub combination 3210. Virtual hubs may represent the end points of a route defined by the user 3210 or virtual hubs may represent points along a given route but not including the endpoints or virtual hubs may represent points not along the route the user defined 3210. Virtual hub combinations transform curb capacity units or securities into a forward market which allow users of the method and system to transact in the physical market by either delivering transformed curb capacity units as a driver of a vehicle or capacity holder or by receiving them as a passenger or package if the unit is a package rather than a person. A transformed curb capacity unit represents space which may be filled by a person or a package or vehicle or ship or transportation device. In some implementations and embodiments, further the forward transformed curb capacity unit market auction 3215 overlay may be a layer on traditional GPS map routing software as an alternative to time based routing. The forward curb capacity unit market specification such as “Basic” 3235, 3240 or “Intermediate” 3245, 3250 or “Premium” 3255, 3260 may also have a plurality of other characteristics or levels which form the basis of a fungible contract or substitutable contract between users which is exchangeable with the same terms and conditions if one user is unable to fulfil their contract obligations for the transformed curb capacity unit. In some implementations and embodiments, the navigation mode 3291 may move the user to turn by turn directions along the price based navigation route 3295. In some implementations and embodiments, the game mode 3292 may move the user to a game based overlay on the price based navigation route 3295. In some embodiments, the market mode 3293 may move the user to a market based overlay on the priced based navigation route 3295.

The disclosed method and system of a transformed curb capacity unit may be fully functional as a layer in map routing software 3200 or as a stand alone application 200, 300, etc.

In some implementations and embodiments, the disclosed method and system transformed curb capacity unit or security auction price 3220 and 3230 has two prices or more in other embodiments. Two route prices 3220 are disclosed at $3 and $3.10. The former price of $3 is the price where a user is willing to buy or pay for a curb capacity unit along the given route 3295. The later price of $3.10 is the price at which a user is willing to sell a curb capacity unit along the given route 3295. The instructions of the auction may match the highest bidding price of $3 with the lowest selling price in the price queue when the prices match. In other words, in the exemplary embodiment, if a user wanted to sell a curb capacity unit at the current forward market auction queue 3220 on route 3295, the user would enter a price of $3 which is the current highest bidding price in the method and system queue 3220. By way of further example, another user may desire to buy a transformed curb capacity unit on the forward transformed curb capacity unit or security auction method and system on route 3295, to match, the user would enter a price of $3.10 which is the lowest selling price of a seller on the forward market transformed curb capacity unit auction method and system.

Figure 33:
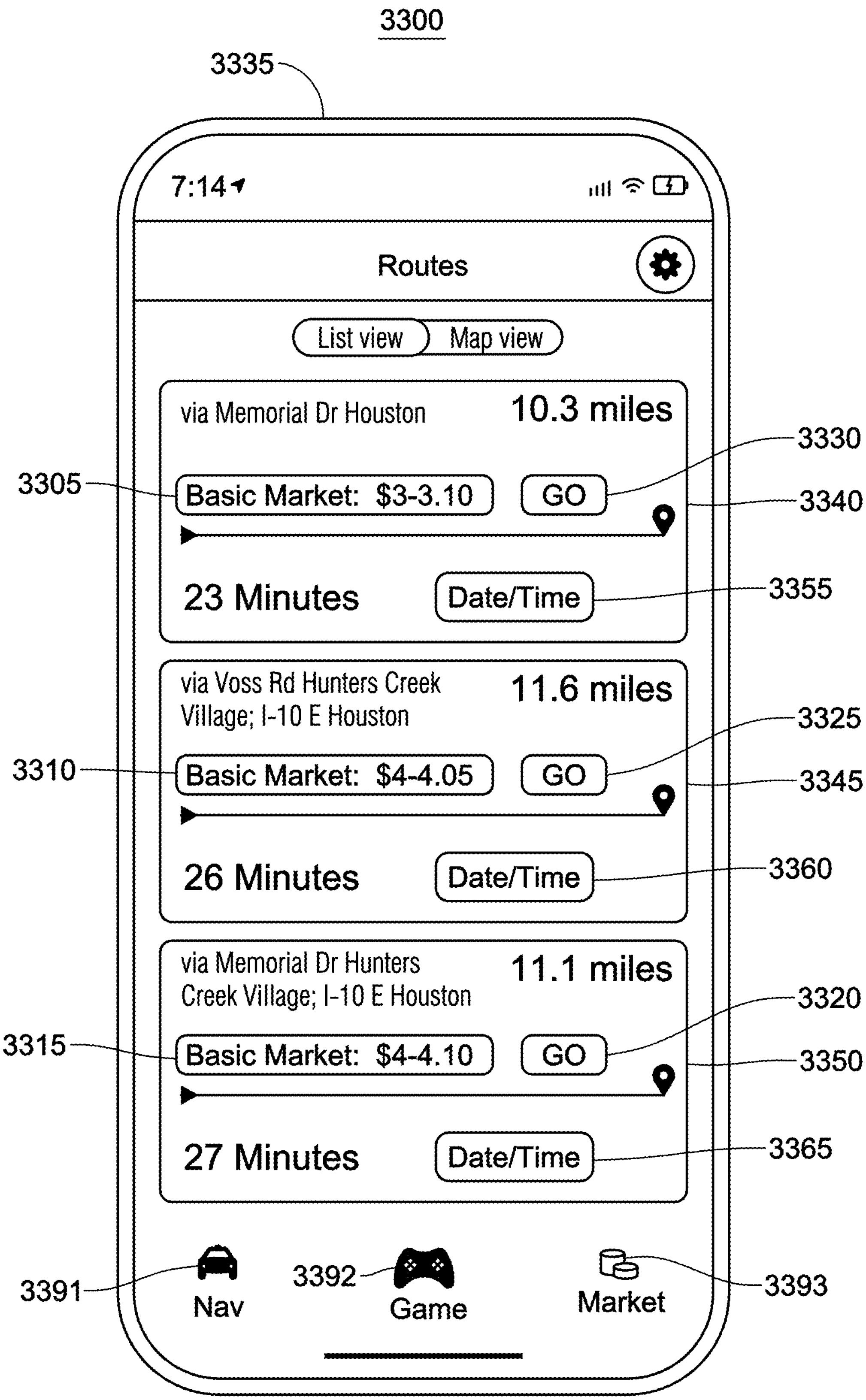
FIG. 33 illustrates an exemplary method and system configuration of the integration interface with GPS map routing such as Waze Maps or other third party map routing software applications in accordance with some embodiments.

FIG. 33 illustrates another exemplary network configuration 3300 integrating the disclosed method and system as a layer on another traditional third party map software. In some embodiments, the multi layered network node topology of participating, transacting and/or trading curb capacity or freight capacity configuration 3300 includes the following accounting elements, or a subset or superset thereof:

- exemplary computing device 3335;
- exemplary route node structure 3340 to satisfy user route requests with associated time and price;
- exemplary alternative route node structure 3345 to satisfy user route request with associated time and price;
- exemplary alternative route node structure 3350 to satisfy user route request with associated time and price;
- exemplary live auction price value 3305 for price based route 3340;
- exemplary navigation mode button 3391;
- exemplary game mode button 3392;
- exemplary market mode button 3393;
- exemplary go 3330 button to transact or modify the price based routing;
- exemplary go 3325 button to transact or modify the price based routing;
- exemplary go 3320 button to transact or modify the price based routing;
- exemplary alternative live auction price value 3310 for route 3345;
- exemplary alternative live auction price value 3315 for route 3350;
- exemplary date and time modification button 3355 for disclosed route 3340;
- exemplary date and time modification button 3360 for disclosed route 3345;
- exemplary date and time modification button 3365 for disclosed route 3350;

In some implementations and embodiments, map routing interfaces 3335 such as Waze Maps or another third party, may integrate the disclosed method and system to display the transformed forward curb capacity unit market auction price along a various route given various virtual hub topologies 1800 over the user 110 defined route requests. In some implementations and embodiments, the computing device 3335 may disclose over visual, audio or other communication methods the forward transformed curb capacity unit or security auction price 3305 on a given route 3340. In yet other embodiments, the disclosed curb capacity unit transformation may communicate the forward transformed curb capacity unit auction price 3310 of an alternative route 3345 such that a user may select either route 3340 or 3345 or 3350 based on the disclosed method and system price 3305 or 3310 or 3315 which was generated by instructions from a plurality of users between two virtual hubs on the user defined route and instructions to generate a price queue for buyers and sellers of curb capacity units along given routes. The disclosed forward market transformed curb capacity unit or security auction may be communicated on an on demand basis representing the current time and day or on a forward basis by changing the Date/Time 3340, 3360, 3365 user interface button feature to represent the then current market pricing for future time intervals on a plurality of given routes 3340 or 3345 or 3350 along the user requested virtual hub combination. In some implementations and embodiments, the user(s) 110 may alter the date 3355 such that the transformed curb capacity unit or security may be updated with user 110 submitted prices 3305 for forward looking time periods. Virtual hubs may represent the end points of a route defined by the user or virtual hubs may represent points along a given route but not including the endpoints or virtual hubs may represent points not along the route the user defined. Virtual hub combinations transform curb capacity units into a forward market which allow users of the method and system to transact in the physical market by either delivering curb capacity units as a driver of a vehicle or capacity holder or by receiving them as a passenger or package if the unit is a package rather than a person. A curb capacity unit represents space which may be filled by a person or a package. Further the forward curb capacity unit market auction 3305 overlay may be a layer on traditional GPS map routing software or as an alternative to time based routing. The forward curb capacity unit market specification such as "Basic" 3305 may also have a plurality of other transformed characteristics or levels which form the basis of a fungible contract or substitutable contract specifications between users which is exchangeable with the same terms and conditions if one user is unable to fulfil their contract obligations for the transformed curb capacity unit or security. In some embodiments, the navigation mode 3391 may move the user to turn by turn directions along the price based navigation route 3350. In some embodiments, the game mode 3392 may move the user to a game based overlay on the price based navigation route 3340. In some embodiments, the market mode 3393 may move the user to a market based overlay on the priced based navigation route 3350.

The disclosed method and system of a transformed curb capacity unit may be fully functional as a layer in map routing software 3300 or as a stand alone application 200, 300, etc.

In some implementations and embodiments, the disclosed method and system curb capacity unit auction price 3305 and 3310 and 3315 has two prices or more in other embodiments. In some implementations and embodiments, two route prices 3305 are disclosed at $3 and $3.10. In some implementations and embodiments, the former price of $3 is the price where a user is willing to buy or pay for a curb capacity unit along the given route 3340. The later price of $3.10 is the price at which a user is willing to sell a curb capacity unit along the given route 3340. The instructions of the auction may match the highest bidding price of $3 with the lowest selling price in the price queue when the prices match. In other words, in the exemplary embodiment, if a user wanted to sell a curb capacity unit at the current forward market auction queue 3305 on route 3340, the user would enter a price of $3 which is the current highest bidding price in the method and system queue 3305. By way of further example, another user may desire to buy a curb capacity unit on the forward curb capacity unit auction method and system on route 3340, to match, the user would enter a price of $3.10 which is the lowest selling price of a seller on the forward market curb capacity unit auction method and system.

Figure 34:
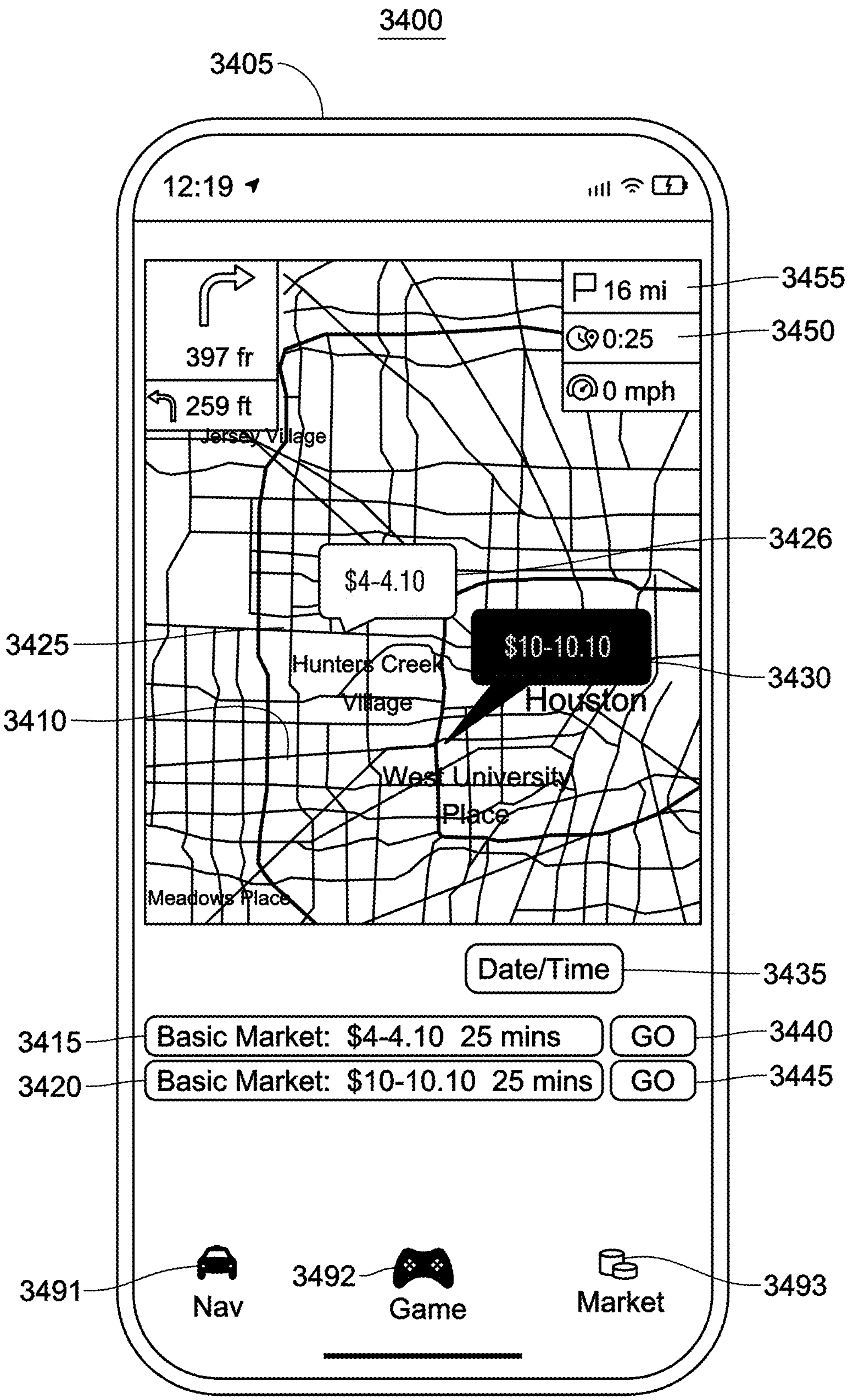
FIG. 34 illustrates an exemplary method and system configuration of the integration interface with GPS map routing such as Open Street Maps or other third party map routing software applications in accordance with some embodiments.

FIG. 34 illustrates another exemplary network configuration 3400 integrating the disclosed method and system as a layer on another traditional third party map software. In some embodiments, the multi layered network node topology of participating, transacting and/or trading transformed curb capacity or freight capacity unit or security configuration 3400 includes the following accounting elements, or a subset or superset thereof:

- exemplary computing device 3405;
- exemplary route 3410;
- exemplary live auction price value 3430 for route 3410;
- exemplary alternative live auction price value 3425 for route 3425;
- exemplary navigation mode button 3491;
- exemplary game mode button 3492;
- exemplary market mode button 3493;
- exemplary date and time modification button 3435 for disclosed route 3410;
- exemplary mileage estimate 3455 for disclosed route 3410;
- exemplary route estimate 3450 for disclosed route 3410;
- exemplary transformed forward curb capacity unit auction value and modification feed 3415 and selection GO 3440 button to transact the given route with a basic curb capacity unit or security feature and characteristic for one route 3425 that satisfies the user route request;
- exemplary transformed forward curb capacity unit or security auction value and modification feed 3420 and selection GO 3445 button to transact the given route with a premium curb capacity unit feature and characteristic for one route 3410 that satisfies the user route request;

In some embodiments, the navigation mode 3491 may move the user to turn by turn directions along the price based navigation route 3410. In some embodiments, the game mode 3492 may move the user to a game based overlay on the price based navigation route 3410. In some embodiments, the market mode 3493 may move the user to a market based overlay on the priced based navigation route 3410.

Figure 35:
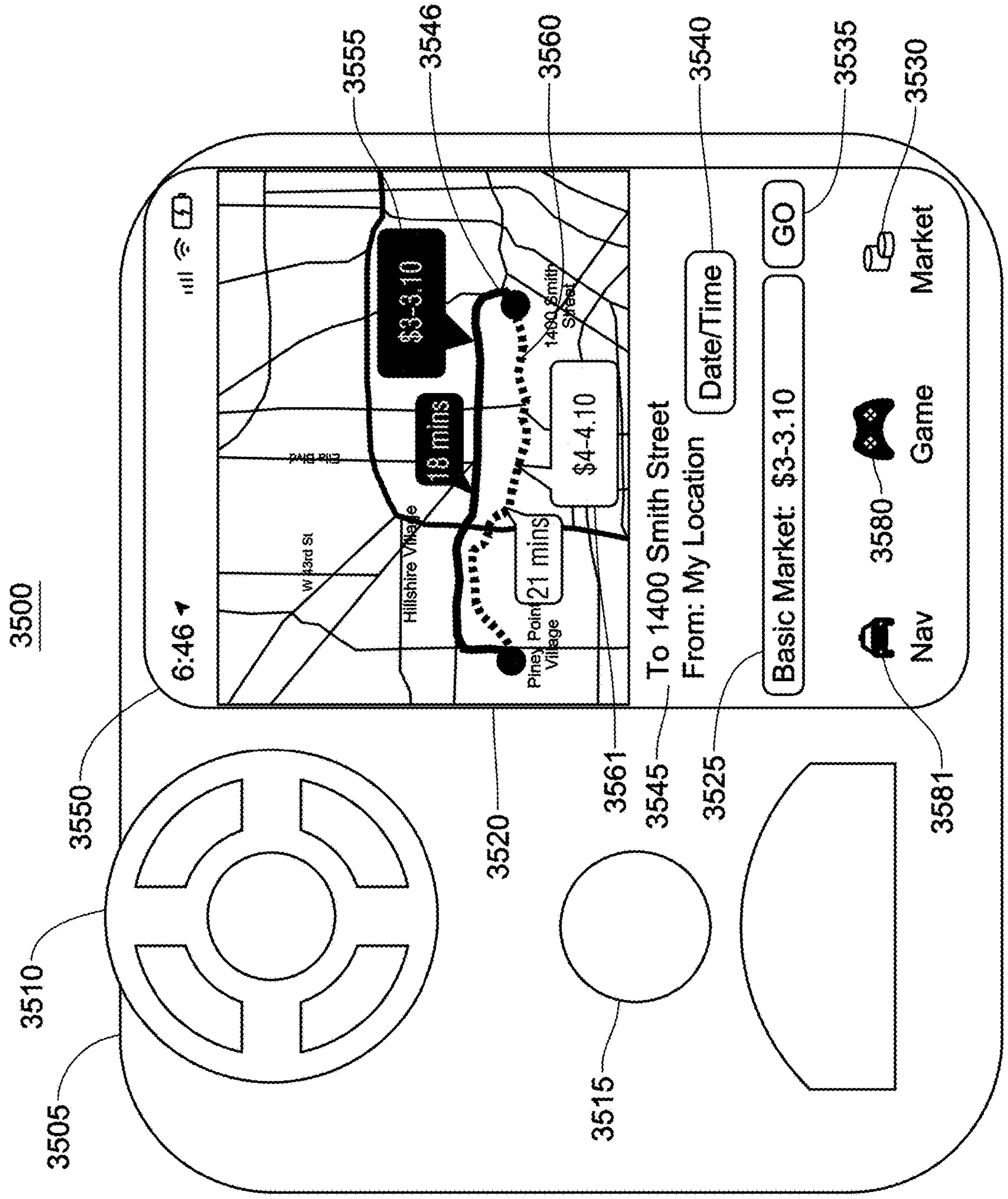
FIG. 35 illustrates an exemplary method and system configuration of the integration interface with GPS map routing in a vehicle such as Tesla, VW, Audi, Daimler, GM, Ford, Honda, Fiat, Nissan, Hyundai, Renault, Suzuki, BMW, Mazda, Dongfeng, Great Wall, Geely, BAIC, Tata, Toyota or any other third party map routing software applications inside a vehicle in accordance with some embodiments.

FIG. 35 illustrates another exemplary network configuration 3500 integrating the disclosed method and system as a layer on another traditional third party map software in the setting of a vehicle GPS navigation system. In some embodiments, the multi layered network node topology of participating, transacting and/or trading curb capacity or freight capacity configuration 3500 includes the following accounting elements, or a subset or superset thereof:

- exemplary computing device 3550;
- exemplary vehicle curb capacity unit carrier unit 3505;
- exemplary vehicle curb capacity unit steering wheel 3510;
- exemplary navigation mode button 3581;
- exemplary game mode button 3580;
- exemplary market mode button 3530;
- exemplary user of curb capacity unit as seller or driver 3515;
- exemplary user route request address information 3545;
- exemplary date and time modification button 3540 for disclosed route 3545;
- exemplary transformed forward curb capacity unit auction value and modification feed 3525 and selection GO 3535 button to transact the given route with a basic curb capacity unit feature and characteristic for one route 3545 that satisfies the user route request;

exemplary live auction price value 3555 for price based route 3555;

exemplary live auction price value 3560 for price based alternative route 3560;

exemplary market layer routing overlay 3530;

In some implementations and embodiments, the disclosed method and system transformed curb capacity unit or security auction market layer may be in a vehicle unit GPS navigation system 3550. In some embodiments, the user 3515 may input driving address instructions 3545 that have an origin location and a destination location. In some embodiments, the user 3515 may communicate with the computing device 3550 through a touchscreen 3520 or and audio interface or another interface. In some embodiments the user 3515 may edit the date/time 3540 button to communicate the market auction price based route 3555 from on demand or current time to a forward time or date. Market auction based pricing 3555 may vary by date and time due to a plurality of market factors. In some embodiments the user 3515 may edit the market based auction price for the curb capacity units by selecting the market feature button 3525. In some embodiments the user 3515 may select a give curb capacity unit auction price to transact by selecting the go button 3535. In some embodiments, the navigation mode 3581 may move the user to turn by turn directions along the price based navigation route 3555. In some embodiments, the game mode 3580 may move the user to a game based overlay on the price based navigation route 3555. In some embodiments, the market mode 3530 may move the user to a market based overlay on the priced based navigation route 3555.

In some implementations and embodiments, the disclosed method and system curb capacity unit auction price 3555 and 3560 has two prices or more in other embodiments. Two route prices 3555 are disclosed at $3 and $3.10. The former price of $3 is the price where a user is willing to buy or pay for a curb capacity unit along the given route 3545. The later price of $3.10 is the price at which a user is willing to sell a curb capacity unit along the given route 3545. The instructions of the auction may match the highest bidding price of $3 with the lowest selling price in the price queue when the prices match. In other words, in the exemplary embodiment, if a user 3515 wanted to sell a curb capacity unit at the current forward market auction queue 3555 on route 3545, the user 3515 would enter a price of $3 which is the current highest bidding price in the method and system queue 3555. By way of further example, another user may desire to buy a curb capacity unit on the forward transformed curb capacity unit or security auction method and system on route 3545, to match, the user would enter a price of $3.10 which is the lowest selling price of a seller on the forward market transformed curb capacity unit or security auction method and system. In some embodiments, alternative routes based on prices in alternative curb capacity unit auctions 3560 may have different prices based on supply and demand conditions. In some embodiments the market based routing layer 3530 serves as an alternative to time based routing or mileage based routing which are fundamentally different premises. In some embodiments, the overall software system 3505 and associated instructions may ask the user 3515 with visual or audio interface if the user 110 would like to monetize there curb routes upon starting any navigation sequence for transformed curb capacity units or securities.

Figure 36:
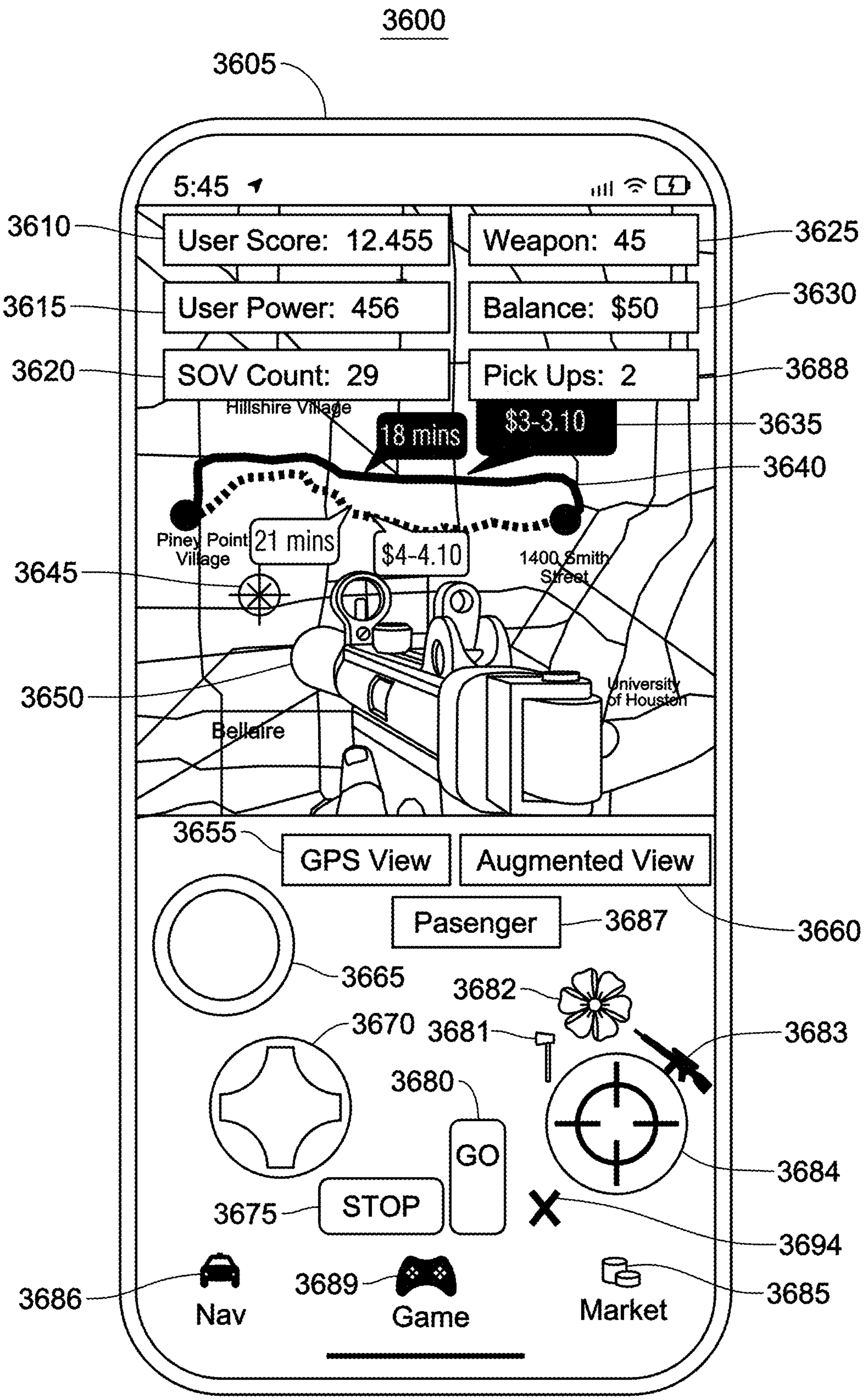
FIG. 36 illustrates an exemplary user interface and database configuration which allow the user to play a strategy based game overlay on the priced based navigation curb capacity in accordance with some embodiments.

FIG. 36 illustrates another exemplary network configuration 3600 integrating the disclosed method and system as a game layer on another internal mapping system or traditional third party map system in the setting of a mobile computing device. In some embodiments, the multi layered network node topology of participating, transacting and/or trading transformed curb capacity or freight capacity unites or securities for price based navigation configuration 3600 includes the following accounting elements, or a subset or superset thereof:

exemplary computing device 3605;

exemplary game overlay user score 3610;

exemplary game overlay user power 3615;

exemplary game overlay SOV (single occupancy vehicle) count 3620;

exemplary game overlay weapon strength 3625;

exemplary game overlay account balance 3630;

exemplary game overlay passenger pick ups 3688;

exemplary game overlay Single Occupancy Vehicle target 3645;

exemplary game overlay Single Occupancy Vehicle weapon 3650;

exemplary game overlay GPS standard map view 3655;

exemplary game overlay augmented or mixed reality view 3660;

exemplary game overlay passenger mode 3687;

exemplary game overlay fire button 3665;

exemplary game overlay multi-purpose direction button 3670;

exemplary game overlay go button 3680;

exemplary game overlay stop button 3675;

exemplary navigation overlay button 3686;

exemplary game overlay button 3689;

exemplary market overlay button 3685;

exemplary market overlay weapon selection button 3683, 3682, 3681, 3694;

exemplary market overlay aim finder toggle 3684.

In some implementations and embodiments, the game overlay 3689 awards score and points for destroying the single occupancy vehicle 3620, compute and distribute positive or negative curb capacity unit game auction strategy points 3610 or power 3615 or rewards 3630 based on any superset combination or subset combination of price 3635, route mileage 3640, number of single occupancy vehicles destroyed or passed 3620, number of passengers 3688, route time estimates 3640, curb capacity unit route 3640, curb capacity unit specifications 3415, curb capacity unit model type 4000 based on model type and age 4000, curb capacity unit make type 4000, curb capacity unit age 4000, matched curb capacity unit specification 800 and 620, matched curb capacity unit fuel type 4000, matched curb capacity unit emission specification 4000, cumulative user curb capacity unit specifications 4100, curb capacity unit rating 4100, curb capacity unit safety 4100, curb capacity unit time 4100, curb capacity unit delay, curb capacity unit driver rating 4100, curb capacity unit rider rating 4100, curb capacity unit timeliness relative to contract specification 4100.

In some implementations and embodiments, the game overlay 3689 may use a plurality of weapon or scoring configurations such as a rifle 3683, an axe 3681, a flower gift 3682, a X logo 3694 to take away points or gain points from other users on the system. In some implementations and embodiments, the scoring may be independent of other players on the system, but dependent on the users actions in the game overlay 3689. In some implementations and embodiments, a selected weapon 3650 may be used to destroy single occupancy vehicles. In some embodiments the user may accelerate with the go button 3680 to avoid an attack or fire. In some embodiments the user may slow down or stop with the stop button 3675 to avoid enemy fire or attack. In some embodiments, the stop button 3675 may interface with an autonomous driving system of a vehicle to pick up passengers along a price based navigation route to increase the score of the player 3610 and increase the balances 3630 by earning money on the system. In some implementations and embodiments, user(s) may be identified by the X logo 3694 or by a person logo who is a bidder on the priced based navigation route 3640 to increase score and balances 3630. In some embodiments user(s) may scan navigation view 3655 or augmented reality view 3660 to look for single occupancy vehicle targets or X logo(s) 3694 or 3645 for users who are bidding on the price based navigation route 3640.

In some implementations and embodiments, the strategy of the priced based navigation game overlay is to pick up as many passengers or bidders as possible along the price based navigation route 3640, destroy as many single occupancy vehicles along the price based navigation route 3640 and to give flowers 3682 and rewards to curb capacity unit providers who have more than one person in the vehicle along the price based navigation route 3640. In some embodiments user(s) may work independently or collectively in tribes to maximize user score in strategy.

Figure 37:
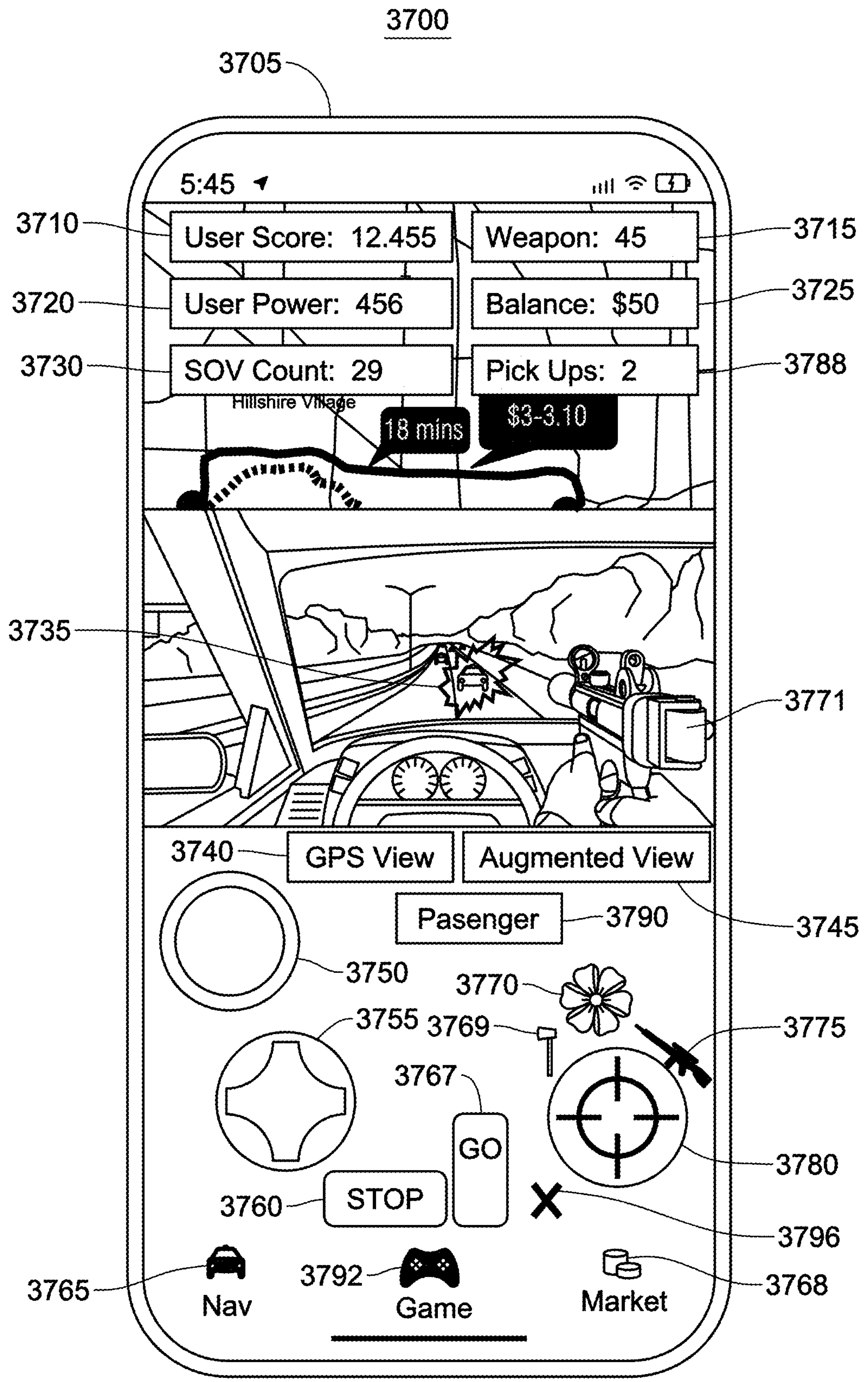
FIG. 37 illustrates an exemplary user interface and database configuration which allow the user to play a strategy based game overlay on the priced based navigation curb capacity with augmented reality in accordance with some embodiments.

FIG. 37 illustrates another exemplary network configuration 3700 integrating the disclosed method and system as a game layer on another internal mapping navigation system or traditional third party navigation map system in the setting of a mobile computing device. In some embodiments, the multi layered network node topology of participating, transacting and/or trading curb capacity or freight capacity for price based navigation configuration 3700 includes the following accounting elements, or a subset or superset thereof:

- exemplary computing device 3705;
- exemplary game overlay user score 3710;
- exemplary game overlay user power 3720;
- exemplary game overlay SOV (single occupancy vehicle) count 3730;
- exemplary game overlay weapon strength 3715;
- exemplary game overlay account balance 3725;
- exemplary game overlay passenger pick ups 3788;
- exemplary game overlay Single Occupancy Vehicle target 3735;
- exemplary game overlay Single Occupancy Vehicle weapon 3771;
- exemplary game overlay GPS standard map view 3740;
- exemplary game overlay augmented or mixed reality view 3745;
- exemplary game overlay passenger mode 3790;
- exemplary game overlay fire button 3750;
- exemplary game overlay multi-purpose direction button 3755;
- exemplary game overlay go button 3767;
- exemplary game overlay stop button 3760;
- exemplary navigation overlay button 3765;
- exemplary game overlay button 3792;
- exemplary market overlay button 3768;
- exemplary market overlay weapon selection button 3775, 3770, 3769, 3796;
- exemplary market overlay aim finder toggle 3780.

In some embodiments, the game overlay view 3768 of the price based navigation system 3705 may alert the user to a single occupancy vehicle 3735 which would then be a target for the user to use a weapon 3771, 3775, 3769 to destroy the single occupancy vehicle to increase user score 3710. In some embodiments, the user may identify a vehicle as having more than one passenger in the vehicle and therefore award or gift flowers 3770 to the vehicle or curb capacity user in the price based navigation game strategy. In some embodiments, the user may use a weapon 3771 against a single occupancy vehicle 3735 at which point the vehicle would explode and the passenger would be left without a vehicle in the augmented reality view 3745 or GPS view 3740. In some embodiments, the user may award flowers 3770 to a vehicle with more than one passenger to increase their score 3710 and the score of the user that has more than one passenger in their vehicle.

Figure 38:
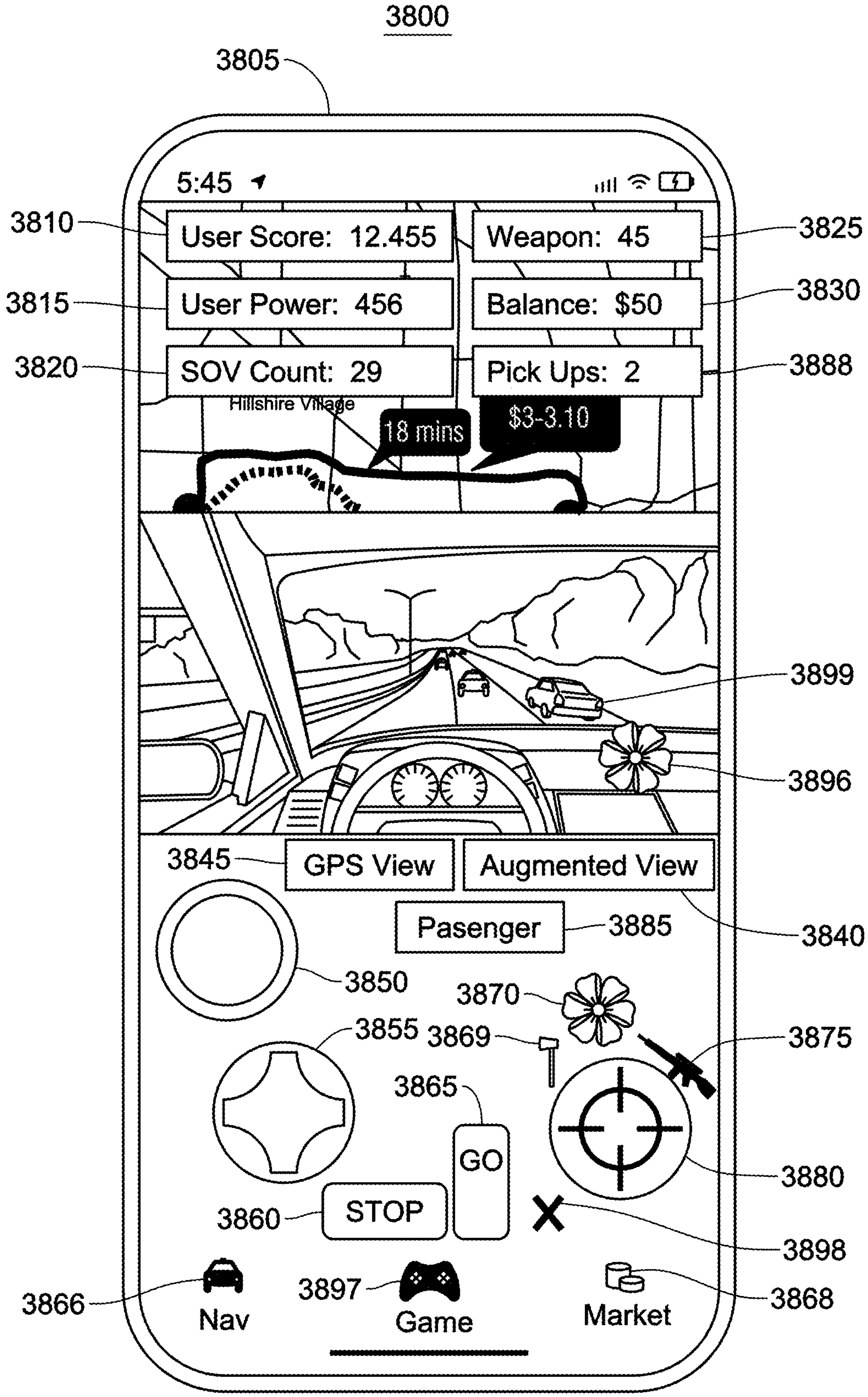
FIG. 38 illustrates an exemplary user interface and database configuration which allow the user to play a strategy based game overlay on the priced based navigation curb capacity with augmented reality in accordance with some embodiments.

FIG. 38 illustrates another exemplary network configuration 3800 integrating the disclosed method and system as a game layer on another internal mapping navigation system or traditional third party navigation map system in the setting of a mobile computing device. In some embodiments, the multi layered network node topology of participating, transacting and/or trading curb capacity or freight capacity for price based navigation configuration 3800 includes the following accounting elements, or a subset or superset thereof:

- exemplary computing device 3805;
- exemplary game overlay user score 3810;
- exemplary game overlay user power 3815;
- exemplary game overlay SOV (single occupancy vehicle) count 3820;
- exemplary game overlay weapon strength 3825;
- exemplary game overlay account balance 3830;
- exemplary game overlay passenger pick ups 3888;
- exemplary game overlay flower gift 3896;
- exemplary game overlay GPS standard map view 3845;
- exemplary game overlay augmented or mixed reality view 3840;
- exemplary game overlay passenger mode 3885;
- exemplary game overlay fire button 3850;
- exemplary game overlay multi-purpose direction button 3855;
- exemplary game overlay go button 3865;
- exemplary game overlay stop button 3860;
- exemplary navigation overlay button 3866;
- exemplary game overlay button 3897;
- exemplary market overlay button 3868;
- exemplary market overlay weapon selection button 3869, 3870, 3875, 3898;
- exemplary market overlay aim finder toggle 3880.

In some implementations and embodiments, the game overlay view 3897 of the price based navigation system 3805 may alert the user to a vehicle with more than one passenger 3899 which would then be a way for the user to gift a flower to the other user 3899.

Figure 39:
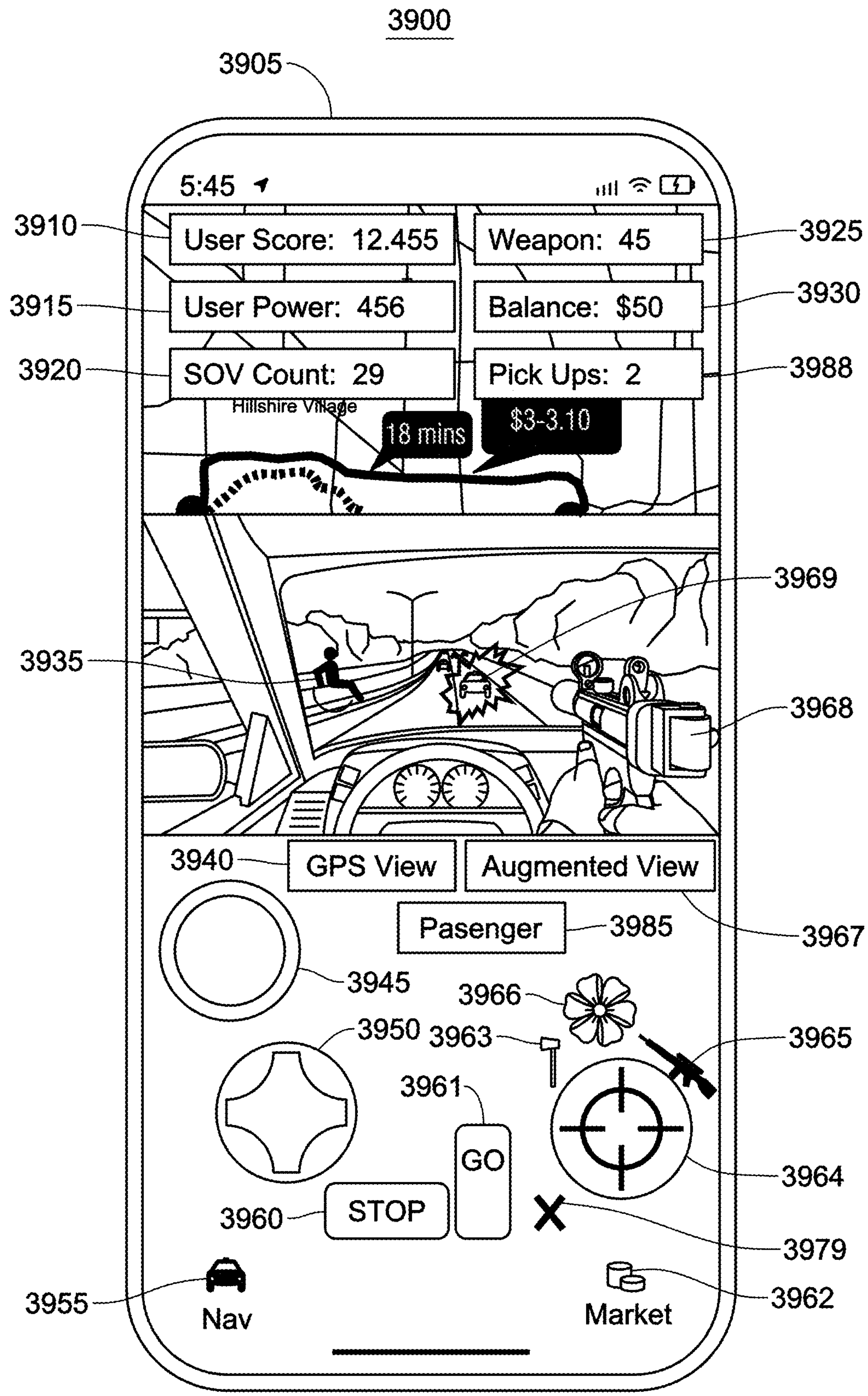
FIG. 39 illustrates an exemplary user interface and database configuration which allow the user to play a strategy based game overlay on the priced based navigation curb capacity with augmented reality in accordance with some embodiments.

FIG. 39 illustrates another exemplary network configuration 3900 integrating the disclosed method and system as a game layer on another internal mapping navigation system or traditional third party navigation map system in the setting of a mobile computing device. In some embodiments, the multi layered network node topology of participating, transacting and/or trading curb capacity or freight capacity for price based navigation configuration 3900 includes the following accounting elements, or a subset or superset thereof:

- exemplary computing device 3905;
- exemplary game overlay user score 3910;
- exemplary game overlay user power 3915;
- exemplary game overlay SOV (single occupancy vehicle) count 3920;

exemplary game overlay weapon strength 3925;
exemplary game overlay account balance 3930;
exemplary game overlay passenger pick ups 3988;
exemplary game overlay weapon 3968;
exemplary game overlay GPS standard map view 3940;
exemplary game overlay augmented or mixed reality view 3967;
exemplary game overlay passenger mode 3985;
exemplary game overlay fire button 3945;
exemplary game overlay multi-purpose direction button 3950;
exemplary game overlay go button 3961;
exemplary game overlay stop button 3960;
exemplary navigation overlay button 3955;
exemplary market overlay button 3962;
exemplary market overlay weapon selection button 3963, 3966, 3965, 3979;
exemplary market overlay aim finder toggle 3964;
exemplary user in augmented reality view who has had their single occupancy vehicle destroyed 3935.

In some implementations and embodiments, the game overlay view 3905 of the price based navigation system 3905 may show a user who has had their single occupancy vehicle destroyed 3935 which increases the score of the user 3910. In some embodiments, the user may target additional single occupancy vehicles 3969 to destroy along the priced based navigation route.

Figure 40:
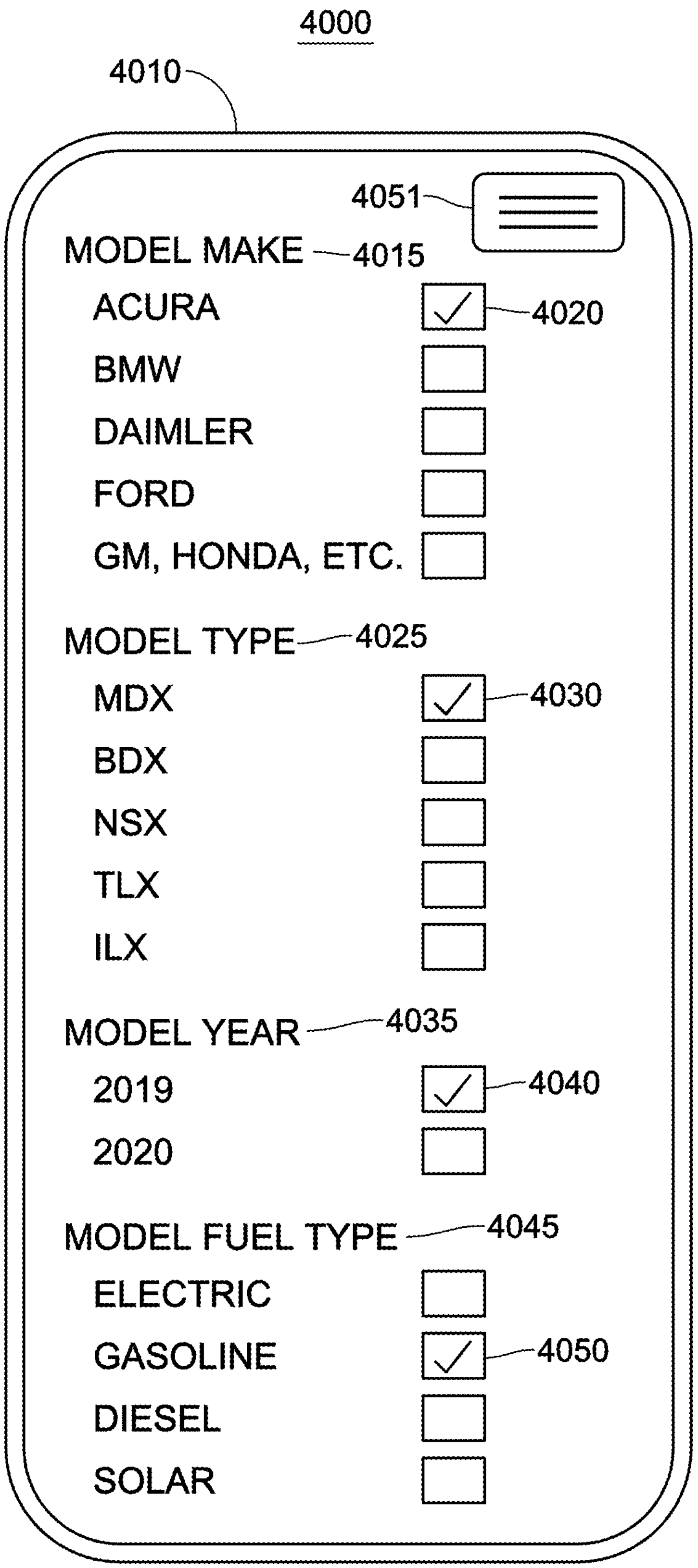
FIG. 40 illustrates an exemplary user interface and database configuration which allow the user to select model, make, type, year, fuel type in configuration for price based navigation in accordance with some embodiments.

FIG. 40 illustrates another exemplary network configuration 4000 module of the disclosed method and system which records the vehicle specifications for a given user on the system 4010 in the setting of a mobile computing device. In some embodiments, the multi layered network node topology of participating, transacting and/or trading transformed curb capacity or freight capacity units or securities for price based navigation configuration 4000 includes the following elements, or a subset or superset thereof:

exemplary computing device 4010;
exemplary curb capacity unit model make 4015;
exemplary curb capacity unit model type 4025;
exemplary curb capacity unit model year 4035;
exemplary system menu toggle box 4051;
exemplary curb capacity unit model fuel type 4045;
exemplary curb capacity unit model make selection box toggle 4020;
exemplary curb capacity unit model type selection box toggle 4030;
exemplary curb capacity unit model year selection box toggle 4040;
exemplary curb capacity unit model fuel type selection box toggle 4050;

In some implementations and embodiments, the disclosed method and system may allow the user to select the model make such as by example an Acura 4020 as a model make 4015. In some implementations and embodiments, the user may select an unlimited variety of vehicle types in the method and system not limiting the system to those vehicle make 4015 or model 4025 types in FIG. 40. In some implementations and embodiments, the user may configure the system for the curb capacity unit specification model year 4035 or the model fuel type 4045 or a plurality of other vehicle specifications for the purpose of recording specification for the priced based navigation system 4010. In some implementations and embodiments, the data transformation of the transformed curb capacity unit or security links the attributes or supersets or subsets of the model make 4015, model type 4025, model year 4035, model fuel type 4045, or a plurality of other vehicle features to create specification pools as a feature in the data transformations for the transformed curb capacity units or securities. In some embodiments, the combinations of similar vehicle model make 4015, model type 4025, model year 4035, model fuel type 4045 and plurality of other vehicle attributes are fungible or substitutable in the method of the transformed curb capacity unit or security. To avoid confusion, and to provide further example, but not limit by example, bus or subway or train or air or private automobile or other transformed curb capacity units or securities may be substitutable under broad specifications of the transformed curb capacity or security pool provided that the broad transformed specifications are met for delivery within the transformed curb capacity unit or security pool.

Figure 41:
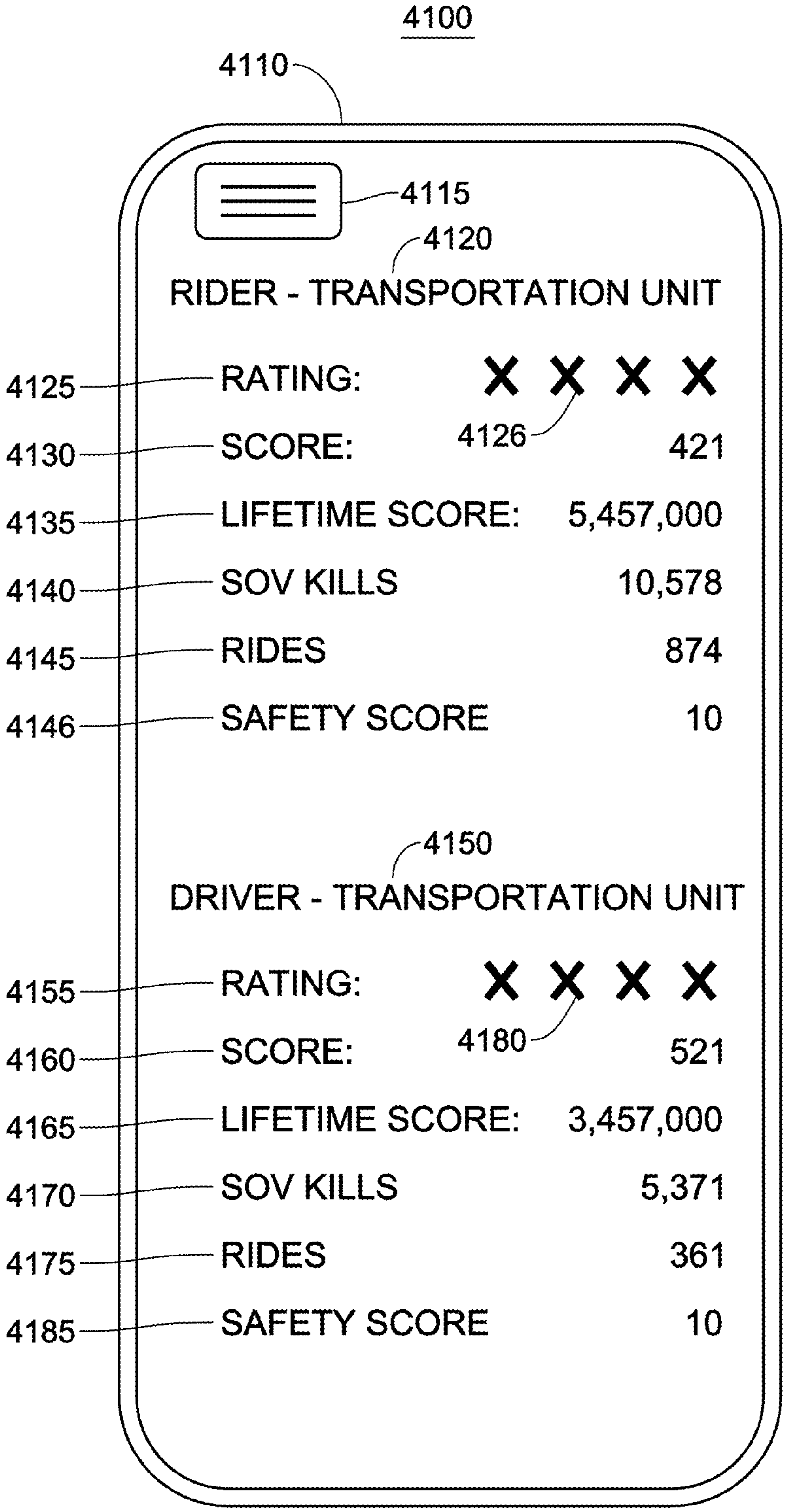
FIG. 41 illustrates an exemplary user interface and database configuration which displays a plurality of metrics for the performance of the user in the game overlay and general system and method of priced based navigation in accordance with some embodiments.

FIG. 41 illustrates another exemplary network configuration 4100 module of the disclosed method and system which records the rider or driver curb capacity unit specification ratings for a given user on the system 4110 in the setting of a mobile computing device. In some embodiments, the multi layered network node topology of participating, transacting and/or trading curb capacity or freight capacity for price based navigation configuration 4100 includes the following elements, or a subset or superset thereof:

exemplary menu toggle box 4115;
exemplary rider curb capacity unit rating category summary 4120;
exemplary rider curb capacity unit rating summary 4125;
exemplary rider curb capacity unit rating X logo amount 4126;
exemplary rider curb capacity unit rating score for navigation route 4130;
exemplary rider curb capacity unit rating lifetime score 4135;
exemplary rider curb capacity unit SOV kills 4140;
exemplary rider curb capacity unit ride count 4145;
exemplary rider curb capacity unit ride safety score 4146;
exemplary driver curb capacity unit rating category summary 4150;
exemplary driver curb capacity unit rating summary 4155;
exemplary driver curb capacity unit rating X logo amount 4180;
exemplary driver curb capacity unit rating score for navigation route 4160;
exemplary driver curb capacity unit rating lifetime score 4165;
exemplary driver curb capacity unit SOV kills 5,371;
exemplary driver curb capacity unit ride count 4175;
exemplary driver curb capacity unit ride safety score 4185;

In some implementations and embodiments, the price based navigation system game overlay layer uses a plurality of the aforementioned combinations to account for user actions in the game overlay of the disclosed method and system.

Figure 42:
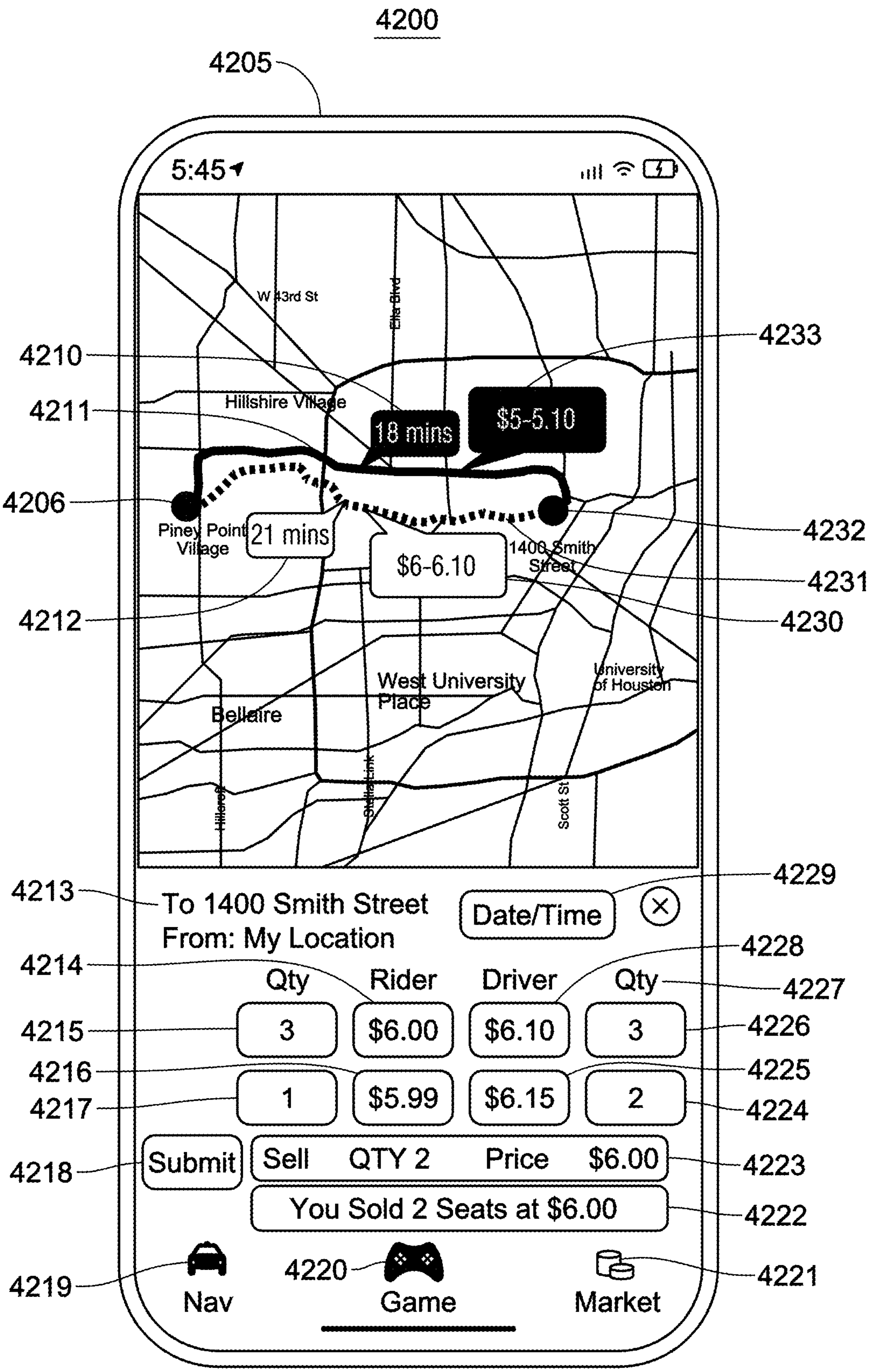
FIG. 42 illustrates an exemplary user interface and database configuration which displays a plurality of routes between two user requested curb hubs indexed based on the pricing of curb capacity units or curb capacity unit securities and the associated open market transaction interface for those transformed curb capacity unit securities in accordance with some embodiments.

FIG. 42 illustrates another exemplary network configuration 4200 module of the disclosed method and system which records the rider or driver transformed curb capacity unit or security specification and market framework for the transformation for a specified plurality of routes. In some embodiments, the multi layered network node topology of participating, transacting and/or trading transformed curb capacity or freight capacity units or securities for price based navigation configuration 4200 includes the following elements, or a subset or superset thereof:

exemplary computing device to display the method or system 4205;

exemplary estimated time of a primary indexed price based navigation route of a transformed curb capacity unit or security 4120;

exemplary market price of a buyer and seller of primary price based navigation route of a transformed curb capacity unit or security 4233;

exemplary price based navigation route of a primary transformed curb capacity unit or security 4211;

exemplary estimated time of a secondary indexed price based navigation route of a transformed curb capacity unit or security 4231;

exemplary estimated time of a secondary indexed price based navigation route of a transformed curb capacity unit or security 4212;

exemplary market price of a buyer and seller of secondary price based navigation route of a transformed curb capacity unit or security 4230;

exemplary starting point virtual hub of an indexed price based navigation route of a transformed curb capacity unit or security 4206;

exemplary ending point virtual hub of an indexed price based navigation route of a transformed curb capacity unit or security 4232;

exemplary ending point and starting point address of virtual hub(s) of an indexed price based navigation route of a transformed curb capacity unit or security 4213;

exemplary date and time specification of an indexed price based navigation route of a transformed curb capacity unit or security 4213;

exemplary number or quantity of transformed curb capacity units or securities that are bidding or buying for purchase by riders of a secondary indexed price based navigation route of a transformed curb capacity unit or security which is first in the rider queue indexed by highest price 4215;

exemplary price of transformed curb capacity units or securities that are bidding or buying for purchase by riders of a secondary indexed price based navigation route of a transformed curb capacity unit or security which is first in the rider queue indexed by highest price 4214;

exemplary price of transformed curb capacity units or securities that are bidding or buying for purchase by riders of a secondary indexed price based navigation route of a transformed curb capacity unit or security which is second in the rider queue indexed by second highest price 4216;

exemplary number or quantity of transformed curb capacity units or securities that are bidding or buying for purchase by riders of a secondary indexed price based navigation route of a transformed curb capacity unit or security which is second in the rider queue indexed by second highest price 4217;

exemplary number or quantity of transformed curb capacity units or securities that are offering or selling by drivers of a secondary indexed price based navigation route of a transformed curb capacity unit or security which is first in the driver queue indexed by lowest price 4226;

exemplary price of transformed curb capacity units or securities that are offering or selling by drivers of a secondary indexed price based navigation route of a transformed curb capacity unit or security which is first in the driver queue indexed by lowest price 4228;

exemplary number or quantity of transformed curb capacity units or securities that are offering or selling by drivers of a secondary indexed price based navigation route of a transformed curb capacity unit or security which is second in the driver queue indexed by second lowest price 4224;

exemplary price of transformed curb capacity units or securities that are offering or selling by drivers of a secondary indexed price based navigation route of a transformed curb capacity unit or security which is second in the driver queue indexed by second lowest price 4225;

exemplary order entry submit button to the method and system for a user order 4218;

exemplary order on the method and system by a driver to sell a specified quantity of transformed curb capacity units or securities 4223;

exemplary order confirmation on the method and system by a driver sold two units of transformed curb capacity units or securities 4222;

exemplary market view of priced based navigation layer to display indexed prices of a plurality routes which may be one, two, three, or an infinite number of routes between two virtual hubs 4222;

exemplary game view layer of a transformed curb capacity unit or security 4220;

exemplary navigation view layer of a transformed curb capacity unit or security 4219;

In some implementations and embodiments, the disclosed method and system may allow the user to select the model make such as by example an Acura 4020 as a model make 4015 which is placed in a certain transformed curb capacity specification pool that may be aggregated with similar transformed curb capacity unit specification participants or units that then display a user 110 selected navigation route 4211 or plurality of routes 4231 and 4211 or an infinite number of routes between the virtual hub start point 4206 and virtual hub endpoint 4232. In some embodiments the prices 4230 on a route 4231 may display the buy price of the highest bidder or rider on a given route 4231 which is listed in more detail in the rider queue display for highest indexed price bid 4214 for a route 4231. In some embodiments, the highest bid price 4214 for a rider on a given route 4231 has an associated quantity 4215 of transformed curb capacity units or securities. Similarly in some embodiments, the lowest offer or sale price 4228 for a driver on a given route 4231 has an associated quantity 4226 of transformed curb capacity units or securities. In some embodiments, the rider quantity 4215 listed as three units, may be one rider, two riders, or three riders who desire to purchase a given transformed curb capacity unit(s) or securities so long as the indexed price is queued to the top based on a highest price index and time stamp for a given specification of a transformed curb capacity unit or security. In some embodiments, transformed curb capacity units or securities may represent a similar pool of transformed curb capacity units or securities based on a superset or subset or the plurality of attributes such as vehicle mode make 4015, vehicle mode model type 4025, vehicle model year 4035, cheapest route 1011, single mode 1012, multi modal 1013, fastest route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest route 827, packages 828, cargo 829, virtual 830, order types 710, 720, term specification 600, timing specification 500, virtual hub end point 230 and start point 220, eScooter, eBike or a plurality of other specifications. In some implementations and embodiments, the match of rider price 4214 and driver price 4228 for a transformed curb capacity unit(s) or securities occurs the lowest price in the driver queue 4228 equals the highest price in the rider queue 4214. In some embodiments, if no such match of prices occur between driver and rider queues for a given specification of a transformed curb capacity unit or security, then prices remain in the queue until a match or a new order entry re-indexes the order of all the deals because the price is higher than the current highest bid in the rider queue 4214 or the queue entries for the transformed curb capacity unit or security may become re-indexed to place an order with the appropriate price index ranking in a queue that places the highest rider price 4214 in the top and descends by price 4216, then time of order entry all other things equal. In some embodiments, the driver price queue 4228, 4225 similarly ranks from lowest driver price 4228 at the top of the queue to highest driver price 4228 at the bottom on the queue, then indexing by time subordinate to price for a given pool specification of transformed curb capacity units or securities. In some implementations and embodiments, a plurality of routes 4231 and 4211 may be displayed as price based navigation options indexed by market pricing. In some embodiments, the user may select one, two or many, many more routes as to how many they desire to be displayed as options between their virtual hubs to perform calculations that may maximize the number of curb capacity units or securities they sell on a given route specification or the prices which they obtain or any combination of specifications or objectives the user may have in the price based navigation method and display of transformed curb capacity unit or security.

Figure 43:
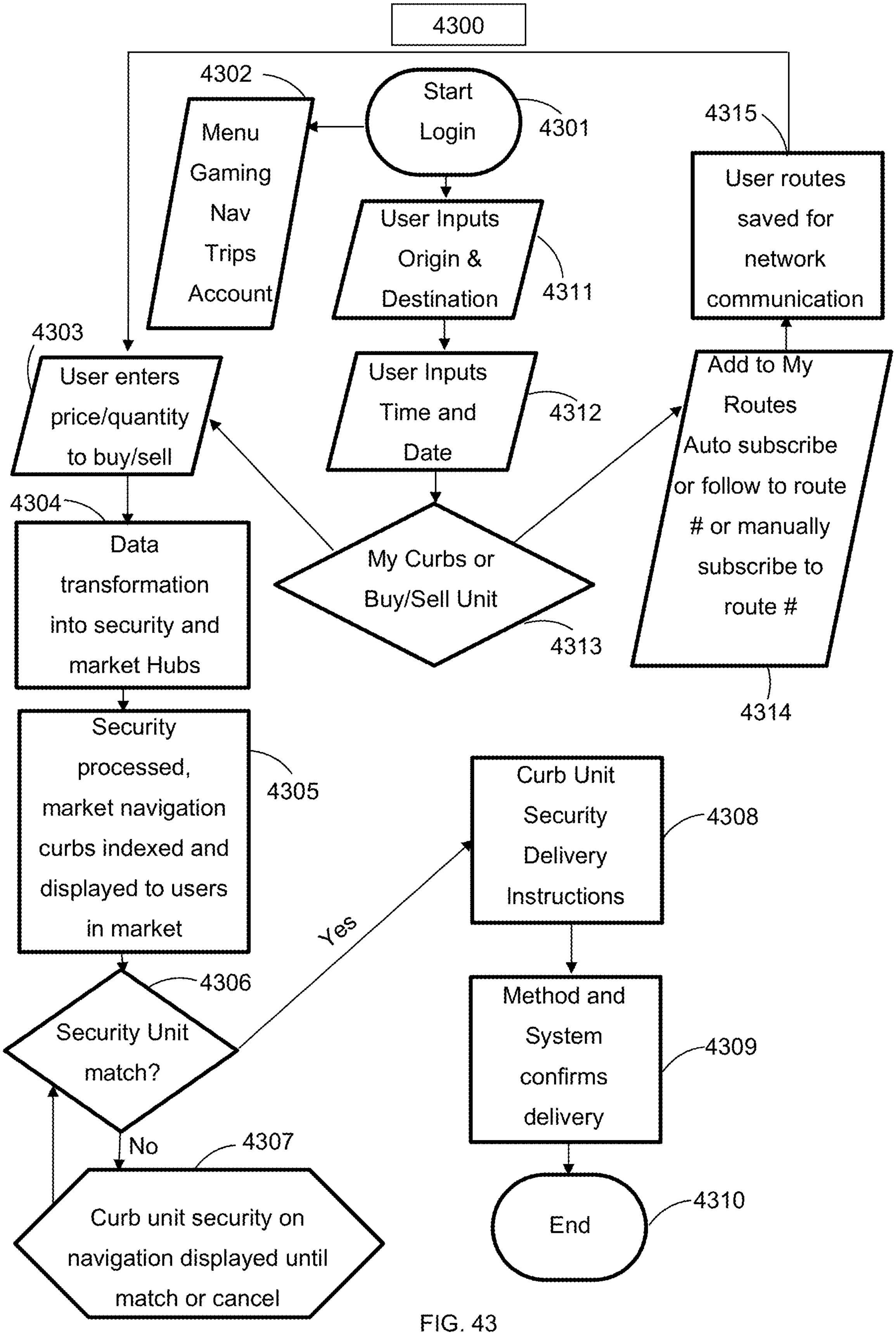
FIG. 43 illustrates an exemplary flow chart of steps in the curb capacity unit security data transformation and presentation of the curb capacity unit security with integration to navigation systems which is another data transformation in accordance with some embodiments.

FIG. 43 illustrates an exemplary flow chart 4300 of user 110 experience during a transformed curb capacity unit or security life cycle. In some embodiments the user 110 may login 4301 to the system which requires the user to go to a plurality of menu options 4302 or user input for origin and destination of virtual curb capacity hubs 4311 alongside user inputs of time and date 4312 for a given specification that may contain a subset or superset of attributes such as vehicle mode make 4015, vehicle mode model type 4025, vehicle model year 4035, cheapest route 1011, single mode 1012, multi modal 1013, fastest route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest route 827, packages 828, cargo 829, virtual 830, eScooter, eBike, eSkates, eBoards, order types 710, 720, term specification 600, timing specification 500, virtual hub end point 230 and start point 220, or a plurality of other specifications. In some embodiments, the user may save a route to the "My Routes" 4313 in "Add My Routes" 4314 whereby the user route is saved in the system for one touch retrieval in the future. In some embodiments, the user may enter a price or quantity to buy or sell a transformed curb capacity unit or security of a given specification or specification combination 4303 which has many steps involved with the transformation of the curb capacity unit or security. In some embodiments, additional data transformations occur to process 4305, market navigation route options and indexing 4305, virtual hub or virtual hub combination data transformations 4305, curb capacity unit transformations 4305 and many other subsets or supersets of transformed curb capacity unit combinations and combination specifications 4305. In some embodiments, if a transformed curb capacity unit or security matches 4306 in price and specification, then the transformed curb capacity unit or security moves into delivery 4308 and the deliver process has many steps of electric signal handoff 4308, 4309 and security checks 4308, 4309, 911 system checks 4308, 4309, GPS server and user 110 position checks 4308, 4309 as well as curb capacity unit rating checks 4308, 4309 and many other possible checks for all the data elements of the transformed curb capacity unit or security for verification of delivery 4308, 4309. In some embodiments, if prices of the buyer and seller queue do not match 4307, then the steps of processing 4304, 4305, 4306 repeat until a match is made 4306 to 4308 or an order is cancelled before it expires for the transformed curb capacity unit or security.

Figure 44:
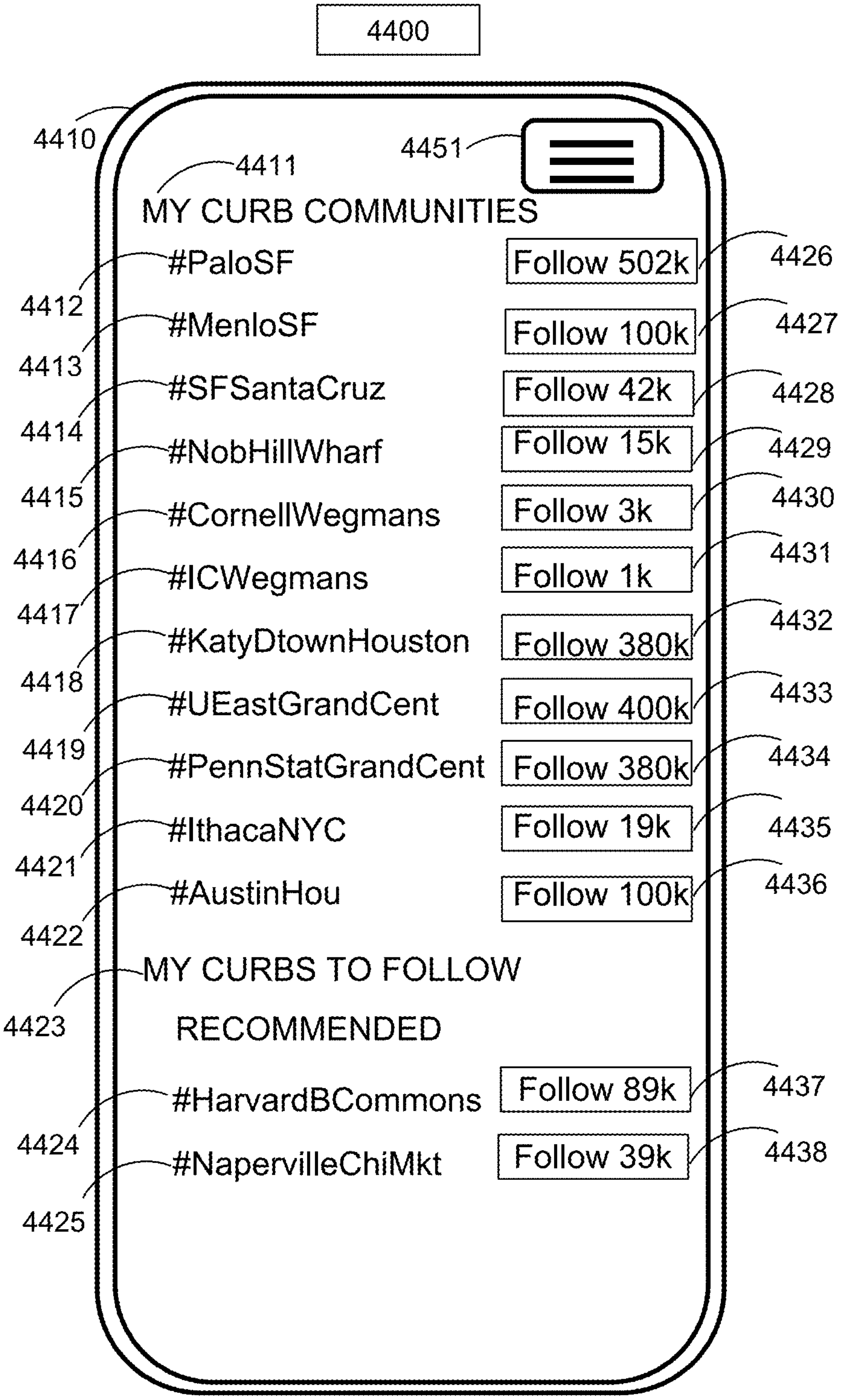
FIG. 44 illustrates an exemplary user interface of virtual curb hub sequences as community object(s) to which users may subscribe in accordance with some embodiments.

FIG. 44 illustrates an exemplary user interface 4410 for the my curbs communities functions 4411. In some embodiments, the user interface 4410 may have a menu option 4451 to move to other areas of the method and system. In some embodiments, the virtual curb capacity hub sequence as an object may be meta data tag #PaloSF 4412 to represent Palo Alto, California to San Francisco, California. In some embodiments, #PaloSF 4412 may have an option for the user 110 to Follow or Join or subscribe, or add 4426 the virtual curb capacity hub sequence #PaloSF 4412. In some embodiments, the number of followers or network members who are joined to that community object transformed data structure 4412 are 502 k 4426. In some embodiments, the virtual curb capacity hub sequence as an object may be meta data tag #MenloSF 4413 to represent Menlo Park, California to San Francisco, California. In some embodiments, #MenloSF 4413 may have an option for the user 110 to Follow or Join or subscribe, or add 4427 the virtual curb capacity hub sequence #MenloSF 4413. In some embodiments, the number of followers or network members who are joined to that community object transformed data structure 4413 are 100 k 4427. In some embodiments, the virtual curb capacity hub sequence as an object may be meta data tag #SFSantaCruz 4414 to represent San Francisco, California to Santa Cruz, California. In some embodiments, #SFSantaCruz 4414 may have an option for the user 110 to Follow or Join or subscribe, or add 4428 the virtual curb capacity hub sequence #SFSantaCruz 4414. In some embodiments, the number of followers or network members who are joined to that community object transformed data structure 4414 are 42 k 4428. In some embodiments, the virtual curb capacity hub sequence as an object may be meta data tag #NobHillWharf 4415 to represent Nob Hill San Francisco, California to Fishermans Wharf, San Francisco, California. In some implementations and embodiments, #NobHillWharf 4415 may have an option for the user 110 to Follow or Join or subscribe, or add 4429 the virtual curb capacity hub sequence #NobHillWharf 4415. In some embodiments, the number of followers or network members who are joined to that community object transformed data structure 4415 are 15 k 4429. In some embodiments, the virtual curb capacity hub sequence as an object may be meta data tag #CornellWegmans 4416 to represent Cornell University, Ithaca, NY to Wegmans, Ithaca, NY In some implementations and embodiments, #CornellWegmans 4416 may have an option for the user 110 to Follow or Join or subscribe, or add 4430 the virtual curb capacity hub sequence #CornellWegmans 4416. In some embodiments, the number of followers or network members who are joined to that community object transformed data structure 4416 are 3 k 4430. In some embodiments, the virtual curb capacity hub sequence as an object may be meta data tag #ICWegmans 4417 to represent Ithaca College, Ithaca, NY to Wegmans, Ithaca, NY In some embodiments, #ICWegmans 4417 may have an option for the user 110 to Follow or Join or subscribe, or add 4431 the virtual curb capacity hub sequence #ICWegmans 4417. In some embodiments, the number of followers or network members who are joined to that community object transformed data structure 4417 are 1 k 4431. In some implementations and embodiments, the virtual curb capacity hub sequence as an object may be meta data tag #KatyDtownHouston 4418 to represent Katy, Texas to Houston, Texas. In some embodiments, #KatyDtownHouston 4418 may have an option for the user 110 to Follow or Join or subscribe, or add 4432 the virtual curb capacity hub sequence #KatyDtownHouston 4418. In some implementations and embodiments, the number of followers or network members who are joined to that community object transformed data structure 4418 are 380 k 4432. In some implementations and embodiments, the virtual curb capacity hub sequence as an object may be meta data tag #UEastGrandCent 4419 to represent Upper East Side, NYC to Grand Central Station, NYC. In some implementations and embodiments, #UEastGrandCent 4419 may have an option for the user 110 to Follow or Join or subscribe, or add 4433 the virtual curb capacity hub sequence #UEastGrandCent 4419. In some embodiments, the number of followers or network members who are joined to that community object transformed data structure 4419 are 400 k 4433. In some embodiments, the virtual curb capacity hub sequence as an object may be meta data tag #PennStatGrandCent 4420 to represent Penn Station, NYC to Grand Central Station, NYC. In some implementations and embodiments, #PennStatGrandCent 4420 may have an option for the user 110 to Follow or Join or subscribe, or add 4434 the virtual curb capacity hub sequence #PennStatGrandCent 4420. In some implementations and embodiments, the number of followers or network members who are joined to that community object transformed data structure 4420 are 280 k 4434. In some implementations and embodiments, the virtual curb capacity hub sequence as an object may be meta data tag #IthacaNYC 4421 to represent Ithaca, NY to Grand Central Station, NYC. In some embodiments, #IthacaNYC 4421 may have an option for the user 110 to Follow or Join or subscribe, or add 4435 the virtual curb capacity hub sequence #IthacaNYC 4421. In some implementations and embodiments, the number of followers or network members who are joined to that community object transformed data structure 4421 are 19 k 4435. In some embodiments, the virtual curb capacity hub sequence as an object may be meta data tag #AustinHou 4422 to represent Austin, TX to Houston, TX. In some embodiments, #AustinHou 4422 may have an option for the user 110 to Follow or Join or subscribe, or add 4436 the virtual curb capacity hub sequence #AustinHou 4422. In some embodiments, the number of followers or network members who are joined to that community object transformed data structure 4422 are 100 k 4436. In some embodiments, the virtual curb capacity hub sequences may be recommended 4423 to follow as an object may be meta data tag #HarvardBCommons 4424 to represent Harvard, Cambridge, Mass to Boston Commons. In some implementations and embodiments, #HarvardBCommons 4424 may have an option for the user 110 to Follow or Join or subscribe, or add 4437 the virtual curb capacity hub sequence #HarvardBCommons 4424. In some implementations and embodiments, the number of followers or network members who are joined to that community object transformed data structure 4424 are 89 k 4437. In some implementations and embodiments, the virtual curb capacity hub sequences may be recommended 4423 to follow as an object may be meta data tag #NapervilleChiMkt 4425 to represent Naperville, Chicago to Marketplace, Chicago, Ill. In some implementations and embodiments, #NapervilleChiMkt 4425 may have an option for the user 110 to Follow or Join or subscribe, or add 4438 the virtual curb capacity hub sequence #NapervilleChiMkt 4425. In some embodiments, the number of followers or network members who are joined to that community object transformed data structure 4425 are 39 k 4438.

Figure 45:
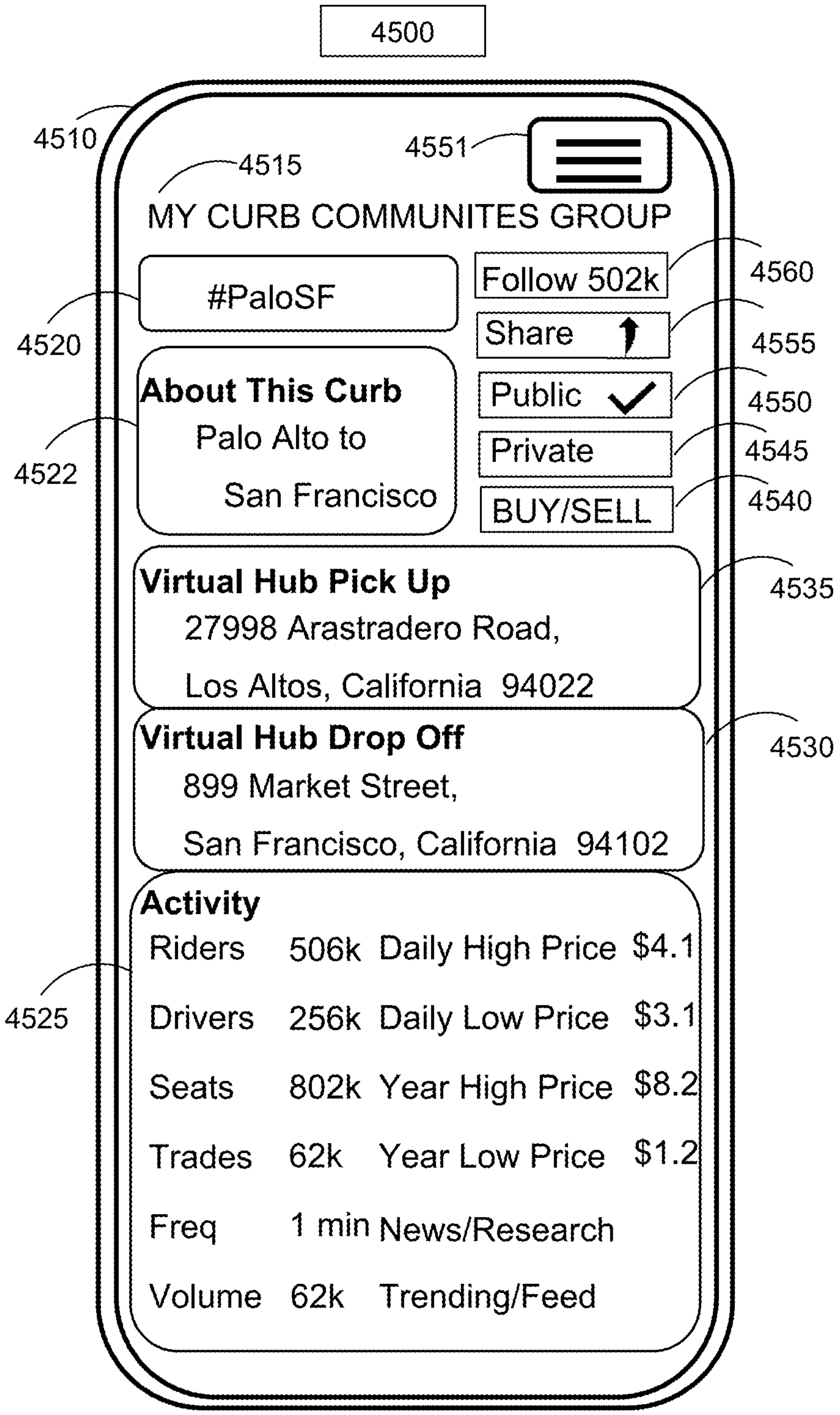
FIG. 45 illustrates an exemplary user interface of an exemplary virtual curb hub sequence as a community object and the associated attributes in accordance with some embodiments.

FIG. 45 illustrates an exemplary user interface 4500 for the My Routes Communities Group 4515 for a specific transformed data structure of a transformed community virtual hub sequence 4520. In some implementations and embodiments, the meta data virtual hub sequence #PaloSF 4520 may list the long form route details in the about the route section 4522. In some implementations and embodiments, the specific hub sequence #PaloSF 4520 may list the amount of followers and an option to follow 4560. In some embodiments, the specific hub sequence #PaloSF 4520 may list the ability to share the community group with another social network or text or email or other network protocol. In some implementations and embodiments, the specific hub sequence #PaloSF 4520 may list group as public 4550 or private 4545. In some embodiments, the specific hub sequence #PaloSF 4520 may list gateway to buy or sell 4540 transformed curb capacity units using the LOB 300 for a commute community 241. In some implementations and embodiments, the specific hub sequence #PaloSF 4520 may list specific pick up hub address location 4535 or drop off point address 4530. In some embodiments, the specific hub sequence #PaloSF 4520 may list the activity statistics and data with respect to the number of riders 4525, number of drivers 4525, number of seats 4525, number of trades 4525, frequency of curb capacity units 4525, volume of curb capacity units 4525, daily high price for curb capacity units 4525, daily low price for curb capacity units on the community object of #PaloSF 4520, yearly high price 4525, yearly low price 4525, news, research, trending, feeds for the #PaloSF 4520 virtual hub sequence.

Figure 46:
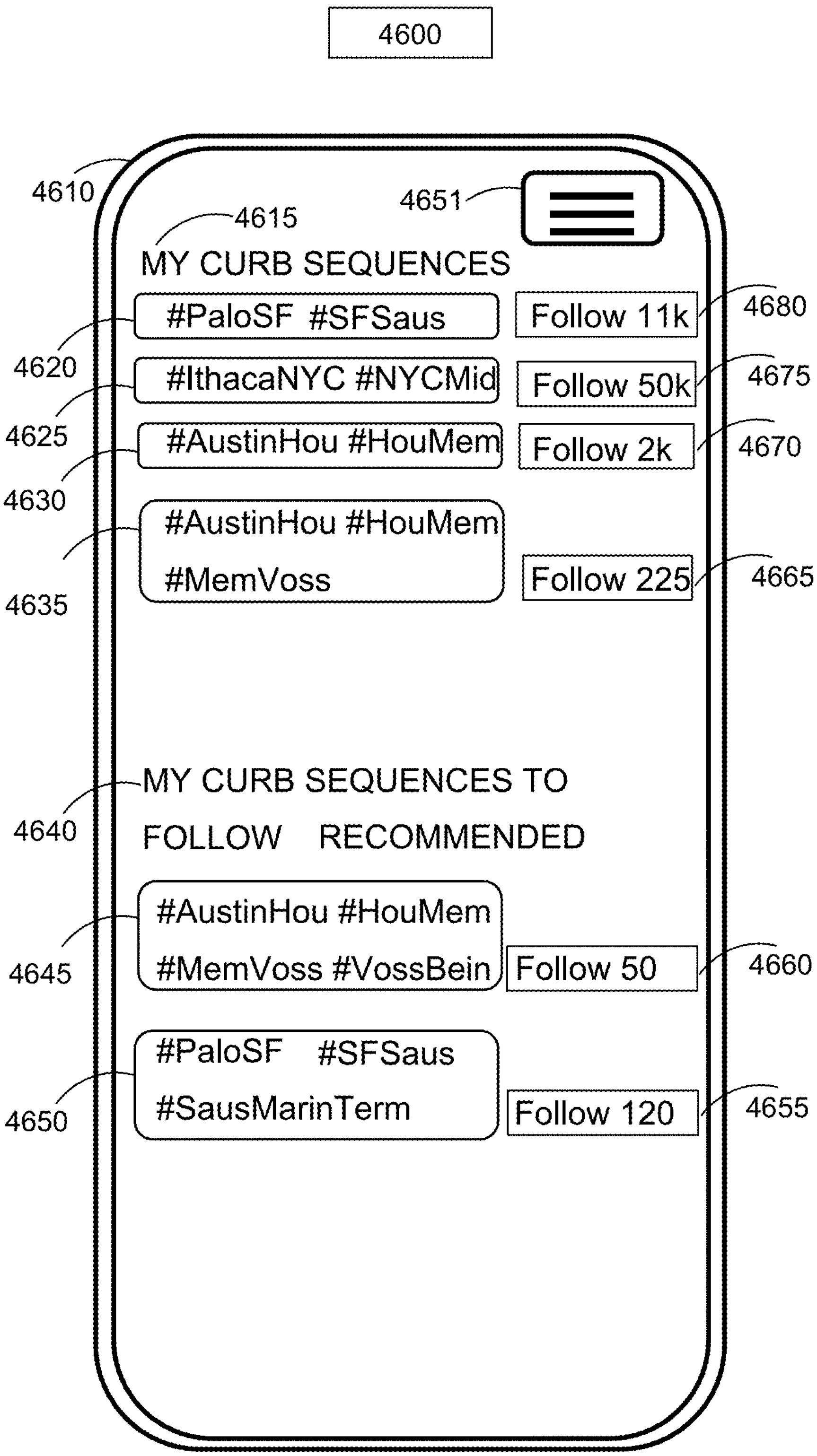
FIG. 46 illustrates an exemplary multi-virtual hub sequence community object combination in accordance with some embodiments.

FIG. 46 illustrates an exemplary user interface 4600 with respect to My Route Sequences 4615 which may transform sequences with more than two virtual hubs into sequences as two or three or more series of route sequences 4620. In some embodiments, #PaloSF #SFSaus 4620 may represent an origin virtual hub sequence of Palo Alto, California to San Francisco, California followed by a secondary sequence of San Francisco, California to Sausalito, California 4620. Multi leg virtual hub sequences allow for the power of the data transformation to link the villages, cities or states from a network curb capacity topology structure from multiple providers of curb capacity units to provide higher levels of frequency and market opportunity to link public and private systems among many other benefits. In some implementations and embodiments, #PaloSF #SFSaus 4620 may allow input from users to join, follow, subscribe or become a member of multi leg sequences which help solve potential last mile issues within curb capacity systems 4680. In some implementations and embodiments, #IthacaNYC #NYCMid 4625, may allow for a curb capacity unit seller or buyer to connect two disparate curb capacity networks to provide last mile curb capacity to a destination at the lowest market cost because each leg or series of virtual hub sequences has an independent market associated with the leg or virtual hub sequence #IthacaNYC #NYCMid 4625. In some In some implementations and embodiments, #IthacaNYC #NYCMid 4625 may allow input from users to join, follow, subscribe or become a member of multi leg sequences which help solve potential last mile issues within curb capacity systems 4675. In some embodiments, three two leg sequences may be attached through data transformations such that #Austin-Hou then takes a curb capacity unit to #HouMem which then takes a curb capacity unit to #MemVoss. The #AustinHou #HouMem #MemVoss 4635 three leg virtual hub sequence combination may further solve last mile issues for travelers where public transport may be an issue 4665 or private rides simply are going a different direction, but the sequence community object transformation helps travelers understand options and piece multiple curb capacity systems onto a single community based object to aggregate communication and transaction benefits of the system. In some embodiments, prior history navigation searches and locations may be used to build recommended additional sequences 4640 which may be recommended for users to subscribe, join, follow or become a member. In some embodiments, the virtual hub route sequence may link 4 or more virtual hub sequence pairs or even combinations of already linked community object pairs 4645. In some embodiments, #AustinHou #HouMem #MemVoss #VossBein 4645 may be linked to provide a last mile sequence to a traveler or driver from Austin to the Memorial Area of Houston in a specific address. Traversing a series of linked trips may allow for the cost of non-linked trips to be dramatically lower due to using a series of connected local seats rather than a private for hire vehicle which may be 10 times the cost and add a reverse dead head trip that further pollutes the environment and leaves the driver without additional income on the dead head return leg. The transformed virtual hub sequence methodology allows for curb capacity systems to be integrated in ways that were not formerly possible because the systems were disparate or simply did not allow for linked trips or linked community objects that could optimize topological network structures over existing inefficient structures. In some embodiments, virtual hub sequences which have been linked 4645 may also allow users to subscribe 4660. In some embodiments, #PaloSF #SFSaus #SausMarinTerm 4650 may be linked to provide a last mile sequence to a traveler or driver from Palo Alto, California to Marin Terminal in Sausilito, California in a specific address. In some embodiments, virtual hub sequences which have been linked 4650 may also allow users to subscribe 4655.

Figure 47:
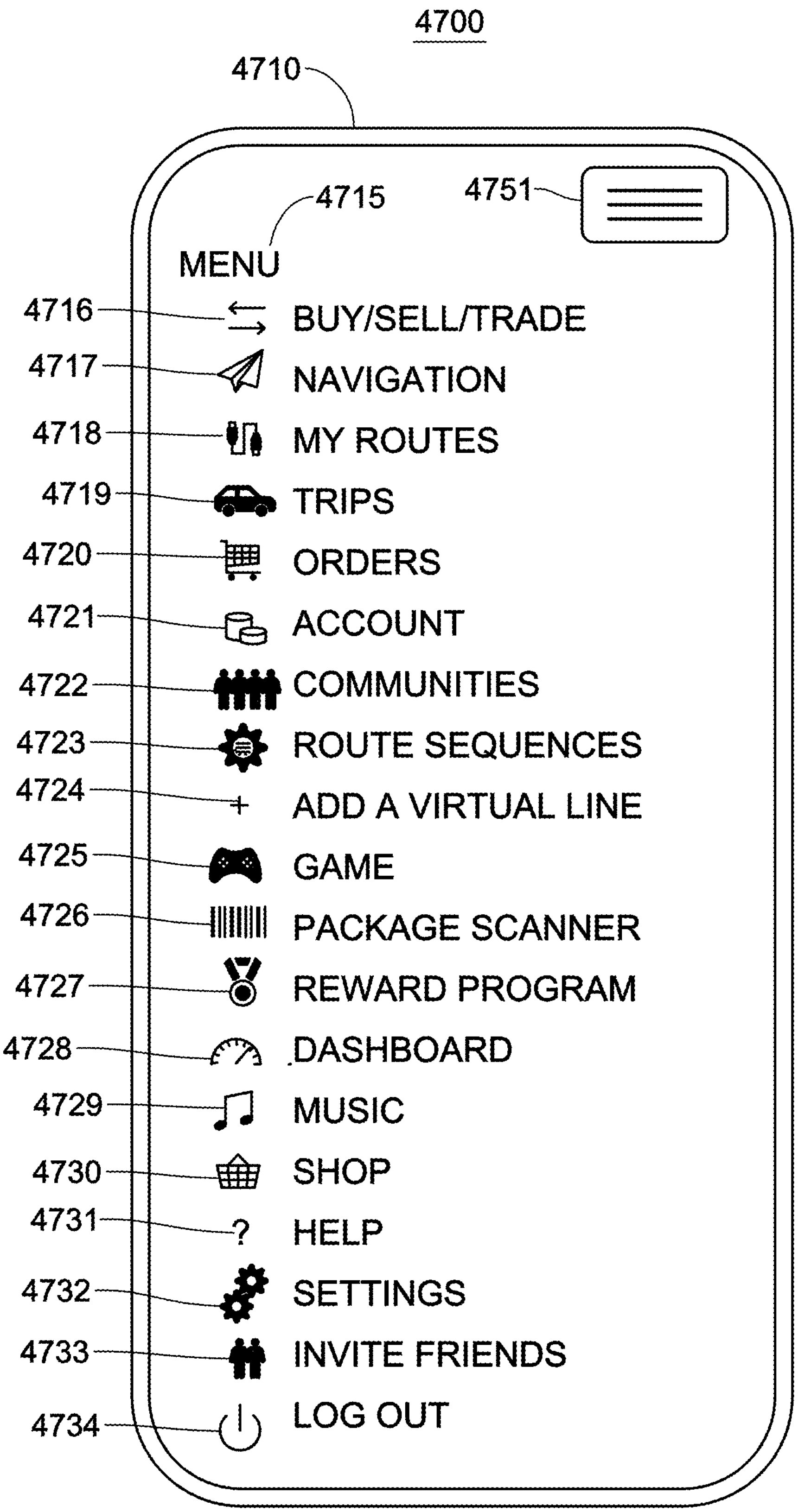
FIG. 47 illustrates an exemplary menu user interface for the method and system of virtual hub sequence communities combined with the curb capacity unit market system and method in accordance with some embodiments.

FIG. 47 illustrates an exemplary user menu interface 4700. In some embodiments, menu options may list as buy/sell/trade 4716 to go to the curb capacity unit gateway trading platform for virtual hub combinations and virtual hub sequences. In some embodiments, the user interface may allow a user to go to the navigation 4717 module for price based navigation or route selection based on cost or earnings from a route as described in U.S. patent application Ser. No. 16/242,967, "Price Based Navigation," filed Jan. 8, 2019; the entirety of which is incorporated by reference herein. Furthermore, as described in U.S. patent application Ser. No. 15/877,393, "Electronic Forward market exchange for curb capacity seats and capacity in curb capacity spaces and vehicles," filed Jan. 23, 2018, the entirety of which is incorporated by reference herein. In some embodiments, a user 110 may select my routes 4718 to toggle to routes that are important to their user profile or needs in the network member database 222. In some implementations and embodiments, trips 4719 may be selected to toggle to the trip delivery view. In some embodiments, orders 4720 may be selected to toggle to cancel or adjust orders in the system that are unfilled. In some embodiments, users may toggle to the account 4721 page or communities object page 4400 or the route sequences page 4723. In some embodiments, users 110 may add additional hubs 4724 or may toggle to the gaming interface 3700. In some implementations and embodiments, freight curb capacity units may need to be scanned on the freight scanning module 4726. In some implementations and embodiments, users may select the reward program module 4727 or the dashboard module 4728. In some implementations and embodiments, the user may select the music 4729 or shopping module 4730. In some implementations and embodiments, the user may select help 4731 or settings 4732 to update account information or privacy settings. In some implementations and embodiments, users 110 may invite friends 4733 for rewards or bonuses or cash or credits 4733. In some embodiments, users may also logout 4734.

FIG. 48 illustrates an exemplary preamble formula structure 4800 for a transformed transportation or freight capacity unit which is interchangeable with a curb capacity unit or sidewalk capacity unit or toll congestion capacity unit. In some embodiments, the disclosed method and system relates to the sale and purchase or resale or repurchase or transfer and assignment of those certain transportation and freight capacity units and thereby curb capacity unit or sidewalk capacity unit or toll congestion capacity units. In some implementations and embodiments, SeatsX may relate to the purchase or sale or repurchase and resale of transportation capacity units or curb capacity unit or sidewalk capacity unit or toll congestion capacity units. In some embodiments, ShipsX may relate to the purchase or sale or repurchase and resale of freight capacity units or curb capacity unit or sidewalk capacity unit or toll congestion capacity unit. In some embodiments, CirclesX may relate to the purchase or sale or repurchase and resale of freight capacity units or curb capacity unit or sidewalk capacity unit or toll congestion capacity unit. In some embodiments, a SeatsX or ShipsX or CirclesX Trade Hub is synonymous with a Virtual Hub.

FIG. 49 illustrates an exemplary preamble formula extension structure 4900 for a transformed Transportation or Freight Capacity Unit which is interchangeable with a curb capacity unit or sidewalk capacity unit or toll congestion capacity unit. In some embodiments, the disclosed method and system relates to the sale and purchase or resale or repurchase or transfer and assignment of those certain transportation and freight capacity units. In some embodiments, SeatsX may relate to the purchase or sale or repurchase and resale of transportation capacity units. In some embodiments ShipsX may relate to the purchase or sale or repurchase and resale of freight capacity units. In some embodiments, a SeatsX or ShipsX Trade Hub is synonymous with a Virtual Hub.

FIG. 50 illustrates an exemplary definition formula structure 5000 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Affiliate, Agreement, Applicable Interest Rate, Assigning Party, Bankrupt entity and other terms in accordance with some embodiments. In some embodiments, the formula for the transformed transportation or freight capacity unit may be present within the definitions stated in FIG. 50.

FIG. 51 illustrates an exemplary definition formula structure 5100 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Business Day, Buyer, Claiming Party, Claims, Confirmation, Contract Price, Contract Value, Contractual Currency and other terms in accordance with some embodiments. In some embodiments, the formula for the transformed transportation or freight capacity unit may be present within the definitions stated in FIG. 51.

FIG. 52 illustrates an exemplary definition formula structure 5200 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Cost, Defaulting Party, Default Rate, Delivery, Early Termination Date, Effective Date, Event of Default, Force Majeure and other terms in accordance with some embodiments. In some embodiments, the formula for the transformed transportation or freight capacity unit may be present within the definitions stated in FIG. 52.

FIG. 53 illustrates an exemplary definition formula structure 5300 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include GTCs, Independent Amount, Letters of Credit, Margin Party, Non-Defaulting Party, Option, Option Buyer, Option Seller, Party or Parties, Party B, Payment Date, Performance Assurance and other terms in accordance with some embodiments. In some embodiments, the formula for the transformed transportation or freight capacity unit may be present within the definitions stated in FIG. 53.

FIG. 54 illustrates an exemplary definition formula structure 5400 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Person, Premium, Present Value Discount Rate, Ask Yield, Product, Recording, Replacement Value, Seller, Settlement Amount, and other terms in accordance with some embodiments. In some embodiments, the formula for the transformed transportation or freight capacity unit may be present within the definitions stated in FIG. 54.

FIG. 55 illustrates an exemplary definition formula structure 5500 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Taxes, Term, Terminated Transaction, Termination Payment, Termination Replacement Price, Termination Replacement Transaction and other terms in accordance with some embodiments. In some embodiments, the formula for the transformed transportation or freight capacity unit may be present within the definitions stated in FIG. 55.

FIG. 56 illustrates an exemplary definition formula structure 5600 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Trade Date, Transaction, Transportation Capacity Unit and Freight Capacity Unit may be used interchangeably and other terms in accordance with some embodiments. In some embodiments, the formula for the transformed transportation or freight capacity unit may be present within the definitions stated in FIG. 56.

FIG. 57 illustrates an exemplary definition formula structure 5700 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Confirmation and other terms in accordance with some embodiments. In some embodiments, a plurality of definitions are set from a superset or subset or combination of the following structure to include Recording of Transactions and other terms in accordance with some embodiments. In some embodiments, the formula for the transformed transportation or freight capacity unit may be present within the definitions stated in FIG. 57.

FIG. 58 illustrates an exemplary definition formula structure 5800 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Inconsistency with these established formulas for a plurality of transformed transportation unit formulas. In some embodiments, the formula for the transformed transportation or freight capacity unit may be present within the definitions stated in FIG. 58.

FIG. 59 illustrates an exemplary definition formula structure 5900 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Force Majeure with these established formulas for a plurality of transformed transportation unit formulas. In some embodiments, Force Majeure may occur and be written in one or more business days from the Force Majeure event. In some embodiments, Remedies for Product Delivery Failures may be caused by failure of failure of the Buyer or Seller to delivery the TCU and the non-failing party shall be entitled to the formula of the then current price of such TCI as liquidated damages. In some embodiments, the formula for the transformed transportation or freight capacity unit may be present within the definitions stated in FIG. 59.

FIG. 60 illustrates an exemplary definition formula structure 6000 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include events of default and remedies with these established formulas for a plurality of transformed transportation and freight unit formulas. In some embodiments, the formula for the transformed transportation or freight capacity unit may be present within the definitions stated in FIG. 60. In some embodiments, events of default may include failure to make payment when required, making false representations, failure to perform to deliver the TCU, post-merger or reorganization failing to support the obligations of TCU transactions. In some embodiments, events of default may include credit default or failure to delivery performance assurance or margin.

FIG. 61 illustrates an exemplary definition formula structure 6100 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include effect of default for a plurality of transformed transportation unit formulas. In some embodiments, effect of default may occur and be written in one or more business days from the Effect of an event of Default. In some embodiments, the calculation of a termination payment may be "Settlement Amount" for such Terminated Transaction shall be the difference between the Replacement Value and the Contract Value of such Terminated Transaction, as calculated by the Non-Defaulting Party as follows:

i. If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

ii. If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party. In some embodiments, the formula for the transformed transportation or freight capacity unit may be present within the definitions stated in FIG. 61.

FIG. 62 illustrates an exemplary definition formula structure 6200 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include effect of default for a plurality of transformed transportation unit formulas. In some embodiments, effect of default may occur and be written in one or more business days from the Effect of an event of Default. In some embodiments, the calculation of a termination payment may be "Settlement Amount" for such Terminated Transaction shall be the difference between the Replacement Value and the Contract Value of such Terminated Transaction, as calculated by the Non-Defaulting Party as follows:

iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section 5.4. In some embodiments, the formula for the transformed transportation or freight capacity unit may be present within the definitions stated in FIG. 62.

FIG. 63 illustrates an exemplary definition formula structure 6300 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Notice of Payment of Termination Payment of transformed transportation unit formulas. In some embodiments, Notice of Payment of Termination Payment may occur and be written in one or more business days from the Notice of Payment of Termination Payment. In some embodiments, As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and SeatsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3 5900, no such interest shall be payable. If the Termination Payment is due from the Non-Defaulting Party, the Non-Defaulting Party shall pay such Termination Payment, without interest, within twenty (20) Business Days after delivery of such notice.

FIG. 64 illustrates an exemplary definition formula structure 6400 for a transformed Transportation or Freight Capacity Unit. In some embodiments, a plurality of definitions are set from a superset or subset or combination of the following structure to include Notice of Payment of Termination Payment of transformed transportation unit formulas. In some embodiments, Notice of Payment of Termination Payment may occur and be written in one or more business days from the Notice of Payment of Termination Payment. In some embodiments, As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and SeatsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3 5900, no such interest shall be payable. If the Termination Payment is due from the Non-Defaulting Party, the Non-Defaulting Party shall pay such Termination Payment, without interest, within twenty (20) Business Days after delivery of such notice.

FIG. 65 illustrates an exemplary definition formula structure 6500 for a transformed Transportation or Freight Capacity Unit. In some embodiments, a plurality of definitions are set from a superset or subset or combination of the following structure to include Closeout Setoff features 6500. After calculation of a Termination Payment in accordance with Section 5.3 (unless such Termination Payment was calculated as a result of a termination pursuant to Article 3), if the Defaulting Party would be owed the Termination Payment, the Non-Defaulting Party shall be entitled, at its option and in its discretion, to set off against such Termination Payment any amounts due and owing by the Defaulting Party to the Non-Defaulting Party under any other agreements, instruments or undertakings between the Defaulting Party and the Non-Defaulting Party which are not related to the SeatsX Trade Hub. The remedy provided for in this Section shall be without prejudice and in addition to any right of setoff, combination of accounts, lien or other right to which any Party is at any time otherwise entitled (whether by operation of law, contract or otherwise). Notwithstanding the foregoing, the Non-Defaulting Party shall not be required to pay to the Defaulting Party any amount owing by the Non-Defaulting Party under this Agreement until the Non-Defaulting Party receives confirmation satisfactory to it in its reasonable discretion that all obligations of the Defaulting Party to make any payments of any kind whatsoever to the Non-Defaulting Party or any of its Affiliates or otherwise which are due and payable as of the Early Termination Date have been fully and finally paid in cash in some embodiments.

FIG. 66 illustrates an exemplary definition formula structure 6600 for a transformed Transportation or Freight Capacity Unit which is interchangeable with a curb capacity unit or sidewalk capacity unit or toll congestion capacity unit. In some embodiments, a plurality of definitions are set from a superset or subset or combination of the following structure to include Disputes of Invoices and Payments of transformed transportation unit formulas. In some embodiments, a plurality of limitation of remedies, liability and damages are set from a superset or subset or combination of the following structure to include limitation of remedies, liability and damages of transformed transportation unit formulas. In some embodiments, remedies are limited to the formulas of Replacement Value and Contract Value structured in 6100 and 6200.

FIG. 67 illustrates an exemplary definition formula structure 6700 for a transformed Transportation or Freight Capacity Unit which is interchangeable with a curb capacity unit or sidewalk capacity unit or toll congestion capacity unit. In some embodiments, a plurality of limitation of remedies, liability and damages are set from a superset or subset or combination of the following structure to include limitation of remedies, liability and damages of transformed transportation unit formulas. In some embodiments, remedies are limited to the formulas of Replacement Value and Contract Value structured in 6100 and 6200.

FIG. 68 illustrates an exemplary definition formula structure 6800 for a transformed Transportation or Freight Capacity Unit which is interchangeable with a curb capacity unit or sidewalk capacity unit or toll congestion capacity unit. In some embodiments, a plurality of limitation of remedies, liability and damages are set from a superset or subset or combination of the following structure to include limitation of remedies, liability and damages of transformed transportation unit formulas. In some embodiments, remedies are limited to the formulas of Replacement Value and Contract Value structured in 6100 and 6200. In some embodiments, financial information may be requested to satisfy performance assurance 5300 formulas for credit support 6900 of Transportation and Freight Capacity Units.

FIG. 69 illustrates an exemplary definition formula structure 6900 for a transformed Transportation or Freight Capacity Unit which is interchangeable with a curb capacity unit or sidewalk capacity unit or toll congestion capacity unit. In some embodiments, a plurality of credit support formulas are set from a superset or subset or combination of the following structure to include credit protection in the form of performance assurance and grants of security interest and remedies of transformed transportation unit formulas. In some embodiments, credit support may follow the formulas in the definition of performance assurance 5300. In some embodiments, credit support and performance assurance calculations may include value at risk calculations that consider duration of the contract, price volatility formulas, price correlation formulas, closeout setoff formulas, cross-default formulas and other formulas that may consider the value and credit fluctuations of the credit worthiness of a counterparty and the market value and Replacement Value of such contracts of transformed transportation and freight capacity units.

FIG. 70 illustrates an exemplary definition formula structure 7000 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, general formulas may follow the formulas in the definition of performance assurance 5300, representation and warranties formulas to determine the variance of financial results of a counterparty to quantify a truthfulness score. In some embodiments, a credit score or truthfulness score may use earnings manipulation formulas that seek variance thresholds on cash flow, inventories, receivables, payables, goodwill, and other accounting standards that may be placed in a model to determine the general variability of the credit worthiness of the counterparty.

FIG. 71 illustrates an exemplary definition formula structure 7100 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include cross checks on criminal background, driver license scores, indemnification scores, or scores to determine the likelihood of litigious actions.

FIG. 72 illustrates an exemplary definition formula structure 7200 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include credit support for successors and assignments to provide scores of the likelihood a counterparty assuming the transportation or freight capacity unit may handle the credit obligations without triggering an event of default.

FIG. 73 illustrates an exemplary definition formula structure 7300 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include dispute resolution formulas and threshold formulas to methodically evaluate and settle dispute amounts.

FIG. 74 illustrates an exemplary definition formula structure 7400 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include dispute resolution formulas and threshold formulas to methodically evaluate and settle dispute amounts and arbitration awards.

FIG. 75 illustrates an exemplary definition formula structure 7500 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include dispute resolution formulas and threshold formulas to methodically evaluate and settle dispute amounts and arbitration awards.

FIG. 76 illustrates an exemplary definition formula structure 7600 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include dispute resolution formulas and threshold formulas to methodically evaluate and settle dispute amounts and arbitration awards.

FIG. 77 illustrates an exemplary definition formula structure 7700 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include notice formulas and threshold formulas to methodically evaluate and settle dispute amounts and arbitration awards and counterparty information updates.

FIG. 78 illustrates an exemplary definition formula structure 7800 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include notice formulas and threshold formulas to methodically evaluate and settle severability and intent and regulation and exchange rule.

FIG. 79 illustrates an exemplary definition formula structure 7900 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional formulas of transformed transportation unit formulas. In some embodiments, these formulas may include termination, liquidation, net out, offset, and plurality of counterpart formulas and threshold formulas to methodically evaluate and settle termination, liquidation, net out, offset, and plurality of counterpart formulas.

FIG. 80 illustrates an exemplary notice of correspondence 8000 for a transformed Transportation or Freight Capacity Unit which is interchangeable with a curb capacity unit or sidewalk capacity unit or toll congestion capacity unit. In some embodiments, a plurality of general formulas are set from a superset or subset or combination of the following structure to include additional notice of correspondence.

Figure 81:
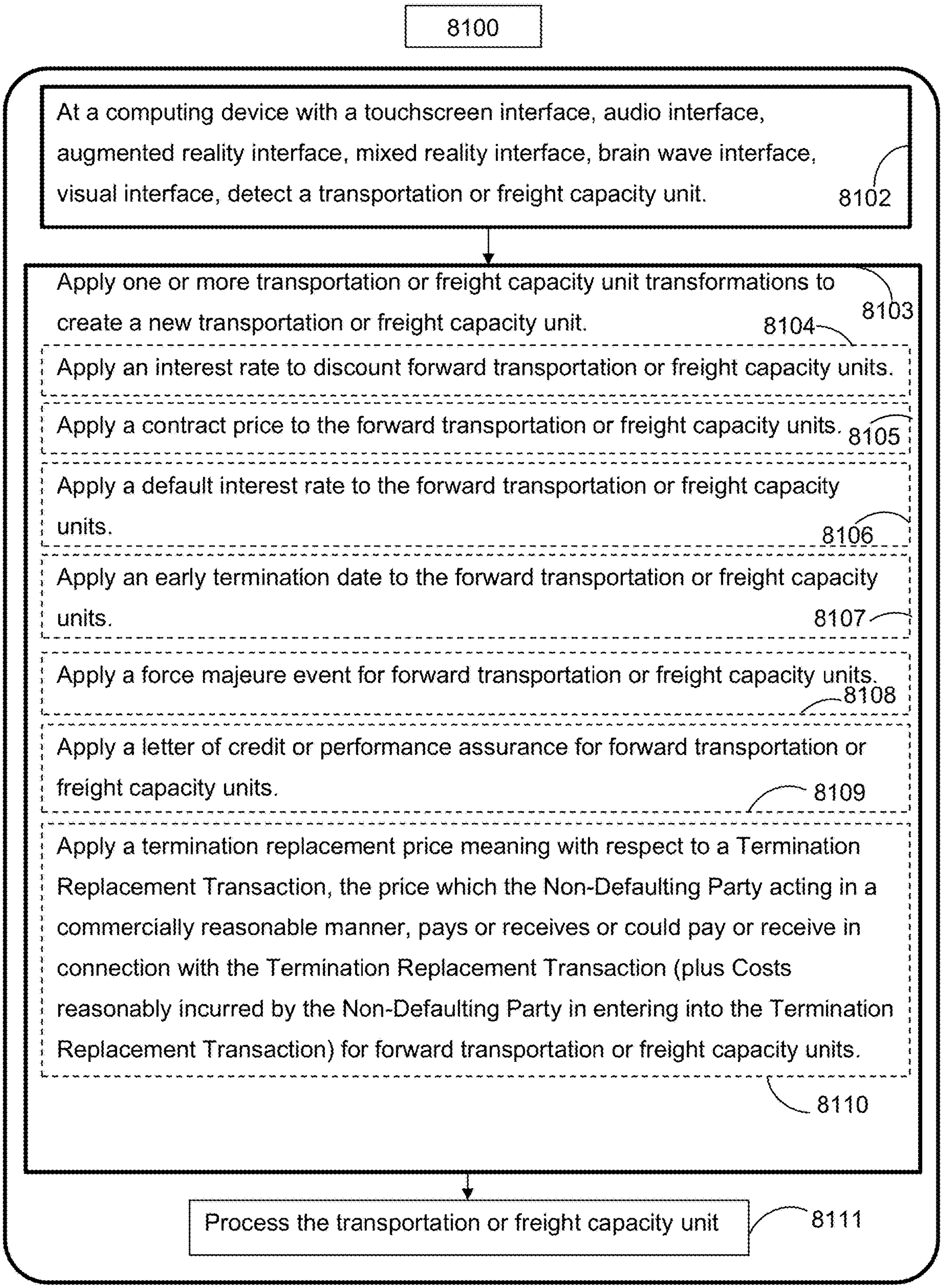
FIG. 81 illustrates and exemplary transformation of a Transportation Capacity Unit flow chart of a plurality of formula transformations in accordance with some embodiments.

FIG. 81 illustrates an exemplary notice step flowchart and application of one or more transportation for freight capacity unit transformations 8100. In some embodiments, at a computing device with a touchscreen interface, audio interface, augmented reality interface, mixed reality interface, brain wave interface, visual interface, detect a transportation or freight capacity unit 8102, the method and system may apply one or more transportation or freight capacity unit transformations to create a new transportation or freight capacity unit 8103. In some embodiments, the transformation may include the following transformations of the transportation and freight capacity unit or a superset or subset thereof:

i) apply an interest rate to discount forward transportation or freight capacity units 8104;

ii) apply a contract price to the forward transportation or freight capacity units 8105;

iii) apply a default interest rate to the forward transportation or freight capacity units 8106;

iv) apply an early termination date to the forward transportation or freight capacity units 8107;

v) apply a force majeure event for forward transportation or freight capacity units 8108;

vi) apply a letter of credit or performance assurance for forward transportation or freight capacity units 8109;

vii) apply a termination replacement price meaning with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction) for forward transportation or freight capacity units 8110.

In some implementations and embodiments, the aforementioned steps and transformations may be processed to transform the transportation or freight capacity unit 8111.

Figure 82:
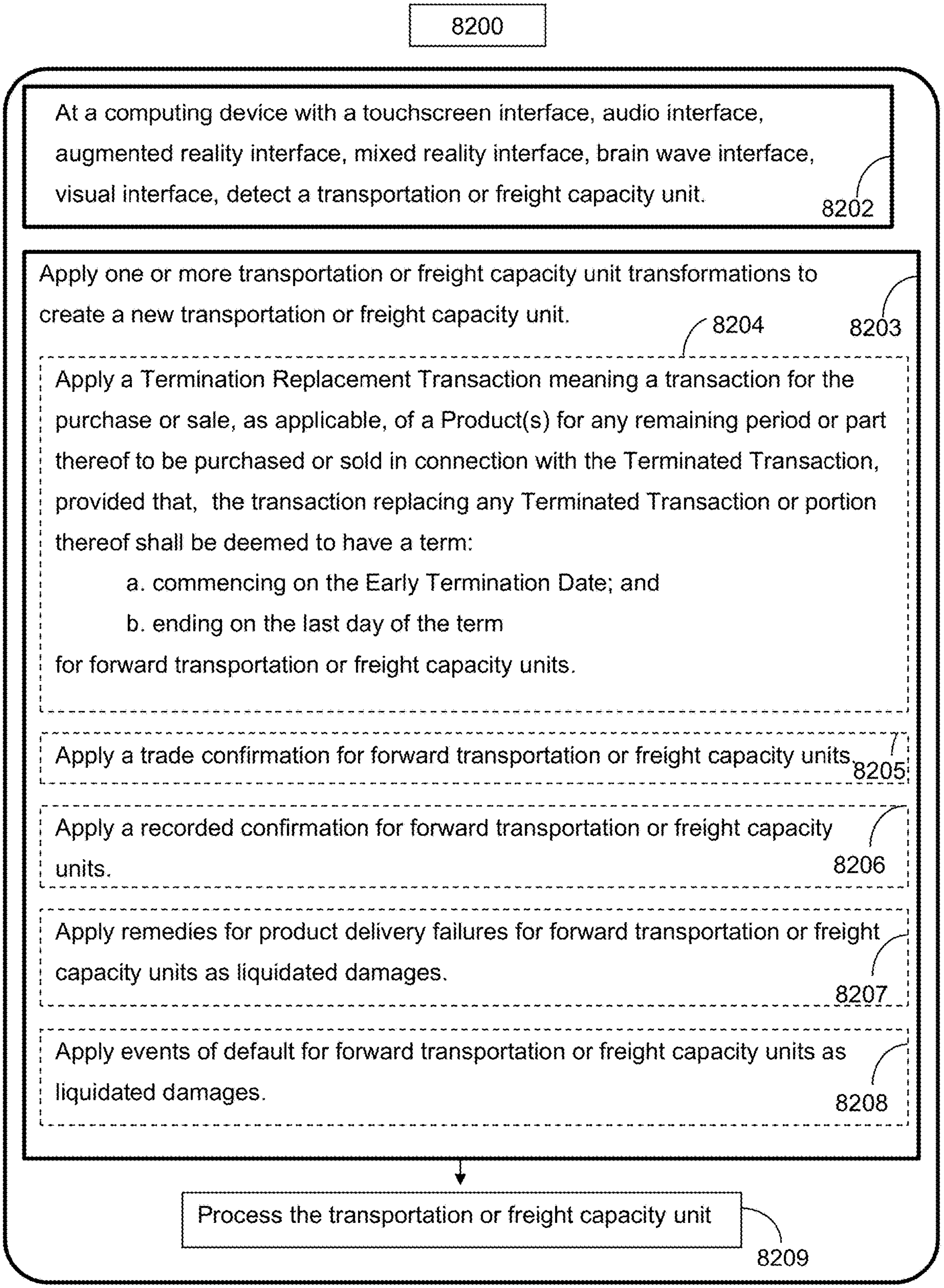
FIG. 82 illustrates and exemplary transformation of a Transportation Capacity Unit flow chart of a plurality of formula transformations in accordance with some embodiments.

FIG. 82 illustrates an exemplary notice step flowchart and application of one or more transportation for freight capacity unit transformations 8200. In some embodiments, at a computing device with a touchscreen interface, audio interface, augmented reality interface, mixed reality interface, brain wave interface, visual interface, detect a transportation or freight capacity unit 8202, the method and system may apply one or more transportation or freight capacity unit transformations to create a new transportation or freight capacity unit 8203. In some embodiments, the transformation may include the following transformations of the transportation and freight capacity unit or a superset or subset thereof:

i) apply a Termination Replacement Transaction 8204 meaning a transaction for the purchase or sale, as applicable, of a Product(s) for any remaining period or part thereof to be purchased or sold in connection with the Terminated Transaction, provided that, the transaction replacing any Terminated Transaction or portion thereof shall be deemed to have a term:
   (1) commencing on the Early Termination Date; and
   (2) ending on the last day of the term for forward transportation or freight capacity units;
ii) apply a trade confirmation for forward transportation or freight capacity units 8205;
iii) apply a recorded confirmation for forward transportation or freight capacity units 8206;
iv) apply remedies for product delivery failures for forward transportation or freight capacity units as liquidated damages 8207;
v) apply events of default for forward transportation or freight capacity units as liquidated damages 8208;

In some implementations and embodiments, the aforementioned steps and transformations may be processed to transform the transportation or freight capacity unit 8209.

Figure 83:
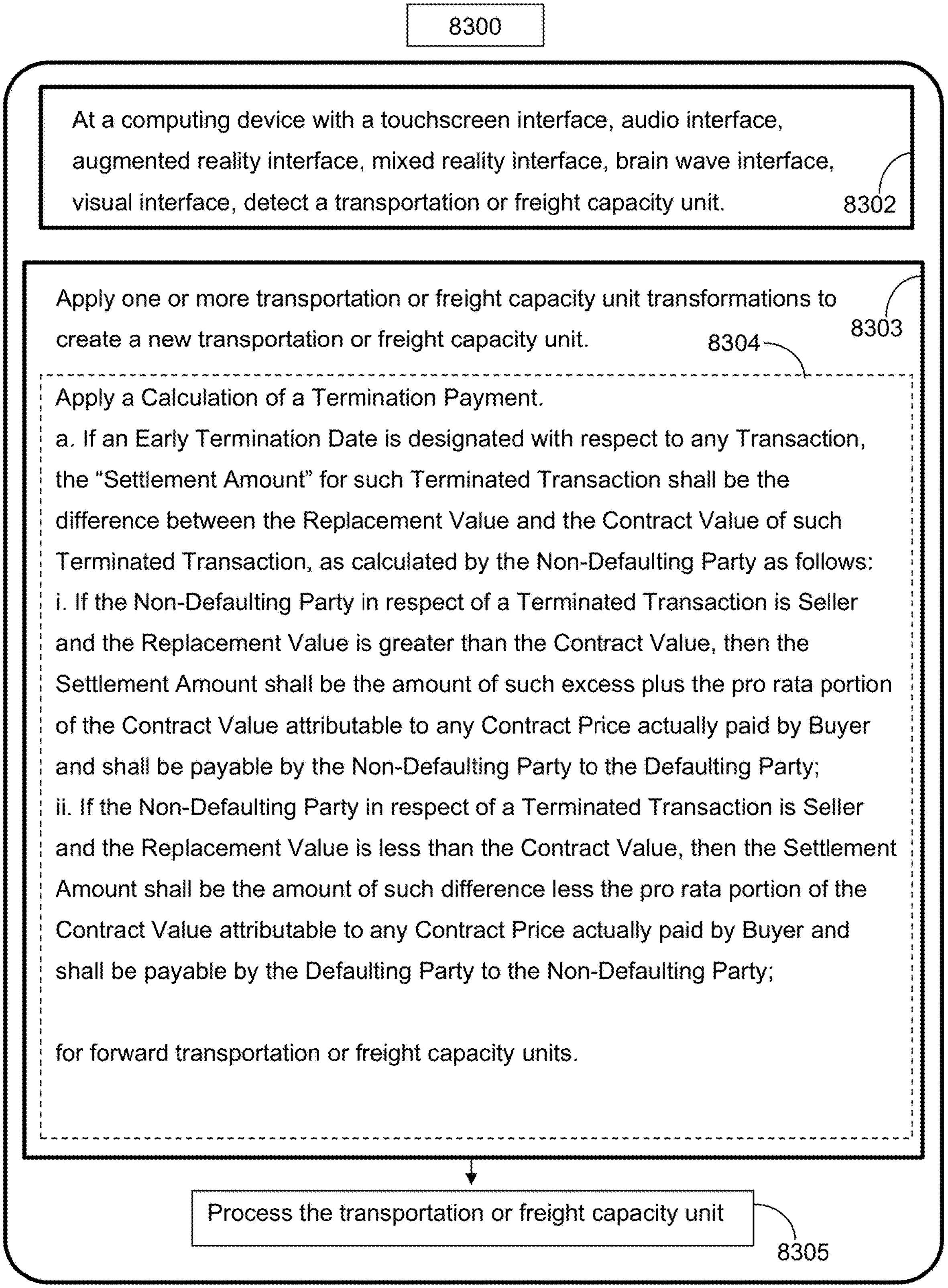
FIG. 83 illustrates and exemplary transformation of a Transportation Capacity Unit flow chart of a plurality of formula transformations in accordance with some embodiments.

FIG. 83 illustrates an exemplary notice step flowchart and application of one or more transportation for freight capacity unit transformations 8300. In some embodiments, at a computing device with a touchscreen interface, audio interface, augmented reality interface, mixed reality interface, brain wave interface, visual interface, detect a transportation or freight capacity unit 8302, the method and system may apply one or more transportation or freight capacity unit transformations to create a new transportation or freight capacity unit 8303. In some embodiments, the transformation may include the following transformations of the transportation and freight capacity unit or a superset or subset thereof:

i) Apply a Calculation of a Termination Payment 8304.
   a. If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:
   (1) If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;
   (2) If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

for forward transportation or freight capacity units.

In some embodiments, the aforementioned steps and transformations may be processed to transform the transportation or freight capacity unit 8305.

FIG. 84 illustrates an exemplary notice step flowchart and application of one or more transportation for freight capacity unit transformations 8400. In some embodiments, at a computing device with a touchscreen interface, audio interface, augmented reality interface, mixed reality interface, brain wave interface, visual interface, detect a transportation or freight capacity unit 8402, the method and system may apply one or more transportation or freight capacity unit transformations to create a new transportation or freight capacity unit 8403. In some embodiments, the transformation may include the following transformations of the transportation and freight capacity unit or a superset or subset thereof:

i) apply a Calculation of a Termination Payment 8404;
   (1) If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and
   (2) If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.
   (3) If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4 6400. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section for forward transportation or freight capacity units.

In some embodiments, the aforementioned steps and transformations may be processed to transform the transportation or freight capacity unit 8405.

Figure 85:
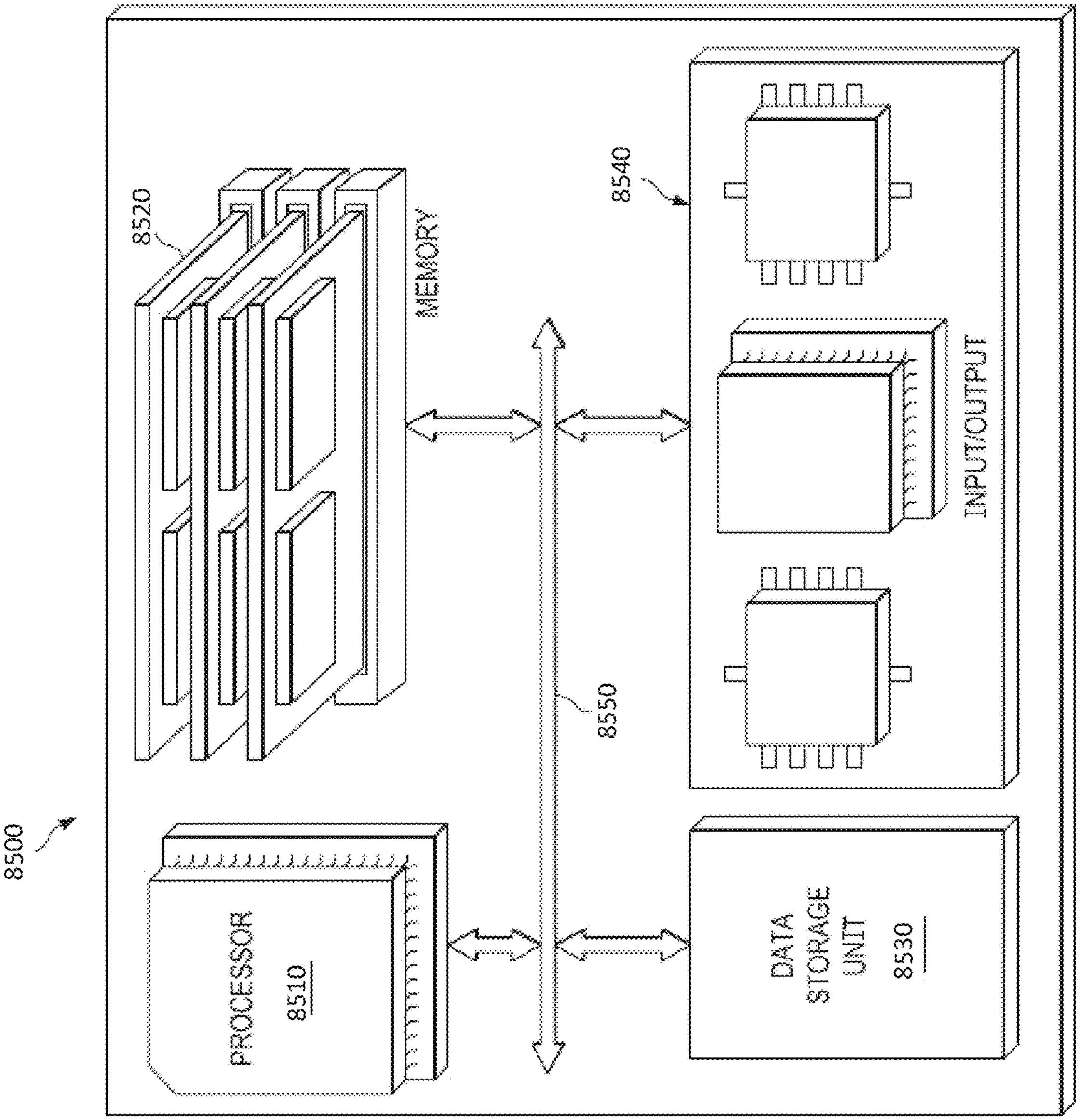
FIG. 85 illustrates a schematic diagram of a computing system in which the various technologies described herein may be incorporated and practiced in accordance with some embodiments.

FIG. 85 illustrates a block diagram of a hardware configuration 8500 in which one or more various technologies described herein may be incorporated and practiced. The hardware configuration 8500 can be used to implement the computing systems discussed above (e.g., the computing devices mentioned above). The hardware configuration 8500 can include a processor 8510, a memory 8520, a storage device 8530, and an input/output device 8540. Each of the components 8510, 8520, 8530, and 8540 can, for example, be interconnected using a system bus 8550. The processor 8510 can be capable of processing instructions for execution within the hardware configuration 8500. In one implementation, the processor 8510 can be a single-threaded processor. In another implementation, the processor 8510 can be a multi-threaded processor. The processor 8510 can be capable of processing instructions stored in the memory 8520 or on the storage device 8530.

The memory 8520 can store information within the hardware configuration 5300. In one implementation, the memory 8520 can be a computer-readable medium. In one implementation, the memory 8520 can be a volatile memory unit. In another implementation, the memory 8520 can be a non-volatile memory unit.

In some implementations, the storage device 8530 can be capable of providing mass storage for the hardware configuration 8500. In one implementation, the storage device 8530 can be a computer-readable medium. In various different implementations, the storage device 8530 can, for example, include a hard disk device/drive, an optical disk device, flash memory or some other large capacity storage device. In other implementations, the storage device 8530 can be a device external to the hardware configuration 8500. Various implementations for the memory 8520 and/or the storage device 8530 are further discussed below.

The input/output device 8540 can provide input/output operations for the hardware configuration 8500. In one implementation, the input/output device 8540 can include one or more display system interfaces, sensors and/or data transfer ports.

The subject matter of this disclosure, and/or components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine, e.g., a machine programmed to perform the processes described herein. The processes and logic flows can also be performed by, and apparatus can also be implemented as, special purpose logic circuitry, e.g., an FPGA (field programmable gate array) or an ASIC (application specific integrated circuit).

Computer readable media (e.g., memory 8520 and/or the storage device 8530) suitable for storing computer program instructions and data may include all forms of non-volatile memory, media, and memory devices, including, by way of example, any semiconductor memory devices (e.g., EPROM, EEPROM, solid state memory devices, and flash memory devices); any magnetic disks (e.g., internal hard disks or removable disks); any magneto optical disks; and any CD-ROM and DVD-ROM disks. The processor and the memory can be supplemented by, or incorporated in, special purpose logic circuitry.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, implemented on one or more computing devices with one or more processors and memory, comprising:

tracking, by the one or more computing devices, first location data and second location data in real-time from a satellite navigation system;

continuously receiving, by the satellite navigation system, updates of at least one of the first location data and the second location data in real-time from a respective user device of a first user over a wireless or wired communication network;

dynamically determining, by the one or more computing devices, a plurality of virtual hubs based on the first location data and the second location data, wherein the plurality of virtual hubs comprises a first virtual hub determined based on the first location data and a second virtual hub determined based on the second location data, and wherein the virtual hubs are adjusted based on changing location data;

storing virtual hub location data corresponding to the first and second virtual hubs on a first database server;

determining, by the one or more computing devices, one or more virtual hub routes based on the plurality of virtual hubs, wherein a respective virtual hub route corresponds to a geographic route from a location corresponding to the first virtual hub to a location corresponding to the second virtual hub;

generating, by the one or more computing devices, one or more geolocation exchange units corresponding to respective digital representations of space capacity along the one or more virtual hub routes, wherein the space capacity comprises curb side capacity, sidewalk capacity, parking capacity, or combinations thereof;

detecting, at user interfaces of the respective user device of the first user and a respective user device of a second user, respective user network logins of the user interfaces using facial recognition or fingerprint recognition for authentication;

generating, by the one or more computing devices, a geolocation exchange for commoditized trading of the one or more geolocation exchange units based on the one or more virtual hub routes, wherein the geolocation exchange corresponds to market depth data, the market depth data comprising data indicating at least a bid price or offer price provided by the second user for a respective geolocation exchange unit;

storing the geolocation exchange on a second database server;

transmitting, over the wireless or wired communication network, the market depth data for the geolocation exchange to a respective detected user interface of the first user;

generating one or more graphical layers on the detected user interfaces of at least one of the first and second users, wherein:

the one or more graphical layers are configured to be superimposed onto a respective navigational map interface of the detected user interfaces, wherein the respective navigational map interface includes visualizations of at least first and second virtual hub routes of the one or more virtual hub routes;

the one or more graphical layers are further configured to be updated in real-time based on user input and real-time location data; and the one or more graphical layers comprise at least one or more of: buttons, icons, settings, tables, or menus configured for selection or manipulation by at least one of the first and second users, wherein the selection or the manipulation of the one or more graphical layers: corresponds to selecting or adjusting the one or more geolocation exchange units, and modifies availability and pricing of the one or more geolocation exchange units in real-time;

receiving, over the wireless or wired communication network, transaction input data from the respective detected user interface of the first user, wherein the transaction input data comprises data indicating an acceptance by the first user of the bid price or offer price provided by a respective detected user interface of the second user; and generating, by the one or more computing devices, a forward commodity geolocation exchange unit, the forward commodity geolocation exchange unit comprising a digital representation of a forward commodity contract between the first user and the second user for the respective geolocation exchange unit of the one or more geolocation exchange units based at least on the received transaction input data, wherein generating, by the one or more computer devices, the forward commodity geolocation exchange unit comprises:

detecting, by the one or more computing devices, the respective geolocation exchange unit; and applying and processing, by the one or more computing devices, one or more geolocation exchange unit transformations to the respective geolocation exchange unit to generate the forward commodity geolocation exchange unit, wherein the one or more geolocation exchange unit transformations comprise:

an interest rate for discount; a contract price; a default interest rate; an early termination date; a force majeure event; a letter of credit or performance assurance; a termination replacement price; a termination replacement transaction; a trade confirmation; a recorded confirmation; one or more remedies for product delivery failures corresponding to respective liquidated damages; events of default; or a calculation of a termination payment.

2. The method of claim 1, further comprising determining locations for the first user and the second user using the satellite navigation system in order to complete a physical delivery corresponding to the respective geolocation exchange unit for the first user and the second user, wherein:

the generated forward commodity geolocation exchange unit further comprises one or more cost of cover specifications, one or more liquidated damages specification, one or more force majeure specifications, or combinations thereof; and the detected user interfaces of the first and second users comprise touchscreen displays or augmented non-screen displays.

3. The method of claim 1, further comprising receiving transportation mode data from the first user, wherein:

the transportation mode data comprises data indicating a selection by the first user of one or more transportation modes for use with the space capacity corresponding to the respective geolocation exchange unit, wherein the one or more transportation modes comprise an automobile, an aircraft, an autonomous vehicle, a motorcycle, a bicycle, a boat, a bus, a taxicab, a drone, an unmanned aircraft, a virtual transportation mode, or a delivery vehicle; and the detected user interfaces of the first and second users comprise graphical user interfaces configured to display one or more integrated or overlayed layers.

4. The method of claim 1, wherein the first location data, the second location data, or both are determined using the satellite navigation system, wherein the forward commodity geolocation exchange unit is generated for the first and second users, and wherein the method further comprises:

combining, by the one or more computing devices, the one or more virtual hub routes and the transaction input data as one or more data objects; and storing, by the one or more computing devices, the one or more data objects in one or more databases of the one or more computing devices, wherein each of the one or more data objects corresponds to a respective forward commodity geolocation exchange unit.

5. The method of claim 1, wherein:

the method further comprises transmitting the market depth data to the detected user interfaces of at least one of the first and second users as one or more overlayed or integrated layers, wherein the one or more overlayed or integrated layers comprise the one or more graphical layers or graphical list views; and the forward commodity contract is for physical delivery of the respective geolocation exchange unit, and wherein the forward commodity contract comprises one or more conditional attributes to provide substitutability between first and second geolocation exchange units of the one or more geolocation exchange units.

6. The method of claim 1, wherein determining, by the one or more computing devices, the one or more virtual hub routes comprises:

receiving constraint data from the first user, wherein the constraint data indicates a selection by the first user, on one or more overlayed or integrated layers of the respective detected user interface of the first user, of one or more conditions for traveling between the first virtual hub and the second virtual hub; and determining the one or more virtual hub routes based on the plurality of virtual hubs and the constraint data.

7. The method of claim 6, wherein generating, by the one or more computing devices, the geolocation exchange comprises generating the geolocation exchange for the one or more geolocation exchange units based on the constraint data and the one or more virtual hub routes, wherein the geolocation exchange comprises a market exchange for the one or more geolocation exchange units, and wherein the forward commodity geolocation exchange unit comprises one or more commodity contract specifications.

8. The method of claim 6, wherein the one or more conditions comprise cheapest route, single mode of transportation, multiple modes of transportation, fastest route, most scenic route, highest rated route, most available route, highest volume of participants for route, most frequent route, service level for route, emissions reduction, highest safety and security level for route, or combinations thereof.

9. A computing system, comprising:

one or more processors; and one or more memory comprising program instructions executable by the one or more processors to:

track first location data and second location data in real-time from a satellite navigation system;

continuously receive, via the satellite navigation system, updates of at least one of the first location data and the second location data in real-time from a respective user device of a first user over a wireless or wired communication network, wherein the first location data corresponds to a first geographic location and the second location data corresponds to a second geographic location;

dynamically determine a plurality of virtual hubs based on the first location data and the second location data, wherein the plurality of virtual hubs comprises a first virtual hub determined based on the first location data and a second virtual hub determined based on the second location data, and wherein the virtual hubs are adjusted based on changing location data;

store virtual hub location data corresponding to the first and second virtual hubs on a first database server;

determine one or more virtual hub routes based on the plurality of virtual hubs, wherein a respective virtual hub route corresponds to a geographic route from the first geographic location corresponding to the first virtual hub to the second geographic location corresponding to the second virtual hub;

generate one or more geolocation exchange units corresponding to respective digital representations of space capacity along the one or more virtual hub routes, wherein the space capacity comprises curb side capacity, sidewalk capacity, parking capacity, or combinations thereof;

detect, at user interfaces of the respective user device of the first user and a respective user device of a second user, respective user network logins of the user interfaces using facial recognition or fingerprint recognition for authentication;

generate a geolocation exchange for commoditized trading of the one or more geolocation exchange units based on the one or more virtual hub routes, wherein the geolocation exchange corresponds to market depth data, the market depth data comprising data indicating at least a bid price or offer price provided by the second user for a respective geolocation exchange unit;

store the geolocation exchange on a second database server;

transmit, over the wireless or wired communication network, the market depth data for the geolocation exchange to a respective detected user interface of the first user;

generate one or more graphical layers on the detected user interfaces of at least one of the first and second users, wherein:

the one or more graphical layers are configured to be superimposed onto a respective navigational map interface of the detected user interfaces, wherein the respective navigational map interface includes visualizations of at least first and second virtual hub routes of the one or more virtual hub routes;

the one or more graphical layers are further configured to be updated in real-time based on user input and real-time location data; and the one or more graphical layers comprise at least one or more of: buttons, icons, settings, tables, or menus configured for selection or manipulation by at least one of the first and second users, wherein the selection or the manipulation of the one or more graphical layers: corresponds to selecting or adjusting the one or more geolocation exchange units, and modifies availability and pricing of the one or more geolocation exchange units in real-time;

receive, over the wireless or wired communication network, transaction input data from the respective detected user interface of the first user, wherein the transaction input data comprises data indicating an acceptance by the first user of the bid price or offer price provided by a respective detected user interface of the second user; and generate a forward commodity geolocation exchange unit, the forward commodity geolocation exchange unit comprising a digital representation of a forward commodity contract between the first user and the second user for the respective geolocation exchange unit of the one or more geolocation exchange units based at least on the received transaction input data, wherein generate the forward commodity geolocation exchange unit comprises:

detect the respective geolocation exchange unit; and apply and process one or more geolocation exchange unit transformations to the respective geolocation exchange unit to generate the forward commodity geolocation exchange unit, wherein the one or more geolocation exchange unit transformations comprise one or more of:

an interest rate for discount; a contract price; a default interest rate; an early termination date; a force majeure event; a letter of credit or performance assurance; a termination replacement price; a termination replacement transaction; a trade confirmation; a recorded confirmation; one or more remedies for product delivery failures corresponding to respective liquidated damages; events of default; or a calculation of a termination payment.

10. The computing system of claim 9, wherein the program instructions comprise program instructions executable by the one or more processors to determine locations for the first user and the second user using the satellite navigation system in order to complete a physical delivery corresponding to the respective geolocation exchange unit for the first user and the second user.

11. The computing system of claim 9, wherein the program instructions comprise program instructions executable by the one or more processors to receive transportation mode data from the first user, wherein the transportation mode data comprises data indicating a selection by the first user of one or more transportation modes for use with the space capacity corresponding to the respective geolocation exchange unit, wherein the one or more transportation modes comprise an automobile, an aircraft, an autonomous vehicle, a motorcycle, a bicycle, a boat, a bus, a taxicab, a drone, an unmanned aircraft, or a delivery vehicle.

12. The computing system of claim 9, wherein the first location data, the second location data, or both are determined using the satellite navigation system, wherein the forward commodity geolocation exchange unit is generated for the first and second users, and wherein the program instructions comprise program instructions executable by the one or more processors to:

combine the one or more virtual hub routes and the transaction input data as one or more data objects; and store the one or more data objects in one or more databases, wherein each of the one or more data objects corresponds to a respective forward commodity geolocation exchange unit.

13. The computing system of claim 9, wherein:

the forward commodity contract is for physical delivery of the respective geolocation exchange unit, wherein the forward commodity contract comprises one or more conditional attributes to provide fungibility for the one or more geolocation exchange units; and the generated forward commodity geolocation exchange unit further comprises one or more cost of cover specifications, one or more liquidated damages specification one or more force majeure specifications, or combinations thereof.

14. The computing system of claim 9, wherein the program instructions executable by the one or more processors to determine the one or more virtual hub routes comprise program instructions executable by the one or more processors to:

receive constraint data from the first user, wherein the constraint data indicates a selection by the first user of one or more conditions for traveling between the first virtual hub and the second virtual hub; and determine the one or more virtual hub routes based on the plurality of virtual hubs and the constraint data.

15. The computing system of claim 14, wherein the program instructions executable by the one or more processors to generate the geolocation exchange comprise program instructions executable by the one or more processors to generate the geolocation exchange for the one or more geolocation exchange units based on the constraint data and the one or more virtual hub routes, wherein the geolocation exchange comprises a market exchange for the one or more geolocation exchange units, and wherein the forward commodity geolocation exchange unit comprises one or more commodity contract specifications.

16. The computing system of claim 14, wherein the one or more conditions comprise cheapest route, single mode of transportation, multiple modes of transportation, fastest route, most scenic route, highest rated route, most available route, highest volume of participants for route, most frequent route, service level for route, highest safety and security level for route, or combination thereof.

17. A non-transitory computer-readable medium having stored thereon a plurality of computer-executable instructions which, when executed by a computer, cause the computer to:

track first location data and second location data in real-time from a satellite navigation system;

continuously receive, via the satellite navigation system, updates of at least one of the first location data and the second location data in real-time from a respective user device of a first user over a wireless or wired communication network, wherein the first location data corresponds to a first geographic location and the second location data corresponds to a second geographic location;

dynamically determine a plurality of virtual hubs based on the first location data and the second location data, wherein the plurality of virtual hubs comprises a first virtual hub determined based on the first location data and a second virtual hub determined based on the second location data, and wherein the virtual hubs are adjusted based on changing location data;

store virtual hub location data corresponding to the first and second virtual hubs on a first database server;

determine one or more virtual hub routes based on the plurality of virtual hubs, wherein a respective virtual hub route corresponds to a geographic route from the first geographic location corresponding to the first virtual hub to the second geographic location corresponding to the second virtual hub;

generate one or more geolocation exchange units corresponding to respective digital representations of space capacity along the one or more virtual hub routes, wherein the space capacity comprises curb side capacity, sidewalk capacity, parking capacity, or combinations thereof;

detect user interfaces of the respective user device of the first user and a respective user device of a second user, respective user network logins of the user interfaces using facial recognition or fingerprint recognition for authentication;

generate a geolocation exchange for commoditized trading of the one or more geolocation exchange units based on the one or more virtual hub routes, wherein the geolocation exchange corresponds to market depth data, the market depth data comprising data indicating at least a bid price or offer price provided by the second user for a respective geolocation exchange unit;

store the geolocation exchange on a second database server;

transmit, over the wireless or wired communication network, the market depth data for a respective geolocation exchange to a respective detected user interface of the first user;

generate one or more graphical layers on the detected user interfaces of at least one of the first and second users, wherein:

the one or more graphical layers are configured to be superimposed onto a respective navigational map interface of the detected user interfaces, wherein the respective navigational map interface includes visualizations of at least first and second virtual hub routes of the one or more virtual hub routes;

the one or more graphical layers are further configured to be updated in real-time based on user input and real-time location data; and the one or more graphical layers comprise at least one or more of: buttons, icons, settings, tables, or menus configured for selection or manipulation by at least one of the first and second users, wherein the user the selection or the manipulation of the one or more graphical layers: corresponds to selecting or adjusting the one or more geolocation exchange units, and modifies availability and pricing of the one or more geolocation exchange units in real-time;

receive, over the wireless or wired communication network, transaction input data from the respective detected user interface of the first user, wherein the transaction input data comprises data indicating an acceptance by the first user of the bid price or offer price provided by a respective detected user interface of the second user; and generate a forward commodity geolocation exchange unit, the forward commodity geolocation exchange unit comprising a digital representation of a forward commodity contract between the first user and the second user for the respective geolocation exchange unit of the one or more geolocation exchange units based at least on the received transaction input data, wherein generate the forward commodity geolocation exchange unit comprises:

detect the respective geolocation exchange unit; and apply and process one or more geolocation exchange unit transformations to the respective geolocation exchange unit to generate the forward commodity geolocation exchange unit, wherein the one or more geolocation exchange unit transformations comprise one or more of:

an interest rate for discount; a contract price; a default interest rate; an early termination date; a force majeure event; a letter of credit or performance assurance; a termination replacement price; a termination replacement transaction; a trade confirmation; a recorded confirmation; one or more remedies for product delivery failures corresponding to respective liquidated damages; events of default; or a calculation of a termination payment.

18. The non-transitory computer-readable medium of claim 17, wherein the plurality of computer-executable instructions, when executed by the computer, further cause the computer to:

determine locations for the first user and the second user using the satellite navigation system in order to complete a physical delivery corresponding to the respective geolocation exchange unit for the first user and the second user, wherein the forward commodity geolocation exchange unit is generated for the first and second users;

combine the one or more virtual hub routes and the transaction input data as one or more data objects; and store the one or more data objects in one or more databases, wherein each of the one or more data objects corresponds to a respective forward commodity geolocation exchange unit.

19. The non-transitory computer-readable medium of claim 17, wherein the plurality of computer-executable instructions, when executed by the computer, further cause the computer to receive transportation mode data from the first user, wherein:

the respective geolocation exchange unit is detected by a brain wave interface at one or more computer devices; and the transportation mode data comprises data indicating a selection by the first user of one or more transportation modes for use with the space capacity corresponding to the respective geolocation exchange unit, wherein the one or more transportation modes comprise an automobile, an aircraft, an autonomous vehicle, a motorcycle, a bicycle, a boat, a bus, a taxicab, a drone, an unmanned aircraft, or a delivery vehicle.

20. The non-transitory computer-readable medium of claim 17, wherein the first location data, the second location data, or both are determined using the satellite navigation system.

* * * * *